US011620491B2

(12) United States Patent
Wang et al.

(10) Patent No.: US 11,620,491 B2
(45) Date of Patent: Apr. 4, 2023

(54) NEURAL PROCESSOR

(71) Applicant: Samsung Electronics Co., Ltd., Suwon-si (KR)

(72) Inventors: Lei Wang, Burlingame, CA (US); Ilia Ovsiannikov, Porter Ranch, CA (US)

(73) Assignee: SAMSUNG ELECTRONICS CO., LTD.

( * ) Notice: Subject to any disclaimer, the term of this patent is extended or adjusted under 35 U.S.C. 154(b) by 208 days.

(21) Appl. No.: 16/842,700

(22) Filed: Apr. 7, 2020

(65) Prior Publication Data

US 2020/0234099 A1 Jul. 23, 2020

Related U.S. Application Data

(63) Continuation-in-part of application No. 16/446,610, filed on Jun. 19, 2019.

(Continued)

(51) Int. Cl.
*G06T 9/00* (2006.01)
*G06N 3/063* (2006.01)
(Continued)

(52) U.S. Cl.
CPC ............. *G06N 3/04* (2013.01); *G06F 17/153* (2013.01); *G06F 17/16* (2013.01); *G06N 3/08* (2013.01); *G06T 9/002* (2013.01); *G06F 9/3001* (2013.01)

(58) Field of Classification Search
None
See application file for complete search history.

(56) References Cited

U.S. PATENT DOCUMENTS 5,285,403 A 2/1994 Quisquater et al.
5,499,382 A 3/1996 Nusinov et al.
(Continued)

FOREIGN PATENT DOCUMENTS

EP 0617518 A2 9/1994
EP 3104309 A2 12/2016
(Continued)

OTHER PUBLICATIONS

Notice of Allowance for U.S. Appl. No. 16/847,631, dated Apr. 26, 2021.

(Continued)

*Primary Examiner* — Joni Hsu
(74) *Attorney, Agent, or Firm* — Renaissance IP Law Group LLP

(57) ABSTRACT

A processor includes a register, a non-zero weight value selector and a multiplier. The register holds a first group of weight values and a second group of weight values. Each group of weight values includes at least one weight value, and each weight value in the first group of weight values corresponding to a weight value in the second group of weight values. The non-zero weight value selector selects a non-zero weight value from a weight value in the first group of weight values or a non-zero weight value in the second group of weight values that corresponds to the weight value in the first group of weight values. The multiplier multiplies the selected non-zero weight value and an activation value that corresponds to the selected non-zero weight value to form an output product value.

20 Claims, 134 Drawing Sheets

Related U.S. Application Data

(60) Provisional application No. 62/689,008, filed on Jun. 22, 2018, provisional application No. 62/798,297, filed on Jan. 29, 2019, provisional application No. 62/841,590, filed on May 1, 2019, provisional application No. 62/841,606, filed on May 1, 2019, provisional application No. 62/835,496, filed on Apr. 17, 2019, provisional application No. 62/841,819, filed on May 1, 2019.

(51) Int. Cl.

| | |
|---|---|
| ***G06N 3/04*** | (2006.01) |
| ***G06F 17/16*** | (2006.01) |
| ***G06N 3/08*** | (2023.01) |
| ***G06F 17/15*** | (2006.01) |
| *G06F 9/30* | (2018.01) |

(56) References Cited

U.S. PATENT DOCUMENTS

| | | | |
|---|---|---|---|
| 5,696,959 | A | 12/1997 | Guttag et al. |
| 5,727,225 | A | 3/1998 | Guttag et al. |
| 5,798,719 | A | 8/1998 | Wise et al. |
| 5,805,913 | A | 9/1998 | Guttag et al. |
| 5,857,035 | A | 1/1999 | Rust |
| 6,032,170 | A | 2/2000 | Guttag et al. |
| 6,055,204 | A | 4/2000 | Bosshart |
| 6,061,749 | A | 5/2000 | Webb et al. |
| 6,195,026 | B1 | 2/2001 | Acharya |
| 6,370,558 | B1 | 4/2002 | Guttag et al. |
| 6,888,941 | B2 | 5/2005 | Rose |
| 7,174,047 | B2 | 2/2007 | Lin et al. |
| 8,223,966 | B2 | 7/2012 | Yeh |
| 8,285,766 | B2 | 10/2012 | Lee et al. |
| 9,418,458 | B2 | 8/2016 | Chertok et al. |
| 9,721,203 | B1 | 8/2017 | Young et al. |
| 9,836,691 | B1 | 12/2017 | Narayanaswami et al. |
| 9,904,874 | B2 | 2/2018 | Shoaib et al. |
| 10,096,134 | B2 | 10/2018 | Yan et al. |
| 10,216,520 | B2 | 2/2019 | Day et al. |
| 10,297,214 | B2 | 5/2019 | Lin |
| 10,438,117 | B1 | 10/2019 | Ross et al. |
| 10,521,488 | B1 | 12/2019 | Ross et al. |
| 10,706,147 | B1 | 7/2020 | Pohlack et al. |
| 11,250,326 | B1 | 2/2022 | Ko et al. |
| 2005/0093873 | A1 | 5/2005 | Paltashev et al. |
| 2007/0285417 | A1 | 12/2007 | Prokopenko et al. |
| 2007/0297252 | A1 | 12/2007 | Singh |
| 2015/0161927 | A1 | 6/2015 | Hekstra |
| 2015/0170021 | A1* | 6/2015 | Lupon .................. G06N 3/0454 706/15 |
| 2015/0378734 | A1 | 12/2015 | Hansen et al. |
| 2015/0379072 | A1 | 12/2015 | Dirac et al. |
| 2016/0358069 | A1 | 12/2016 | Brothers et al. |
| 2017/0011288 | A1 | 1/2017 | Brothers et al. |
| 2017/0103306 | A1 | 4/2017 | Henry et al. |
| 2017/0103314 | A1 | 4/2017 | Ross |
| 2017/0124452 | A1 | 5/2017 | Tucker et al. |
| 2017/0316312 | A1 | 11/2017 | Goyal et al. |
| 2017/0357891 | A1 | 12/2017 | Judd et al. |
| 2018/0032859 | A1 | 2/2018 | Park et al. |
| 2018/0046894 | A1 | 2/2018 | Yao |
| 2018/0046906 | A1 | 2/2018 | Dally et al. |
| 2018/0046913 | A1 | 2/2018 | Yu et al. |
| 2018/0046916 | A1 | 2/2018 | Dally et al. |
| 2018/0096226 | A1* | 4/2018 | Aliabadi .................. G06N 3/10 |
| 2018/0101743 | A1 | 4/2018 | Yang et al. |
| 2018/0129935 | A1 | 5/2018 | Kim et al. |
| 2018/0129939 | A1 | 5/2018 | Yang |
| 2018/0150240 | A1 | 5/2018 | Bernat et al. |
| 2018/0181857 | A1 | 6/2018 | Mathew et al. |
| 2018/0188704 | A1 | 7/2018 | Cella et al. |
| 2018/0189642 | A1 | 7/2018 | Boesch et al. |
| 2018/0217962 | A1 | 8/2018 | Takahashi |
| 2018/0218518 | A1* | 8/2018 | Yan ......................... G06T 9/002 |
| 2018/0259970 | A1 | 9/2018 | Wang et al. |
| 2018/0285254 | A1 | 10/2018 | Baum et al. |
| 2018/0307495 | A1 | 10/2018 | Ould-Ahmed-Vall et al. |
| 2018/0307783 | A1* | 10/2018 | Hah ........................ G06F 30/34 |
| 2018/0307950 | A1 | 10/2018 | Nealis et al. |
| 2019/0042911 | A1* | 2/2019 | Koren ................... G06N 7/005 |
| 2019/0042923 | A1 | 2/2019 | Janedula et al. |
| 2019/0065896 | A1 | 2/2019 | Lee et al. |
| 2019/0066257 | A1 | 2/2019 | Daga et al. |
| 2019/0079764 | A1 | 3/2019 | Diamond et al. |
| 2019/0087713 | A1 | 3/2019 | Lamb et al. |
| 2019/0095130 | A1 | 3/2019 | Xu et al. |
| 2019/0108436 | A1 | 4/2019 | David et al. |
| 2019/0114511 | A1 | 4/2019 | Gao et al. |
| 2019/0147327 | A1 | 5/2019 | Martin |
| 2019/0156201 | A1 | 5/2019 | Bichler et al. |
| 2019/0158338 | A1* | 5/2019 | Herath ................ H04L 27/3488 |
| 2019/0205095 | A1 | 7/2019 | Gupta et al. |
| 2019/0236049 | A1 | 8/2019 | Vantrease et al. |
| 2019/0392287 | A1 | 12/2019 | Ovsiannikov et al. |
| 2020/0210517 | A1 | 7/2020 | Baum et al. |
| 2020/0336273 | A1 | 10/2020 | Ovsiannikov et al. |
| 2021/0011732 | A1 | 1/2021 | Botimer et al. |

FOREIGN PATENT DOCUMENTS

| | | | |
|---|---|---|---|
| GB | 2560600 | A | 9/2018 |
| TW | 201706871 | A | 2/2017 |
| WO | 2016186801 | A1 | 11/2016 |
| WO | 2016186826 | A1 | 11/2016 |
| WO | 2017129325 | A1 | 8/2017 |
| WO | 2017142397 | A1 | 8/2017 |
| WO | 2017186830 | A1 | 11/2017 |
| WO | 2019213745 | A1 | 11/2019 |

OTHER PUBLICATIONS

Notice of Allowance for U.S. Appl. No. 16/847,645, dated Apr. 30, 2021.

Office Action for U.S. Appl. No. 16/842,682, dated Apr. 29, 2021.

Corrected Notice of Allowability for U.S. Appl. No. 16/847,645, dated Aug. 6, 2021.

Notice of Allowance for U.S. Appl. No. 16/842,682, dated Aug. 19, 2021.

Supplemental Notice of Allowability for U.S. Appl. No. 16/847,631, dated Aug. 10, 2021.

Chen, Mingzhe et al., "Machine Learning for Wireless Networks with Artificial Intelligence: A Tutorial on Neural Networks", (arXiv preprint arXiv:1710.02913. Oct. 9, 2017.), Oct. 9, 2017, 98 pages.

Extended European Search Report for Application No. 20170105.9, dated Sep. 23, 2020.

Office Action for U.S. Appl. No. 16/842,682, dated Sep. 14, 2020.

Panda, Sunita, et al., "A new training strategy for neural network using shuffled frog-leaping algorithm and application to channel equalization," AEU—International Journal of Electronics and Communications, vol. 68, Issue 11, Nov. 1, 2014.

Sidelnikov, Oleg, et al., "Nonlinear Equalization in Long Haul Transmission Systems Using Dynamic Multi-Layer Perceptron Networks," 2018 European Conference on Optical Communication (ECOC), Rome, Sep. 23, 2018.

Wikipedia, "Multiplexer," Apr. 5, 2019 (Apr. 5, 2019), XP055727184, Retrieved from the Internet: URL:https://en.wikipedia.org/w/index.php?title=Multiplexer&oldid=891125543 [retrieved on Sep. 3, 2020], 7 pages.

Wu, Zhenning et al., "A PCA and ELM Based Adaptive Method for Channel Equalization in MFL Inspection", Hindawi Publishing Corporation Mathematical Problems in Engineering, vol. 2014, Article ID 124968, 8 pages (http://dx.doi.org/10.1155/2014/124968), published Aug. 12, 2014.

Corrected Notice of Allowability for U.S. Appl. No. 16/847,645, dated Sep. 16, 2021.

Notice of Allowance for U.S. Appl. No. 17/237,038, dated Oct. 26, 2021.

(56) References Cited

OTHER PUBLICATIONS

Supplemental Notice of Allowability for U.S. Appl. No. 16/842,682, dated Sep. 16, 2021.
Supplemental Notice of Allowability for U.S. Appl. No. 16/847,631, dated Sep. 9, 2021.
Ahmad et al., "FPGA-based Accelerators of Deep Learning Networks for Learning and Classification: A Review," Jan. 1, 2019, Date of publication 2018 00, 0000, date of current version 2018 00, 0000. Digital Object Identifier 10.1109/ACCESS.2018.2890150DOI, arXiv:1901.00121vl[cs.NE[, pp. 1-41.
Aimar et al., "NullHop: A Flexible Convolutional Neural Network Accelerator Based on Sparse Representations of Feature Maps," Mar. 6, 2018, arXiv:1706.01406v2 [cs.CV], pp. 1-13.
Lascorz, AD. et al., "Bit-Tactical: Exploiting Ineffectual Computations in Convolutional Neural Networks: Which, Why, and How", Cornell University, Computer Science, Neural and Evolutionary Computing, Mar. 9, 2018, pp. 1-14, arXiv:1803.03688vl.
Mittal, Sparsh, "A survey of FPGA-based accelerators for convolutional neural networks," Neural Computing and Applications, 2020, 32 pages, Nov. 2020.
Notice of Allowance for U.S. Appl. No. 16/842,682, dated Jan. 15, 2021.
Notice of Allowance for U.S. Appl. No. 16/847,645, dated Mar. 31, 2021.
Office Action for U.S. Appl. No. 16/847,631, dated Feb. 11, 2021.
Shaoli et al., "Cambricon: An Instruction Set Architecture for Neural Networks," 2016 ACM/IEEE 43rd Annual International Symposium on Computer Architecture, pp. 1-13, Aug. 2016.
Sombatsiri, Salita, et al., "Parallelism-Flexible Convolution Core for Sparse Convolutional Neural Networks," SASIMI 2018 Proceedings, 2018, pp. 188-193.
Vu-Hsin et al., "Eyeriss v2: A Flexible Accelerator for Emerging Deep Neural Networks on Mobile Devices," May 20, 2019, arXiv:1807 07928V2 [csDC], pp. 1-21.
Notice of Allowance for U.S. Appl. No. 16/842,662, dated Jun. 7, 2022.
Office Action for U.S. Appl. No. 16/446,610, dated Jun. 6, 2022.
Office Action for U.S. Appl. No. 16/847,642, dated Jul. 25, 2022.
Office Action for U.S. Appl. No. 17/465,841, dated Sep. 23, 2022.
Supplemental Notice of Allowability for U.S. Appl. No. 16/842,662, dated Sep. 14, 2022.
Corrected Notice of Allowability for U.S. Appl. No. 16/842,662, dated Oct. 28, 2022.
Notice of Allowance for U.S. Appl. No. 16/842,662, dated Nov. 15, 2022.
Notice of Allowance for U.S. Appl. No. 16/847,642, dated Nov. 16, 2022.
Final Office Action for U.S. Appl. No. 16/446,610, dated Nov. 28, 2022.
Office Action for U.S. Appl. No. 17/465,841, dated Jan. 9, 2023.
Supplemental Notice of Allowability for U.S. Appl. No. 16/842,662, dated Jan. 19, 2023.
Supplemental Notice of Allowability for U.S. Appl. No. 16/847,642, dated Jan. 17, 2023.

* cited by examiner

| Convolution Size | Zigzag Scan "Z" Value | | | |
|---|---|---|---|---|
| | 1 | 2 | 3 | 4 |
| 1 | 0 | 0 | 0 | 0 |
| 2 | 12 | 16 | 20 | 24 |
| 3 | 16 | 20 | 24 | 28 |
| 4 | 15 | 18 | 21 | 24 |

Cache register file size (bytes), per lane, per tile

FIG. 1Q

Slide convolution window horizontally

Slide convolution window vertically to go to next row

Slide convolution window horizontally

Slide convolution window vertically to go to next row

| Conv Size | Z | | | | | | | | | |
|---|---|---|---|---|---|---|---|---|---|---|
| | 1 | 2 | 3 | 4 | 5 | 6 | 7 | 8 | 9 | 10 |
| 1 | 1.0 | 1.0 | 1.0 | 1.0 | 1.0 | 1.0 | 1.0 | 1.0 | 1.0 | 1.0 |
| 2 | 2.0 | 1.5 | 1.3 | 1.3 | 1.2 | 1.2 | 1.1 | 1.1 | 1.1 | 1.1 |
| 3 | 3.0 | 2.0 | 1.7 | 1.5 | 1.4 | 1.3 | 1.3 | 1.3 | 1.2 | 1.2 |
| 4 | 4.0 | 2.5 | 2.0 | 1.8 | 1.6 | 1.5 | 1.4 | 1.4 | 1.3 | 1.3 |
| 5 | 5.0 | 3.0 | 2.3 | 2.0 | 1.8 | 1.7 | 1.6 | 1.5 | 1.4 | 1.4 |
| 6 | 6.0 | 3.5 | 2.7 | 2.3 | 2.0 | 1.8 | 1.7 | 1.6 | 1.6 | 1.5 |
| 7 | 7.0 | 4.0 | 3.0 | 2.5 | 2.2 | 2.0 | 1.9 | 1.8 | 1.7 | 1.6 |
| 8 | 8.0 | 4.5 | 3.3 | 2.8 | 2.4 | 2.2 | 2.0 | 1.9 | 1.8 | 1.7 |
| 9 | 9.0 | 5.0 | 3.7 | 3.0 | 2.6 | 2.3 | 2.1 | 2.0 | 1.9 | 1.8 |
| 10 | 10.0 | 5.5 | 4.0 | 3.3 | 2.8 | 2.5 | 2.3 | 2.1 | 2.0 | 1.9 |
| 11 | 11.0 | 6.0 | 4.3 | 3.5 | 3.0 | 2.7 | 2.4 | 2.3 | 2.1 | 2.0 |

FIG. 2E

| Conv Size | SRAM reads per clock | | | | | | | | | |
|---|---|---|---|---|---|---|---|---|---|---|
| | 1 | 2 | 3 | 4 | 5 | 6 | 7 | 8 | 9 | 10 |
| 1 | 1.00 | 1.00 | 1.00 | 1.00 | 1.00 | 1.00 | 1.00 | 1.00 | 1.00 | 1.00 |
| 2 | 0.50 | 0.38 | 0.33 | 0.31 | 0.30 | 0.29 | 0.29 | 0.28 | 0.28 | 0.28 |
| 3 | 0.33 | 0.22 | 0.19 | 0.17 | 0.16 | 0.15 | 0.14 | 0.14 | 0.14 | 0.13 |
| 4 | 0.25 | 0.16 | 0.13 | 0.11 | 0.10 | 0.09 | 0.09 | 0.09 | 0.08 | 0.08 |
| 5 | 0.20 | 0.12 | 0.09 | 0.08 | 0.07 | 0.07 | 0.06 | 0.06 | 0.06 | 0.06 |
| 6 | 0.17 | 0.10 | 0.07 | 0.06 | 0.06 | 0.05 | 0.05 | 0.05 | 0.04 | 0.04 |
| 7 | 0.14 | 0.08 | 0.06 | 0.05 | 0.04 | 0.04 | 0.04 | 0.04 | 0.03 | 0.03 |
| 8 | 0.13 | 0.07 | 0.05 | 0.04 | 0.04 | 0.03 | 0.03 | 0.03 | 0.03 | 0.03 |
| 9 | 0.11 | 0.06 | 0.05 | 0.04 | 0.03 | 0.03 | 0.03 | 0.02 | 0.02 | 0.02 |
| 10 | 0.10 | 0.06 | 0.04 | 0.03 | 0.03 | 0.03 | 0.02 | 0.02 | 0.02 | 0.02 |
| 11 | 0.09 | 0.05 | 0.04 | 0.03 | 0.02 | 0.02 | 0.02 | 0.02 | 0.02 | 0.02 |

FIG. 2F

BROADCAST 16 REDUCE 1

BROADCAST 16 REDUCE 1, partial results

BROADCAST 16 REDUCE 1, final results

BROADCAST 16 REDUCE 1, final results

BROADCAST 16 REDUCE 2

BROADCAST 8 REDUCE 2, partial results

BROADCAST 8 REDUCE 2, final results

BROADCAST 4 REDUCE 4

BROADCAST 4 REDUCE 4, final results

BROADCAST 2 REDUCE 8

BROADCAST 2 REDUCE 8, partial results

BROADCAST 2 REDUCE 8, partial results

BROADCAST 1 REDUCE 16

BROADCAST 1 REDUCE 16, partial and final results

| Broadcast | FC Multiplier Utilization |
|---|---|
| 16 | 98.5% |
| 8 | 97.0% |
| 4 | 94.1% |
| 2 | 88.9% |
| 1 | 80.0% |

FIG. 6

NEURAL PROCESSOR

CROSS-REFERENCE TO RELATED APPLICATION(S)

The present application is a continuation-in-part patent application of U.S. patent application Ser. No. 16/446,610, filed Jun. 19, 2019, entitled "Neural Processor," which claims priority to and the benefit of (i) U.S. Provisional Application No. 62/689,008, filed Jun. 22, 2018, entitled "SINGLE-PASS NEURAL PROCESSOR ACCELERATOR ARCHITECTURE," (ii) U.S. Provisional Application No. 62/798,297, filed Jan. 29, 2019, entitled "SINGLE PASS NPU," (iii) U.S. Provisional Application No. 62/841,590, filed May 1, 2019, entitled "MIXED-PRECISION NPU TILE WITH DEPTH-WISE CONVOLUTION," (iv) U.S. Provisional Application No. 62/841,606, filed May 1, 2019, entitled "MIXED-PRECISION NEURAL-PROCESSING UNIT TILE," (v) U.S. Provisional Application No. 62/835,496, filed Apr. 17, 2019, entitled "HARDWARE CHANNEL-PARALLEL DATA COMPRESSION/DECOMPRESSION," and (vi) U.S. Provisional Application No. 62/841,819, filed May 1, 2019, entitled "MIXED PRECISION COMPRESSION," the entire content of all are incorporated herein by reference.

FIELD

One or more aspects of embodiments according to the present disclosure relate to processing circuits, and more particularly to a processing circuit for performing combinations of multiplications and additions.

BACKGROUND

In operation, neural networks may perform tensor operations (e.g., tensor multiplications and convolutions) involving large numbers of multiplications and additions. If performed by a general-purpose central processing unit, or even a graphics processing unit (which may be better suited to such a task) these operations may be relatively slow and incur a relatively high energy cost per operation. Especially in small devices (e.g., mobile, hand-held devices), which may have tightly constrained power budgets, the power consumption associated with the use of a general-purpose central processing unit, or of a graphics processing unit, may be a significant disadvantage.

Thus, there is a need for an improved processing circuit for neural network calculations.

SUMMARY

According to some embodiments of the present disclosure, there is provided a processor, including: a first tile, a second tile, a memory, and a bus, the bus being connected to: the memory, the first tile, and the second tile, the first tile including: a first weight register, a second weight register, an activations buffer, a first multiplier, and a second multiplier, the first tile being configured to perform a convolution of an array of activations with a kernel of weights, the performing of the convolution including, in order: forming a tensor product of the kernel with a first subarray of the array of activations; forming a tensor product of the kernel with a second subarray of the array of activations, the second subarray being offset from the first subarray by n array elements in a first direction, n being a positive integer; and forming a tensor product of the kernel with a third subarray of the array of activations, the third subarray being offset from the second subarray by one array element in a second direction, perpendicular to the first direction.

In some embodiments, the performing of the convolution further includes, in order, after the forming of the tensor product of the kernel with the third subarray: forming a tensor product of the kernel with a fourth subarray of the array of activations, the fourth subarray being offset from the third subarray by m array elements in a third direction, opposite to the first direction, m being a positive integer, and forming a tensor product of the kernel with a fifth subarray of the array of activations, the fifth subarray being offset from the fourth subarray by one array element in the second direction.

In some embodiments, m equals n.

In some embodiments, n equals 1.

In some embodiments, the performing of the convolution further includes, in order, after the forming of the products of the kernel with the first subarray: forming n−1 products of the kernel with n−1 respective subarrays of the array of activations, the subarray in a k-th product, of the n−1 products, being offset from the first subarray by k+1 array elements in the first direction.

In some embodiments, the processor further includes a cache, connected to the activations buffer and configured to supply activations to the activations buffer, the cache having a size sufficient to store $H+(H+n)*(W-1)-1$ activations, wherein: H is a size of the kernel in the first direction, and W is a size of the kernel in the second direction.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processor further includes: a first adder, configured, in the first state: to be connected to an output of the first multiplier, and an output of the second multiplier, and to add; a product received from the output of the first multiplier, and a product received from the output of the second multiplier.

In some embodiments, the processor further includes a second adder, configured, in the second state, to be connected to the output of the first multiplier.

According to some embodiments of the present disclosure, there is provided a method for calculating with a processing circuit, the processing circuit including: a first tile, a second tile, a memory, and a bus, the bus being connected to: the memory, the first tile, and the second tile, the first tile including: a first weight register, a second weight register, an activations buffer, a first multiplier, and a second multiplier, the method including performing a convolution of an array of activations with a kernel of weights, the performing of the convolution including, in order: forming a tensor product of the kernel with a first subarray of the array of activations; forming a tensor product of the kernel with a second subarray of the array of activations, the second subarray being offset from the first subarray by n array elements in a first direction, n being a positive integer; and forming a tensor product of the kernel with a third subarray of the array of activations, the third subarray being offset from the second subarray by one array element in a second direction, perpendicular to the first direction.

In some embodiments, the performing of the convolution further includes, in order, after the forming of the tensor product of the kernel with the third subarray: forming a tensor product of the kernel with a fourth subarray of the array of activations, the fourth subarray being offset from the third subarray by m array elements in a third direction, opposite to the first direction, m being a positive integer, and forming a tensor product of the kernel with a fifth subarray of the array of activations, the fifth subarray being offset from the fourth subarray by one array element in the second direction.

In some embodiments, m equals n.

In some embodiments, n equals 1.

In some embodiments, the performing of the convolution further includes, in order, after the forming of the products of the kernel with the first subarray: forming n−1 products of the kernel with n−1 respective subarrays of the array of activations, the subarray in a k-th product, of the n−1 products, being offset from the first subarray by k+1 array elements in the first direction.

In some embodiments, the processing circuit further includes a cache, connected to the activations buffer and configured to supply activations to the activations buffer, the cache having a size sufficient to store H+(H+n)*(W−1)−1 activations, wherein: H is a size of the kernel in the first direction, and W is a size of the kernel in the second direction.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processing circuit further includes a first adder, the method further including, in the first state: connecting the first adder to: an output of the first multiplier, and an output of the second multiplier, and adding, by the first adder: a product received from the output of the first multiplier, and a product received from the output of the second multiplier.

According to some embodiments of the present disclosure, there is provided a method for calculating with a means for processing, the means for processing including: a first tile, a second tile, a memory, and a bus, the bus being connected to: the memory, the first tile, and the second tile, the first tile including: a first weight register, a second weight register, an activations buffer, a first multiplier, and a second multiplier, the method including performing a convolution of an array of activations with a kernel of weights, the performing of the convolution including, in order: forming a tensor product of the kernel with a first subarray of the array of activations; forming a tensor product of the kernel with a second subarray of the array of activations, the second subarray being offset from the first subarray by n array elements in a first direction, n being a positive integer; and forming a tensor product of the kernel with a third subarray of the array of activations, the third subarray being offset from the second subarray by one array element in a second direction, perpendicular to the first direction.

According to some embodiments of the present disclosure, there is provided a processor, including: a first tile, a second tile, a memory, and a bus, the bus being connected to: the memory, the first tile, and the second tile, the first tile including: a first weight register, a second weight register, an activations buffer, a first multiplier, and a second multiplier, the processor being configured to perform a first convolution of an array of activations with a first kernel of weights, the performing of the first convolution including: broadcasting a first subarray of the array of activations to: the first tile, and the second tile; forming a first tensor product, the first tensor product being a tensor product of a first subarray of the first kernel of weights with the first subarray of the array of activations; storing the first tensor product in the memory; broadcasting a second subarray of the array of activations to: the first tile, and the second tile; forming a second tensor product, the second tensor product being a tensor product of a second subarray of the first kernel of weights with the second subarray of the array of activations; and adding the first tensor product and the second tensor product.

In some embodiments, the first tile further includes a weight decompression unit configured to: decompress a data word encoding a plurality of weights in compressed form, to extract a first weight and a second weight; input the first weight to the first weight register; and input the second weight to the second weight register.

In some embodiments, the first tile is further configured to perform a second convolution of an array of activations with a second kernel of weights, the performing of the second convolution including, in order: forming a tensor product of a first portion of the second kernel with a first subarray of the array of activations, the first portion of the second kernel including a weight stored in the first weight register; forming a tensor product of a second portion of the second kernel with the first subarray of the array of activations, the second portion of the second kernel including a weight stored in the second weight register; and forming a tensor product of the first portion of the second kernel with a second subarray of the array of activations, the first portion of the second kernel including the weight stored in the first weight register.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processor further includes: a first adder, configured, in the first state: to be connected to an output of the first multiplier, and an output of the second multiplier; and to add; a product received from the output of the first multiplier, and a product received from the output of the second multiplier.

In some embodiments, the processor further includes a second adder, configured, in the second state, to be connected to the output of the first multiplier.

In some embodiments, the processor further includes: a first accumulator connected to the first adder, and a second accumulator connected to the second adder, the first accumulator including a register and being configured, in the first state: to add to a value in the register of the first accumulator a sum received from the first adder, to form an accumulated value of the first accumulator, and to store the accumulated value of the first accumulator in the register of the first accumulator.

In some embodiments, the second accumulator includes a register and is configured, in the second state, to add to a value in the register of the second accumulator a sum received from the second adder, to form an accumulated value of the second accumulator, and to store the accumulated value of the second accumulator in the register of the second accumulator.

In some embodiments, the processor further includes an activation zero skip control circuit configured to: determine whether the output register of the first queue contains zero, and in response to determining that the output register of the first queue contains zero, cause the first tile to operate in the second state.

According to some embodiments of the present disclosure, there is provided a method for calculating with a processing circuit, the processing circuit including: a first tile, a second tile, a memory, and a bus, the bus being connected to: the memory, the first tile, and the second tile, the first tile including: a first weight register, a second weight register, an activations buffer, a first multiplier, and a second multiplier, the method including performing a first convolution of an array of activations with a first kernel of weights, the performing of the first convolution including: broadcasting a first subarray of the array of activations to: the first tile, and the second tile; forming a first tensor product, the first tensor product being a tensor product of a first subarray of the first kernel of weights with the first subarray of the array of activations; storing the first tensor product in the memory; broadcasting a second subarray of the array of activations to: the first tile, and the second tile; forming a second tensor product, the second tensor product being a tensor product of a second subarray of the first kernel of weights with the second subarray of the array of activations; and adding the first tensor product and the second tensor product.

In some embodiments, the first tile further includes a weight decompression unit, and the method further includes: decompressing, by the weight decompression unit, a data word encoding a plurality of weights in compressed form, to extract a first weight and a second weight; inputting the first weight to the first weight register; and inputting the second weight to the second weight register.

In some embodiments, the method further includes performing a second convolution of an array of activations with a second kernel of weights, the performing of the second convolution including, in order: forming a tensor product of a first portion of the second kernel with a first subarray of the array of activations, the first portion of the second kernel including a weight stored in the first weight register; forming a tensor product of a second portion of the second kernel with the first subarray of the array of activations, the second portion of the second kernel including a weight stored in the second weight register; and forming a tensor product of the first portion of the second kernel with a second subarray of the array of activations, the first portion of the second kernel including the weight stored in the first weight register.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processing circuit further includes a first adder, the method further including, in the first state: connecting the first adder to: an output of the first multiplier, and an output of the second multiplier; and adding, by the first adder: a product received from the output of the first multiplier, and a product received from the output of the second multiplier.

In some embodiments, the processing circuit further includes a second adder, the method further including, in the second state, connecting the second adder to the output of the first multiplier.

In some embodiments, the processing circuit further includes: a first accumulator connected to the first adder, and a second accumulator connected to the second adder, the first accumulator including a register, the method further including, in the first state: adding, by the first accumulator, to a value in the register of the first accumulator, a sum received from the first adder, to form an accumulated value of the first accumulator, and storing, by the first accumulator, the accumulated value of the first accumulator in the register of the first accumulator.

In some embodiments, the second accumulator includes a register and the method further includes, in the second state, adding, by the second accumulator, to a value in the register of the second accumulator, a sum received from the second adder, to form an accumulated value of the second accumulator, and storing, by the second accumulator, the accumulated value of the second accumulator in the register of the second accumulator.

According to some embodiments of the present disclosure, there is provided a method for calculating with a means for processing, the means for processing including: a first tile, a second tile, a memory, and a bus, the bus being connected to: the memory, the first tile, and the second tile, the first tile including: a first weight register, a second weight register, an activations buffer, a first multiplier, and a second multiplier, the method including performing a first convolution of an array of activations with a first kernel of weights, the performing of the first convolution including: broadcasting a first subarray of the array of activations to: the first tile, and the second tile; forming a first tensor product, the first tensor product being a tensor product of a first subarray of the first kernel of weights with the first subarray of the array of activations; storing the first tensor product in the memory; broadcasting a second subarray of the array of activations to: the first tile, and the second tile; forming a second tensor product, the second tensor product being a tensor product of a second subarray of the first kernel of weights with the second subarray of the array of activations; and adding the first tensor product and the second tensor product.

According to some embodiments of the present disclosure, there is provided a processor, including: a first tile, a second tile, a memory, an input bus, and an output bus, the input bus being connected to: the memory, the first tile, and the second tile, the first tile including: a first weight register, a second weight register, an activations buffer, a first multiplier, and a second multiplier, the first tile being configured to perform a first convolution of an array of activations with a kernel of weights; the memory including: a first memory bank set, and a second memory bank set; the input bus including: a first segmented bus for data propagating in a first direction, and a second segmented bus for data propagating in a second direction, opposite the first direction; the first segmented bus including: a first switch block, and a second switch block; the first switch block being connected to: the first tile, and the first memory bank set; the second switch block being connected to: the second tile, and the second memory bank set; the second segmented bus including: a third switch block, and a fourth switch block; the third switch block being connected to: the first tile, and the first memory bank set; the fourth switch block being connected to: the second tile, and the second memory bank set; an input of the first switch block being connected to an output of the second switch block; and an output of the third switch block being connected to an input of the fourth switch block.

In some embodiments, the first segmented bus is configured, in a first bus state, to connect the first memory bank set, through the first switch block, to the first tile, and to connect the second memory bank set, through the second switch block, to the second tile.

In some embodiments, the first segmented bus is further configured, in a second bus state, to connect the second memory bank set, through the first switch block, and through the second switch block, to the first tile, and to connect the second memory bank set, through the second switch block, to the second tile.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processor further includes a first adder, configured, in the first state: to be connected to: an output of the first multiplier, and an output of the second multiplier; and to add: a product received from the output of the first multiplier, and a product received from the output of the second multiplier.

In some embodiments, the processor further includes a second adder, configured, in the second state, to be connected to the output of the first multiplier.

In some embodiments, the processor further includes: a first accumulator connected to the first adder, and a second accumulator connected to the second adder, the first accumulator including a register and being configured, in the first state: to add to a value in the register of the first accumulator a sum received from the first adder, to form an accumulated value of the first accumulator, and to store the accumulated value of the first accumulator in the register of the first accumulator.

In some embodiments, the second accumulator includes a register and is configured, in the second state, to add to a value in the register of the second accumulator a sum received from the second adder, to form an accumulated value of the second accumulator, and to store the accumulated value of the second accumulator in the register of the second accumulator.

In some embodiments, the processor further includes an activation zero skip control circuit configured to: determine whether the output register of the first queue contains zero, and in response to determining that the output register of the first queue contains zero, cause the first tile to operate in the second state.

In some embodiments, the processor further includes a multiplexer having: an input, at a single-port side of the multiplexer, connected to the first multiplier, a first output, at a multi-port side of the multiplexer, connected to the first adder, and a second output, at the multi-port side of the multiplexer, connected to the second adder.

According to some embodiments of the present disclosure, there is provided a method for calculating with a processing circuit, the processing circuit including: a first tile, a second tile, a memory, an input bus, and an output bus, the input bus being connected to: the memory, the first tile, and the second tile, the first tile including: a first weight register, a second weight register, an activations buffer, a first multiplier, and a second multiplier, the first tile being configured to perform a first convolution of an array of activations with a kernel of weights; the memory including: a first memory bank set, and a second memory bank set; the input bus including: a first segmented bus for data propagating in a first direction, and a second segmented bus for data propagating in a second direction, opposite the first direction; the first segmented bus including: a first switch block, and a second switch block; the first switch block being connected to: the first tile, and the first memory bank set; the second switch block being connected to: the second tile, and the second memory bank set; the second segmented bus including: a third switch block, and a fourth switch block; the third switch block being connected to: the first tile, and the first memory bank set; the fourth switch block being connected to: the second tile, and the second memory bank set; an input of the first switch block being connected to an output of the second switch block; and an output of the third switch block being connected to an input of the fourth switch block, the method including: in a first bus state, connecting, by the first switch block, the first memory bank set to the first tile, and connecting, by the second switch block, the second memory bank set to the second tile.

In some embodiments, the method further includes: in a second bus state, connecting, by the first switch block and the second switch block, the second memory bank set to the first tile, and connecting, by the second switch block, the second memory bank set to the second tile.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processing circuit further includes a first adder, the method further including, in the first state: connecting the first adder to: an output of the first multiplier, and an output of the second multiplier; and adding, by the first adder: a product received from the output of the first multiplier, and a product received from the output of the second multiplier.

In some embodiments, the processing circuit further includes a second adder, the method further including, in the second state, connecting the second adder to the output of the first multiplier.

In some embodiments, the processing circuit further includes: a first accumulator connected to the first adder, and a second accumulator connected to the second adder, the first accumulator including a register, the method further including, in the first state: adding, by the first accumulator, to a value in the register of the first accumulator, a sum received from the first adder, to form an accumulated value of the first accumulator, and storing, by the first accumulator, the accumulated value of the first accumulator in the register of the first accumulator.

In some embodiments, the second accumulator includes a register and the method further includes, in the second state, adding, by the second accumulator, to a value in the register of the second accumulator, a sum received from the second adder, to form an accumulated value of the second accumulator, and storing, by the second accumulator, the accumulated value of the second accumulator in the register of the second accumulator.

According to some embodiments of the present disclosure, there is provided a method for calculating with a means for processing, the means for processing including: a first tile, a second tile, a memory, an input bus, and an output bus, the input bus being connected to: the memory, the first tile, and the second tile, the first tile including: a first weight register, a second weight register, an activations buffer, a first multiplier, and a second multiplier, the first tile being configured to perform a first convolution of an array of activations with a kernel of weights; the memory including: a first memory bank set, and a second memory bank set; the input bus including: a first segmented bus for data propagating in a first direction, and a second segmented bus for data propagating in a second direction, opposite the first direction; the first segmented bus including: a first switch block, and a second switch block; the first switch block being connected to the first tile, and the first memory bank set; the second switch block being connected to the second tile, and the second memory bank set; the second segmented bus including: a third switch block, and a fourth switch block; the third switch block being connected to the first tile, and the first memory bank set; the fourth switch block being connected to the second tile, and the second memory bank set; an input of the first switch block being connected to an output of the second switch block; and an output of the third switch block being connected to an input of the fourth switch block, the method including: in a first bus state, connecting, by the first switch block, the first memory bank set to the first tile, and connecting, by the second switch block, the second memory bank set to the second tile.

According to some embodiments of the present disclosure, there is provided a processor, including: a first tile, a second tile, a memory, and a bus, the bus being connected to: the memory, the first tile, and the second tile, the first tile including: a first weight register, a second weight register, an activations buffer, a first multiplier, and a second multiplier, the activations buffer being configured to include: a first queue connected to the first multiplier, and a second queue connected to the second multiplier, the first queue including a first register and a second register adjacent to the first register, the first register being an output register of the first queue, the first tile being configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processor further includes: a first adder, configured, in the first state: to be connected to an output of the first multiplier, and an output of the second multiplier, and to add; a product received from the output of the first multiplier, and a product received from the output of the second multiplier.

In some embodiments, the processor further includes a second adder, configured, in the second state, to be connected to the output of the first multiplier.

In some embodiments, the processor further includes: a first accumulator connected to the first adder, and a second accumulator connected to the second adder, the first accumulator including a register and being configured, in the first state: to add to a value in the register of the first accumulator a sum received from the first adder, to form an accumulated value of the first accumulator, and to store the accumulated value of the first accumulator in the register of the first accumulator.

In some embodiments, the second accumulator includes a register and is configured, in the second state, to add to a value in the register of the second accumulator a sum received from the second adder, to form an accumulated value of the second accumulator, and to store the accumulated value of the second accumulator in the register of the second accumulator.

In some embodiments, the processor further includes an activation zero skip control circuit configured to: determine whether the output register of the first queue contains zero, and in response to determining that the output register of the first queue contains zero, cause the first tile to operate in the second state.

In some embodiments, the processor further includes a multiplexer having: an input, at a single-port side of the multiplexer, connected to the first multiplier, a first output, at a multi-port side of the multiplexer, connected to the first adder, and a second output, at the multi-port side of the multiplexer, connected to the second adder.

In some embodiments, the activation zero skip control circuit is configured to control the multiplexer, in the first state, to connect the input to the first output, and in the second state, to connect the input to the second output.

In some embodiments: the second queue includes a first register and a second register adjacent to the first register, the first register being an output register of the second queue; and the first tile is further configured, in a third state, to multiply, in the first multiplier, the first weight by an activation from the second register of the second queue.

According to some embodiments of the present disclosure, there is provided a method for calculating with a processing circuit, the processing circuit including: a first tile, a second tile, a memory, and a bus, the bus being connected to: the memory, the first tile, and the second tile, the first tile including: a first weight register, a second weight register, an activations buffer, a first multiplier, and a second multiplier, the activations buffer being configured to include: a first queue connected to the first multiplier, and a second queue connected to the second multiplier, the first queue including a first register and a second register adjacent to the first register, the first register being an output register of the first queue, the method including: in a first state: multiplying, by the first multiplier, a first weight by an activation from the output register of the first queue, and in a second state: multiplying, by the first multiplier, the first weight by an activation from the second register of the first queue.

In some embodiments, in the second state, the output register of the first queue contains zero.

In some embodiments, the processing circuit further includes a first adder, the method further including, in the first state: connecting the first adder to: an output of the first multiplier, and an output of the second multiplier, and adding, by the first adder: a product received from the output of the first multiplier, and a product received from the output of the second multiplier.

In some embodiments, the processing circuit further includes a second adder, the method further including, in the second state, connecting the second adder to the output of the first multiplier.

In some embodiments, the processing circuit further includes: a first accumulator connected to the first adder, and a second accumulator connected to the second adder, the first accumulator including a register, the method further including, in the first state: adding, by the first accumulator, to a value in the register of the first accumulator, a sum received from the first adder, to form an accumulated value of the first accumulator, and storing, by the first accumulator, the accumulated value of the first accumulator in the register of the first accumulator.

In some embodiments, the second accumulator includes a register and the method further includes, in the second state, adding, by the second accumulator, to a value in the register of the second accumulator, a sum received from the second adder, to form an accumulated value of the second accumulator, and storing, by the second accumulator, the accumulated value of the second accumulator in the register of the second accumulator.

In some embodiments, the processing circuit further includes an activation zero skip control circuit, and the method further includes: determining, by the activation zero skip control circuit, whether the output register of the first queue contains zero, and in response to determining that the output register of the first queue contains zero, causing the first tile to operate in the second state.

In some embodiments, the processing circuit further includes a multiplexer having: an input, at a single-port side of the multiplexer, connected to the first multiplier, a first output, at a multi-port side of the multiplexer, connected to the first adder, and a second output, at the multi-port side of the multiplexer, connected to the second adder.

In some embodiments, the method further includes controlling, by the activation zero skip control circuit, the multiplexer: in the first state, to connect the input to the first output, and in the second state, to connect the input to the second output.

According to some embodiments of the present disclosure, there is provided a method for calculating with a means for processing, the means for processing including: a first tile, a second tile, a memory, and a bus, the bus being connected to: the memory, the first tile, and the second tile, the first tile including: a first weight register, a second weight register, an activations buffer, a first multiplier, and a second multiplier, the activations buffer being configured to include: a first queue connected to the first multiplier, and a second queue connected to the second multiplier, the first queue including a first register and a second register adjacent to the first register, the first register being an output register of the first queue, the method including: in a first state: multiplying, in the first multiplier, a first weight by an activation from the output register of the first queue, and in a second state: multiplying, in the first multiplier, the first weight by an activation from the second register of the first queue.

BRIEF DESCRIPTION OF THE DRAWINGS

These and other features and advantages of the present disclosure will be appreciated and understood with reference to the specification, claims, and appended drawings in which:

FIG. 1MB is a block diagram depicting a portion of a neural processor according to the subject matter disclosed herein;

FIG. 1Q is a size table according to the subject matter disclosed herein;

FIG. 1WB depicts a data flow in a portion of a neural processor according to the subject matter disclosed herein;

FIG. 1WC depicts a data flow in a portion of a neural processor according to the subject matter disclosed herein;

FIG. 1WD depicts a data flow in a portion of a neural processor according to the subject matter disclosed herein;

FIG. 1WE depicts a data flow in a portion of a neural processor according to the subject matter disclosed herein;

FIG. 2AB is a convolution diagram according to the subject matter disclosed herein;

FIG. 2AC is a convolution diagram according to the subject matter disclosed herein;

FIG. 2AD is a convolution diagram according to the subject matter disclosed herein;

FIG. 2BB is a convolution diagram according to the subject matter disclosed herein;

FIG. 2BC is a convolution diagram according to the subject matter disclosed herein;

FIG. 2BD is a convolution diagram according to the subject matter disclosed herein;

FIG. 2BE is a convolution diagram according to the subject matter disclosed herein;

FIG. 2BF is a convolution diagram according to the subject matter disclosed herein;

FIG. 2BG is a convolution diagram according to the subject matter disclosed herein;

FIG. 2BH is a convolution diagram according to the subject matter disclosed herein;

FIG. 2BI is a convolution diagram according to the subject matter disclosed herein;

FIG. 2BJ is a convolution diagram according to the subject matter disclosed herein;

FIG. 2BK is a convolution diagram according to the subject matter disclosed herein;

FIG. 2BL is a convolution diagram according to the subject matter disclosed herein;

FIG. 2BM is a convolution diagram according to the subject matter disclosed herein;

FIG. 2DB is a convolution diagram according to the subject matter disclosed herein;

FIG. 2DC is a convolution diagram according to the subject matter disclosed herein;

FIG. 2DD is a convolution diagram according to the subject matter disclosed herein;

FIG. 2DE is a convolution diagram according to the subject matter disclosed herein;

FIG. 2DF is a convolution diagram according to the subject matter disclosed herein;

FIG. 2DG is a convolution diagram according to the subject matter disclosed herein;

FIG. 2DH is a convolution diagram according to the subject matter disclosed herein;

FIG. 2DI is a convolution diagram according to the subject matter disclosed herein;

FIG. 2DJ is a convolution diagram according to the subject matter disclosed herein;

FIG. 2DK is a convolution diagram according to the subject matter disclosed herein;

FIG. 2DL is a convolution diagram according to the subject matter disclosed herein;

FIG. 2DM is a convolution diagram according to the subject matter disclosed herein;

FIG. 2DN is a convolution diagram according to the subject matter disclosed herein;

FIG. 2DO is a convolution diagram according to the subject matter disclosed herein;

FIG. 2DP is a convolution diagram according to the subject matter disclosed herein;

FIG. 2DQ is a convolution diagram according to the subject matter disclosed herein;

FIG. 2DR is a convolution diagram according to the subject matter disclosed herein;

FIG. 2DS is a convolution diagram according to the subject matter disclosed herein;

FIG. 2DT is a convolution diagram according to the subject matter disclosed herein;

FIG. 2DV is a convolution diagram according to the subject matter disclosed herein;

FIG. 2DW is a convolution diagram according to the subject matter disclosed herein;

FIG. 2DX is a convolution diagram according to the subject matter disclosed herein;

FIG. 2E is a read table according to the subject matter disclosed herein;

FIG. 2F is a read table according to the subject matter disclosed herein;

FIG. 2GB is a convolution diagram according to the subject matter disclosed herein;

FIG. 2HB is a convolution diagram according to the subject matter disclosed herein;

FIG. 2HC is a convolution diagram according to the subject matter disclosed herein;

FIG. 2HD is a convolution diagram according to the subject matter disclosed herein;

FIG. 3AB depicts a data flow according to the subject matter disclosed herein;

FIG. 3AC depicts a data flow according to the subject matter disclosed herein;

FIG. 3AD depicts a data flow according to the subject matter disclosed herein;

FIG. 3AE depicts a data flow according to the subject matter disclosed herein;

FIG. 3AF depicts a data flow according to the subject matter disclosed herein;

FIG. 3AG depicts a data flow according to the subject matter disclosed herein;

FIG. 3AH depicts a data flow according to the subject matter disclosed herein;

FIG. 3AI depicts a data flow according to the subject matter disclosed herein;

FIG. 3AJ depicts a data flow according to the subject matter disclosed herein;

FIG. 3AK depicts a data flow according to the subject matter disclosed herein;

FIG. 3BB is a data diagram according to the subject matter disclosed herein;

FIG. 3BC is a data diagram according to the subject matter disclosed herein;

FIG. 3CB is a block diagram depicting a portion of a neural processor according to the subject matter disclosed herein;

FIG. 3EB is a block diagram depicting a portion of a neural processor according to the subject matter disclosed herein;

FIG. 3FB is a data diagram according to the subject matter disclosed herein;

FIG. 3FC is a block diagram depicting a portion of a neural processor according to the subject matter disclosed herein;

FIG. 3GB is a block diagram depicting of a portion of a neural processor according to the subject matter disclosed herein;

FIG. 3GC is a block diagram depicting a portion of a neural processor according to the subject matter disclosed herein;

FIG. 3GD is a block diagram depicting a portion of a neural processor according to the subject matter disclosed herein;

FIG. 3HB is a block diagram depicting a portion of a neural processor according to the subject matter disclosed herein;

FIG. 3HC is a block diagram depicting a portion of a neural processor according to the subject matter disclosed herein;

FIG. 3HD is a data diagram according to the subject matter disclosed herein;

FIG. 3IB is a block diagram depicting a portion of a neural processor according to the subject matter disclosed herein;

FIG. 3IC is a block diagram depicting a portion of a neural processor according to the subject matter disclosed herein;

FIG. 3ID is a block diagram depicting a portion of a neural processor according to the subject matter disclosed herein;

FIG. 3IE is a data diagram according to the subject matter disclosed herein;

FIG. 3IF is a data diagram according to the subject matter disclosed herein;

FIG. 3JB depicts a data flow according to the subject matter disclosed herein;

FIG. 3JC depicts a data flow according to the subject matter disclosed herein;

FIG. 3JD depicts a data flow according to the subject matter disclosed herein;

Figure 3A:
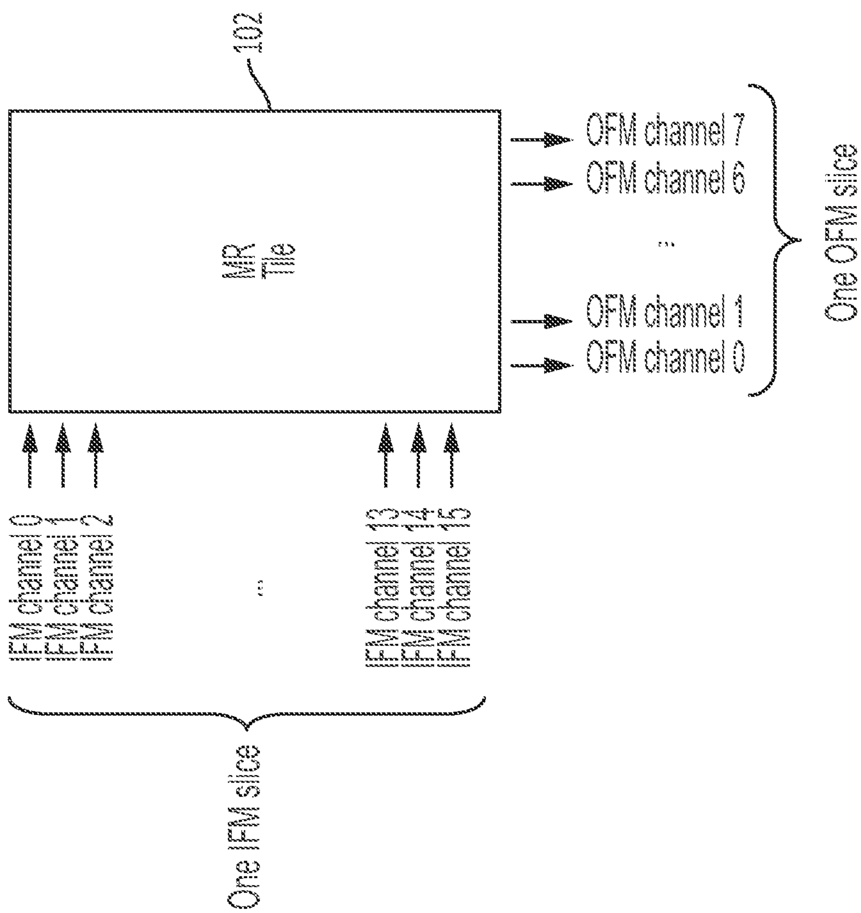
FIG. 3AA is a block diagram depicting a portion of a neural processor according to the subject matter disclosed herein.
Figure 3A:
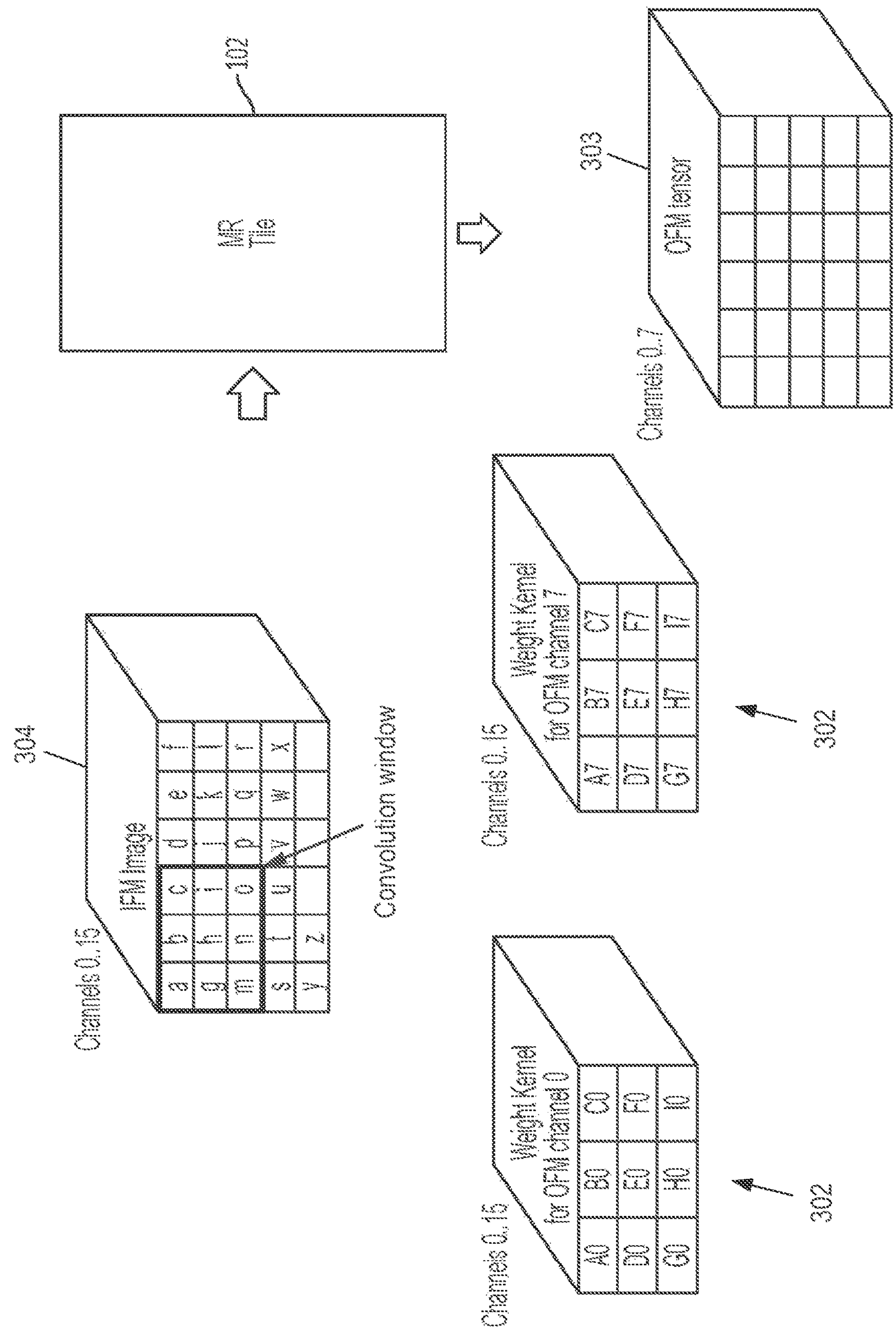
Figure 3A:
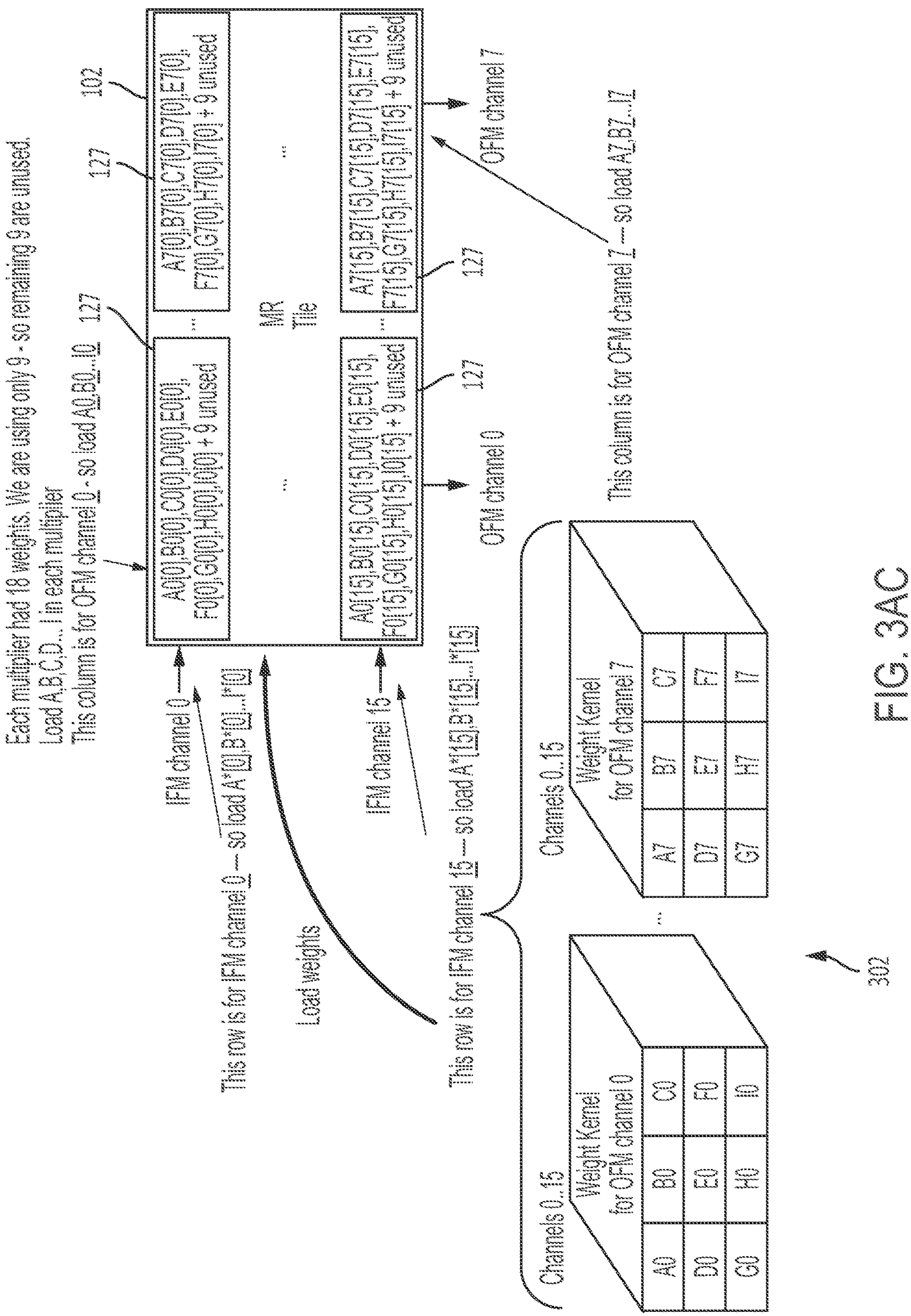
Figure 3A:
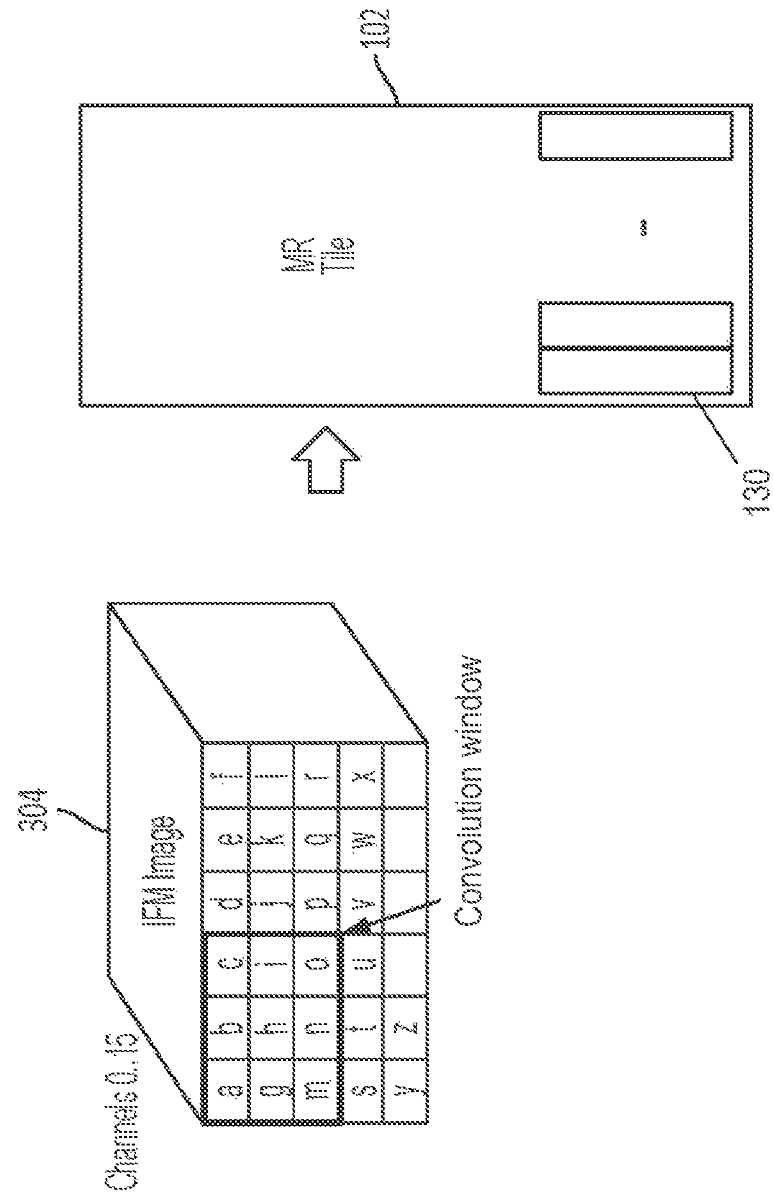
Figure 3A:
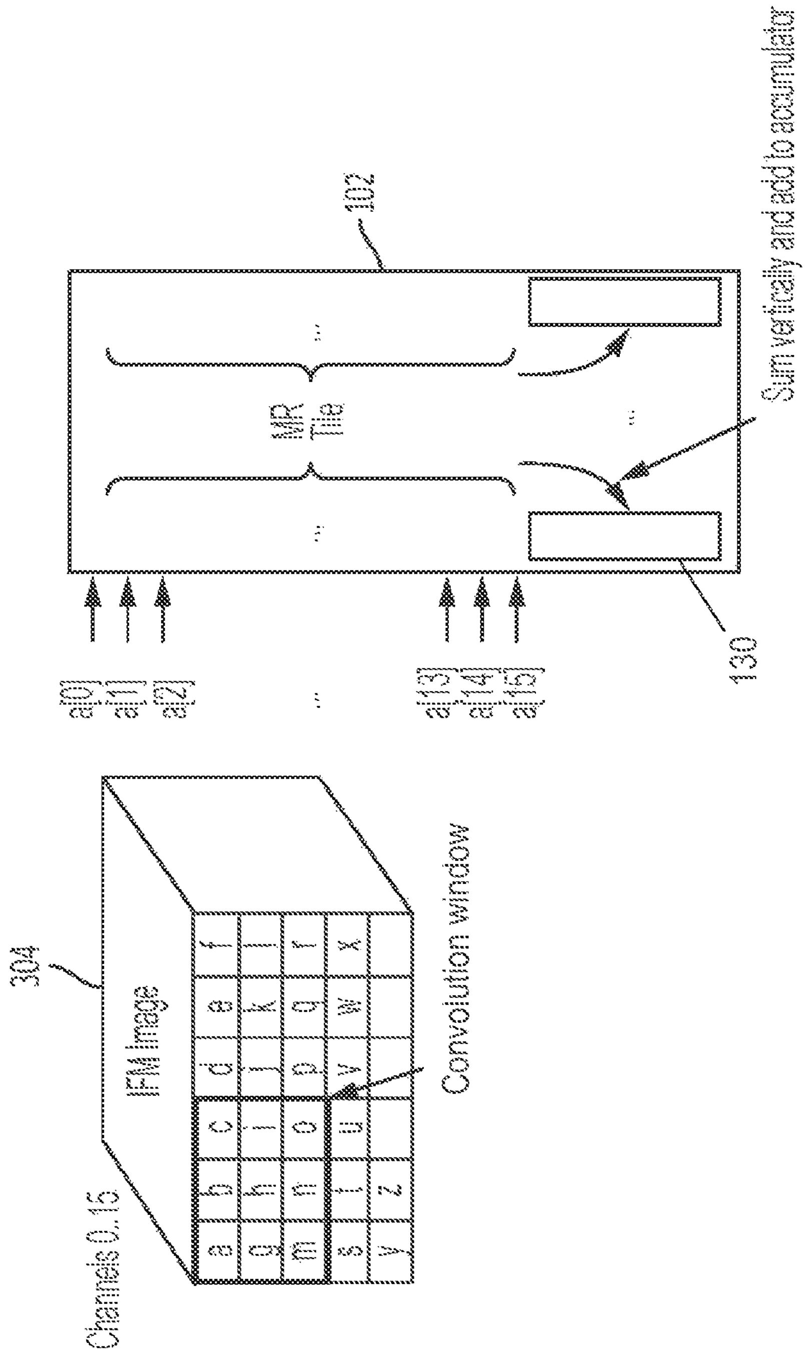
Figure 3A:
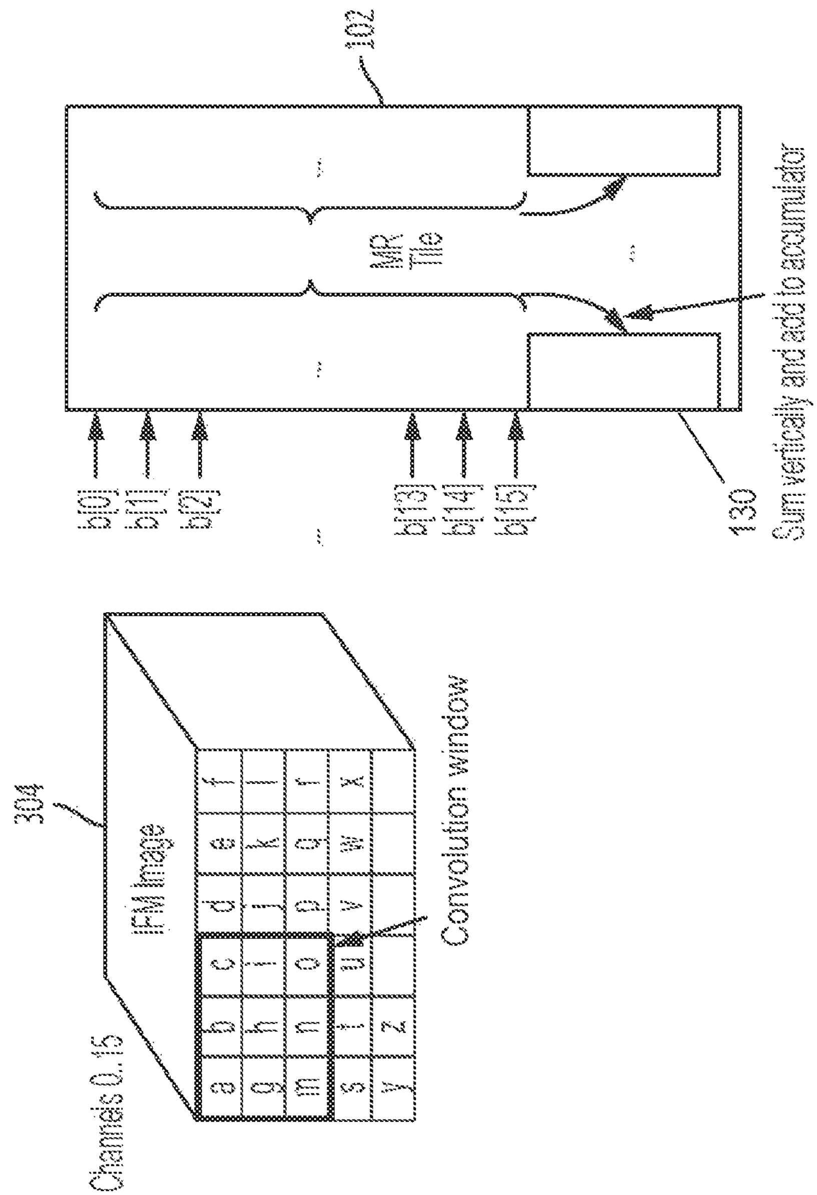
Figure 3A:
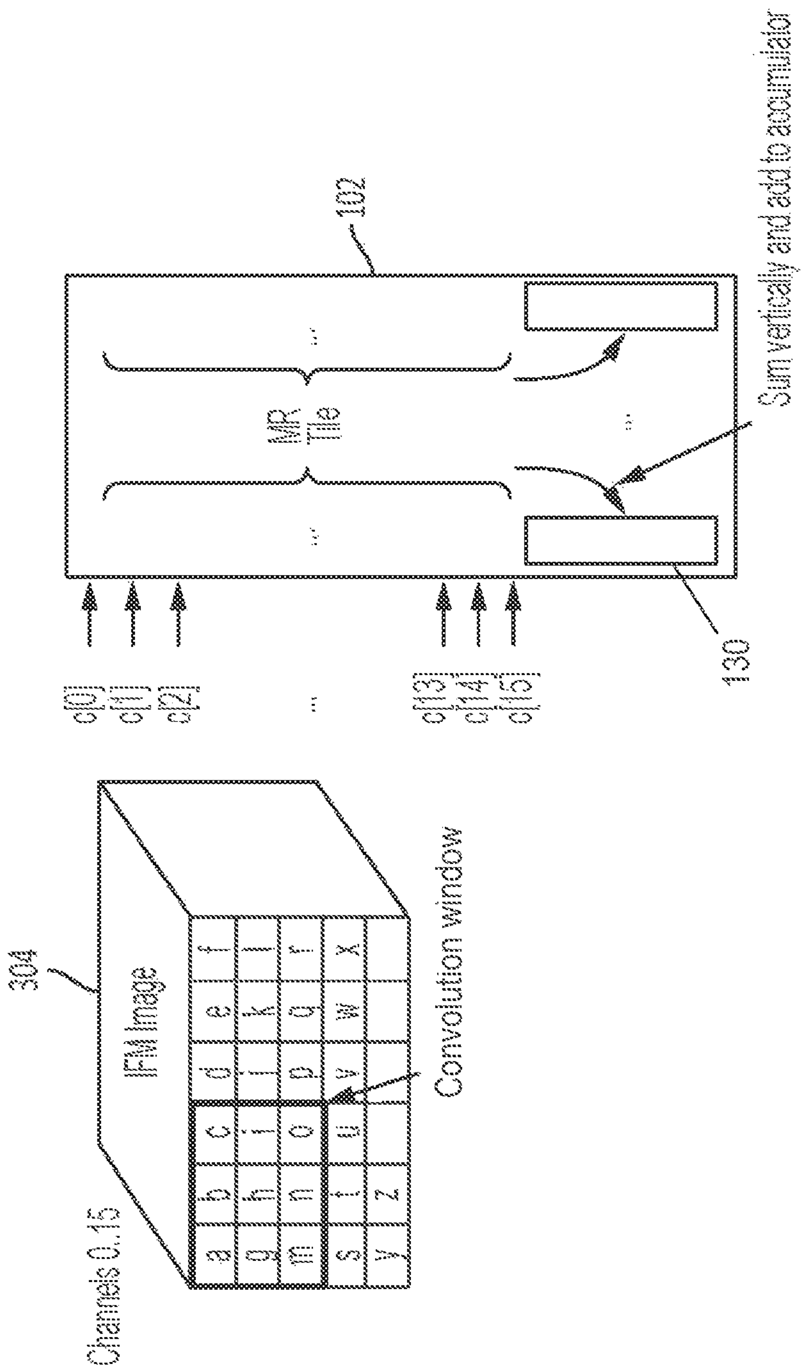
Figure 3A:
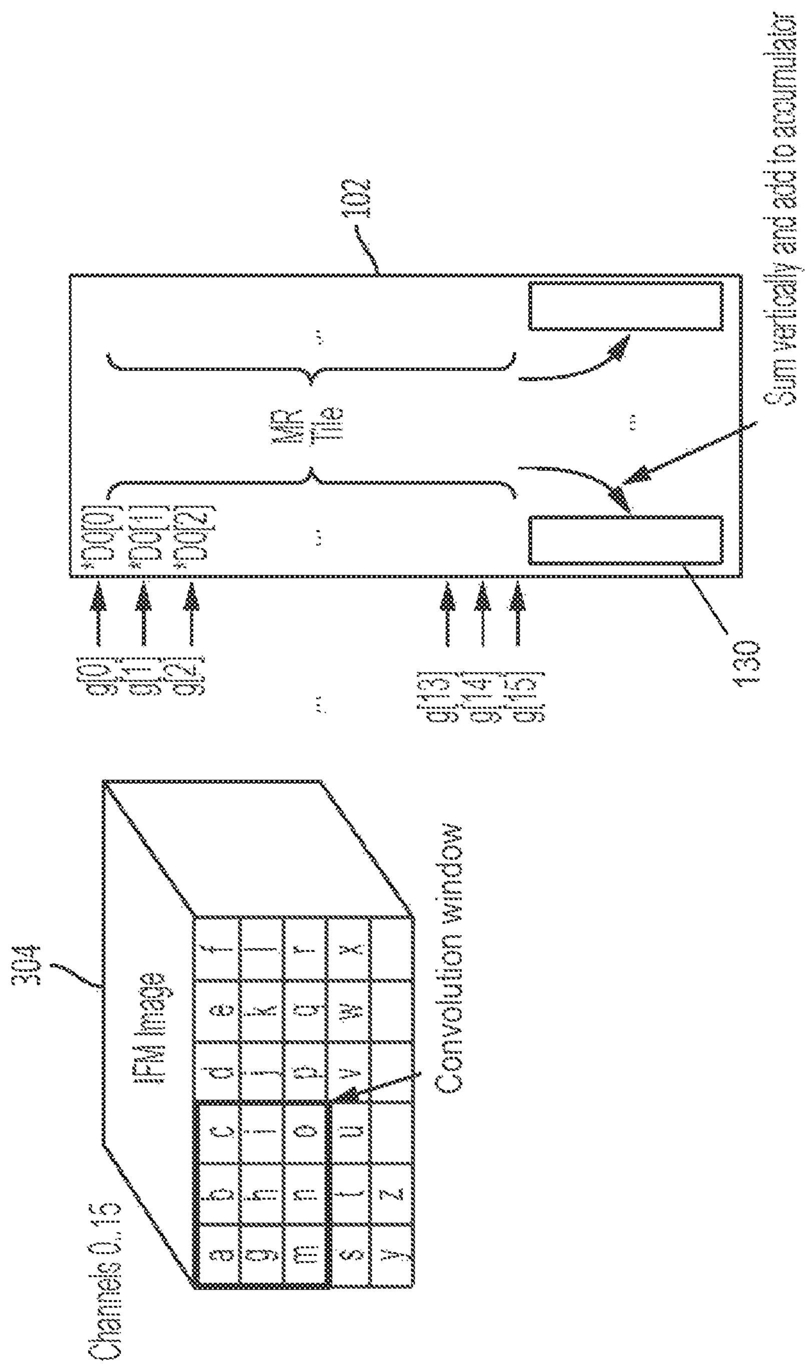
Figure 3A:
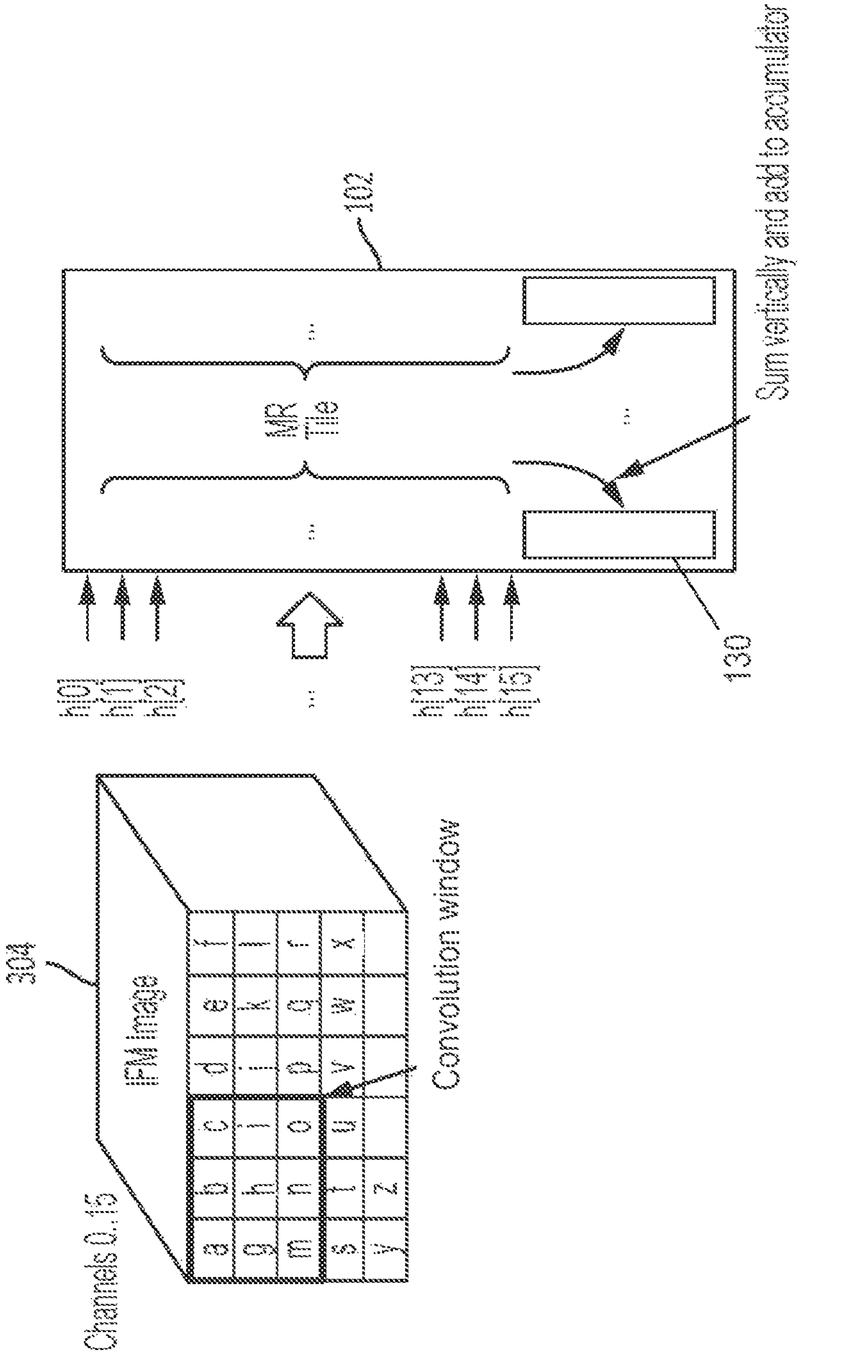
Figure 3A:
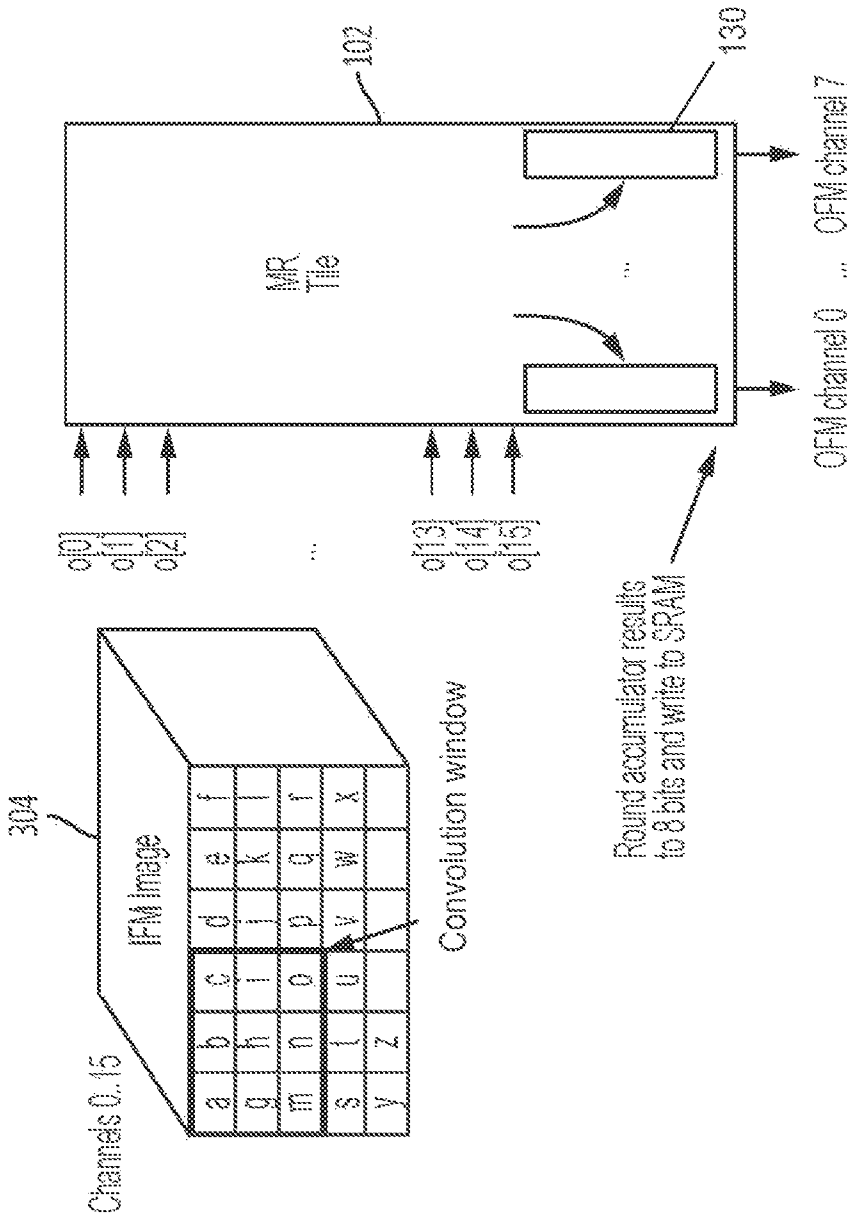
Figure 3A:
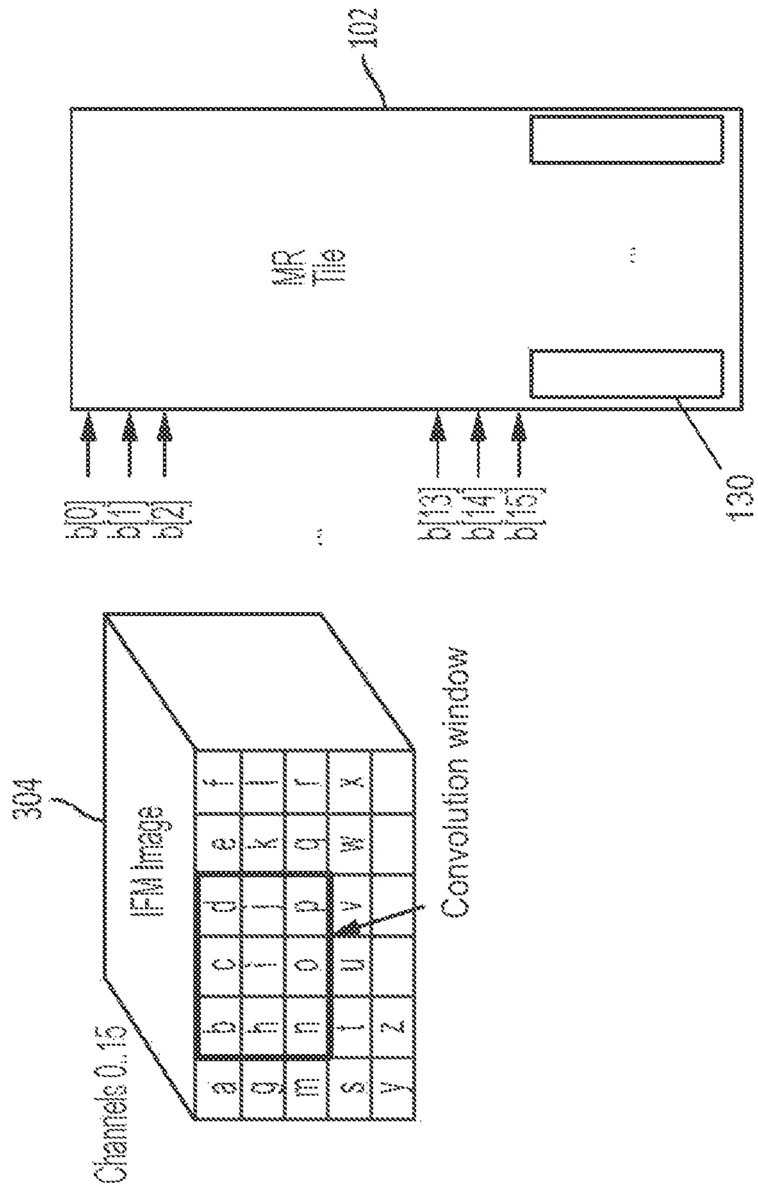
Figure 3B:
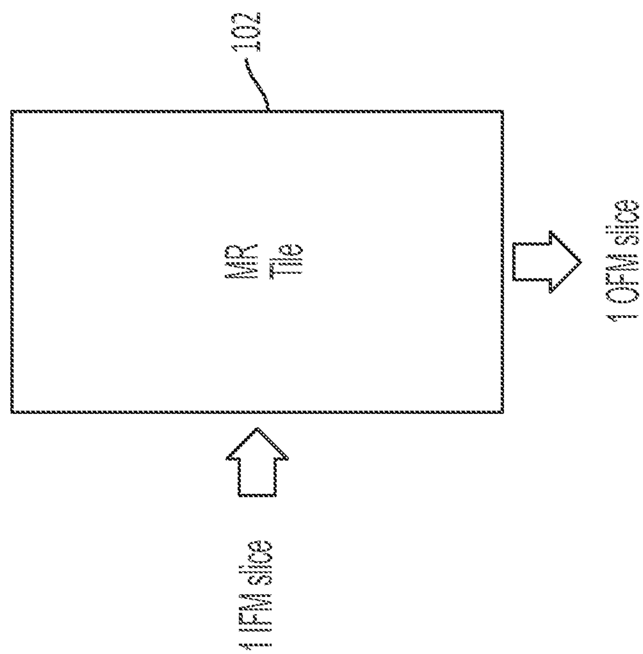
FIG. 3BA depicts a block diagram of a portion of a neural processor according to the subject matter disclosed herein.
Figure 3B:
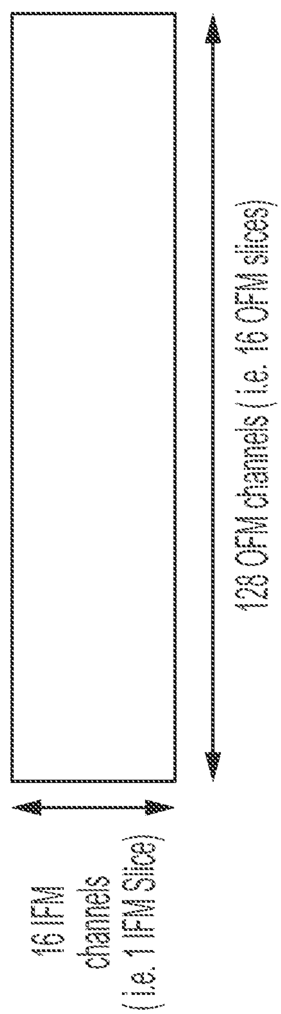
Figure 3B:
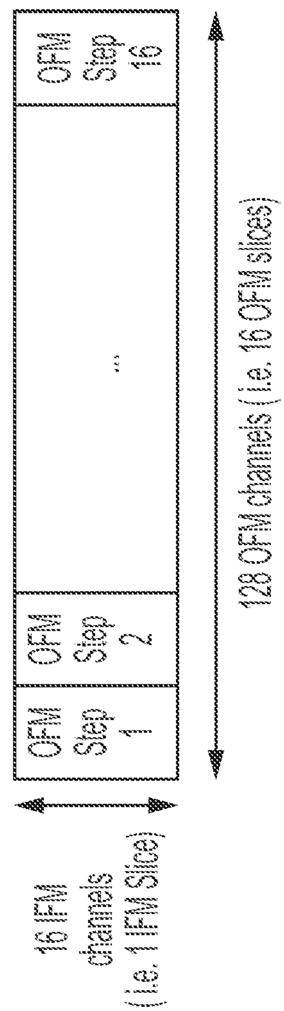
Figure 3C:
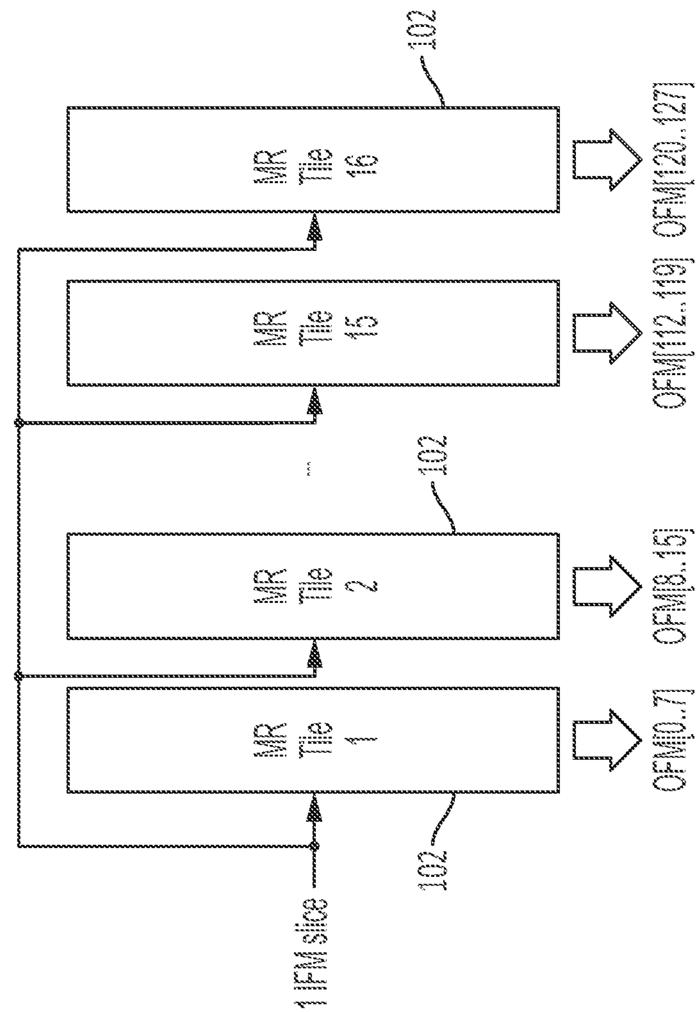
FIG. 3CA is a block diagram depicting a portion of a neural processor according to the subject matter disclosed herein.
Figure 3C:
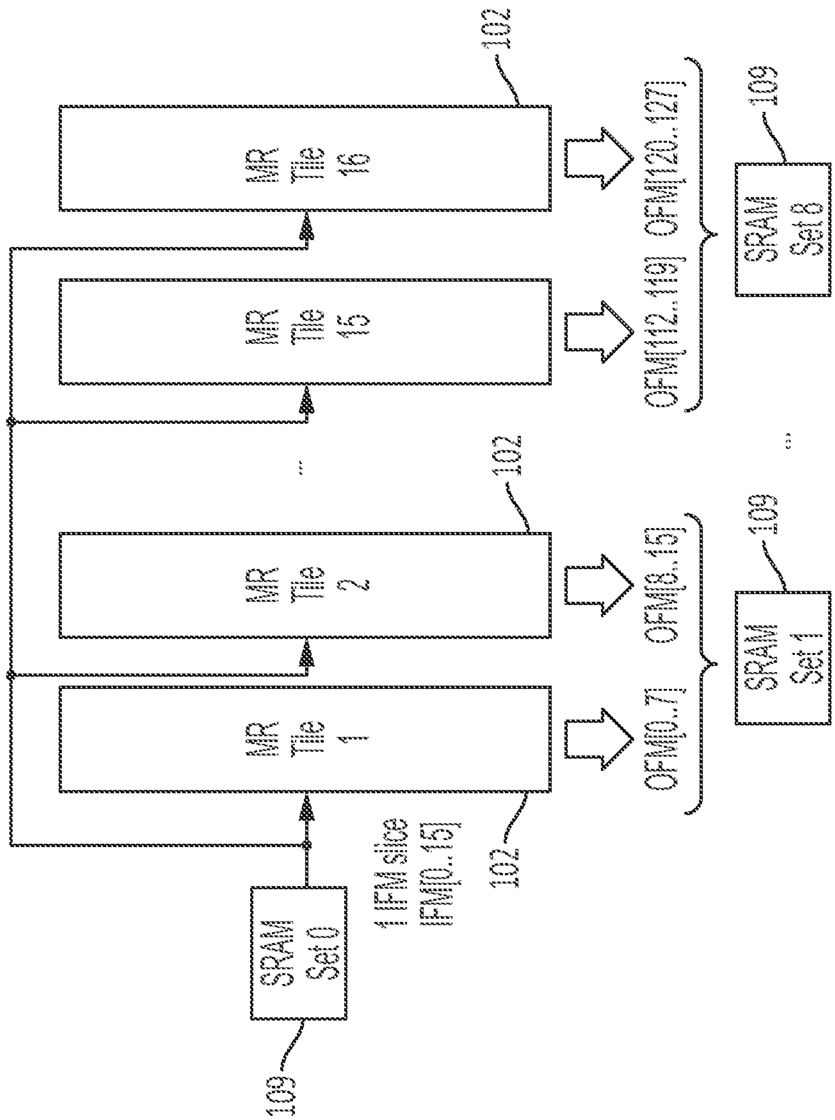
Figure 3D:
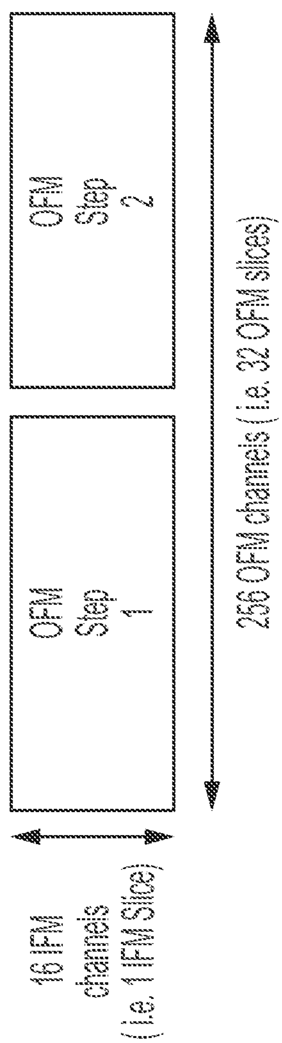
FIG. 3DA is a data diagram according to the subject matter disclosed herein.
Figure 3E:
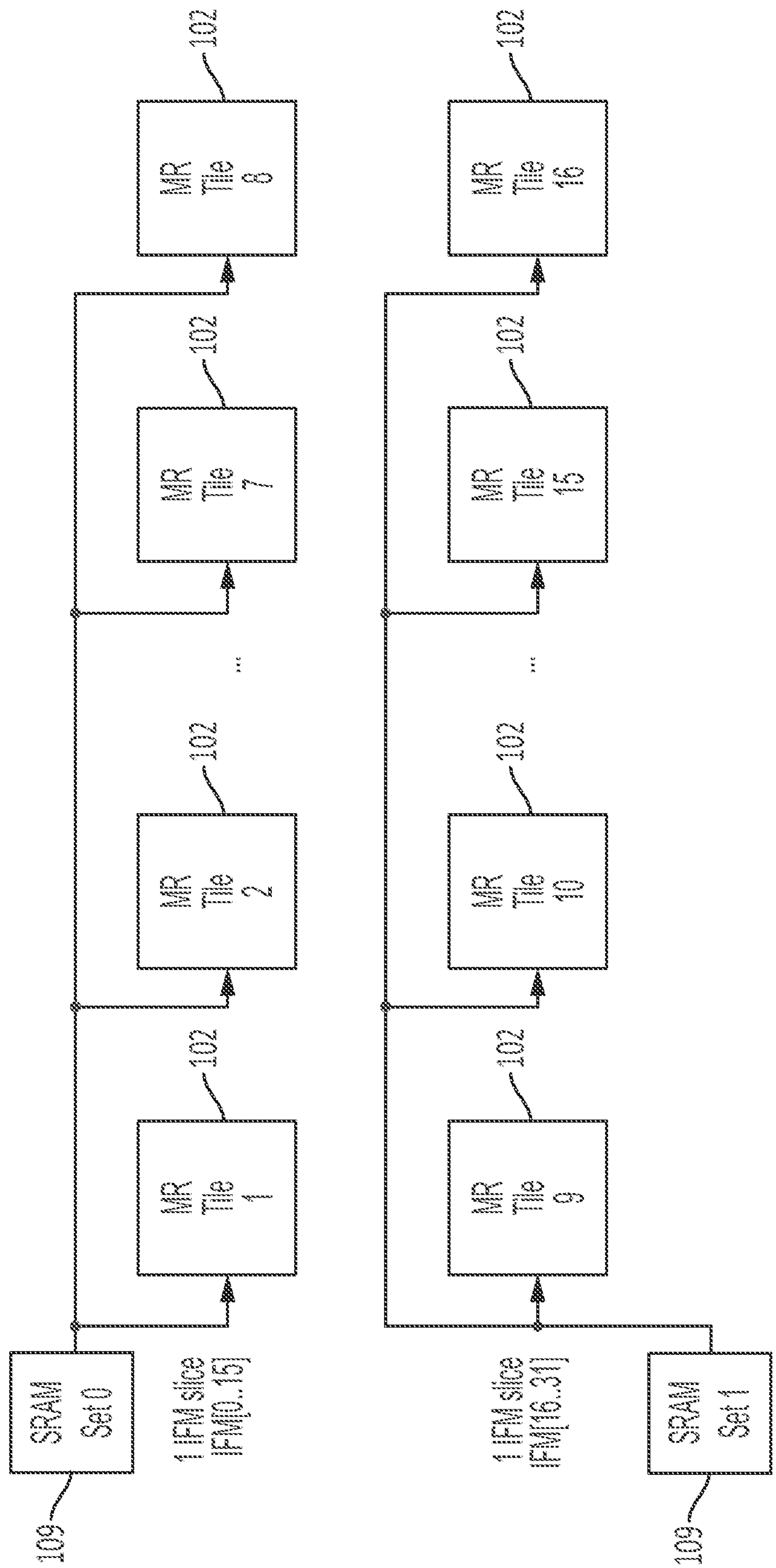
FIG. 3EA is a block diagram depicting a portion of a neural processor according to the subject matter disclosed herein.
Figure 3E:
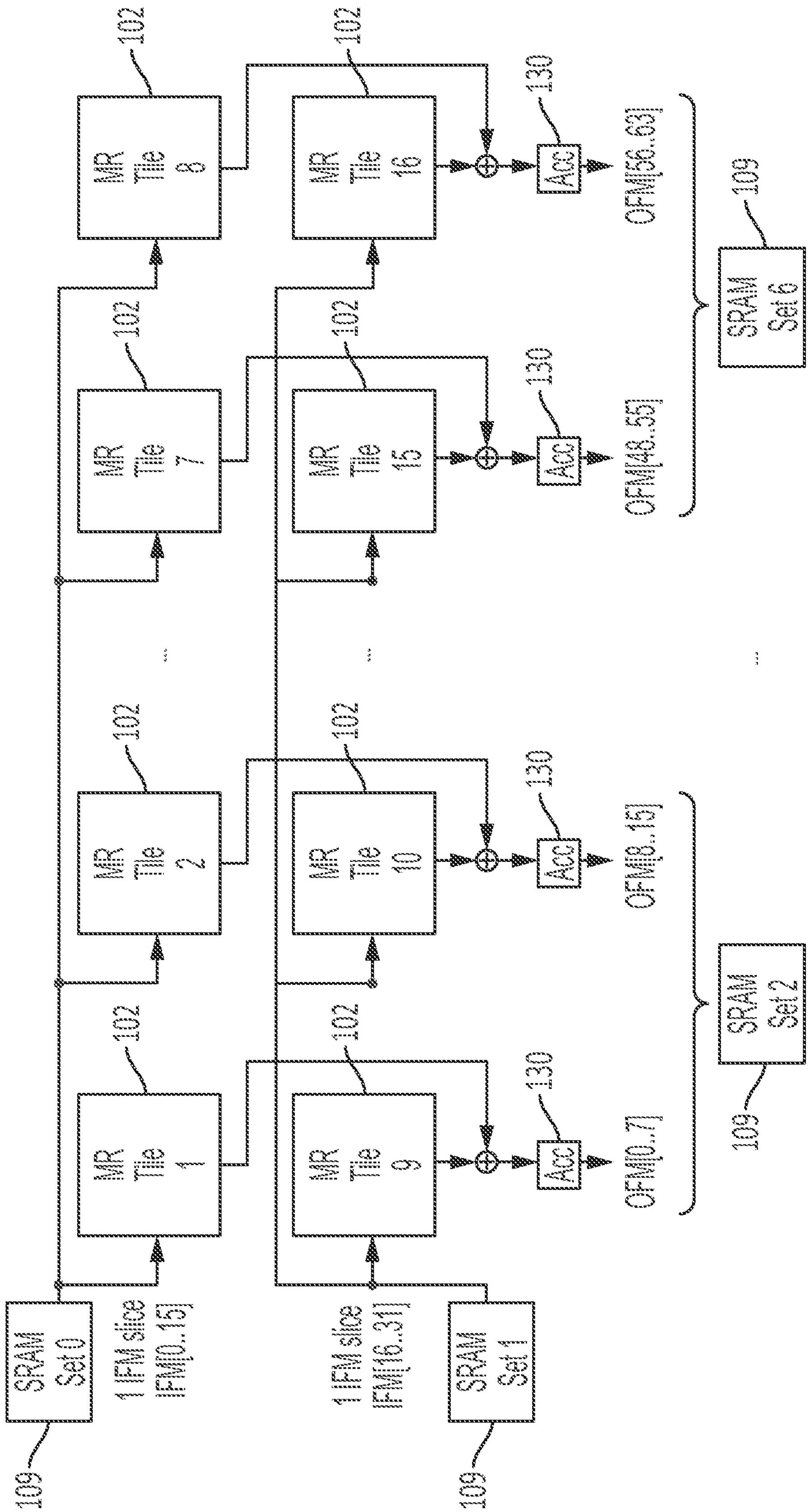
Figure 3F:
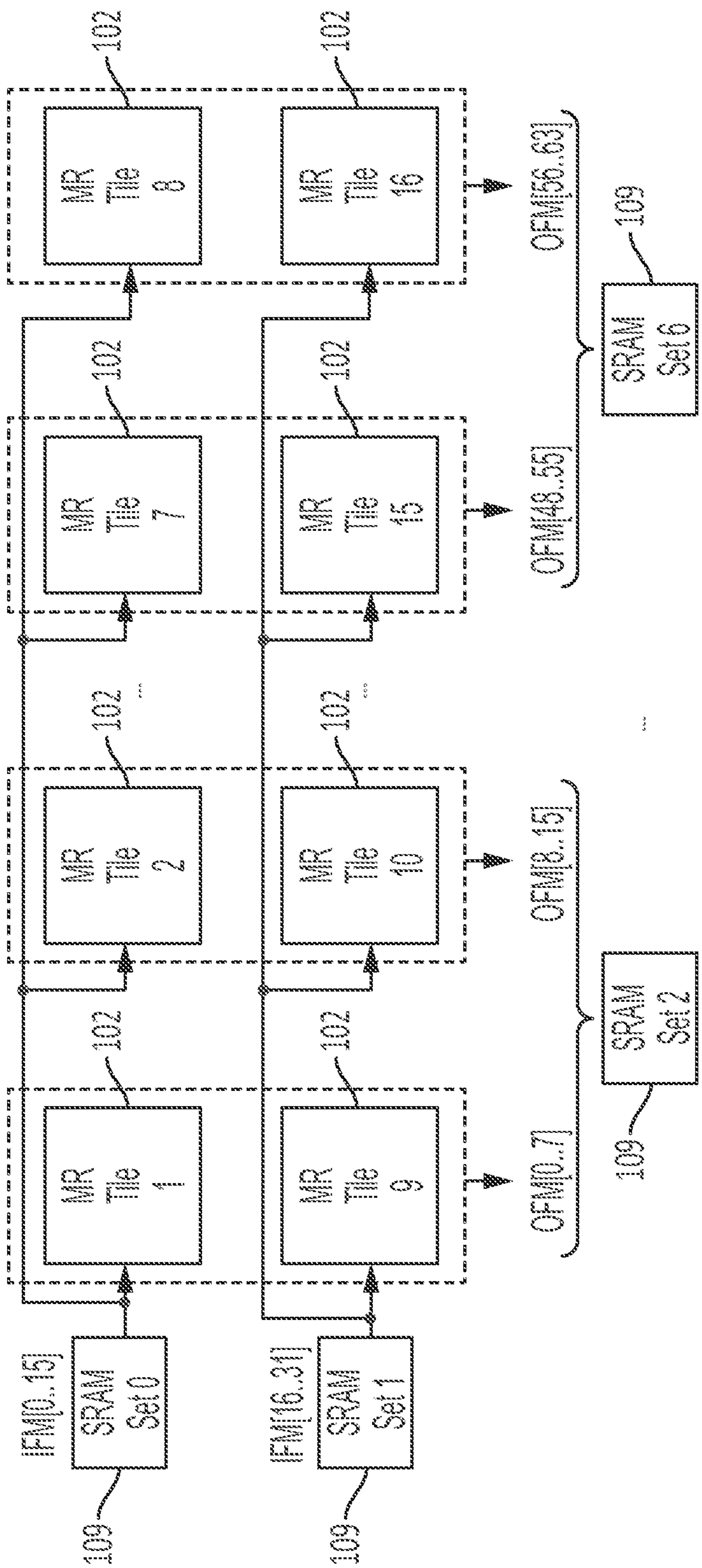
FIG. 3FA is a block diagram depicting a portion of a neural processor according to the subject matter disclosed herein.
Figure 3F:
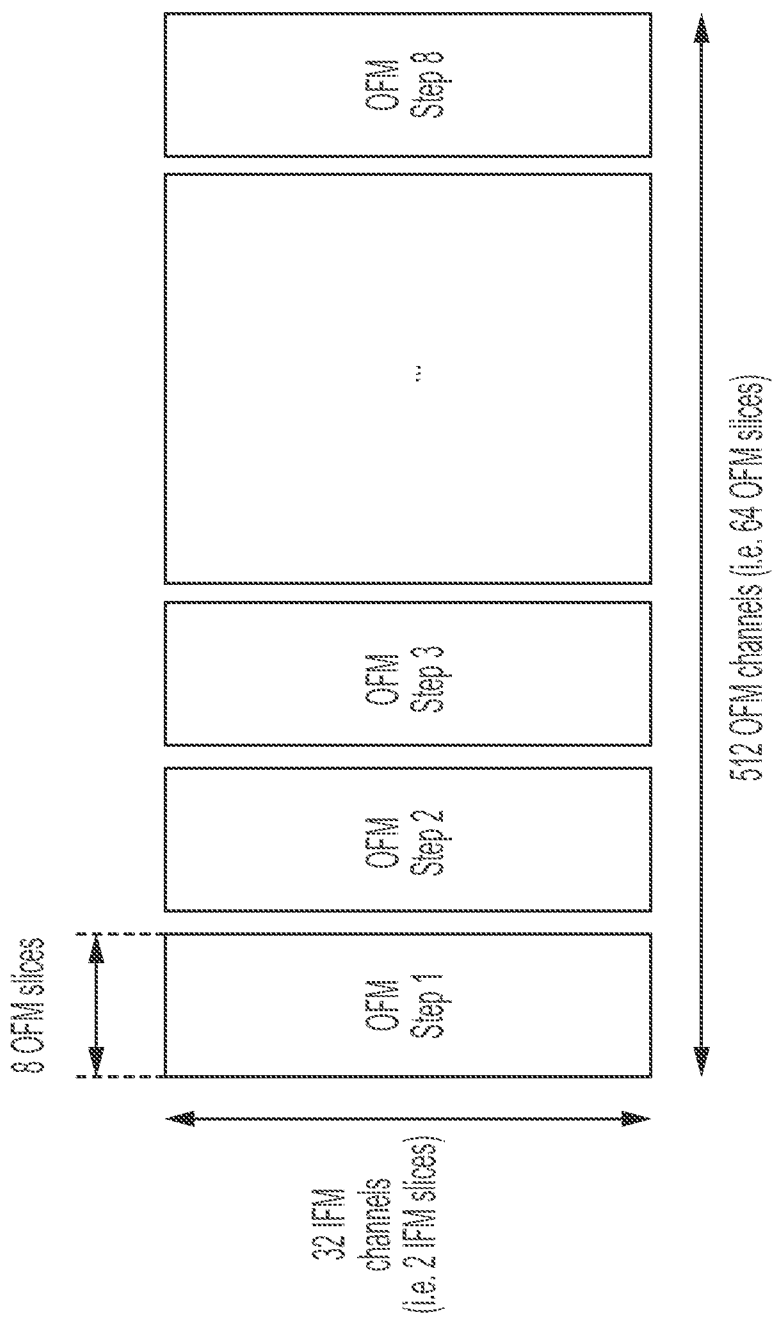
Figure 3F:
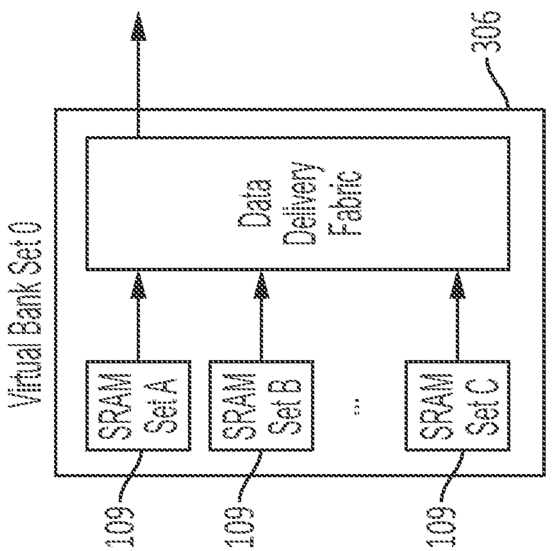
Figure 3G:
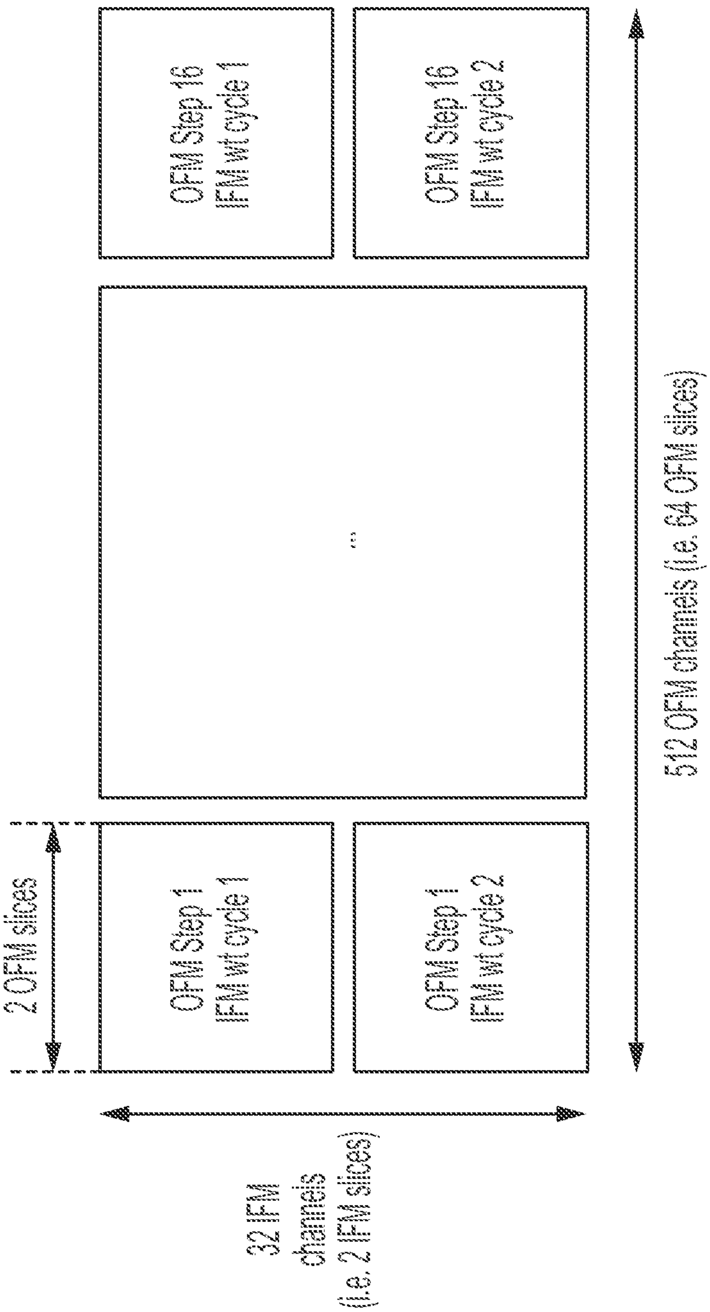
FIG. 3GA is a data diagram according to the subject matter disclosed herein.
Figure 3G:
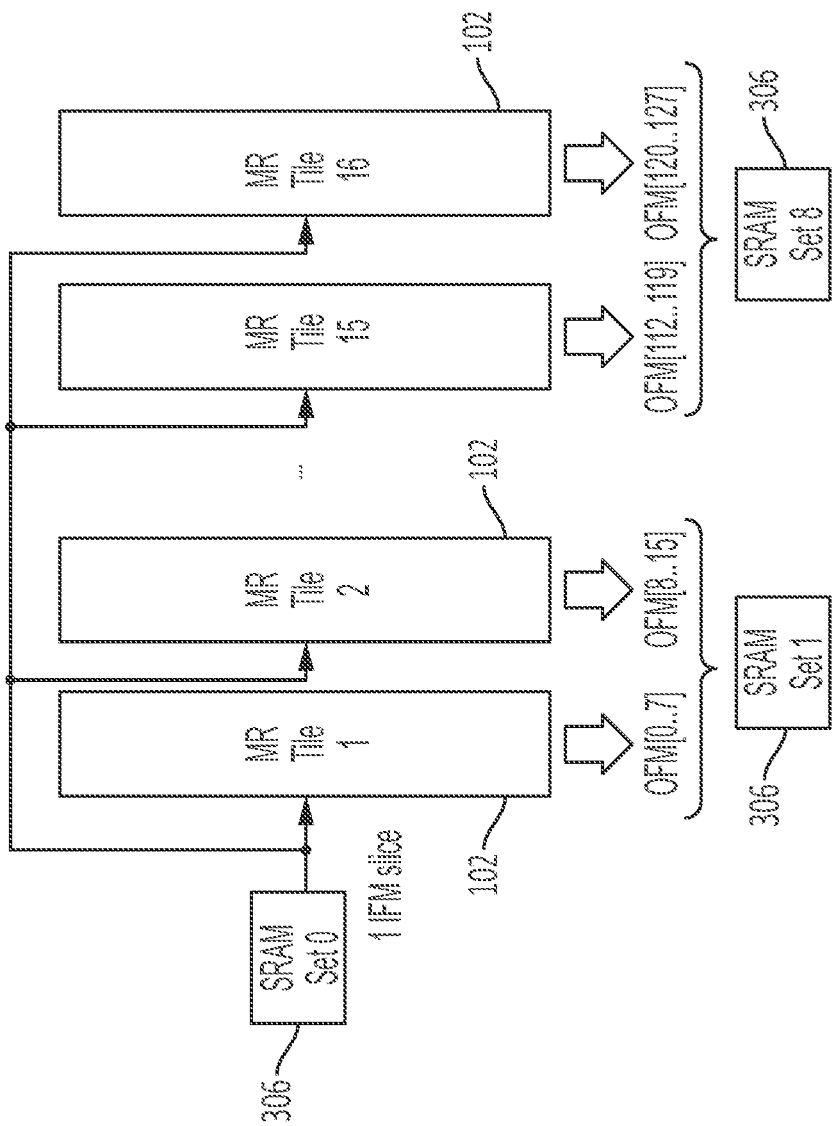
Figure 3G:
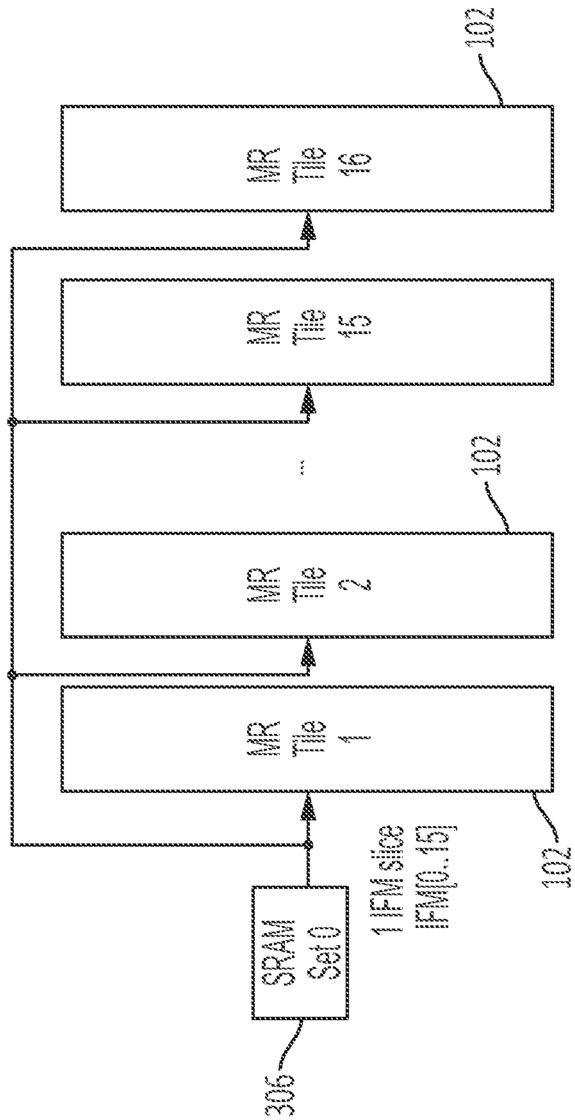
Figure 3G:
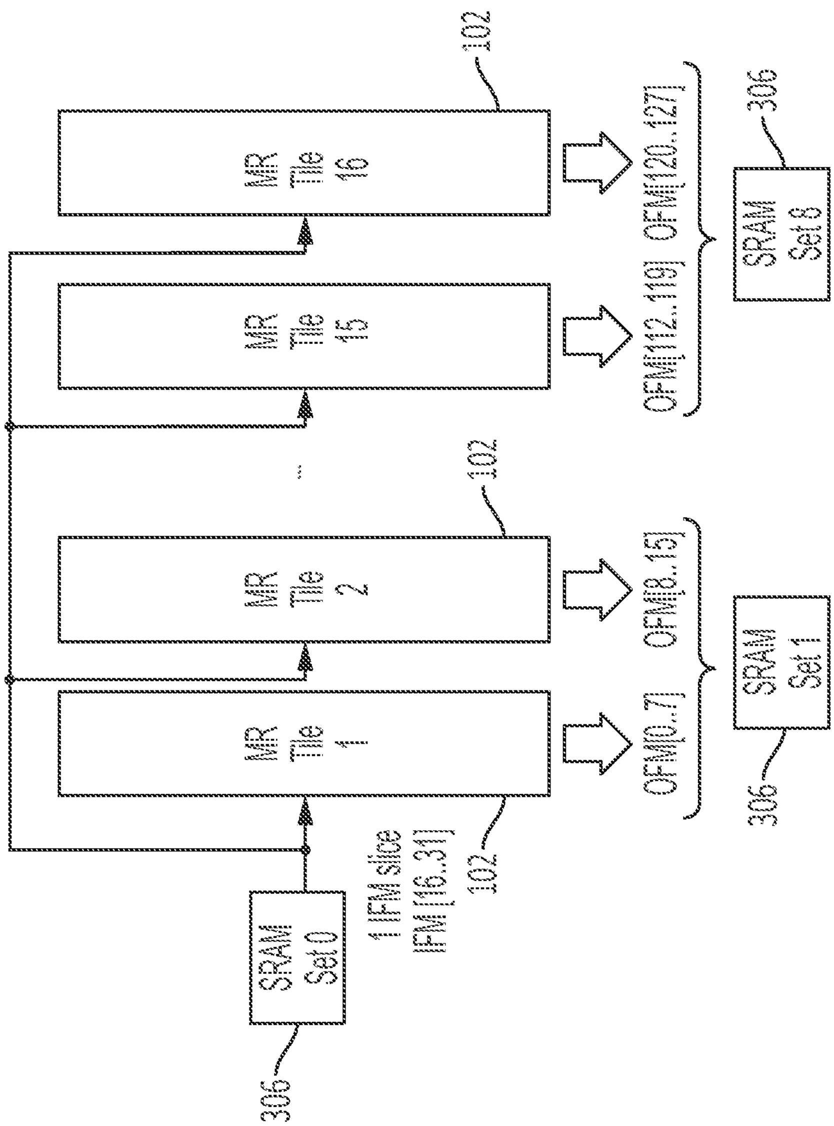
Figure 3H:
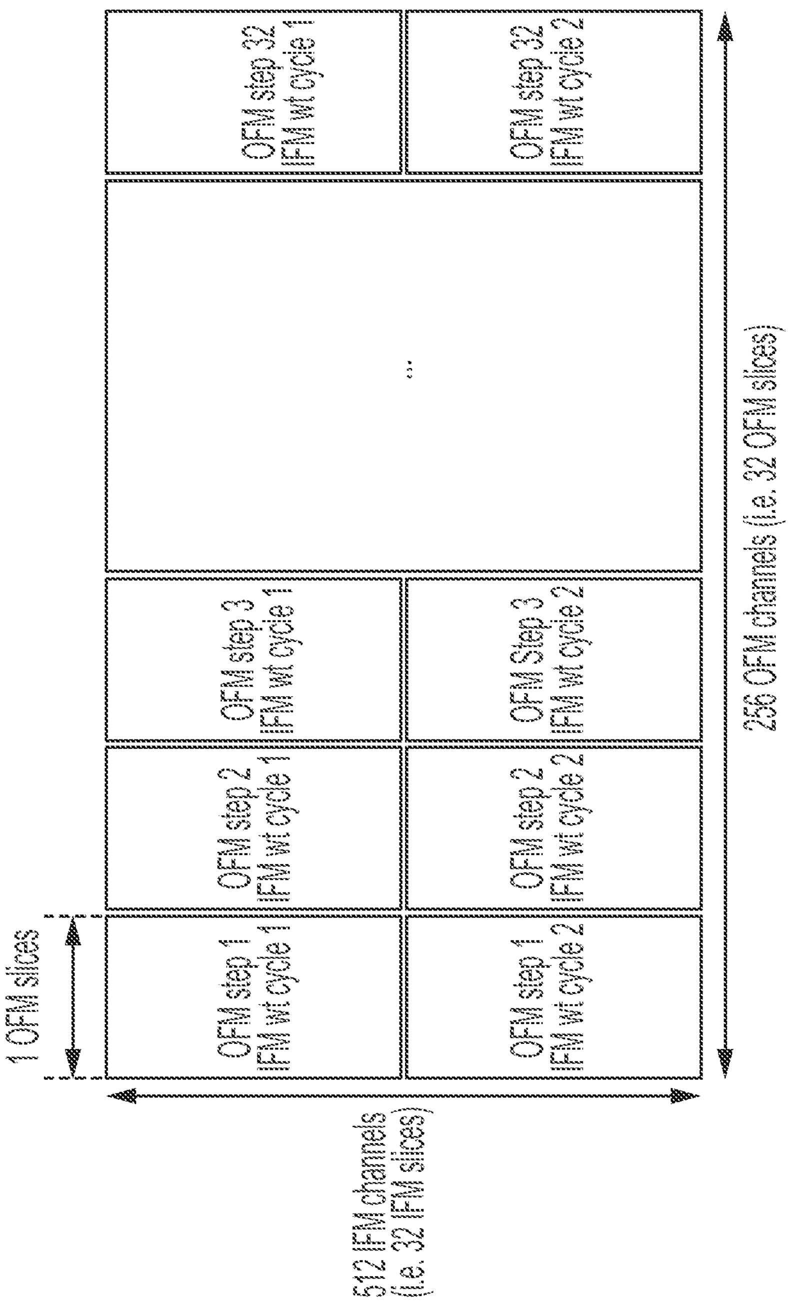
FIG. 3HA is a data diagram according to the subject matter disclosed herein.
Figure 3H:
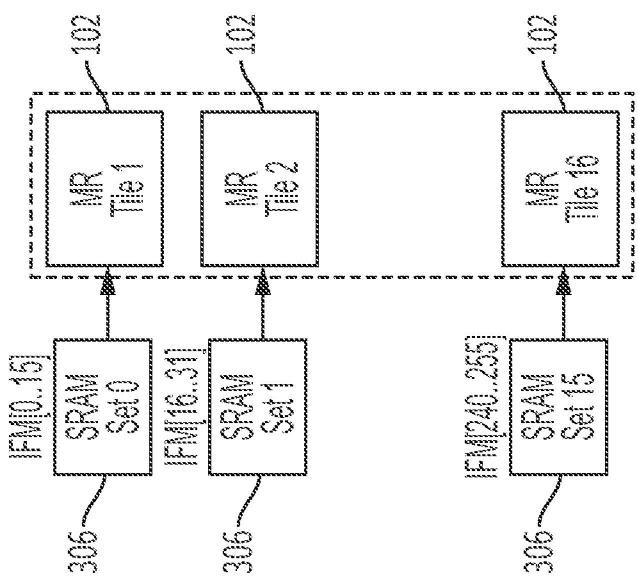
Figure 3H:
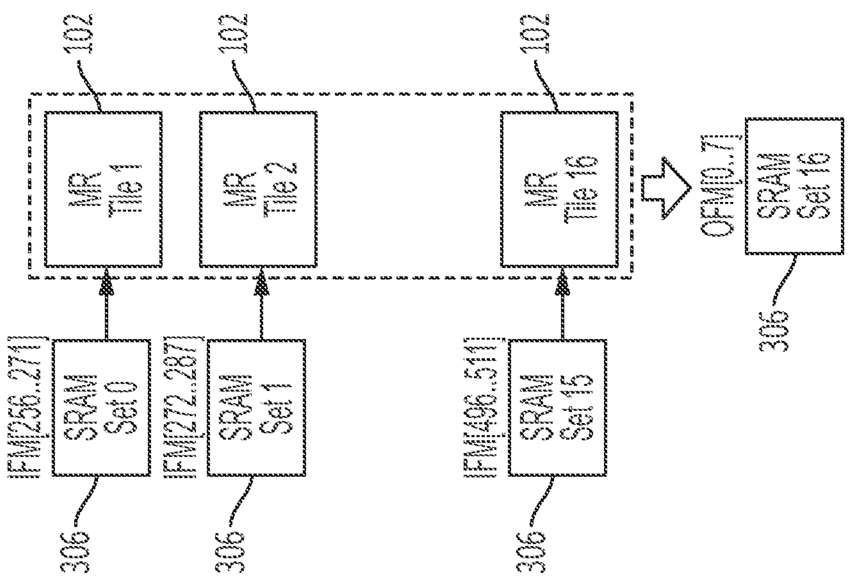
Figure 3H:
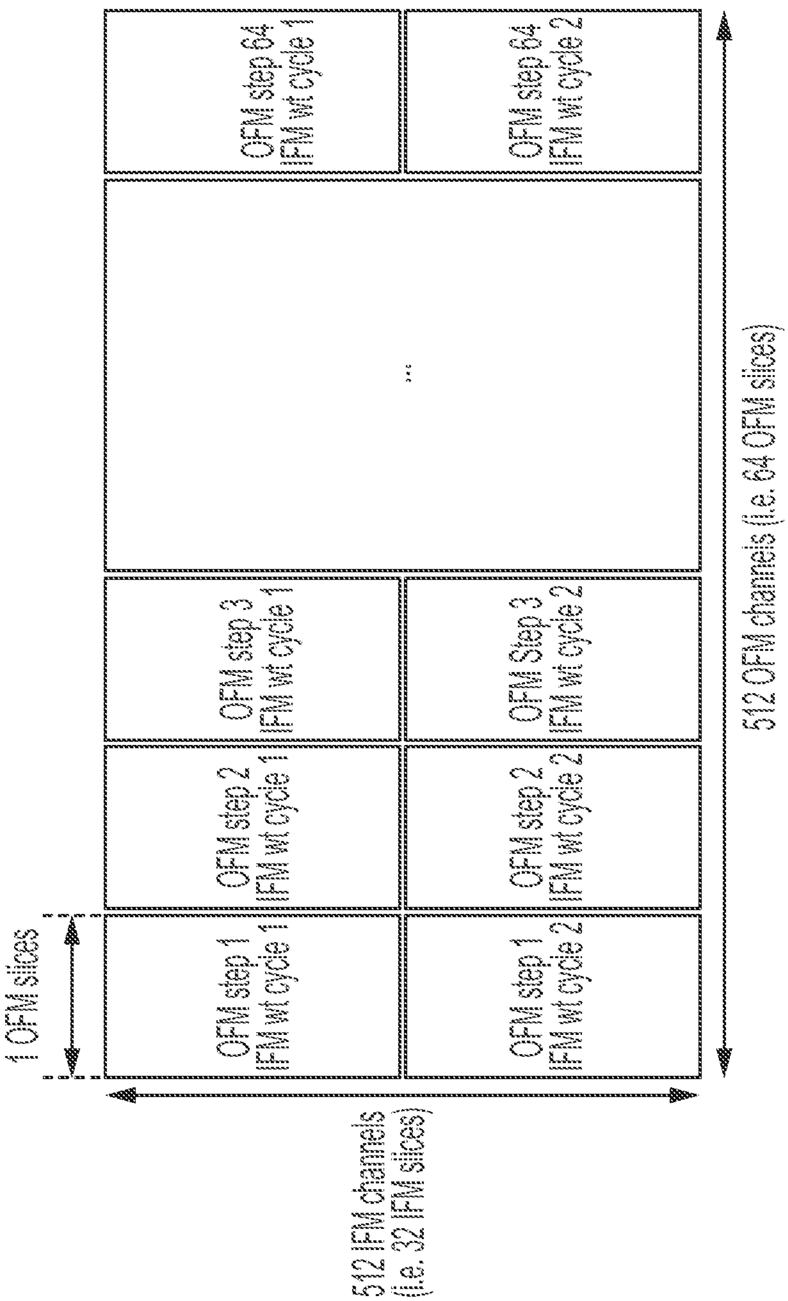
Figure 3I:
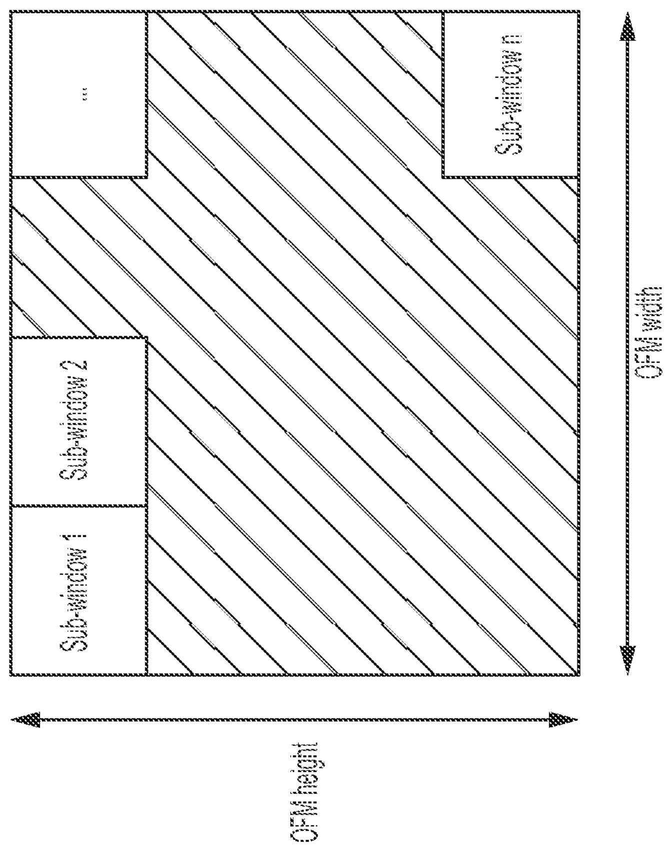
FIG. 3IA is a block diagram depicting a portion of a neural processor according to the subject matter disclosed herein.
Figure 31F:
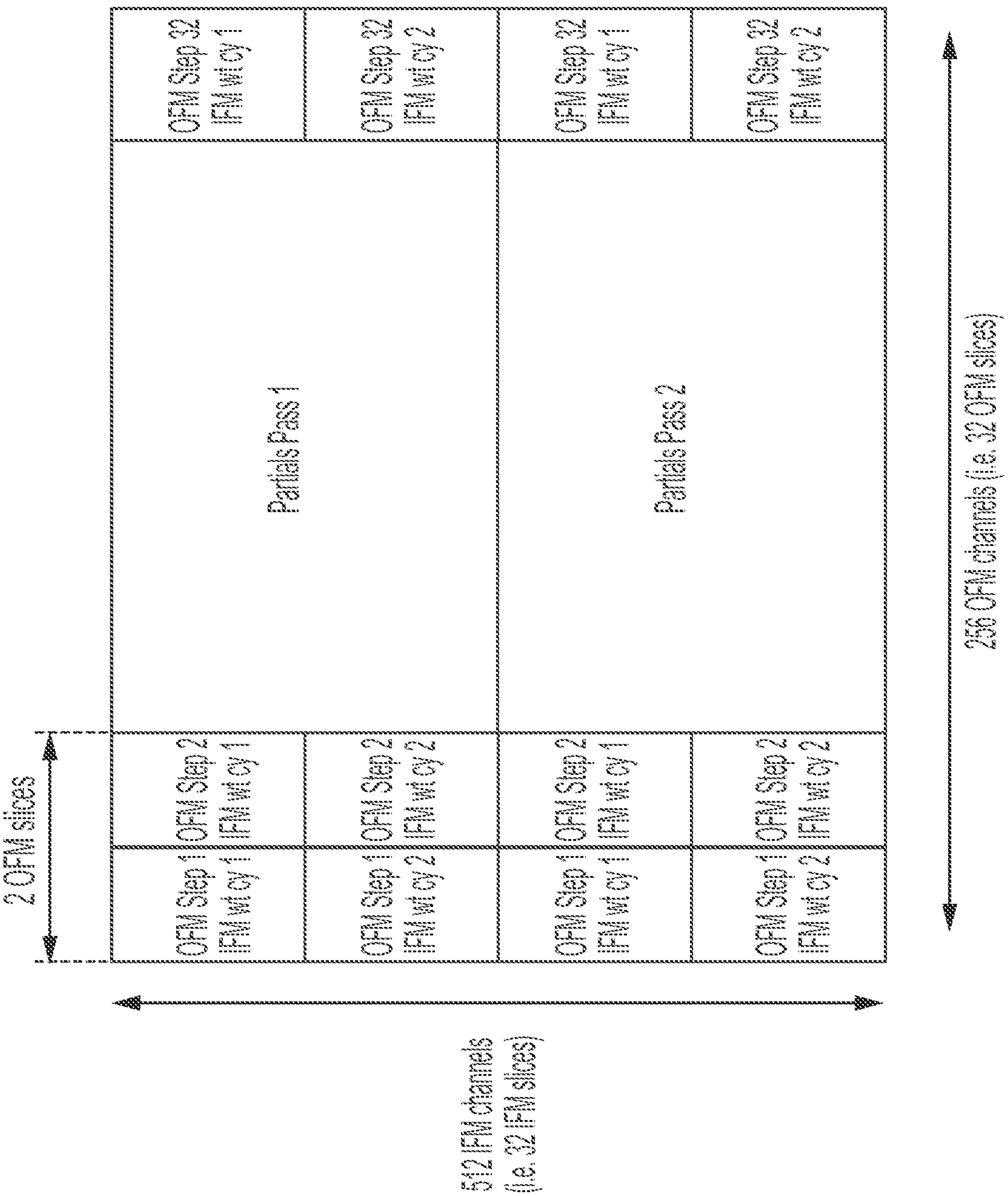
Figure 3J:
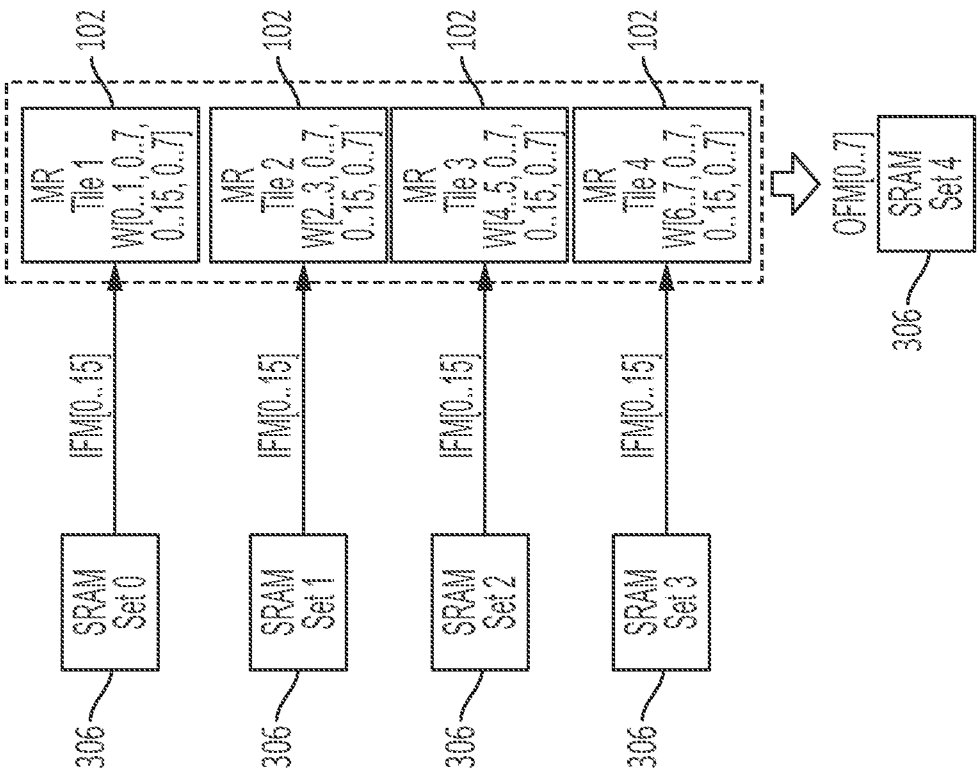
FIG. 3JA depicts a data flow according to the subject matter disclosed herein.
Figure 3J:
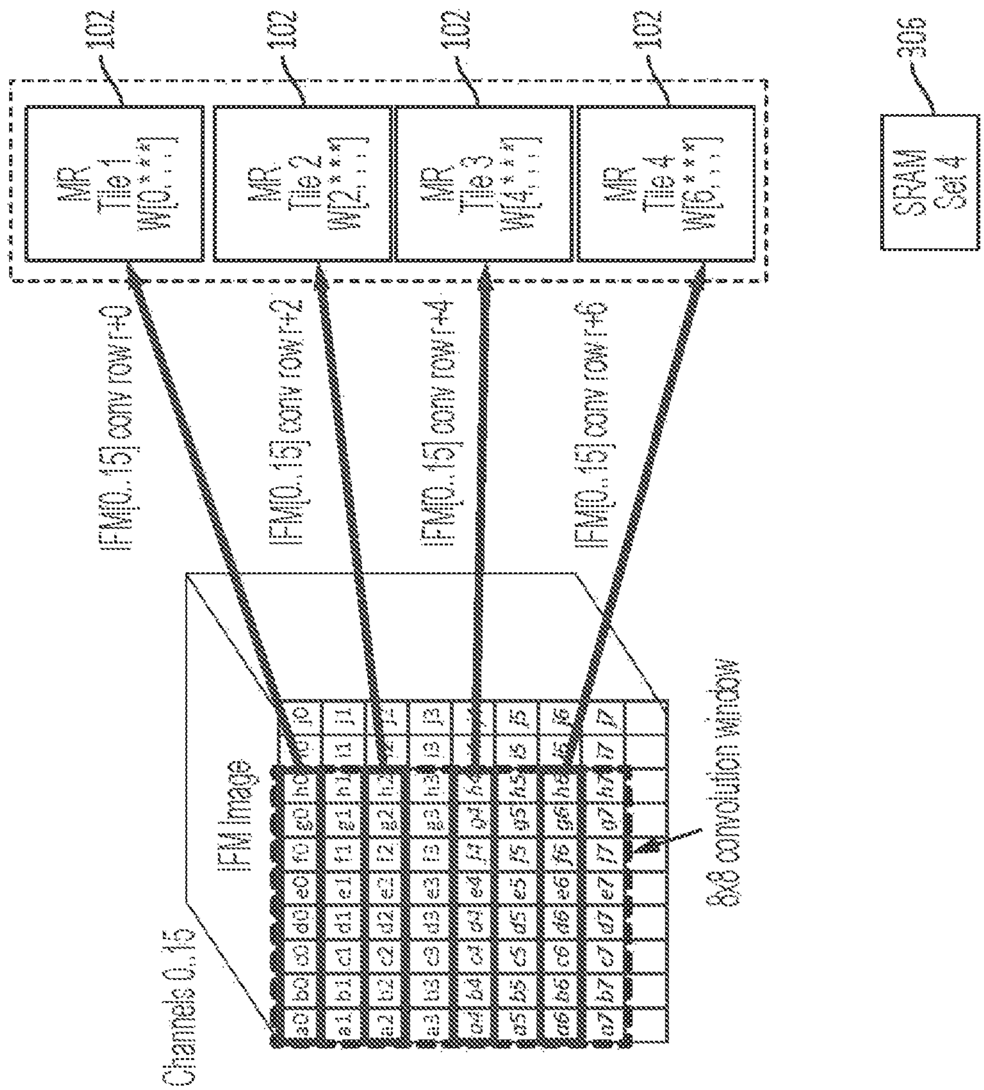
Figure 3J:
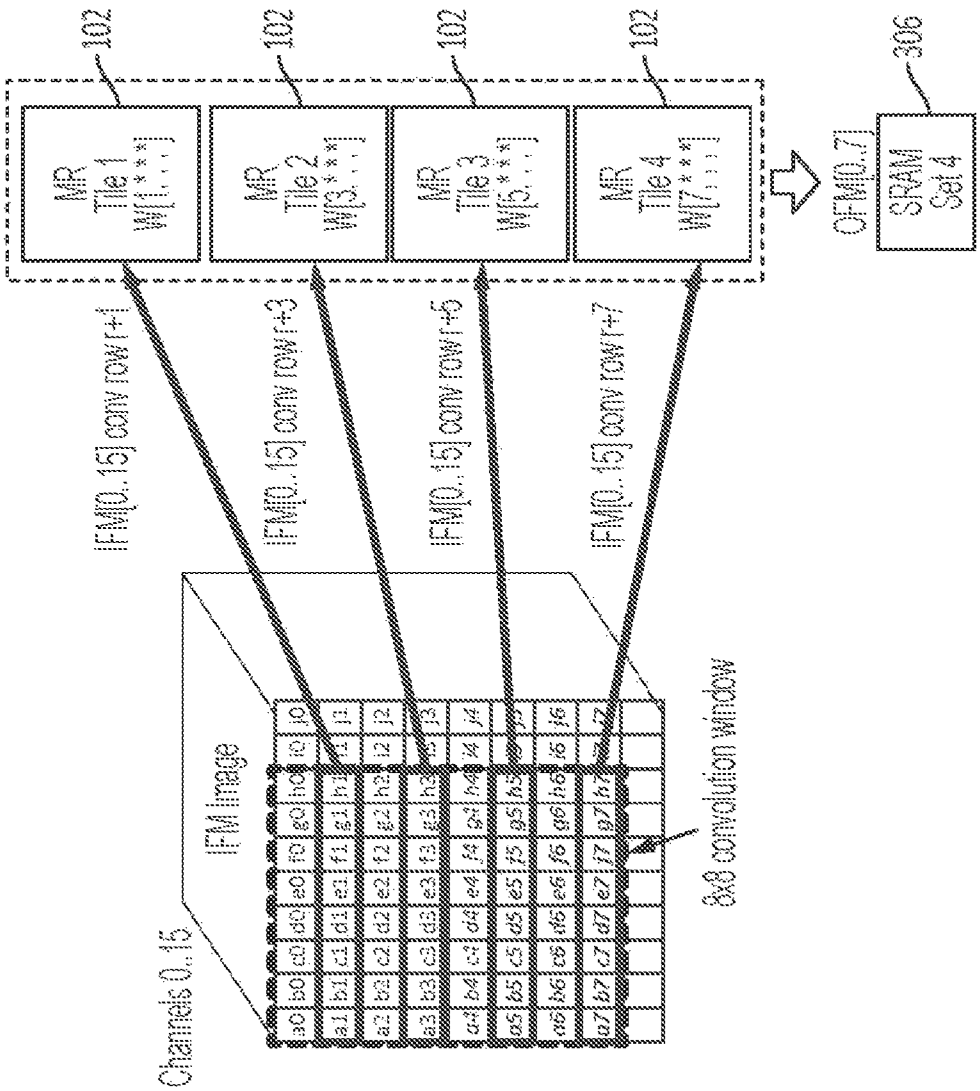
Figure 3J:
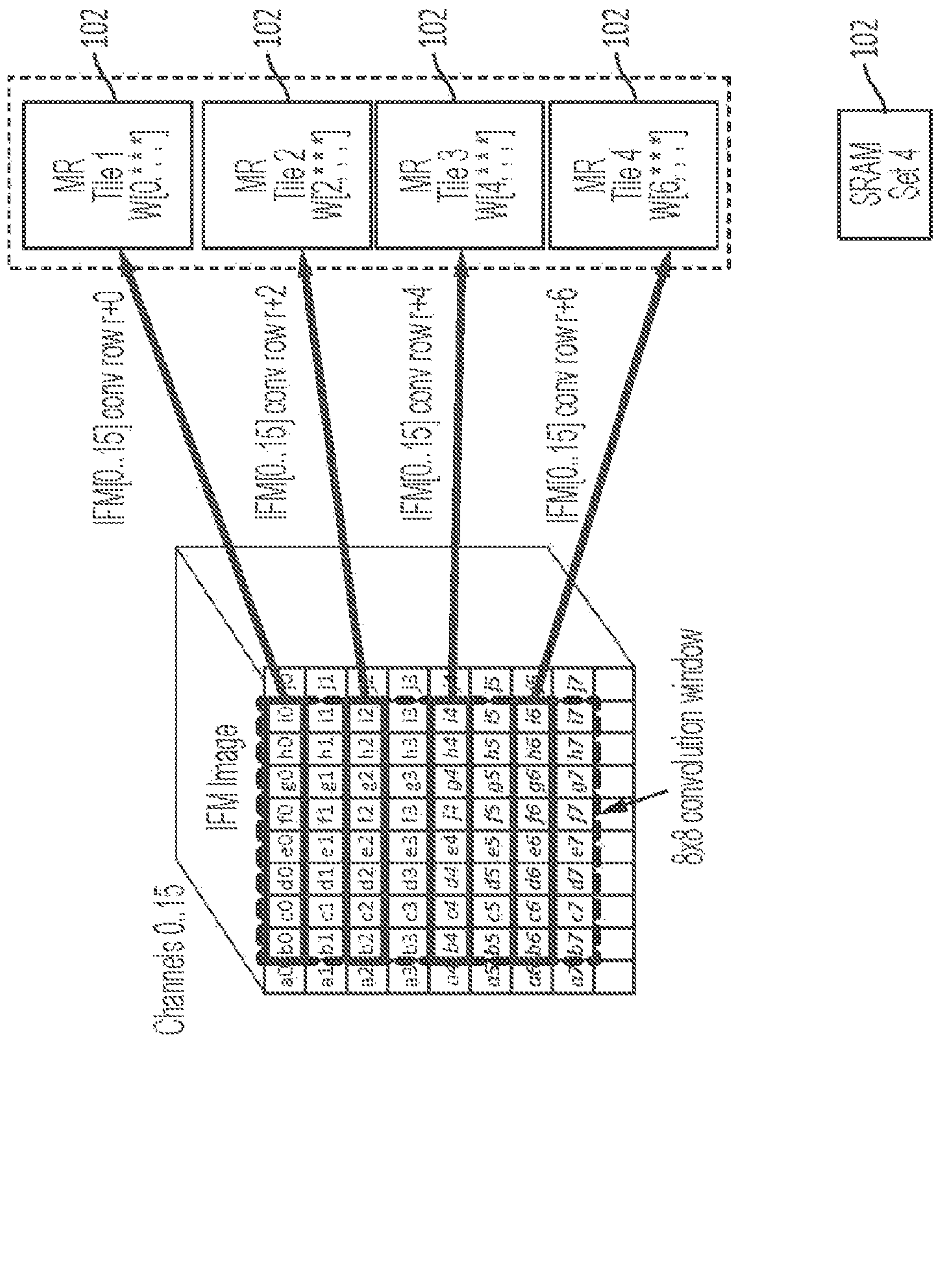
Figure 3K:
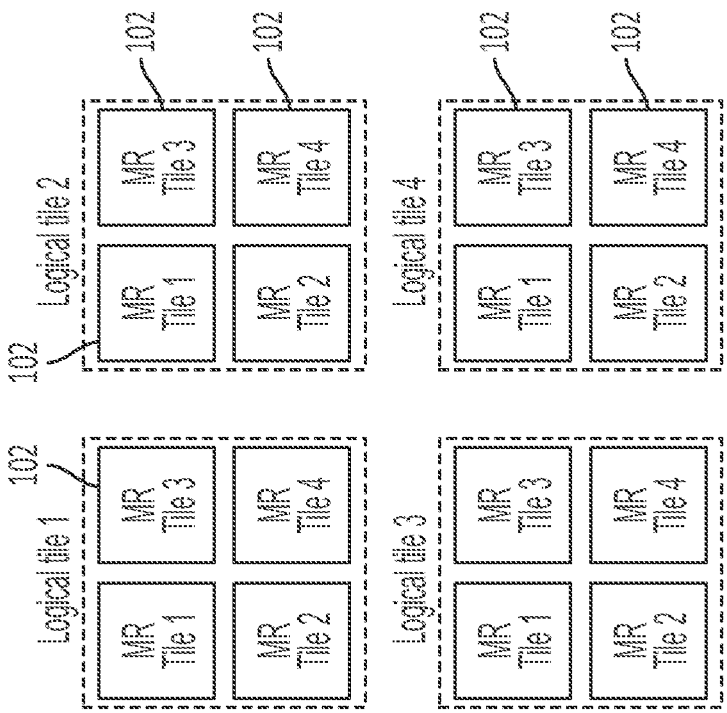
Figure 3K:
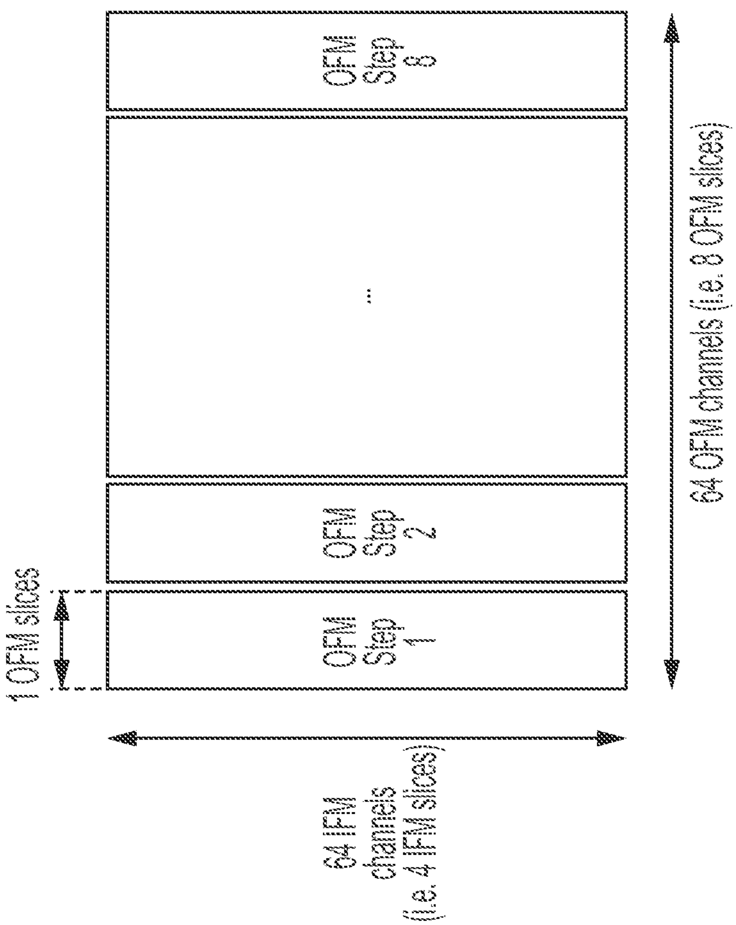
Figure 3L:
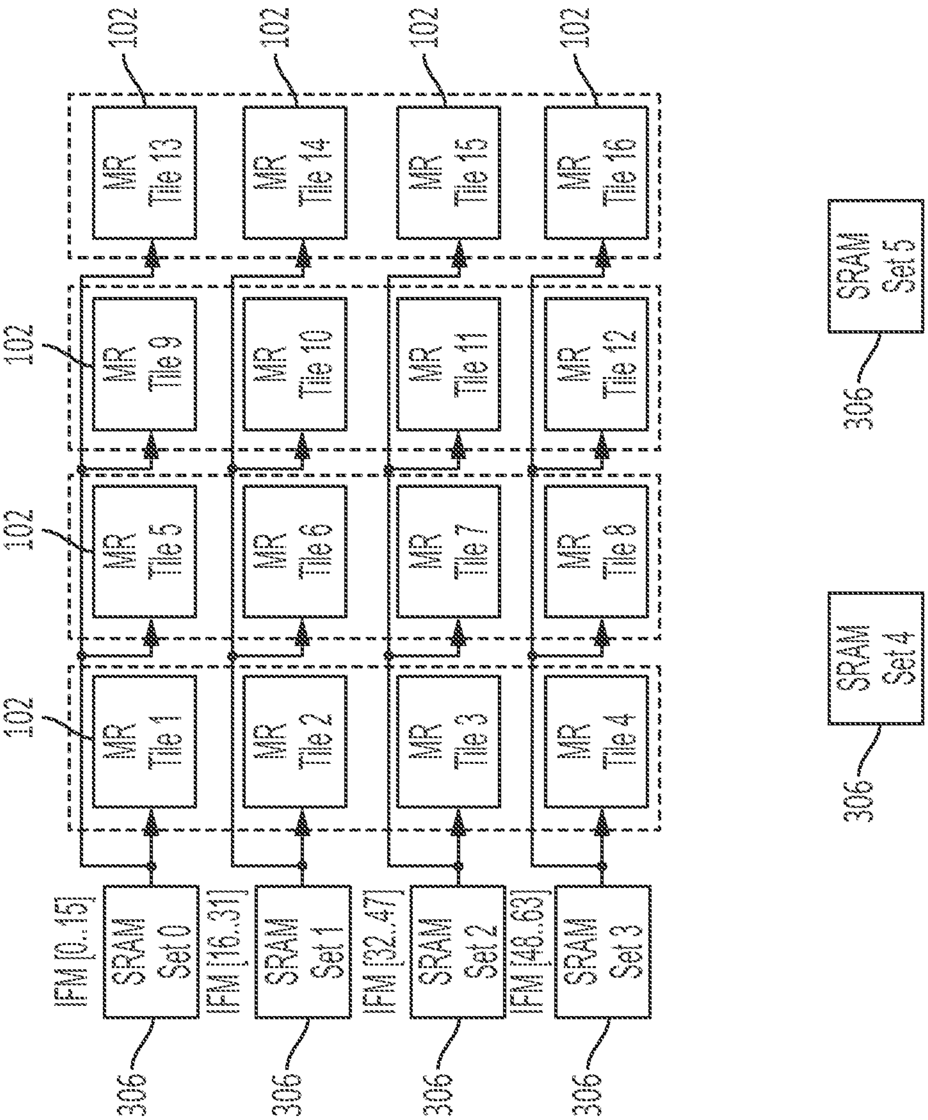
Figure 3L:
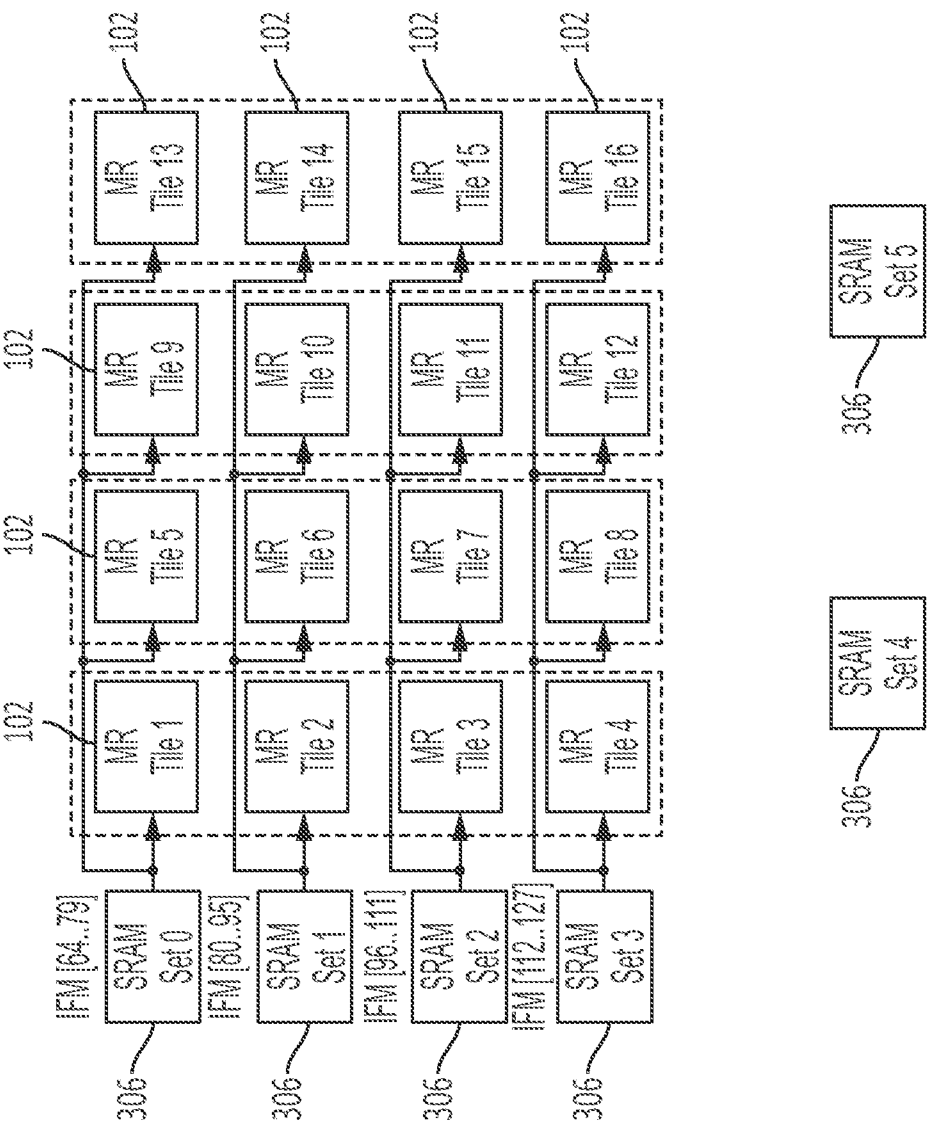
Figure 3L:
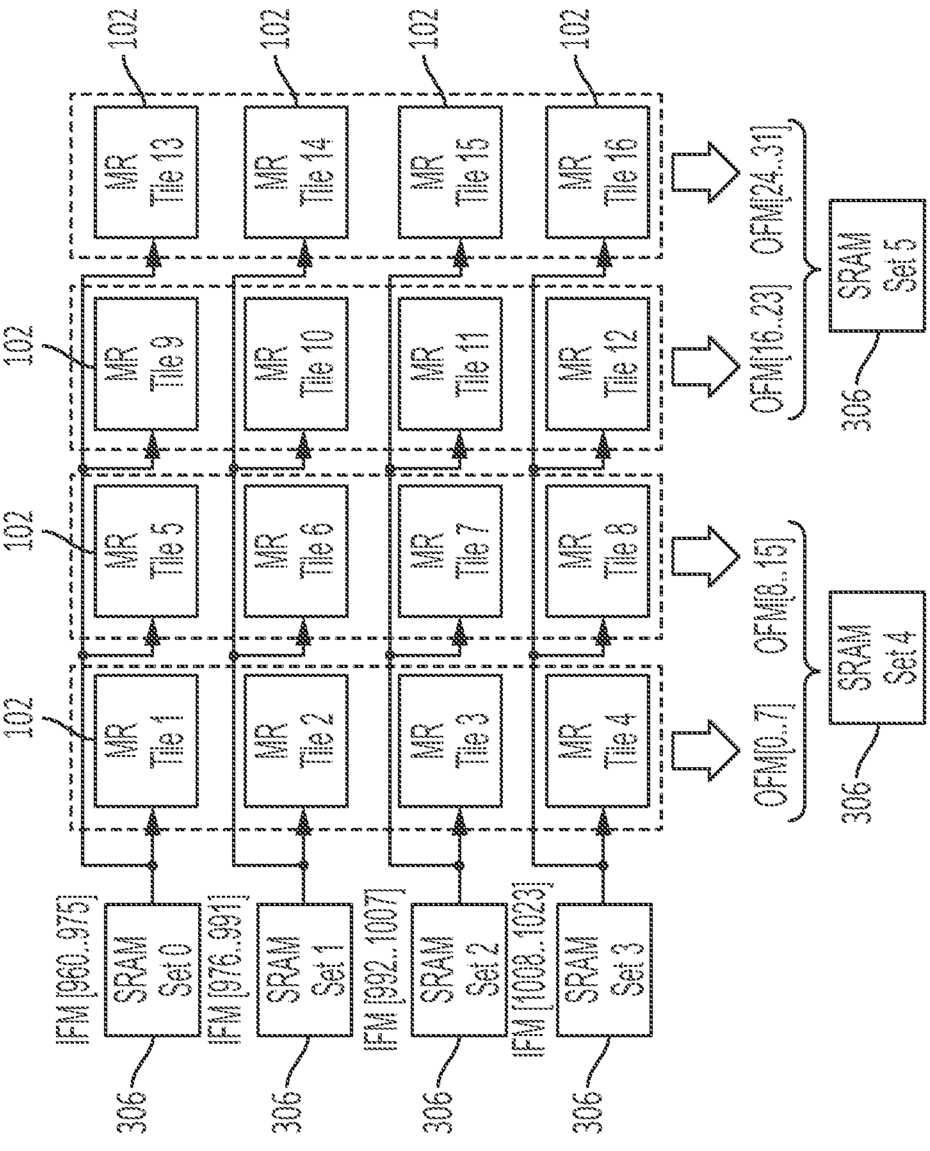
Figure 3L:
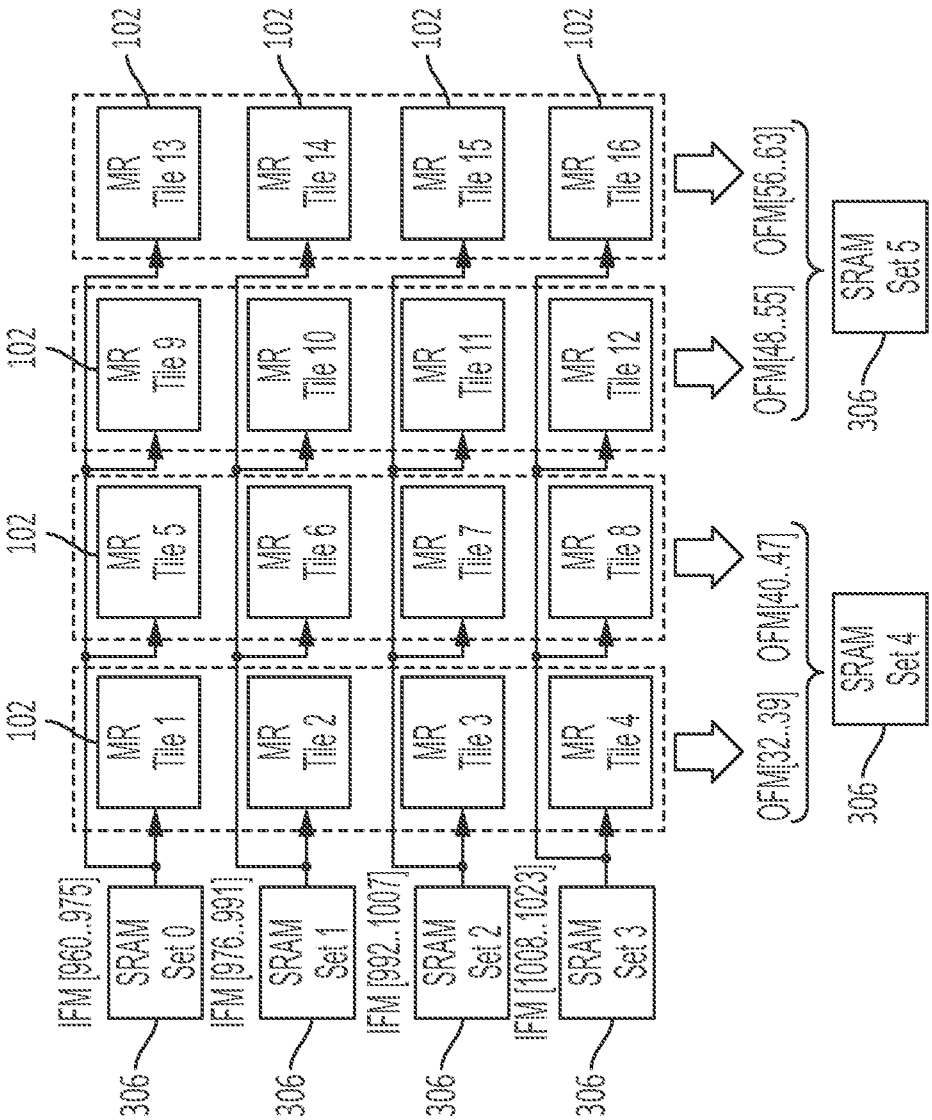
Figure 3M:
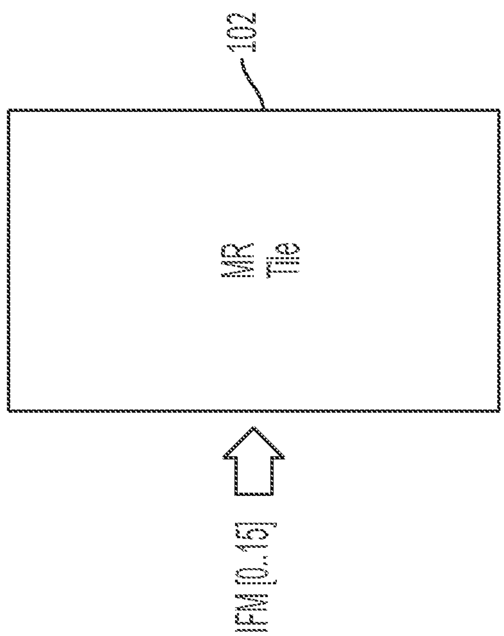
Figure 3M:
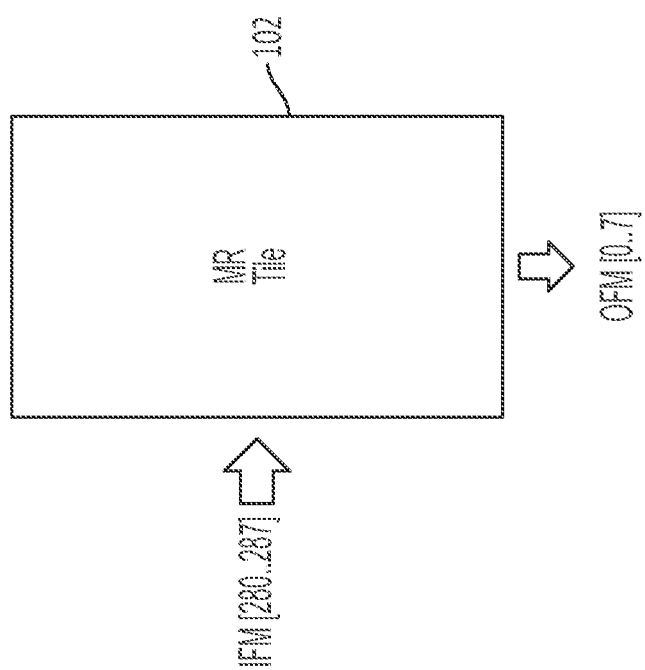
Figure 3N:
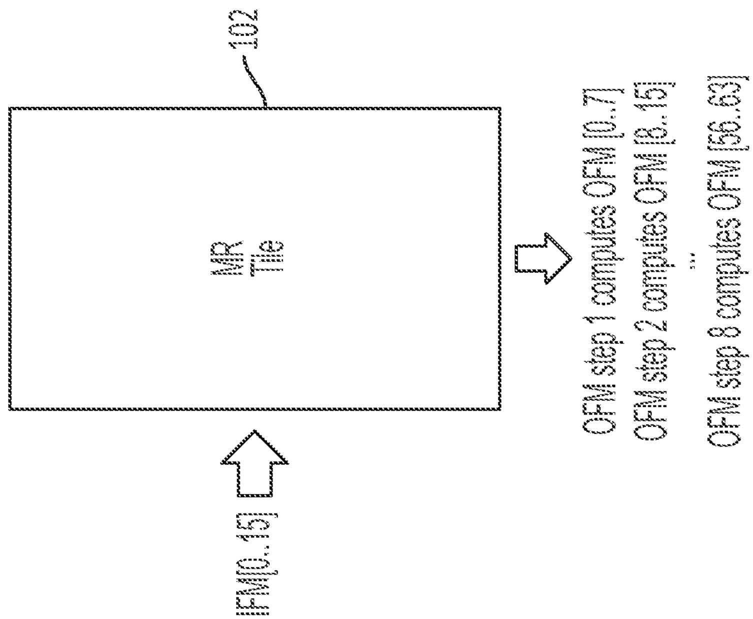
Figure 3P:
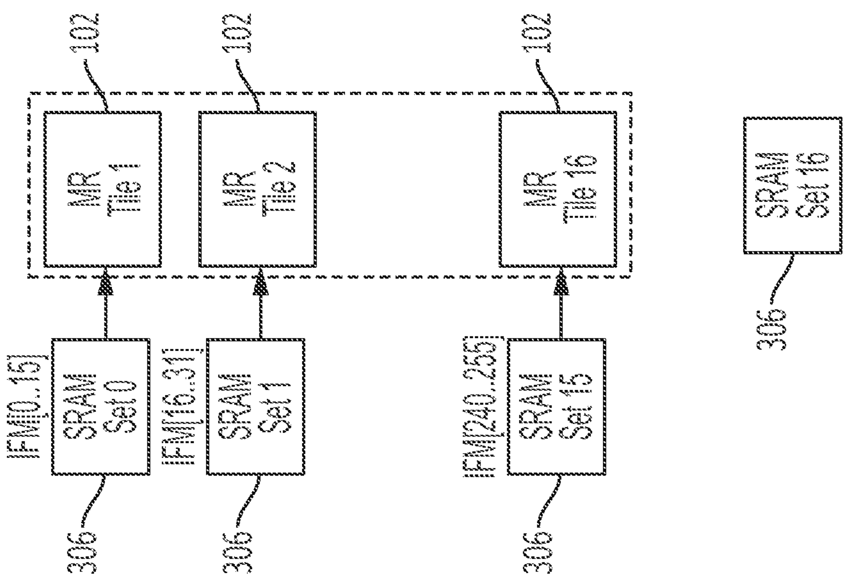
Figure 3P:
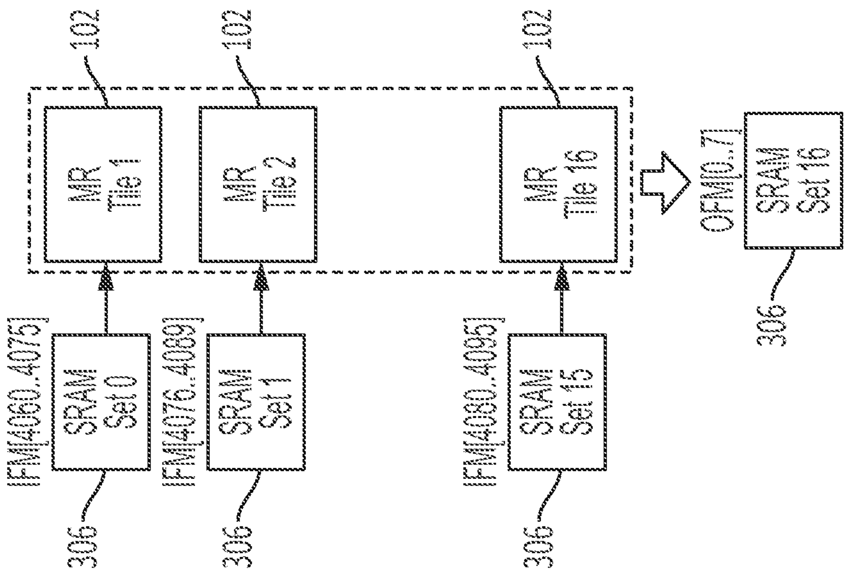
Figure 3P:
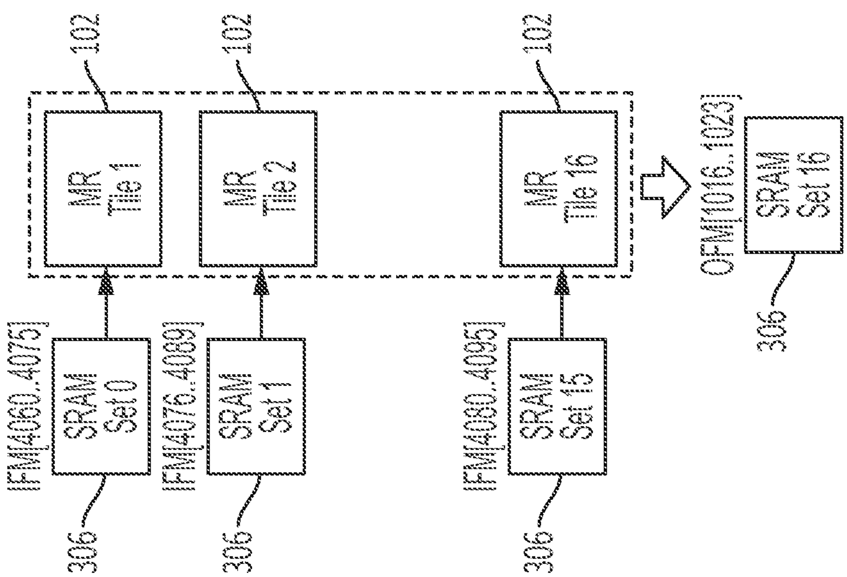
Figure 4A:
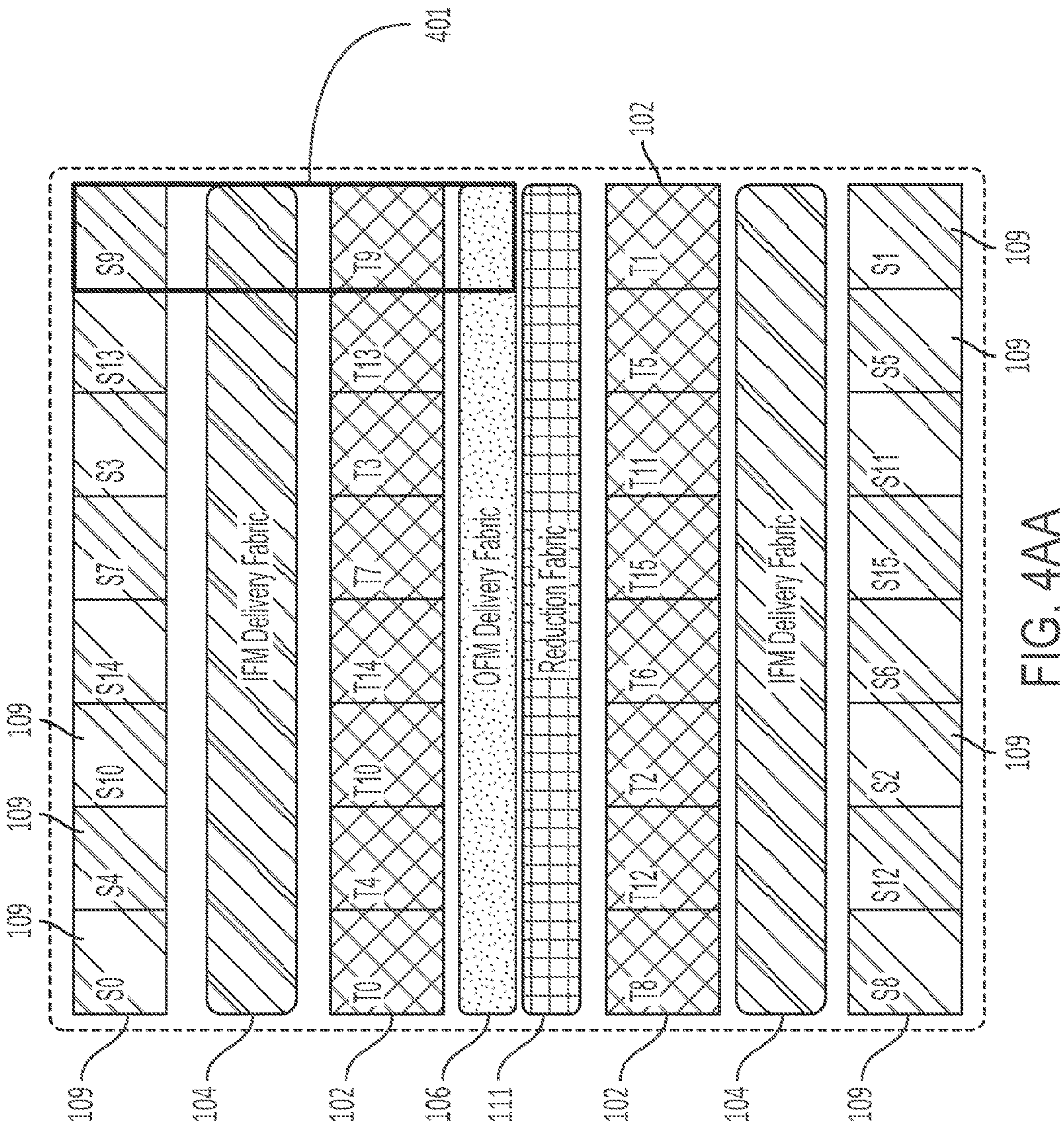
Figure 4A:
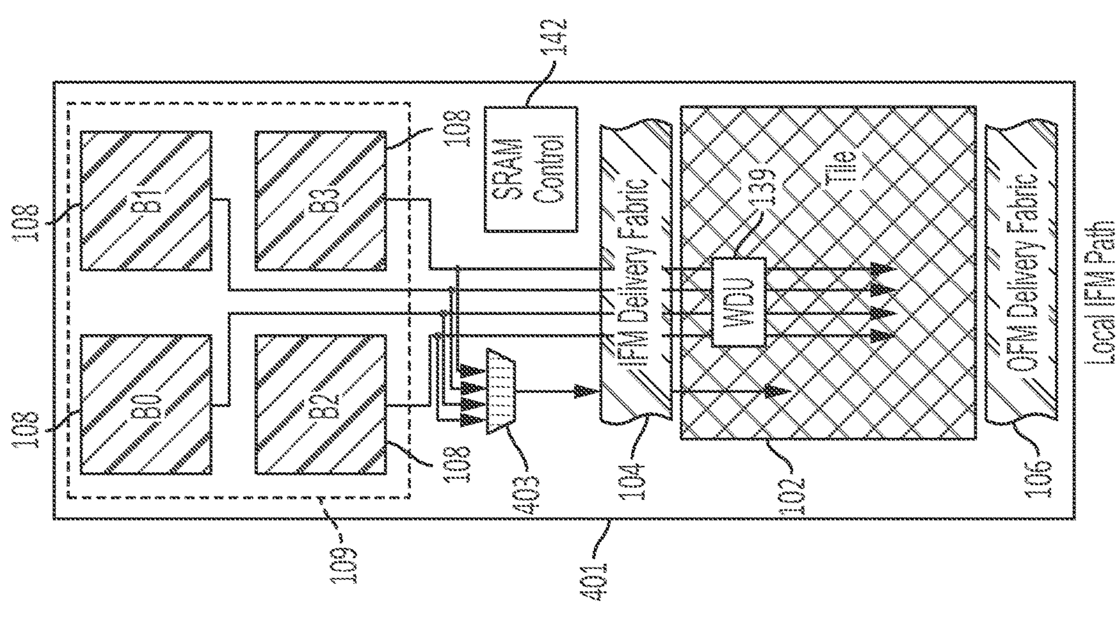
Figure 4A:
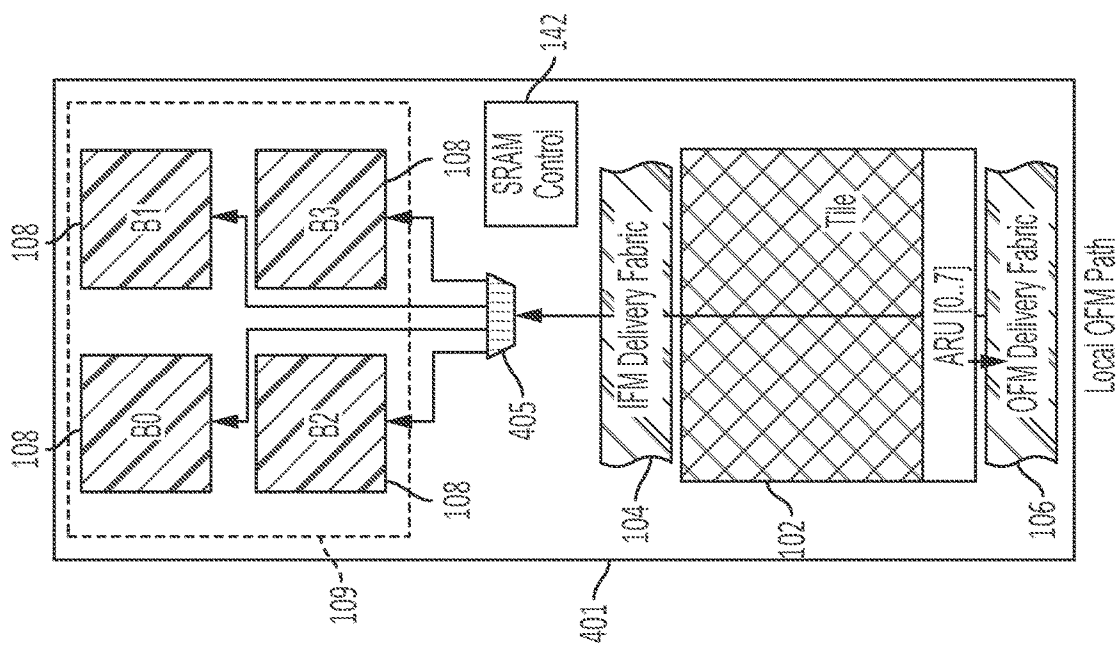
Figure 4A:
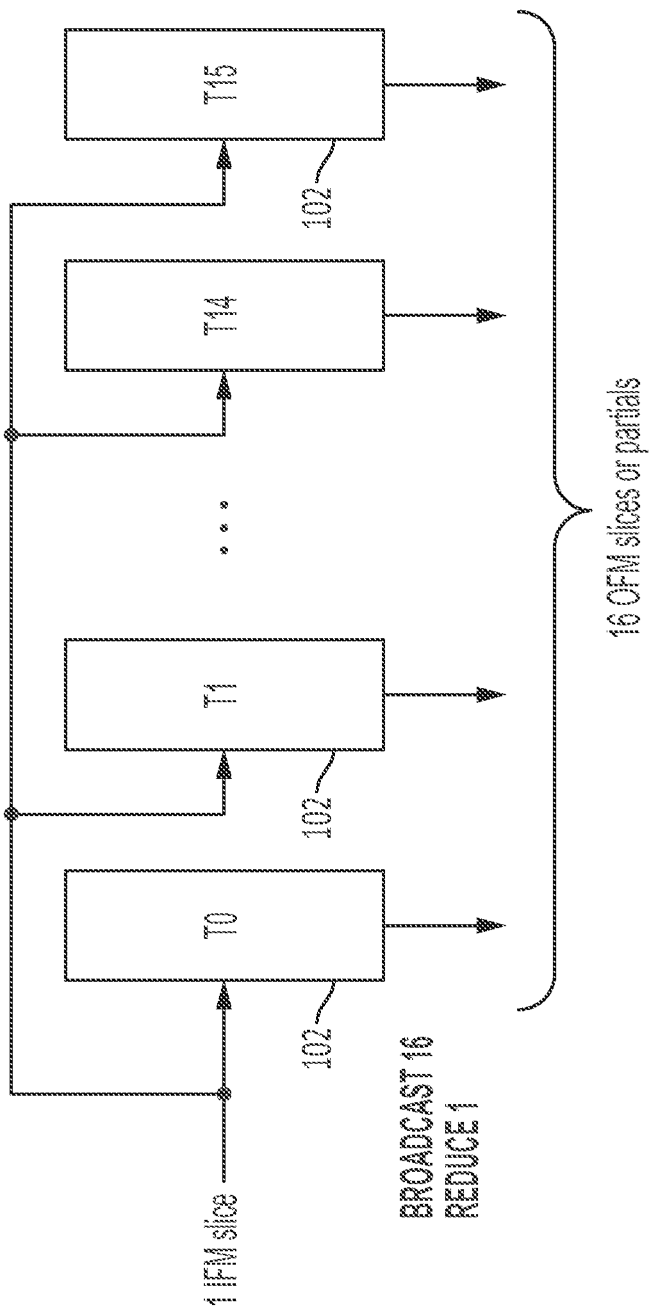
Figure 4A:
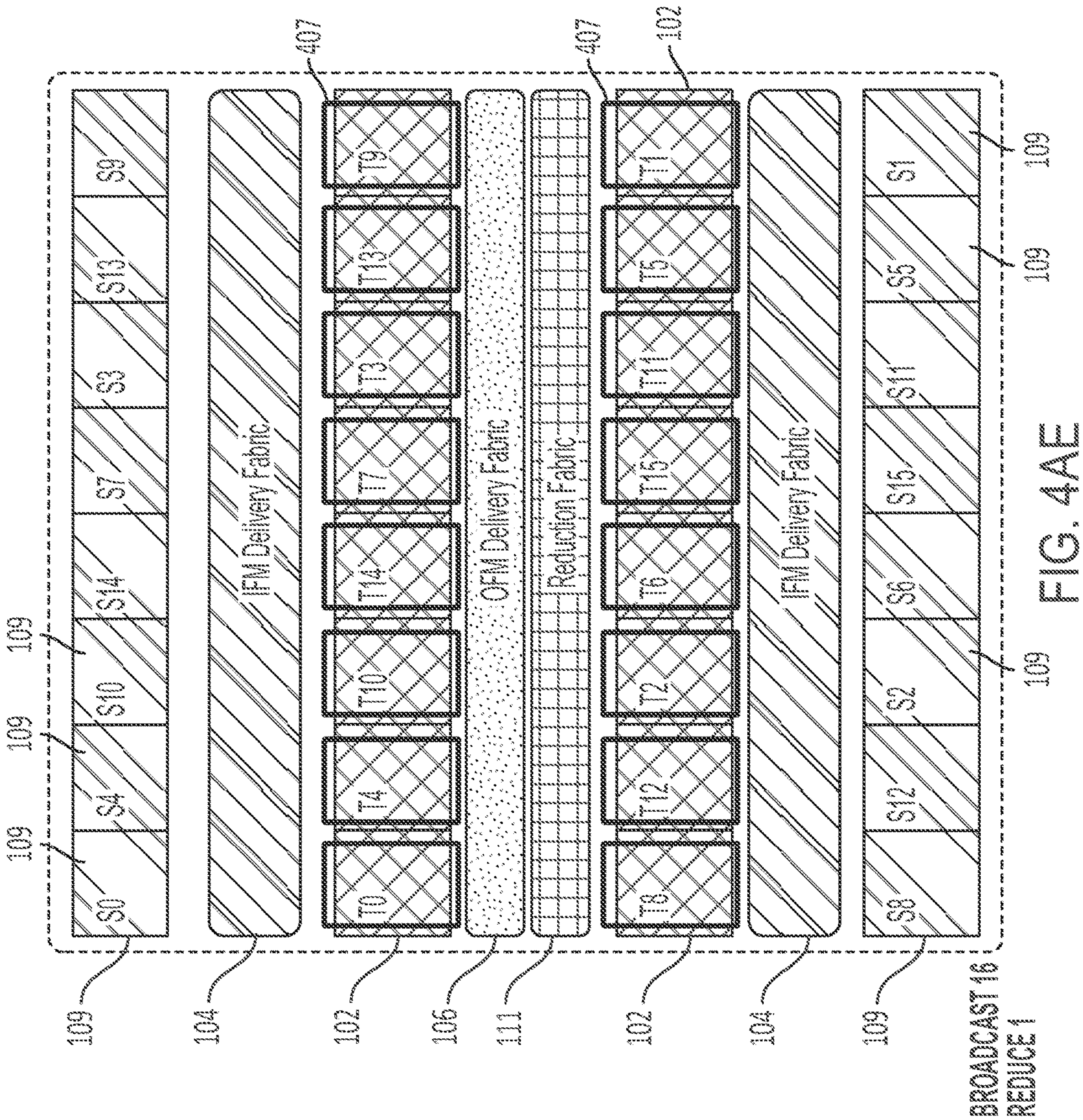
Figure 4A:
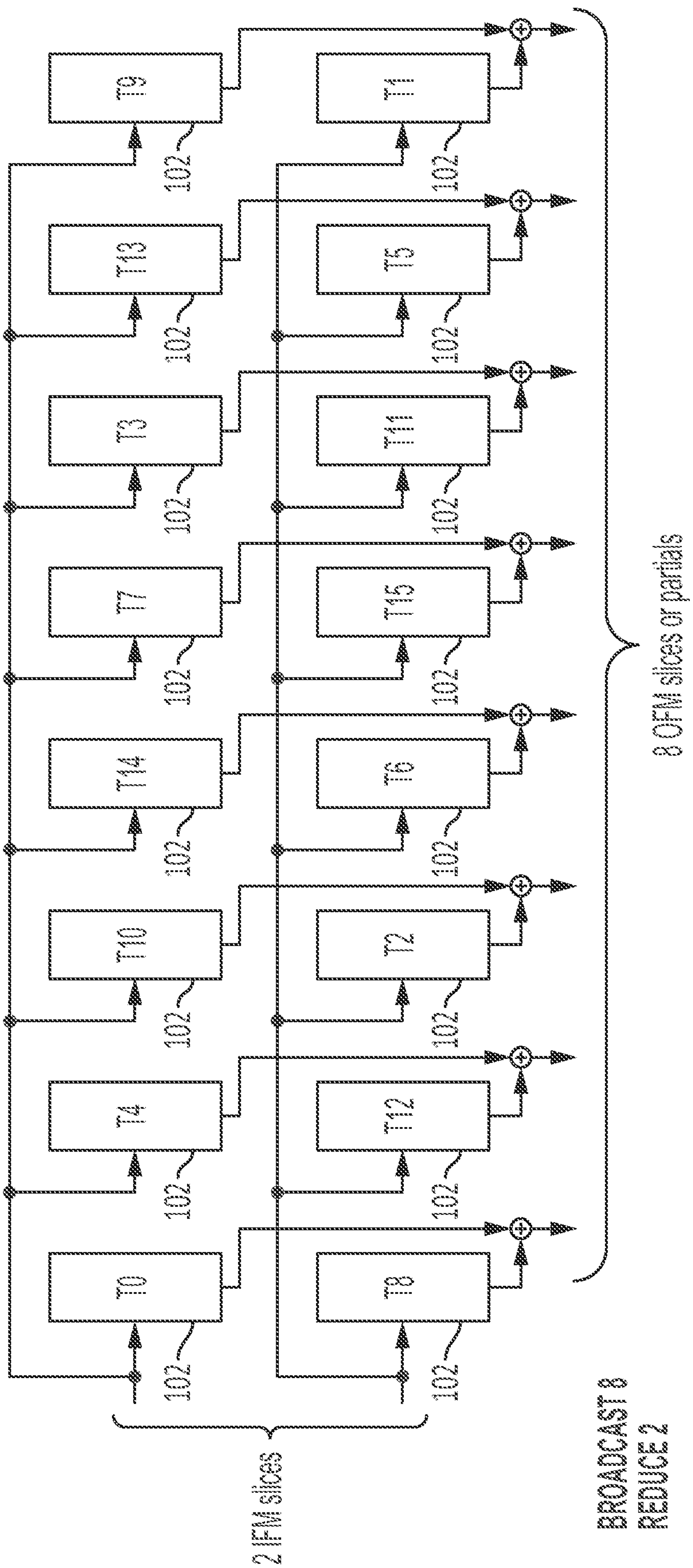
Figure 4A:
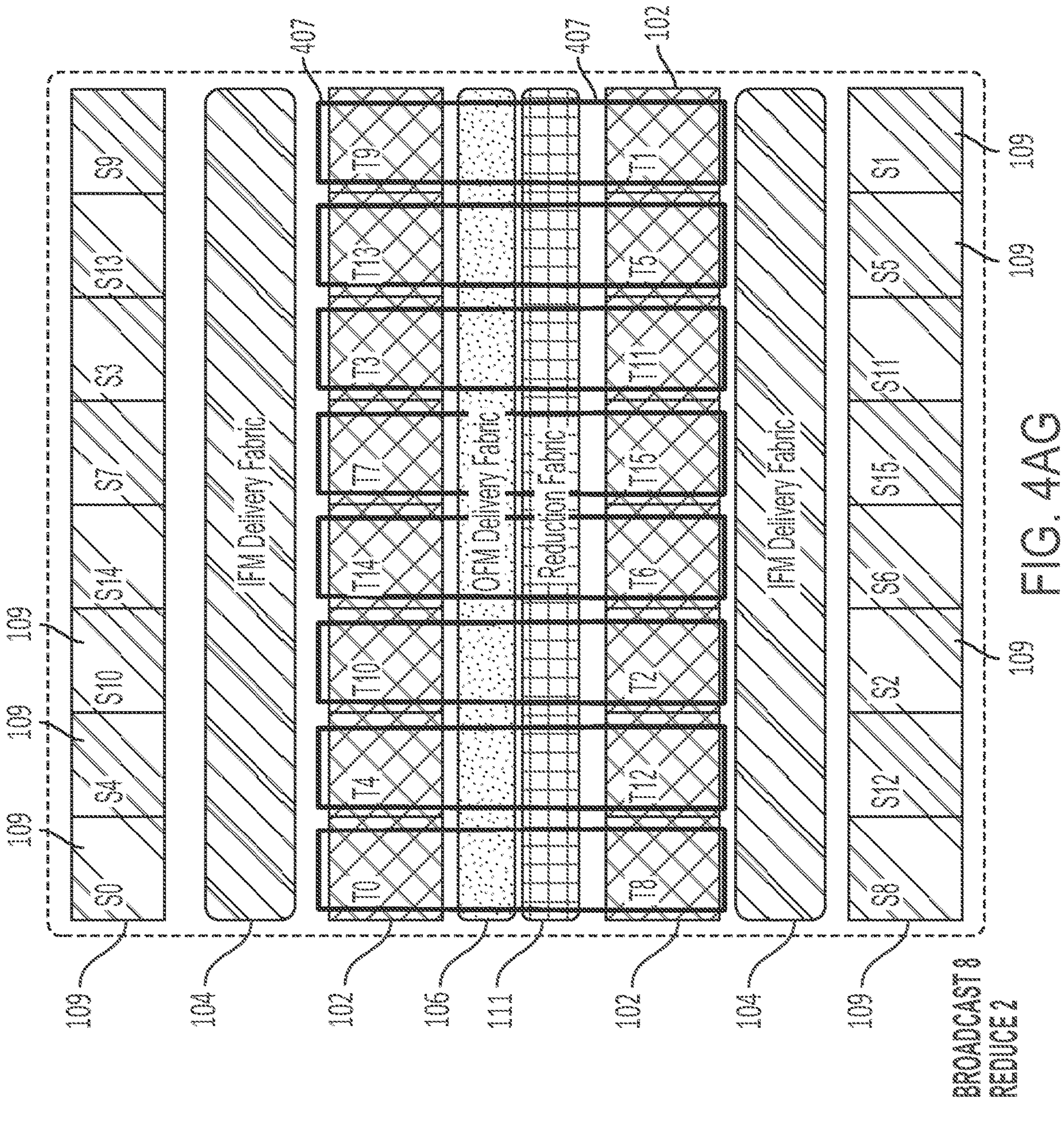
Figure 4A:
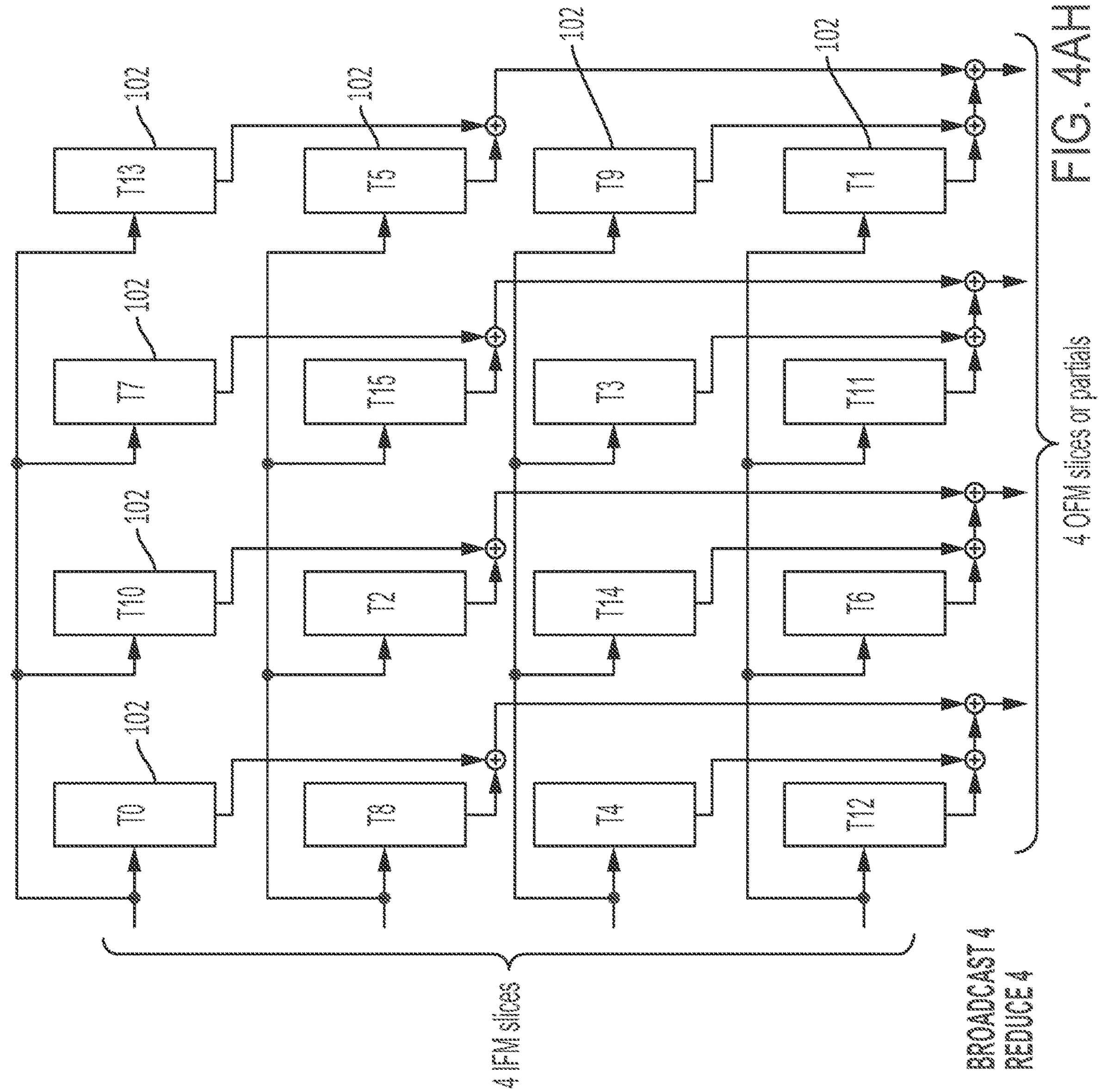
Figure 4A:
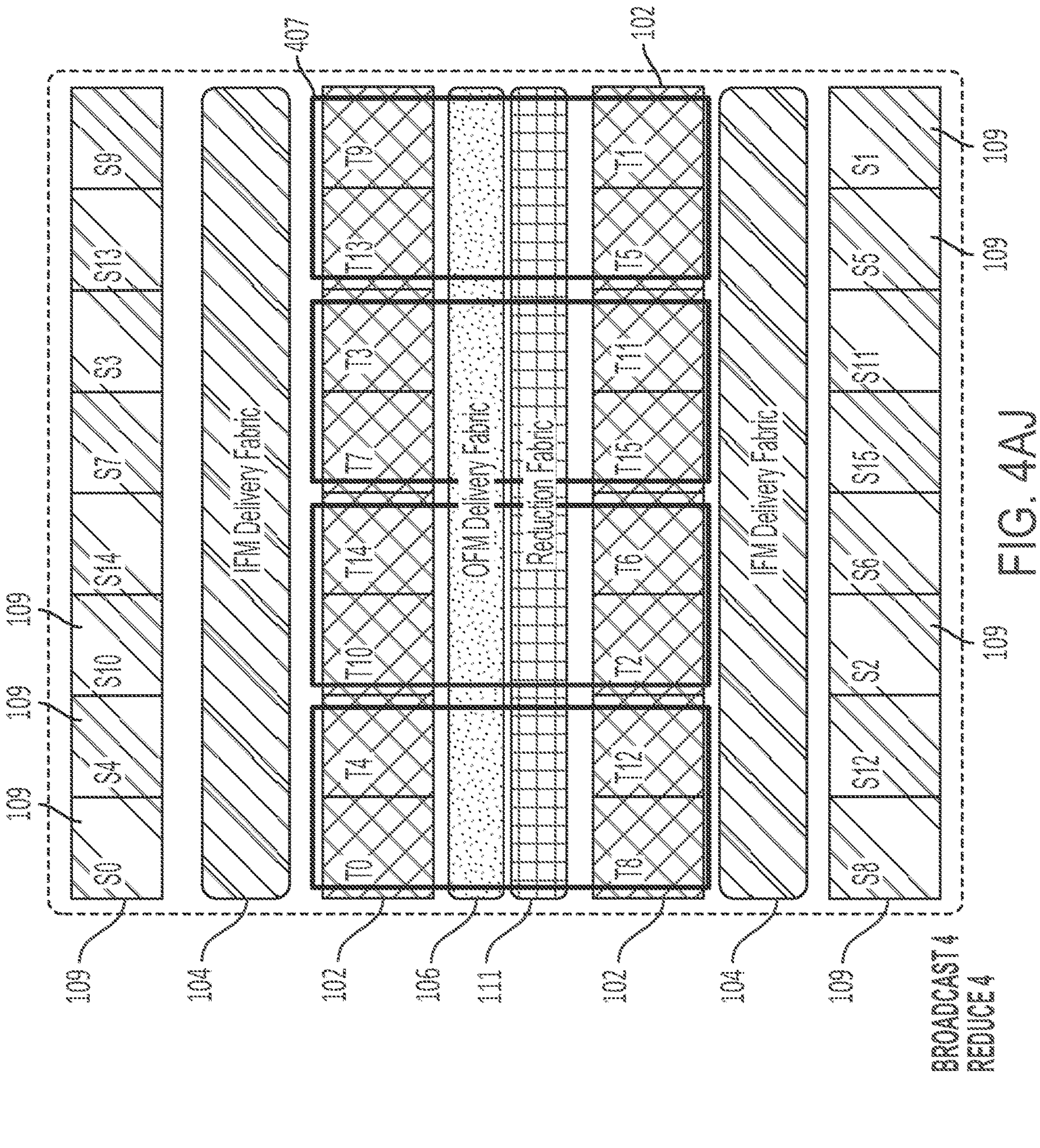
Figure 4A:
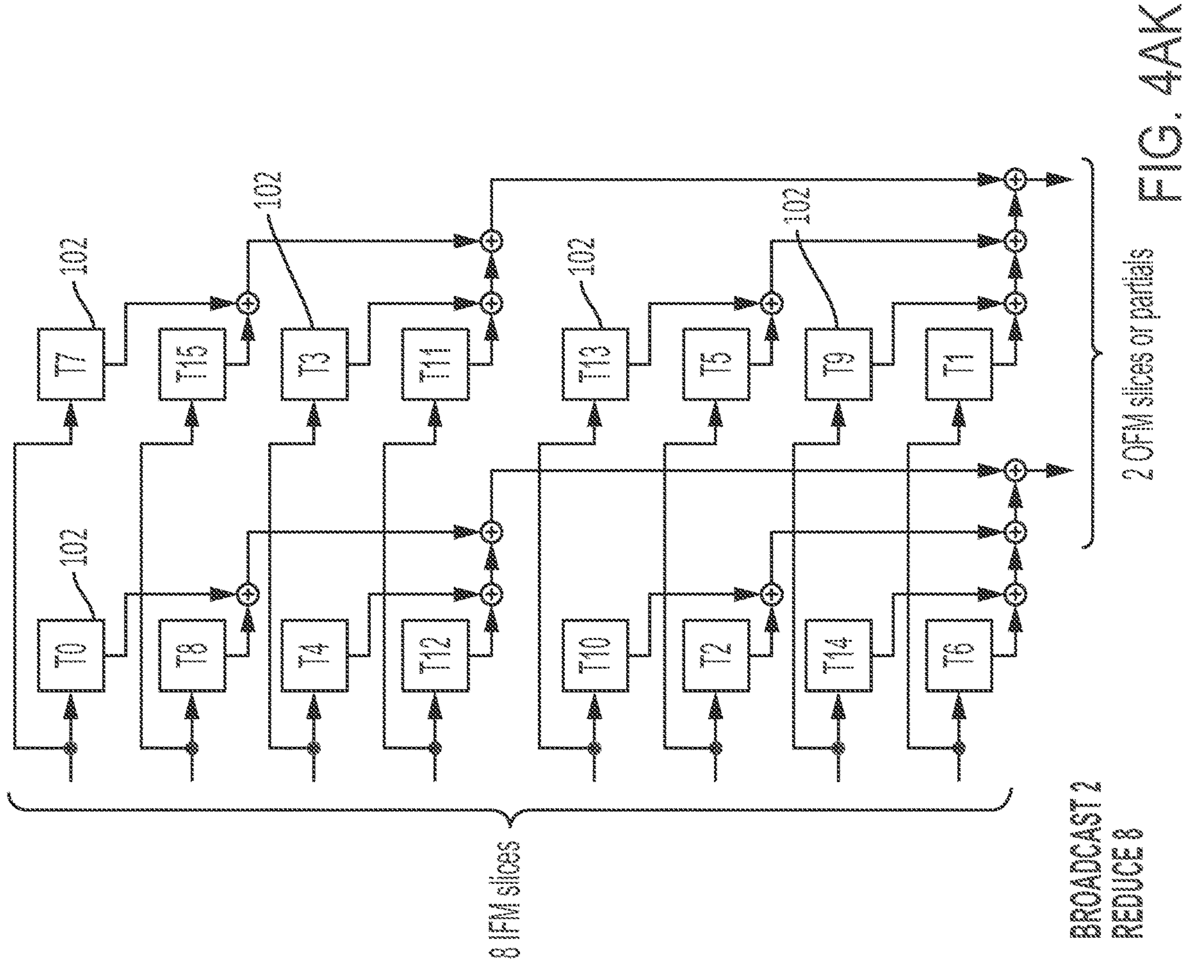
Figure 4A:
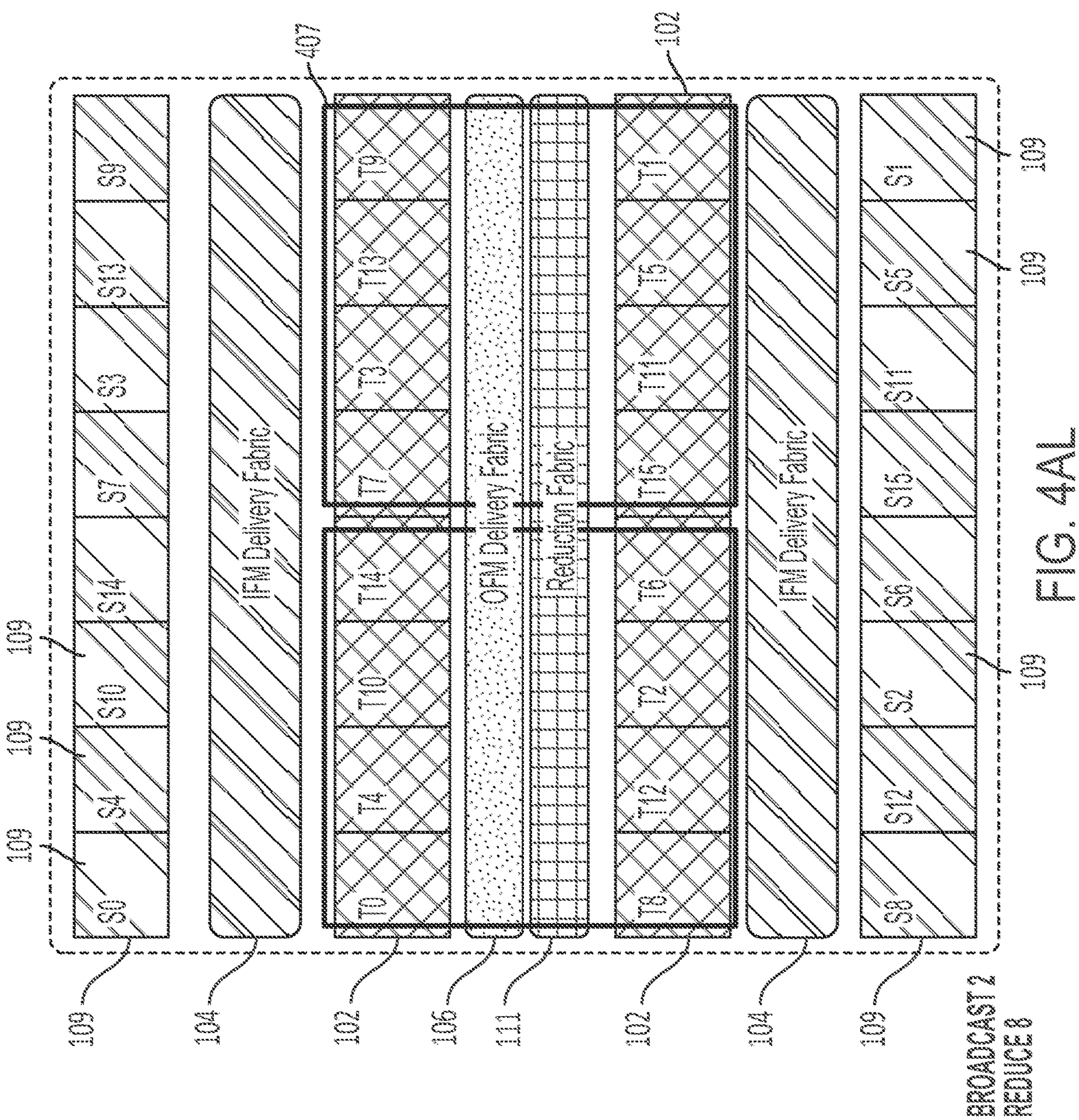
Figure 4A:
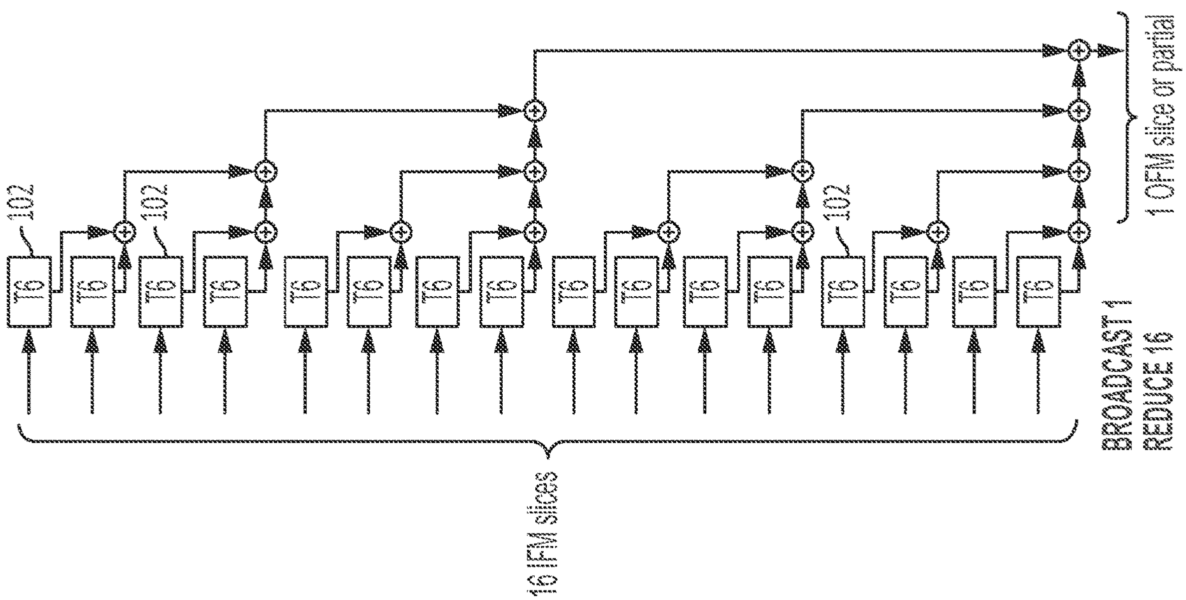
Figure 4A:
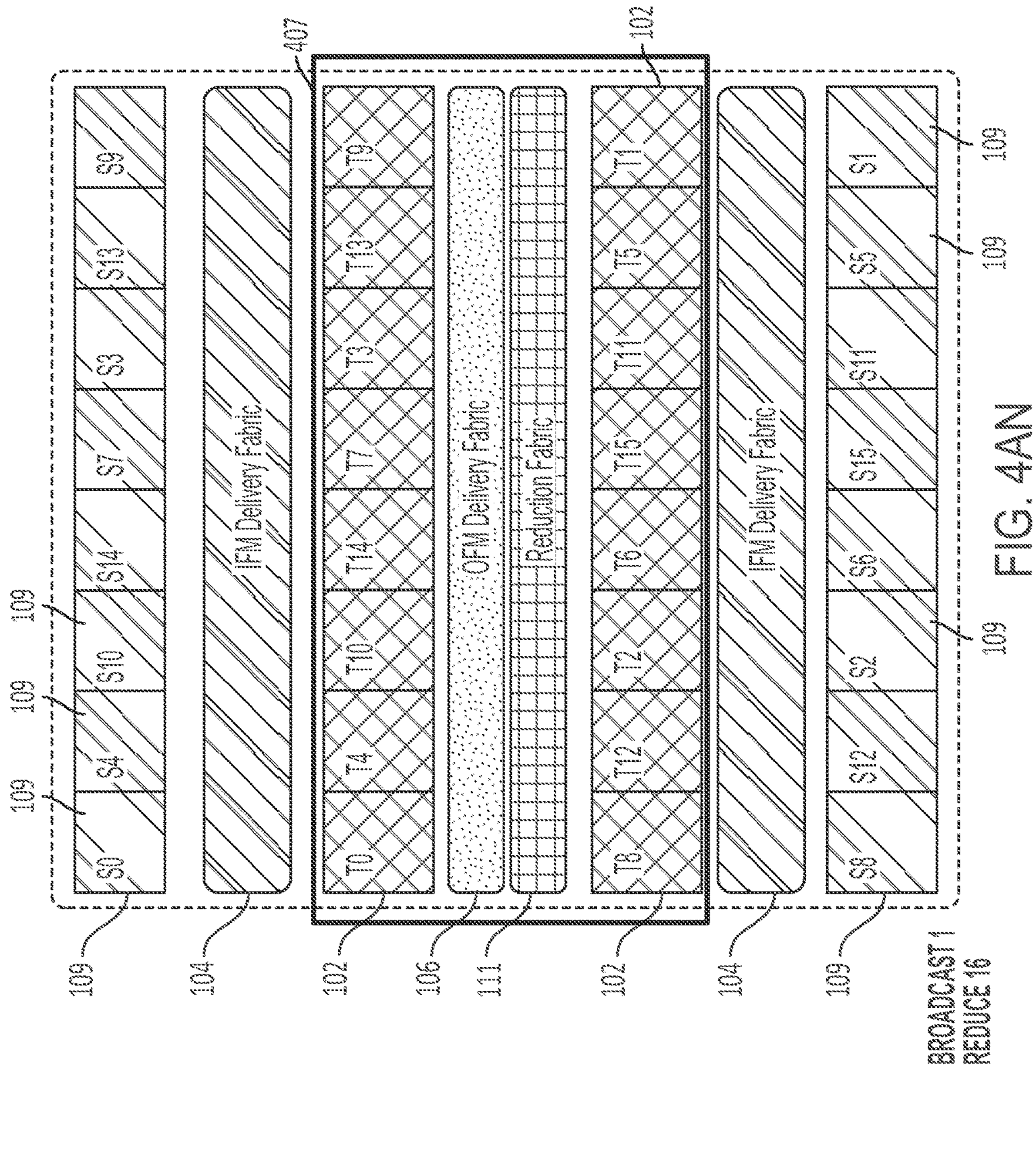
Figure 4B:
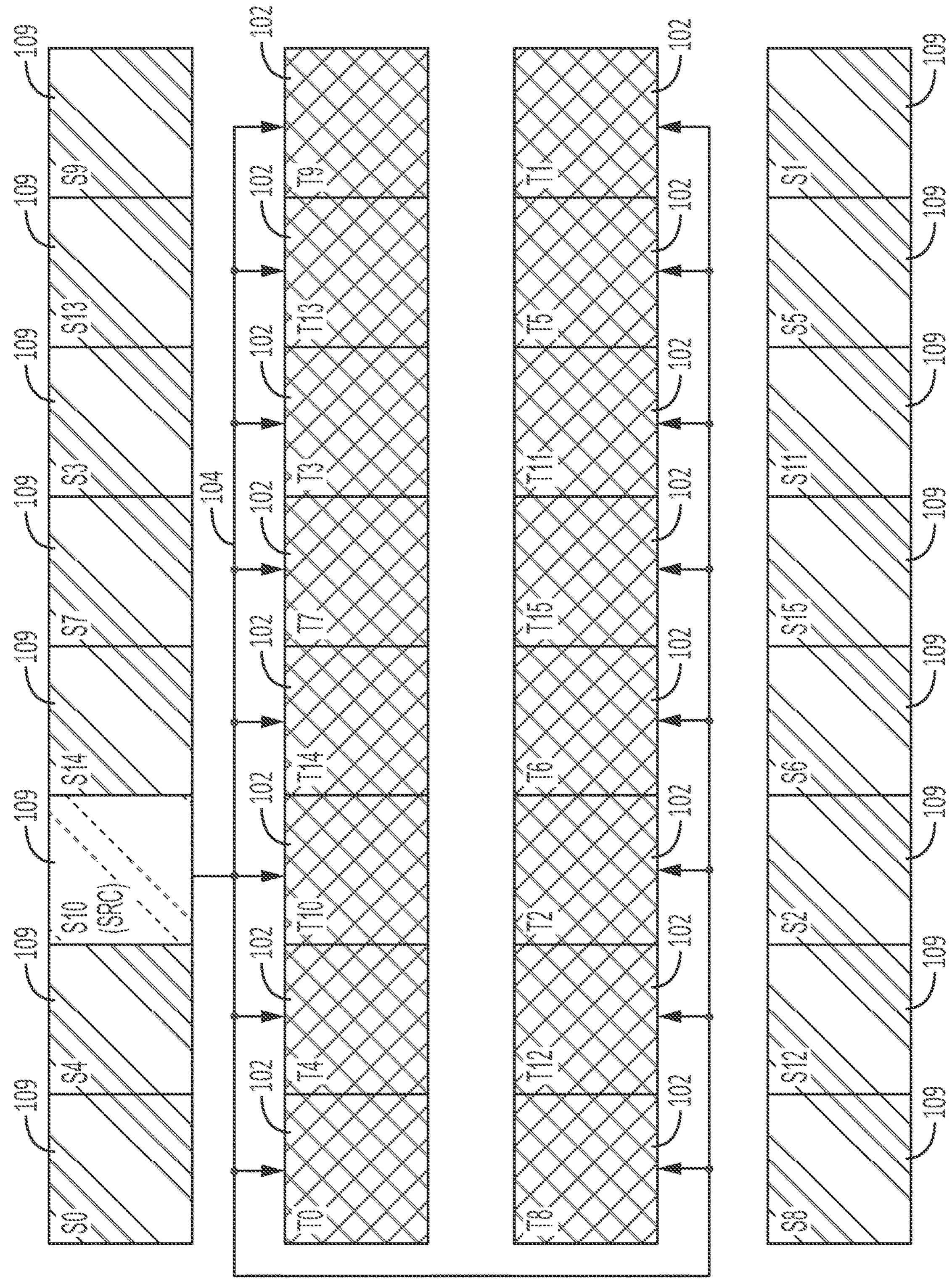
Figure 4B:
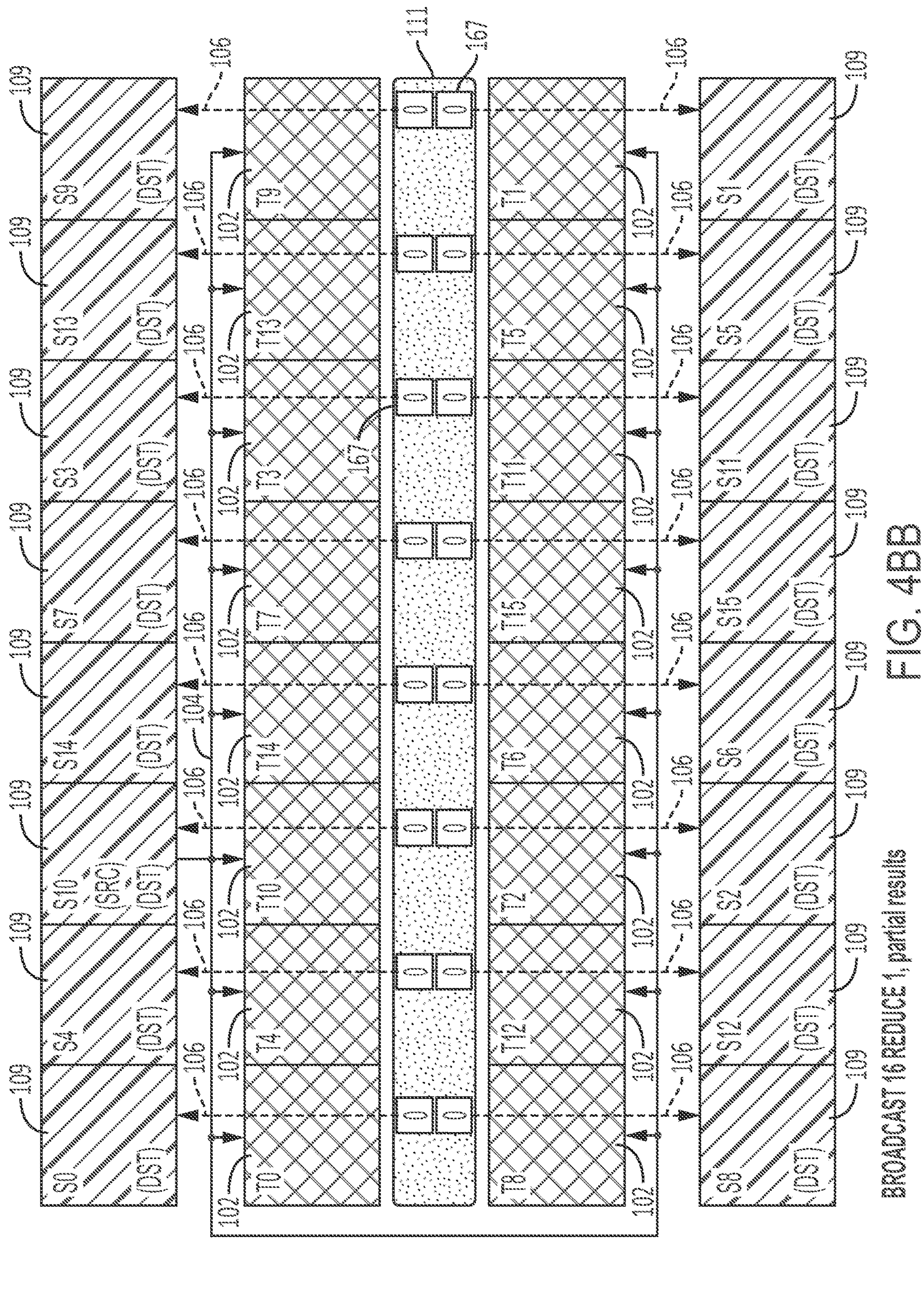
Figure 4B:
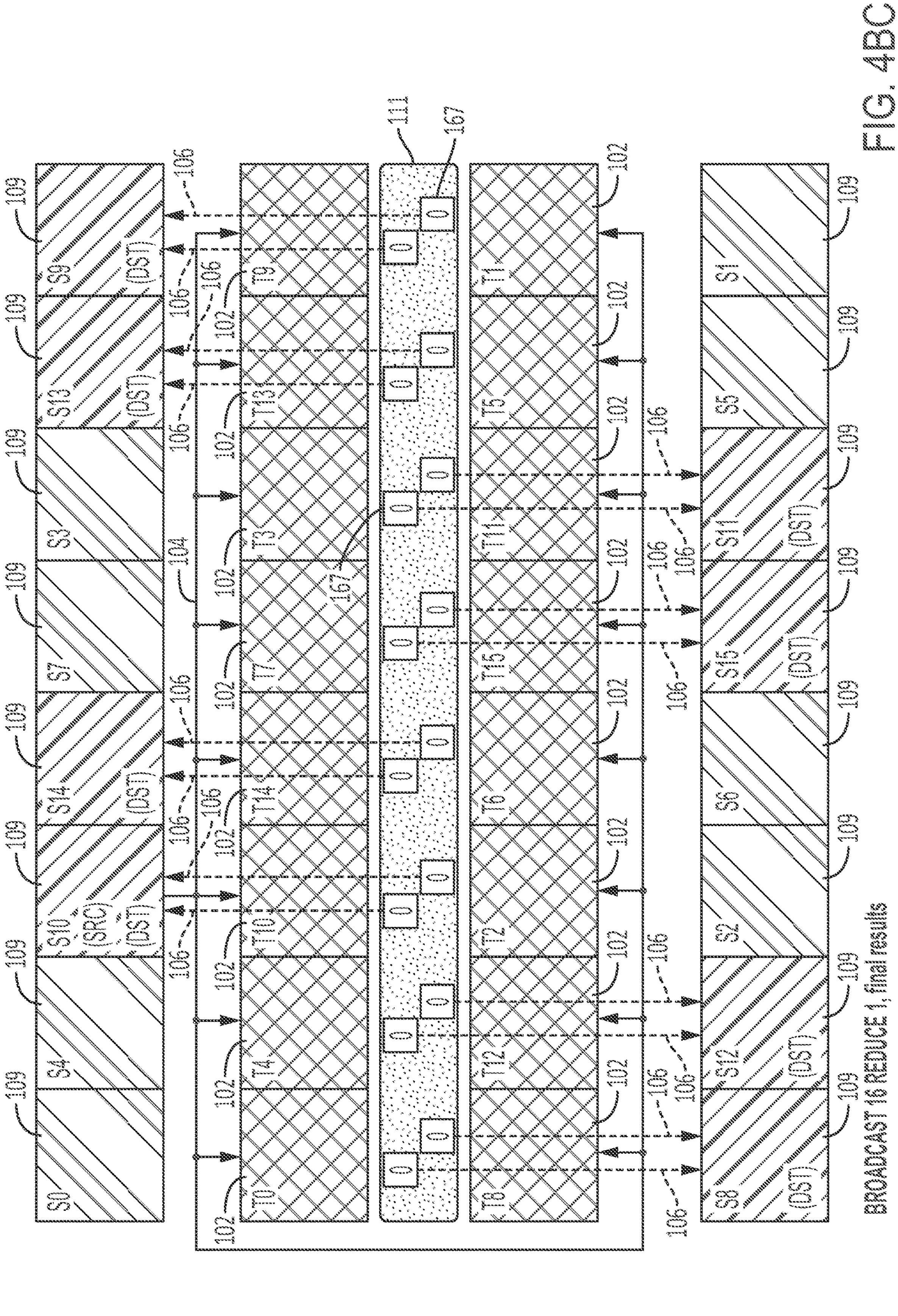
Figure 4B:
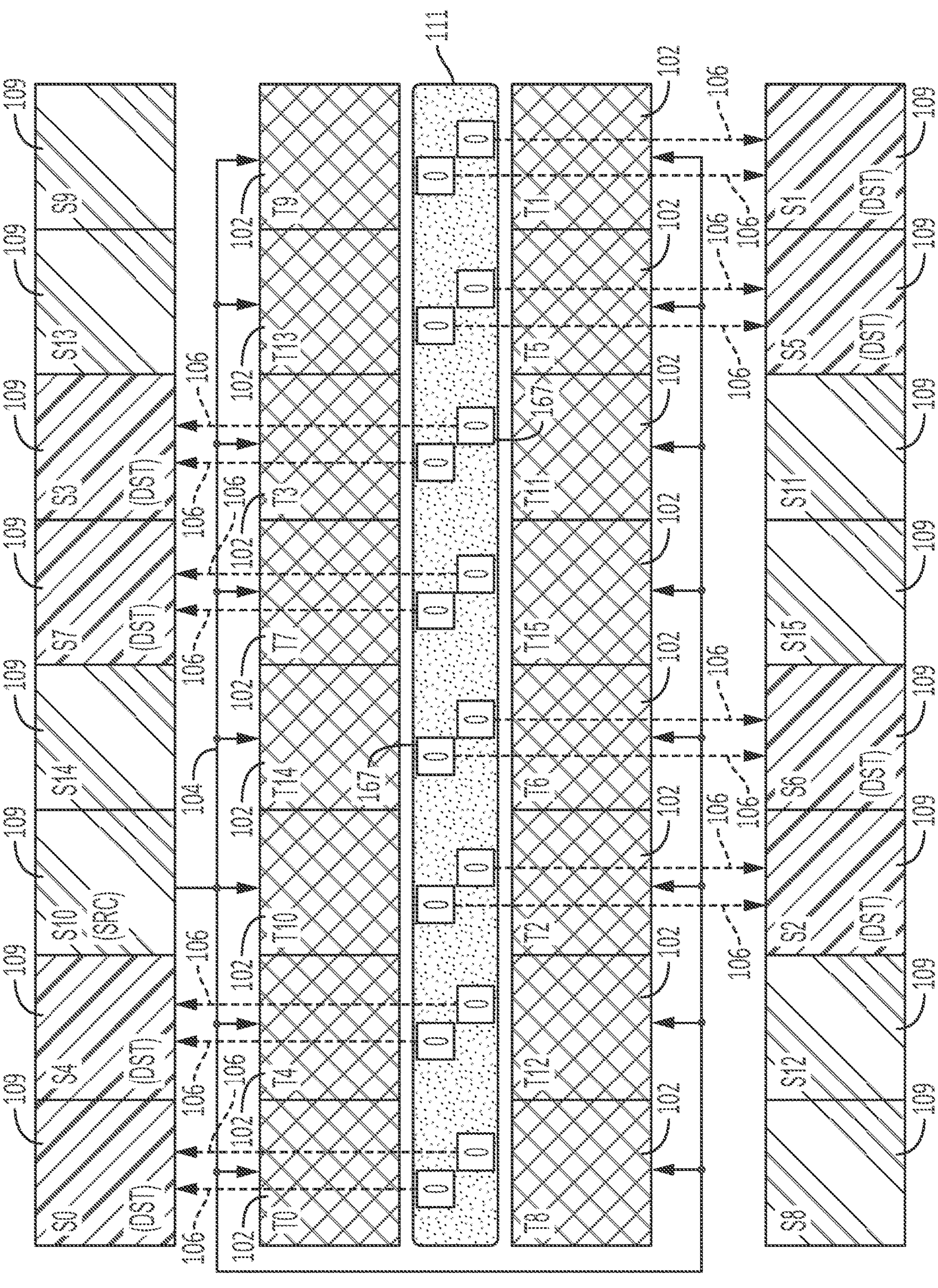
Figure 4C:
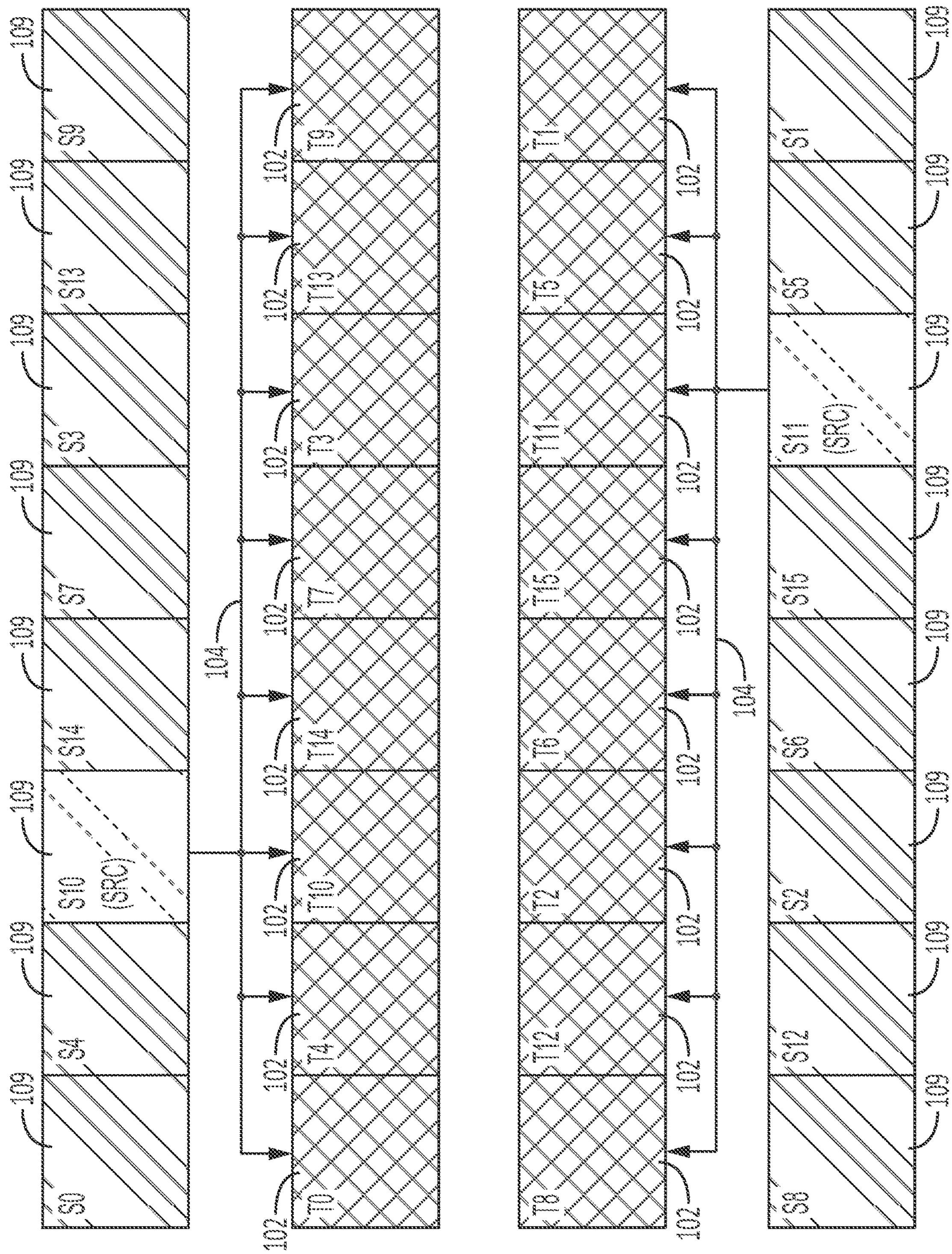
Figure 4C:
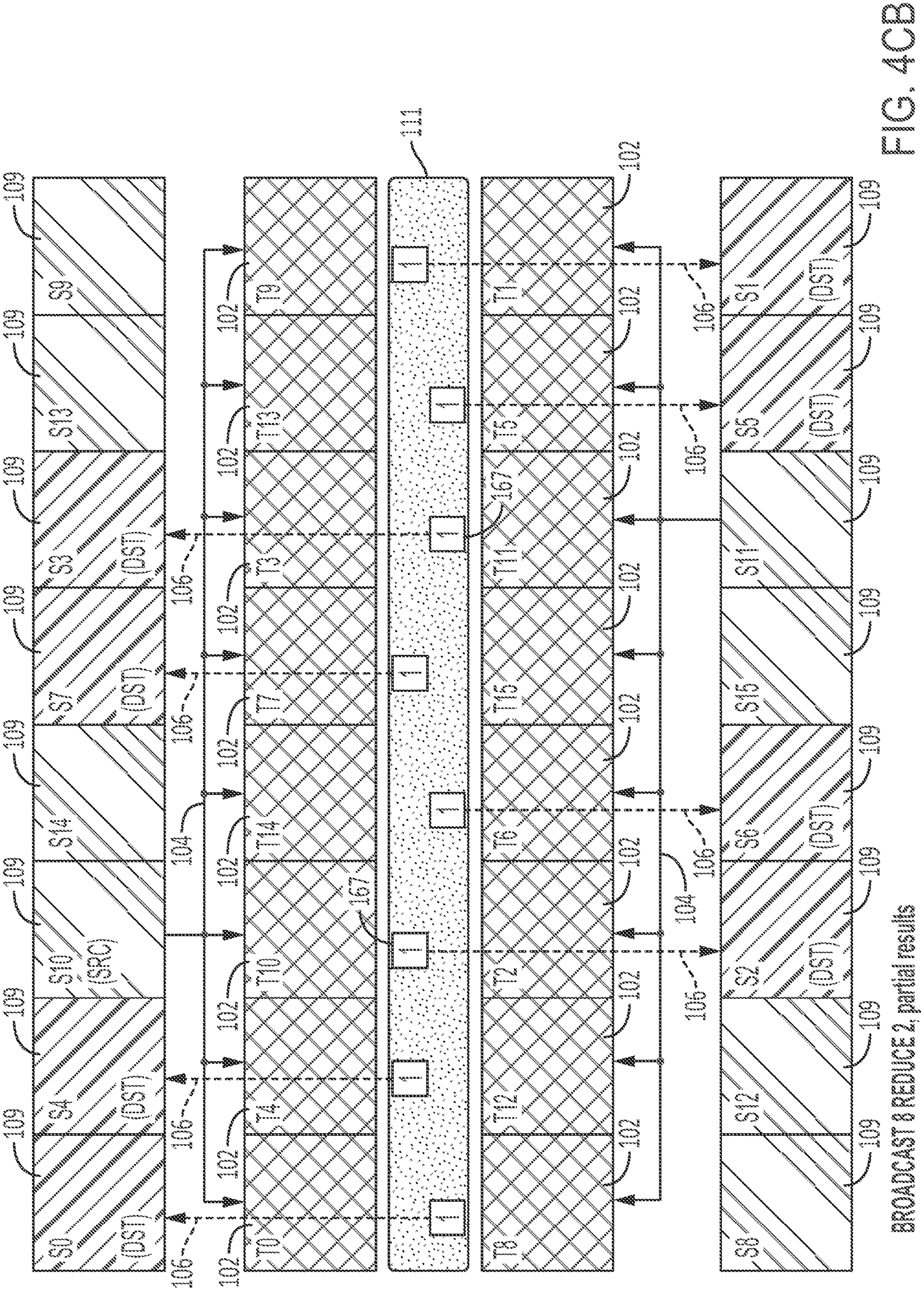
Figure 4C:
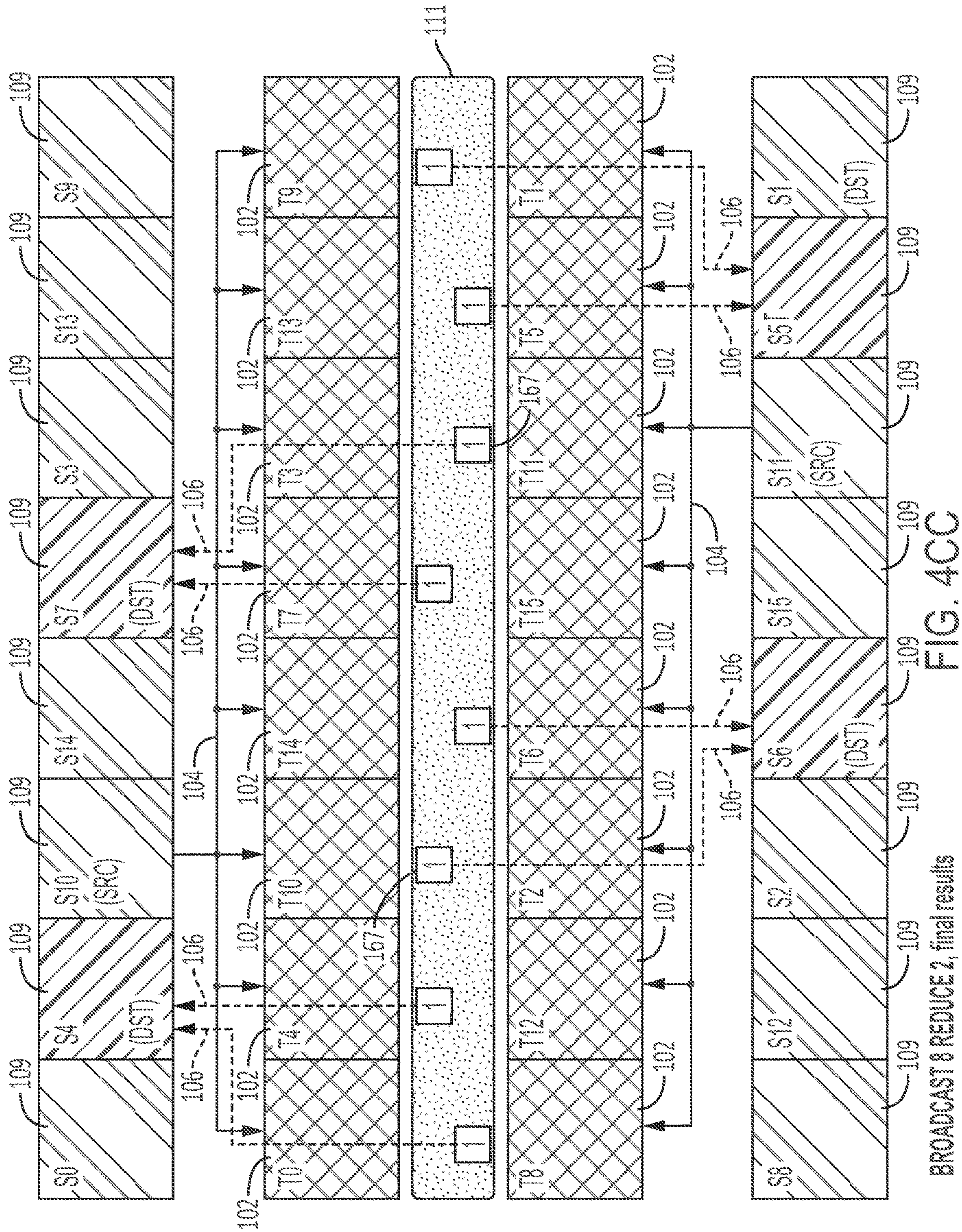
Figure 4D:
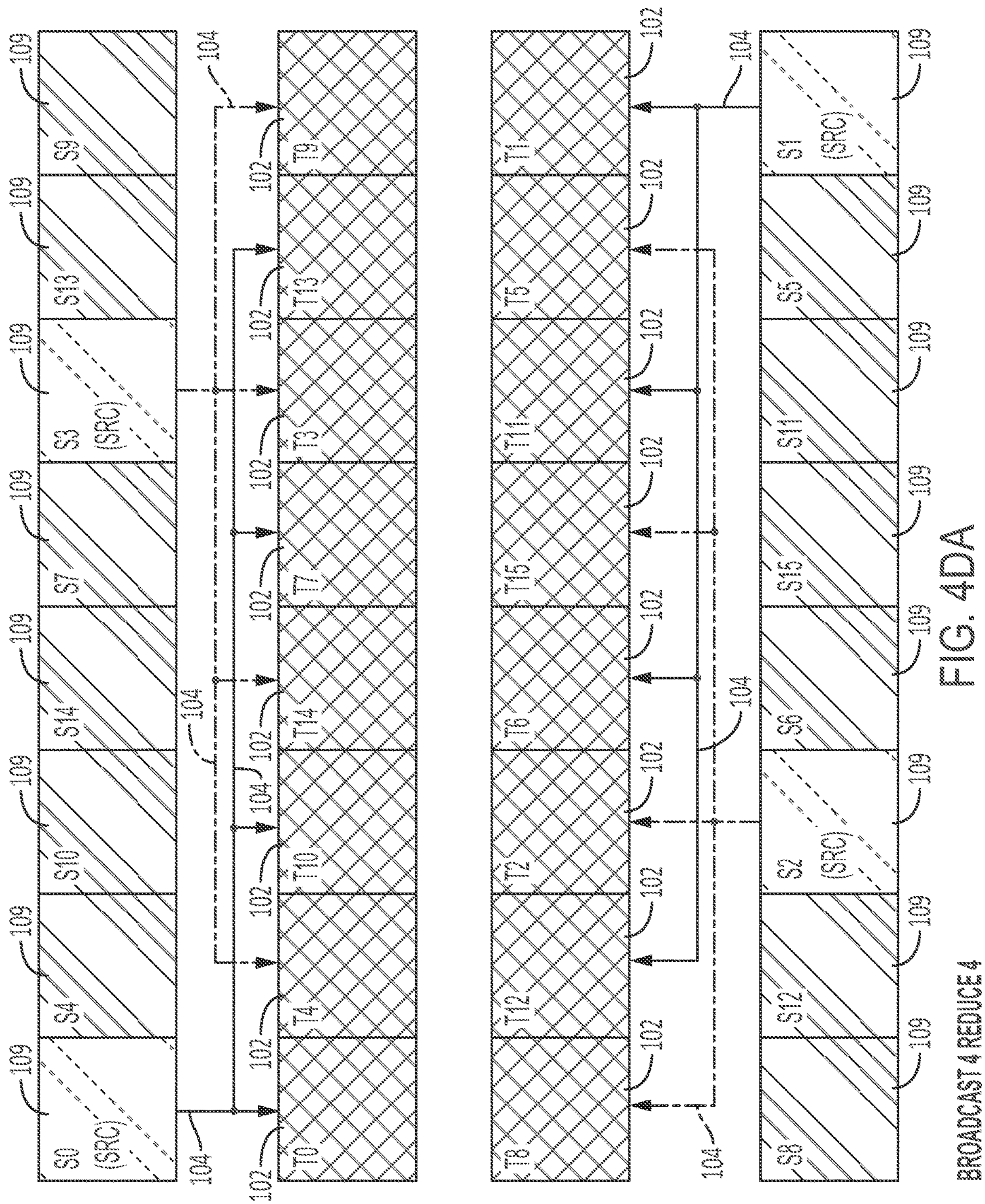
Figure 4D:
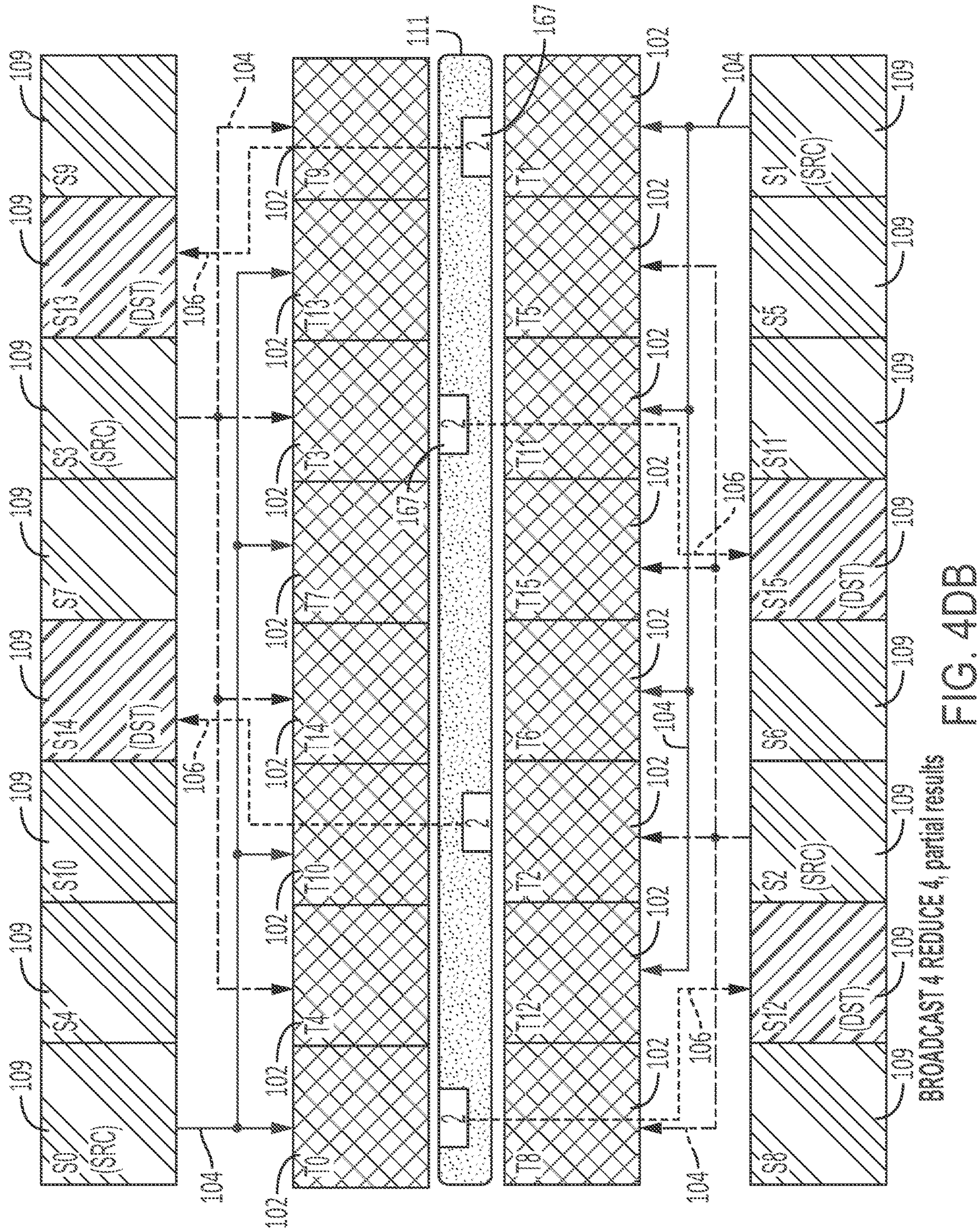
Figure 4D:
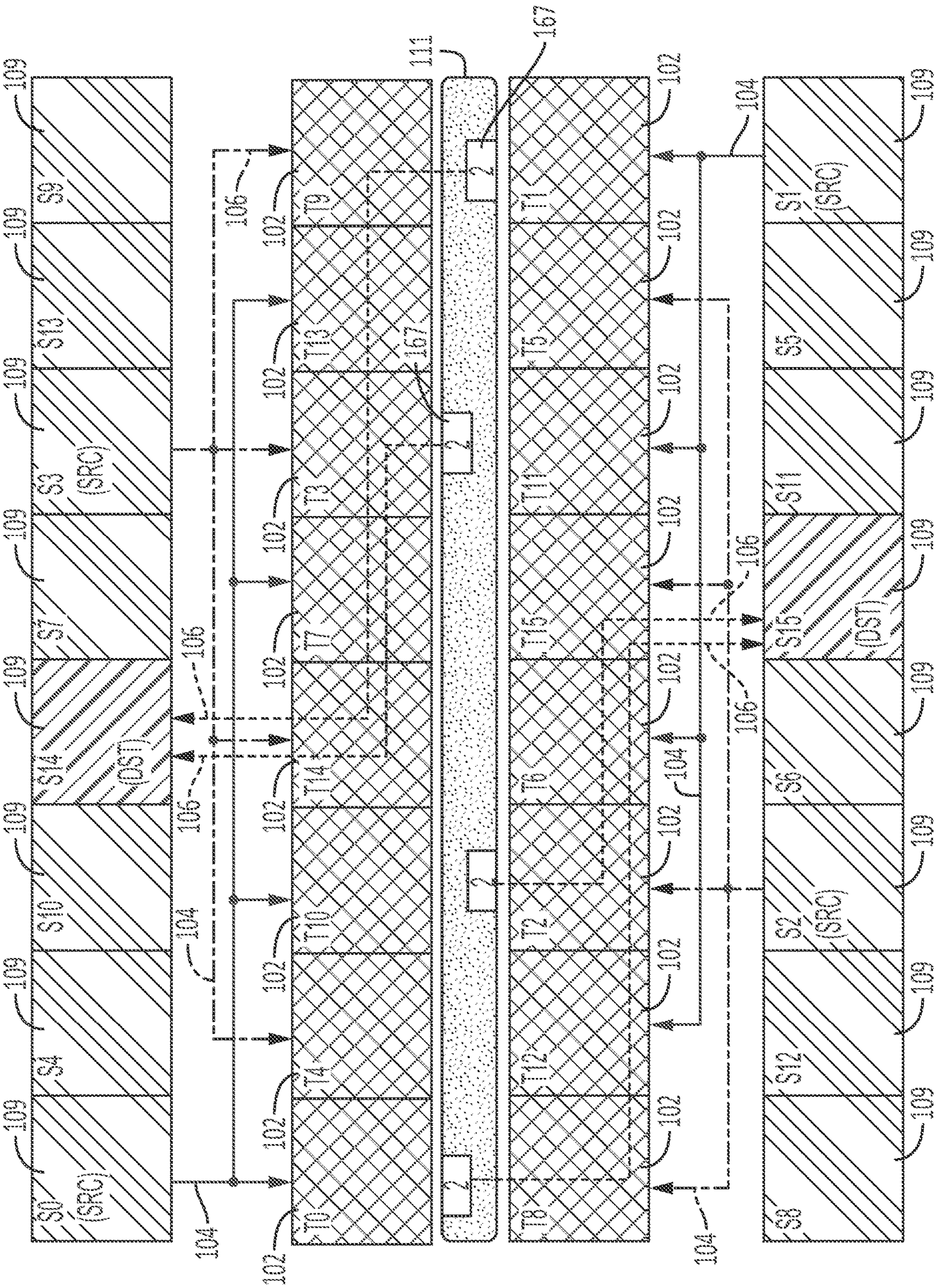
Figure 4E:
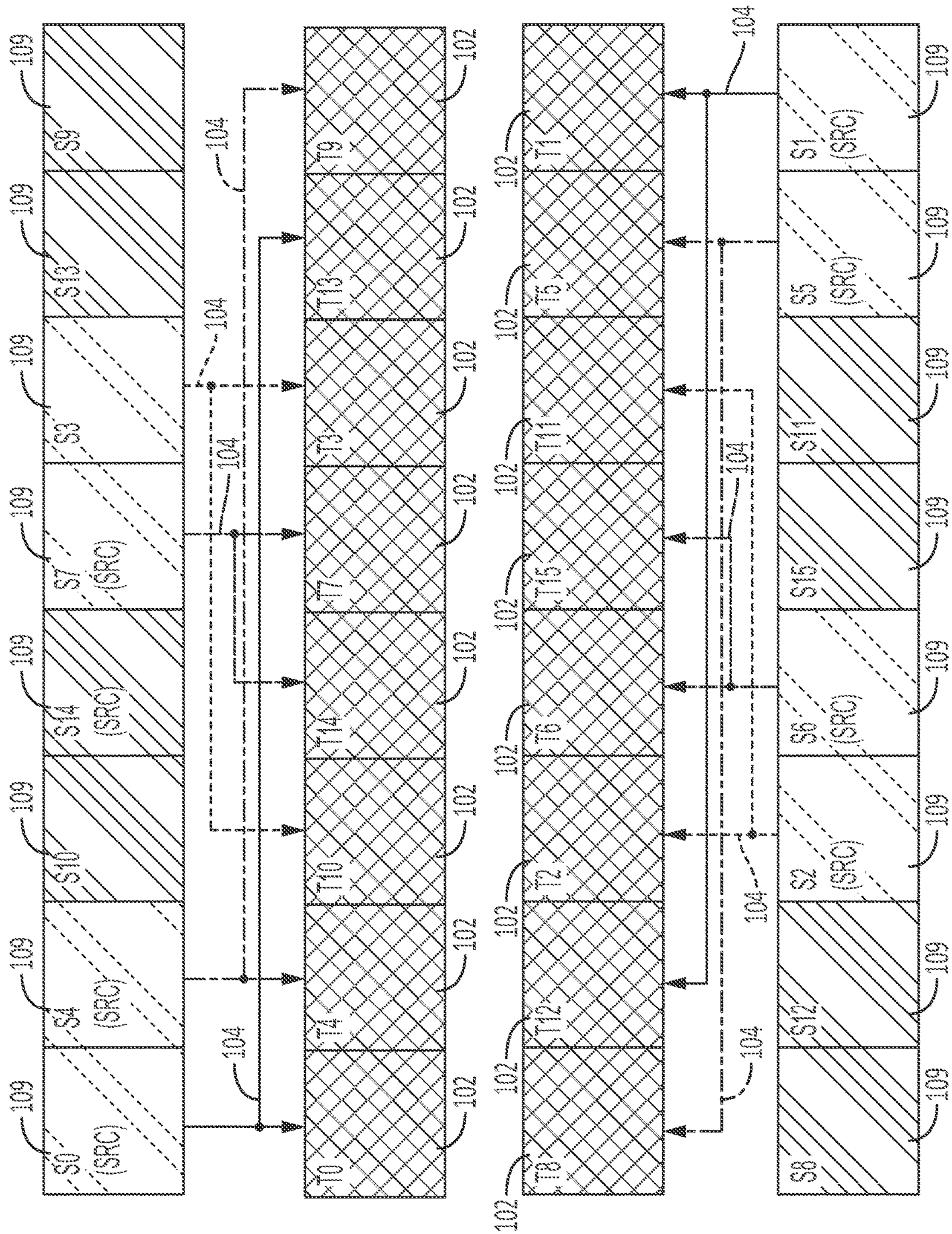
Figure 4E:
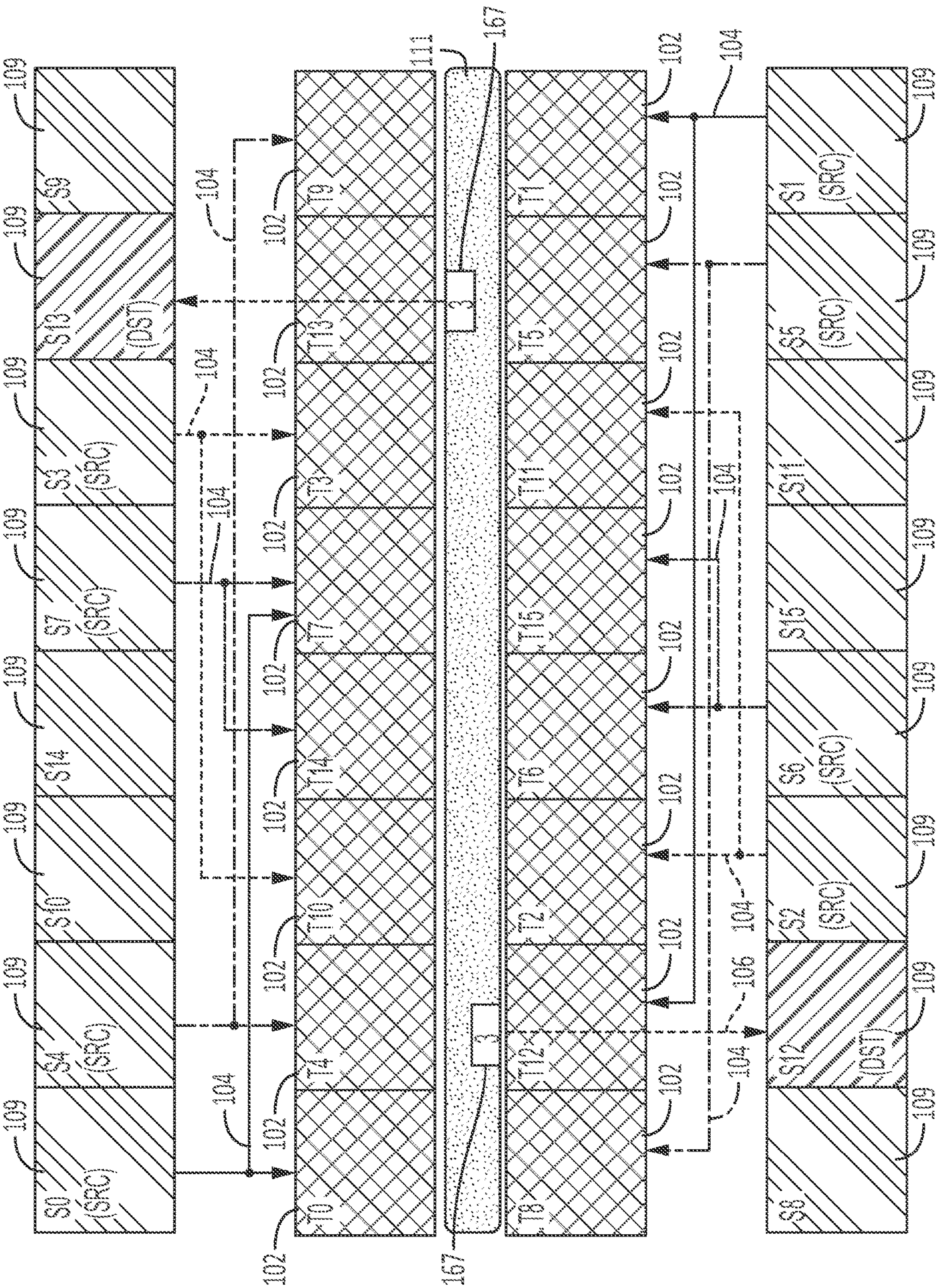
Figure 4E:
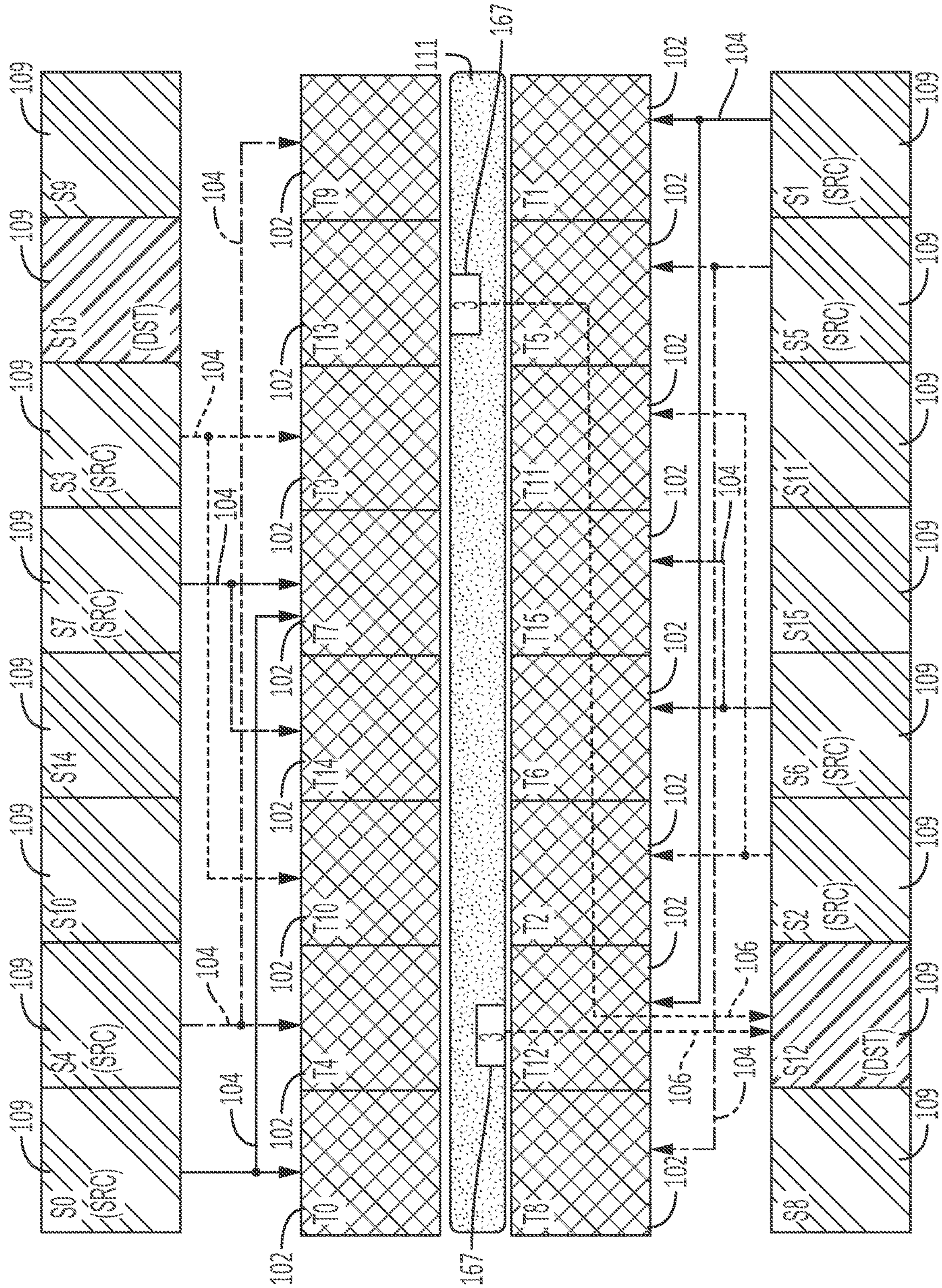
Figure 4F:
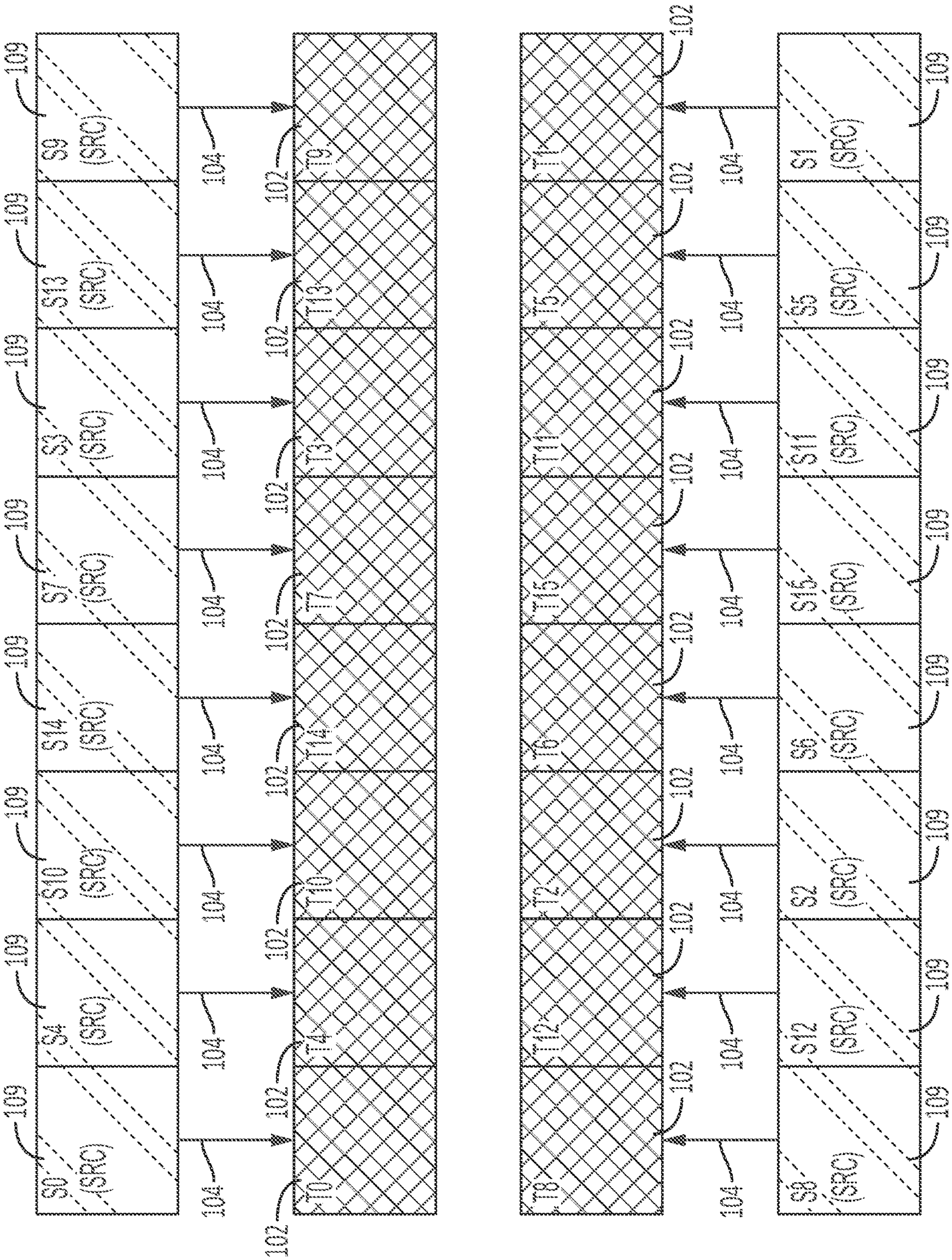
Figure 4F:
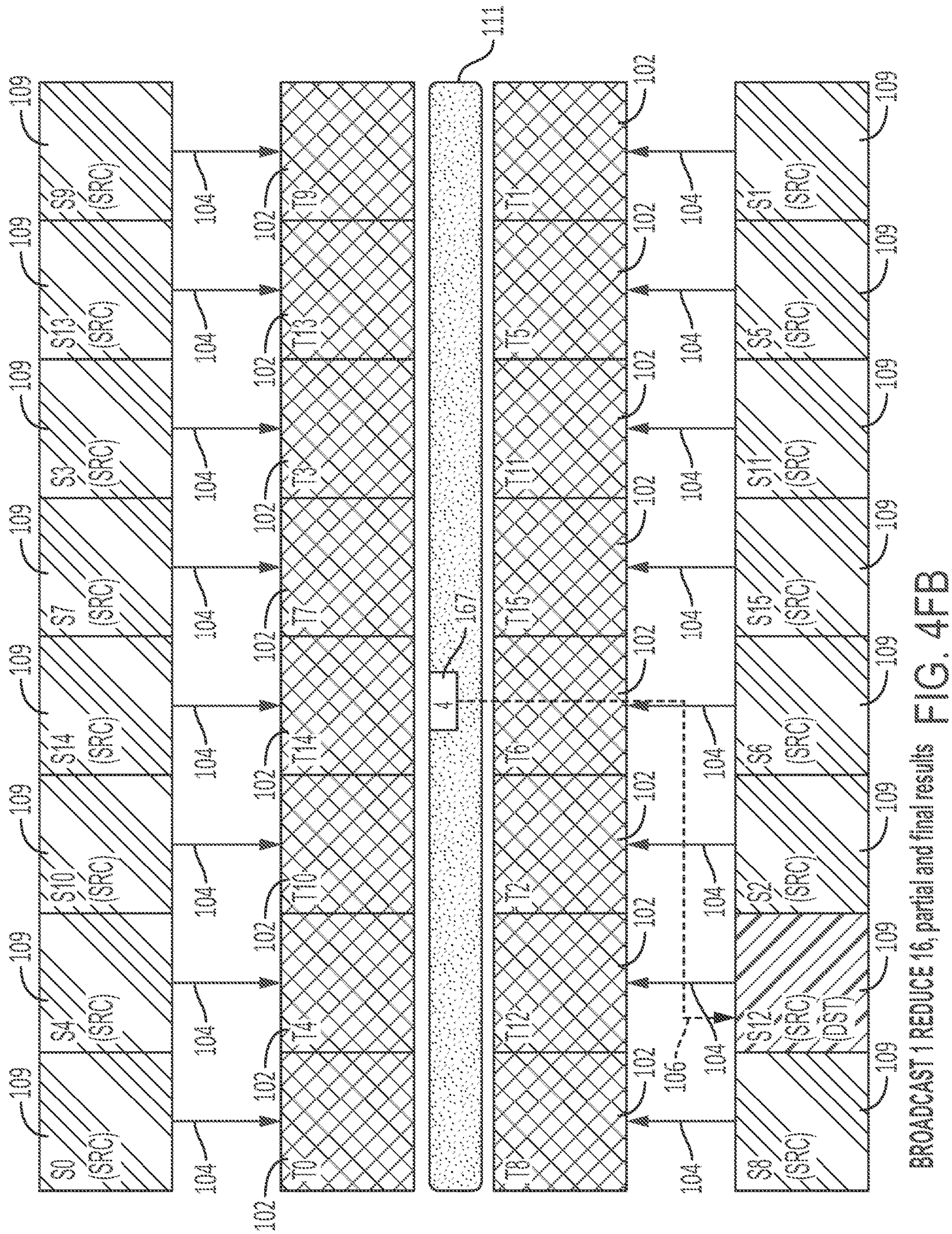
Figure 4G:
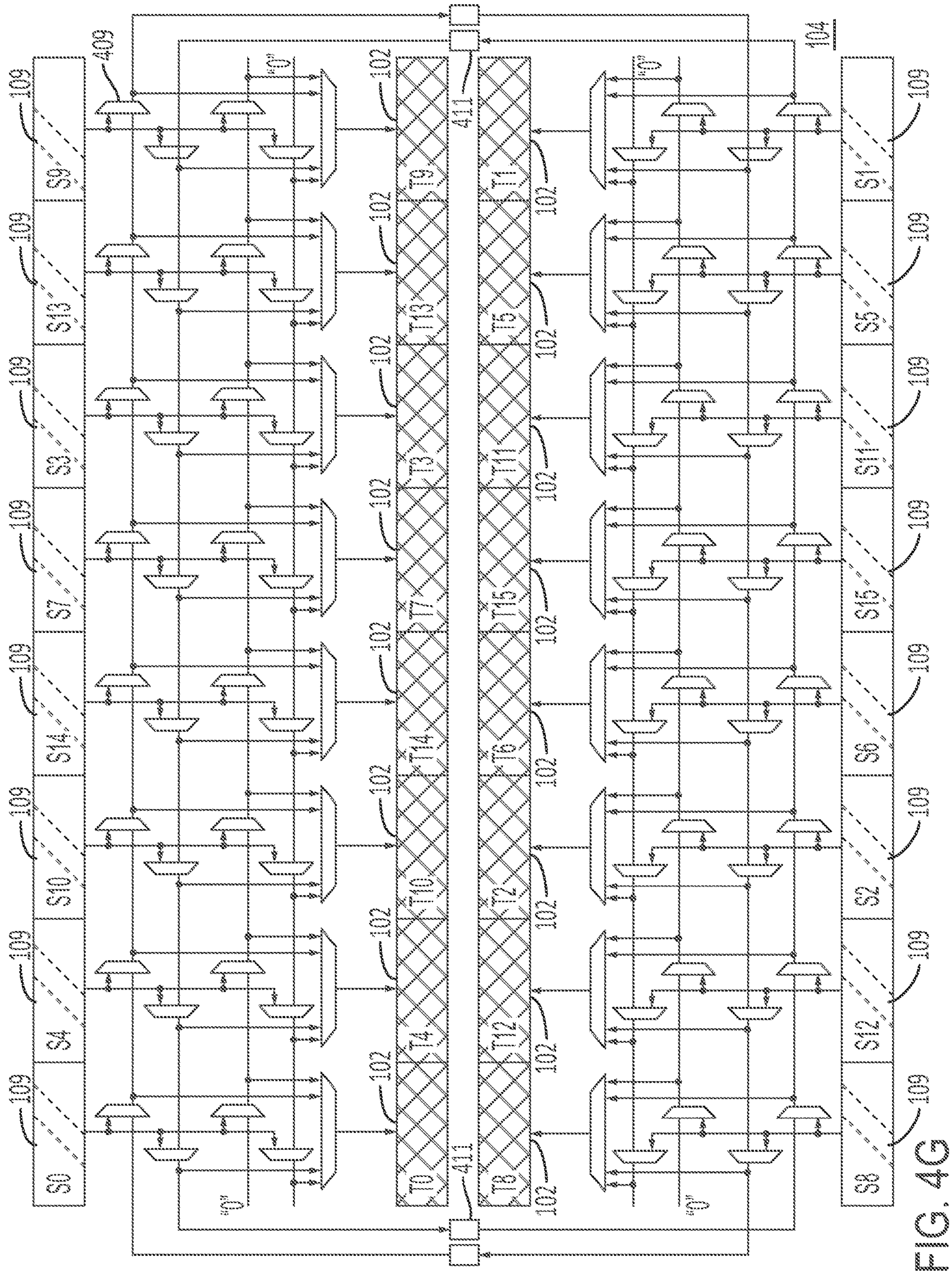
Figure 4H:
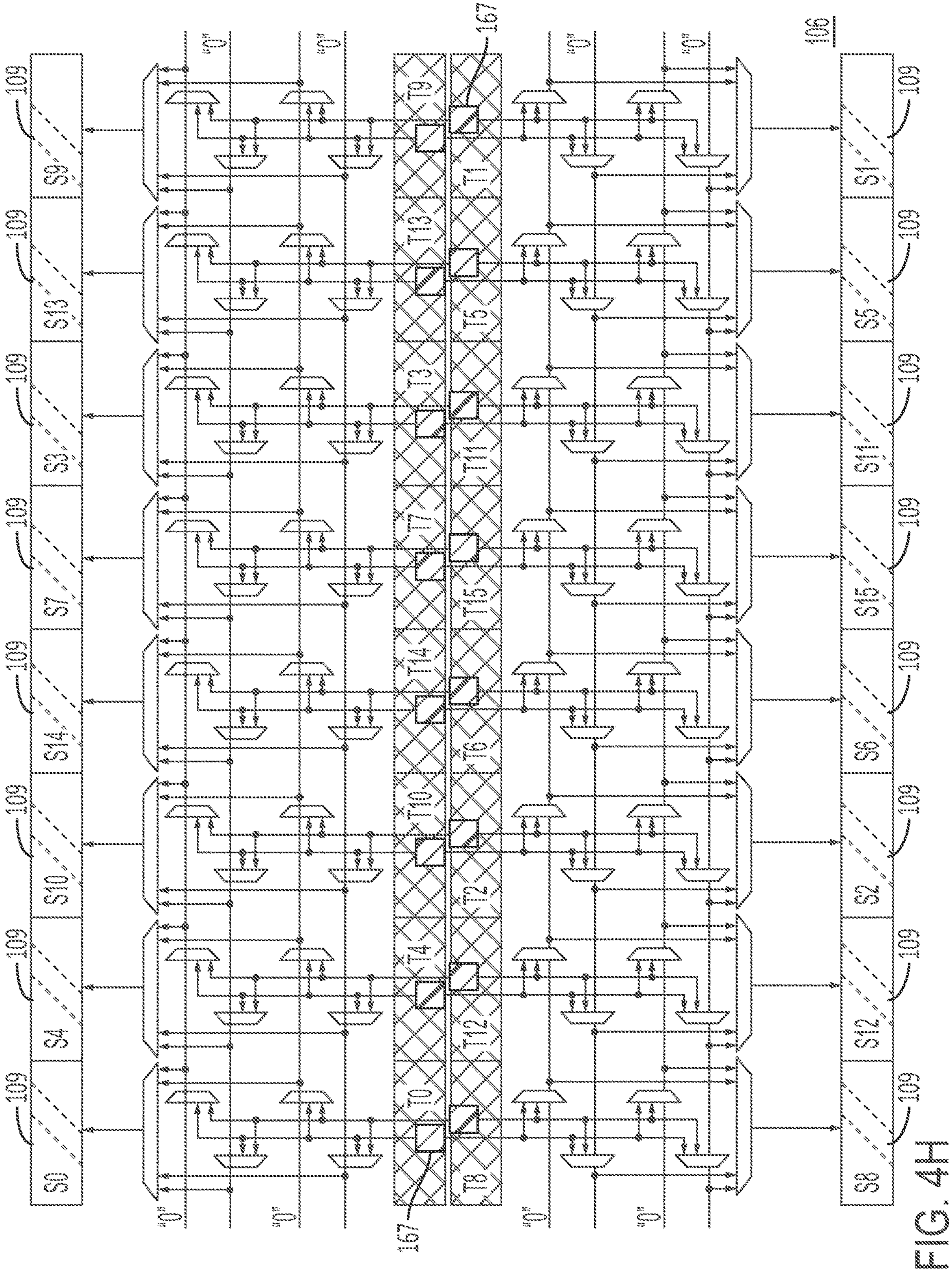
Figure 5A:
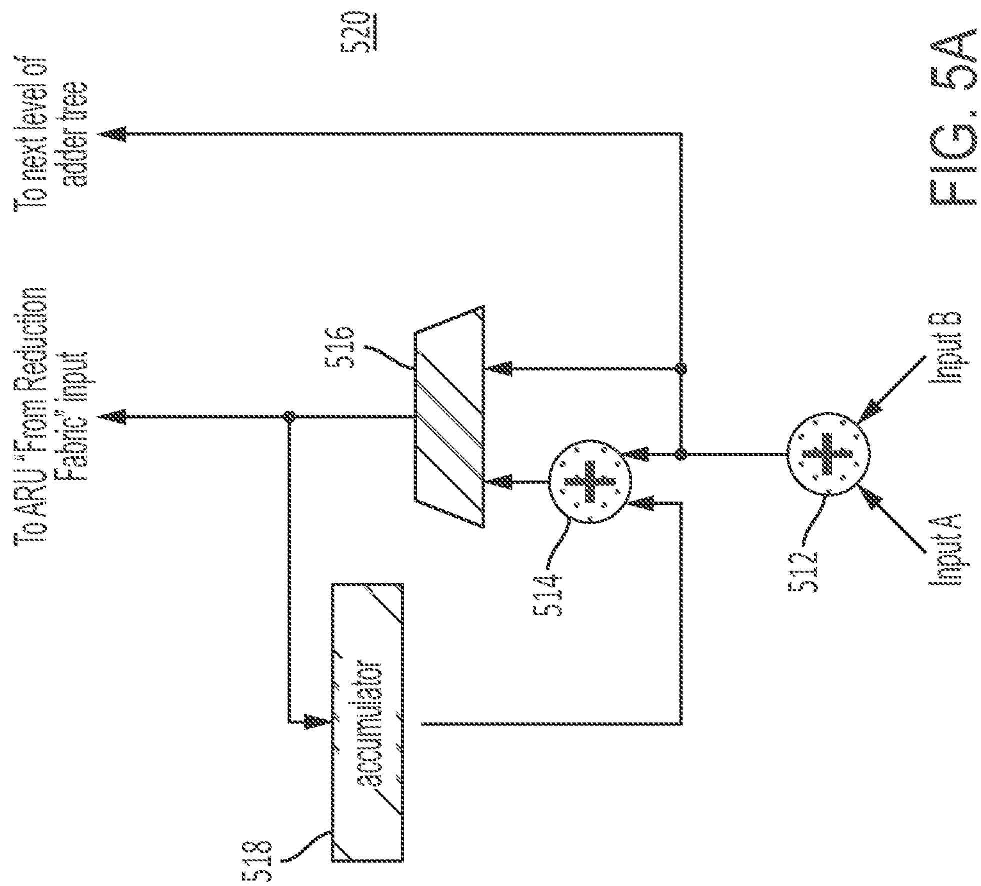
Figure 5B:
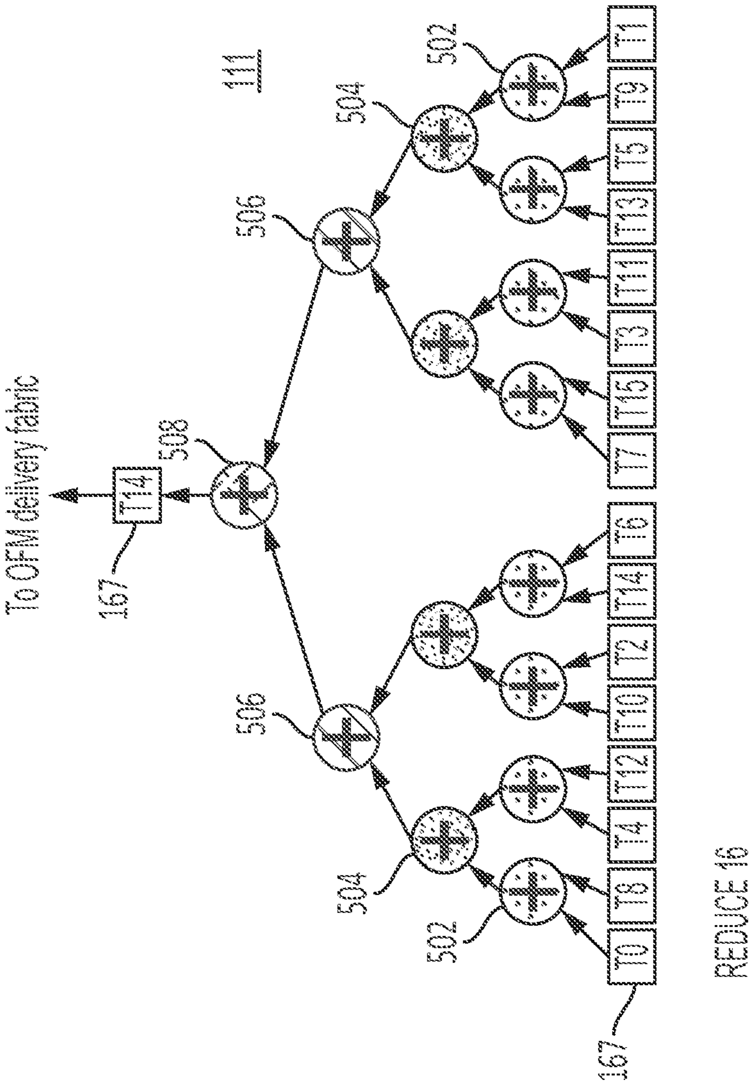
Figure 5C:
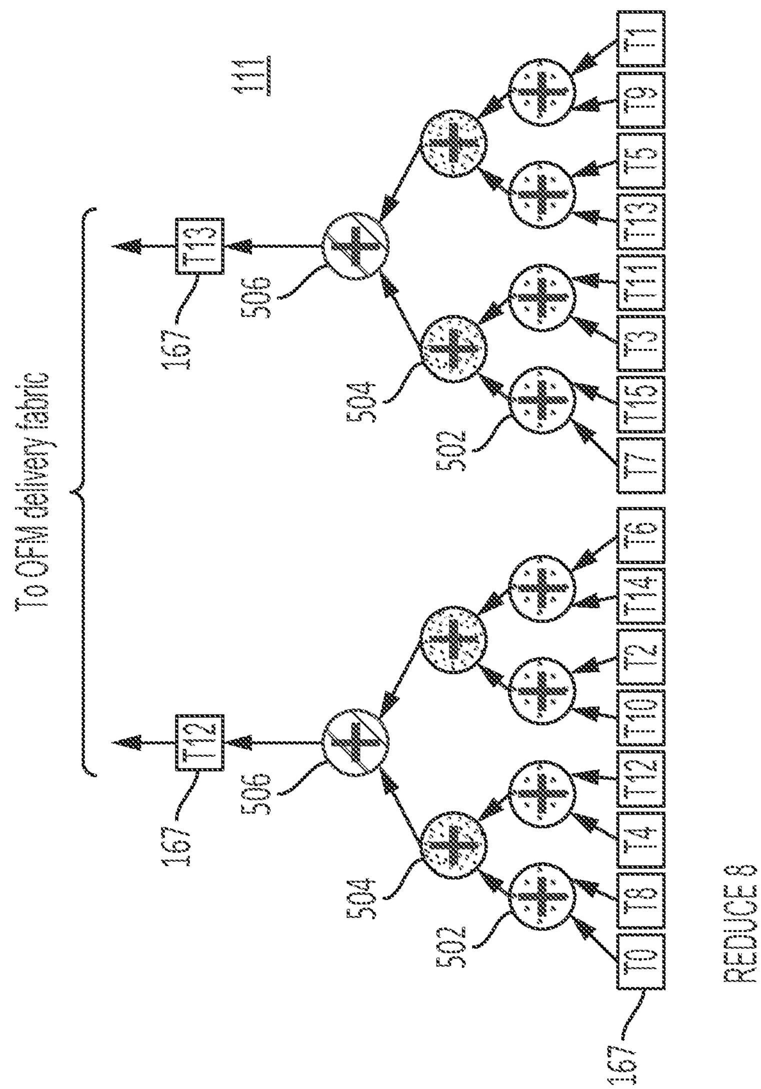
Figure 5D:
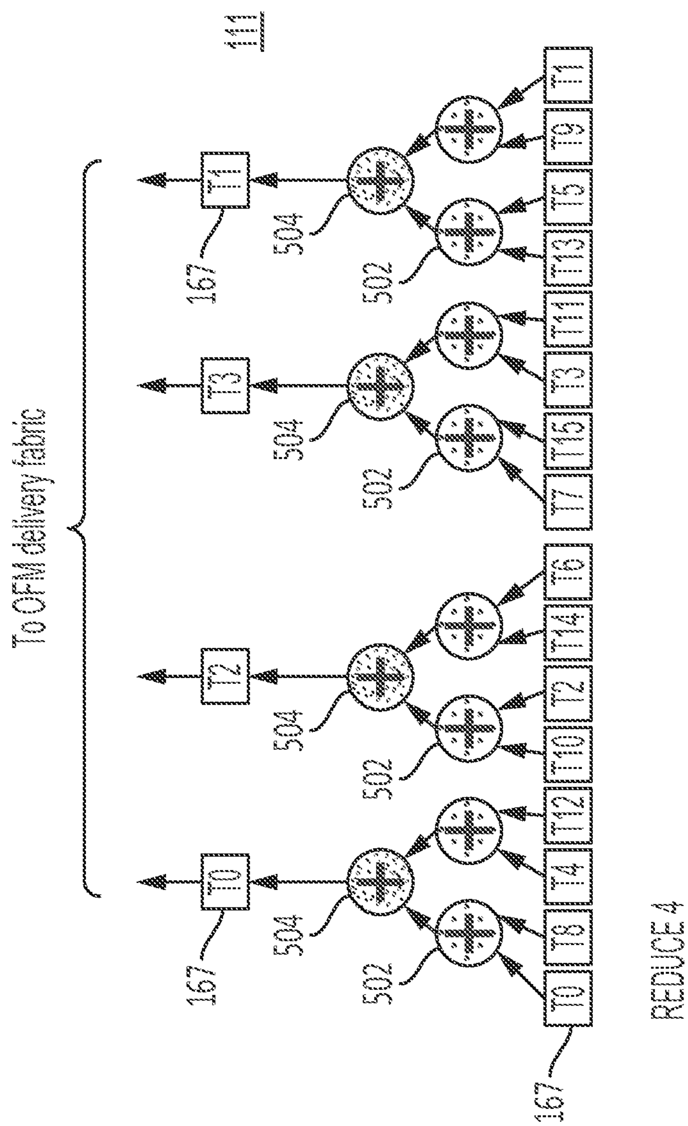
Figure 5E:
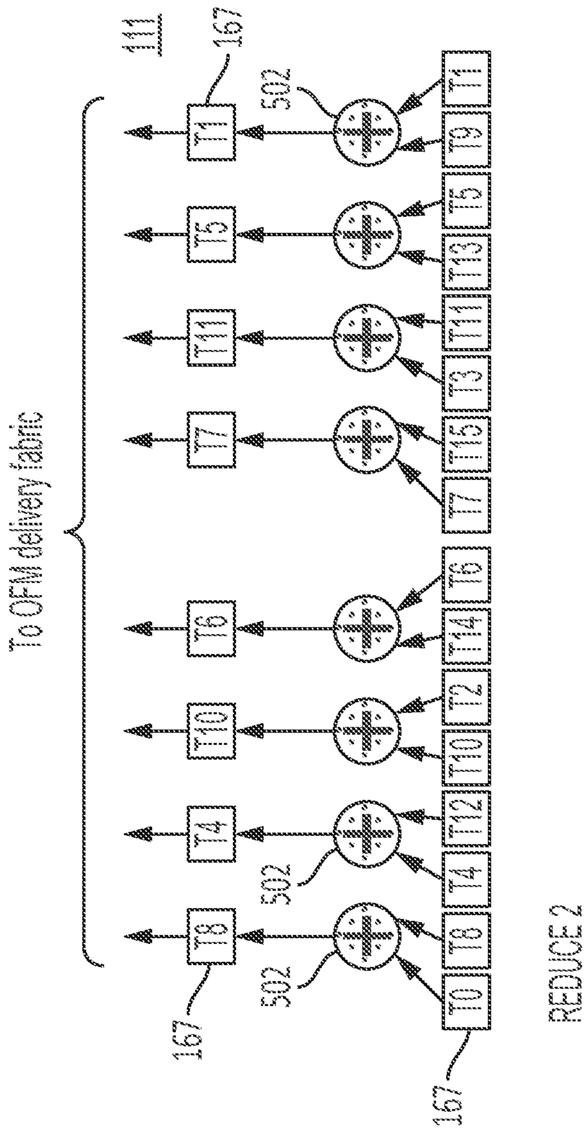
Figure 5F:
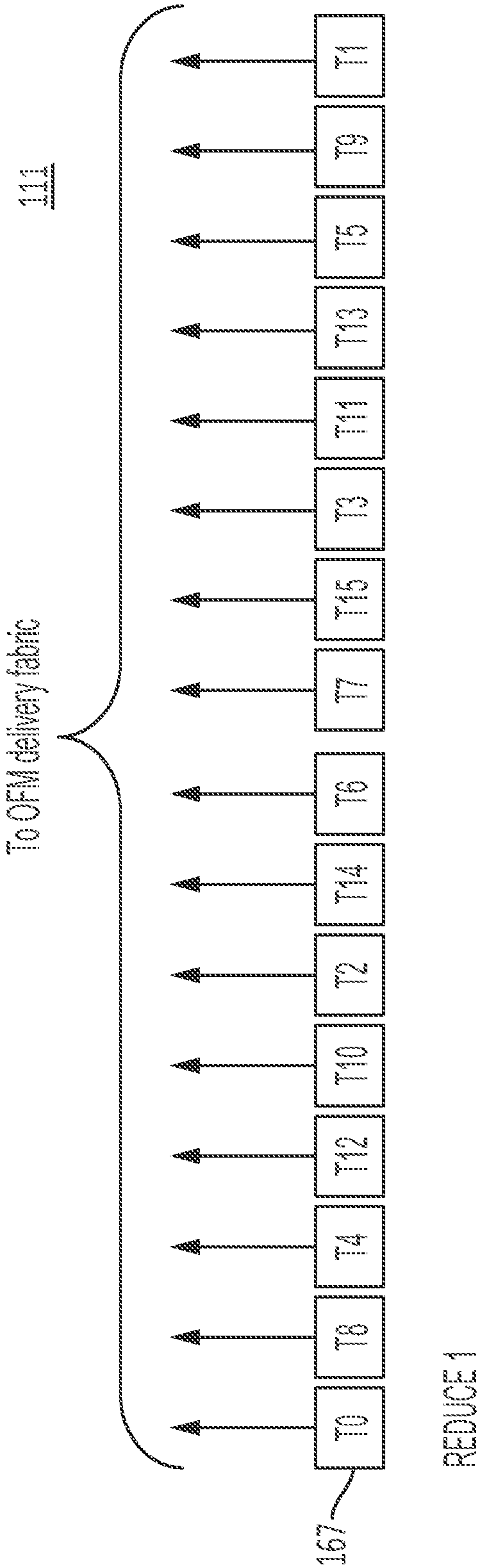
Figure 5G:
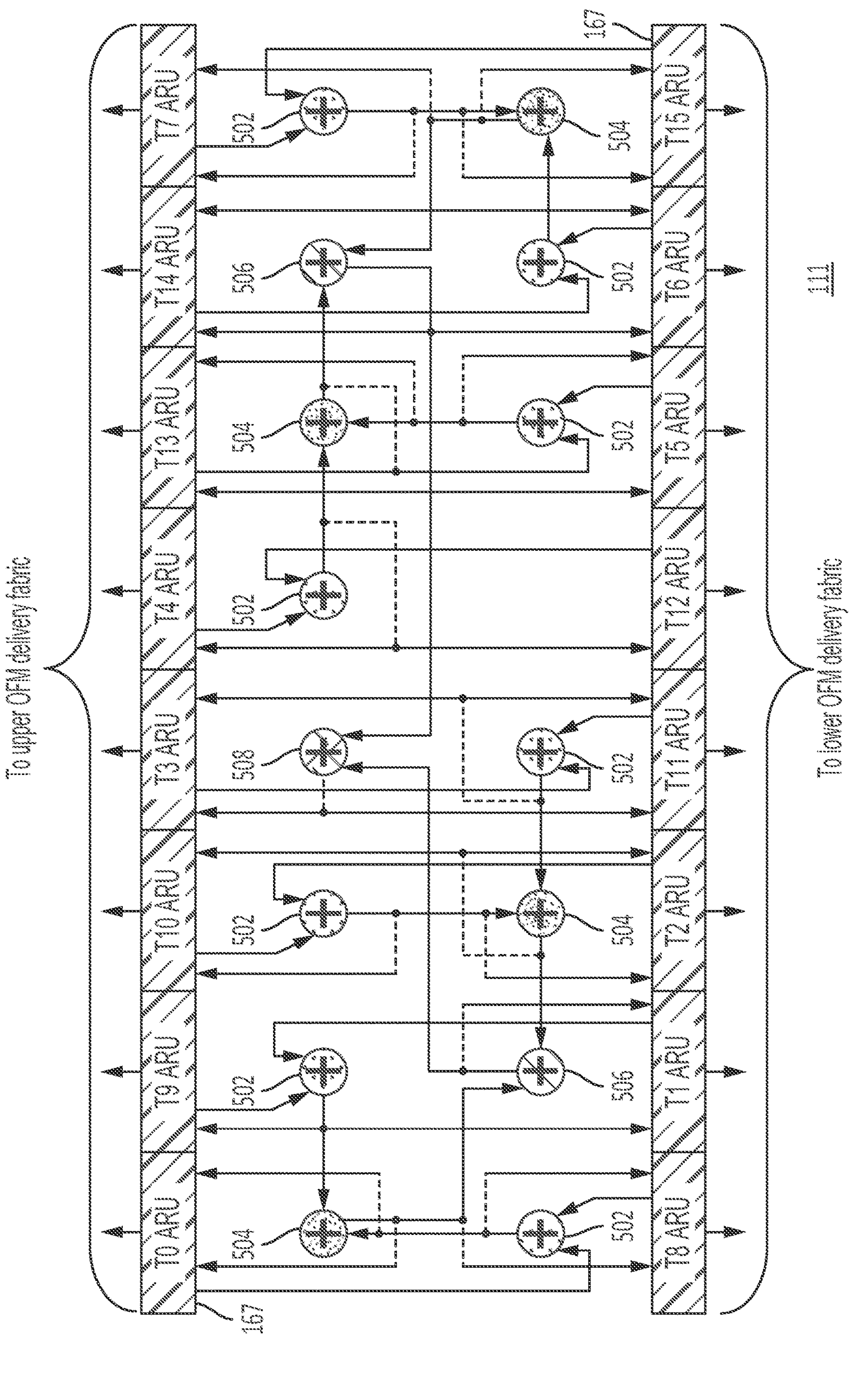
Figure 7B:
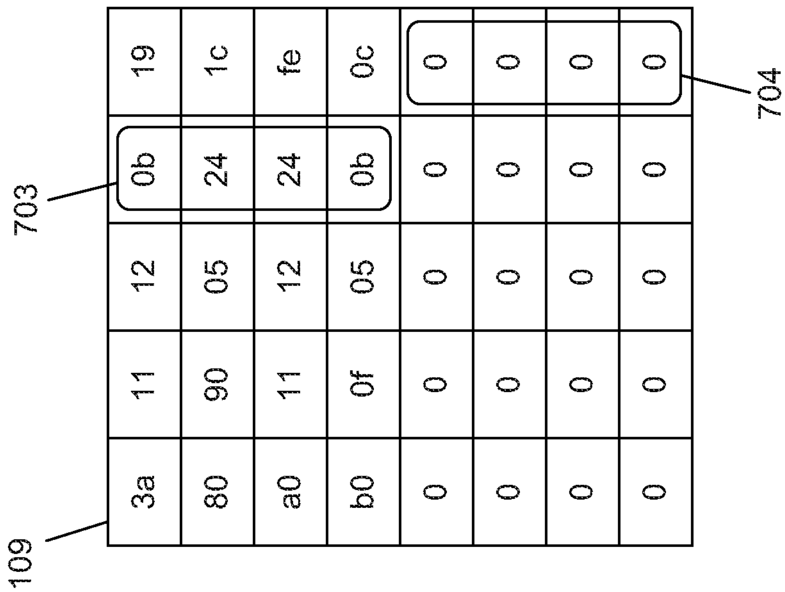
Figure 7A:
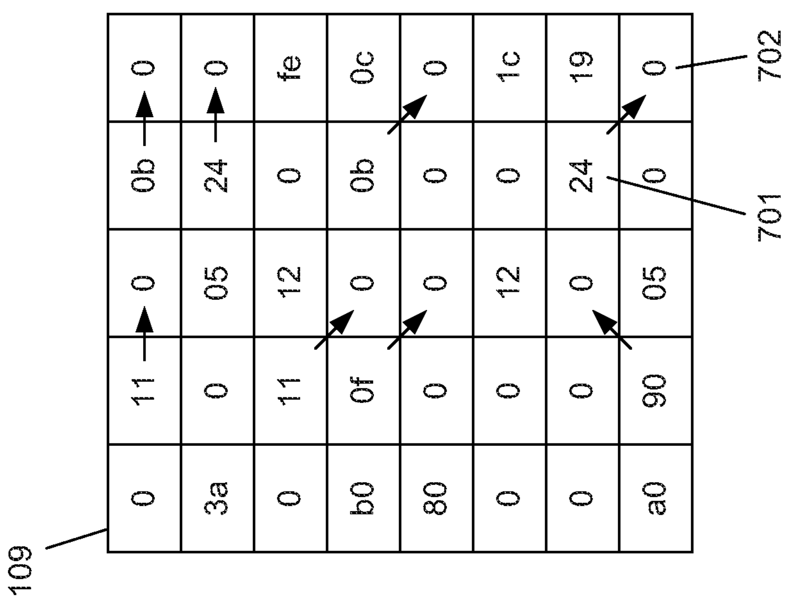
Figure 7C:
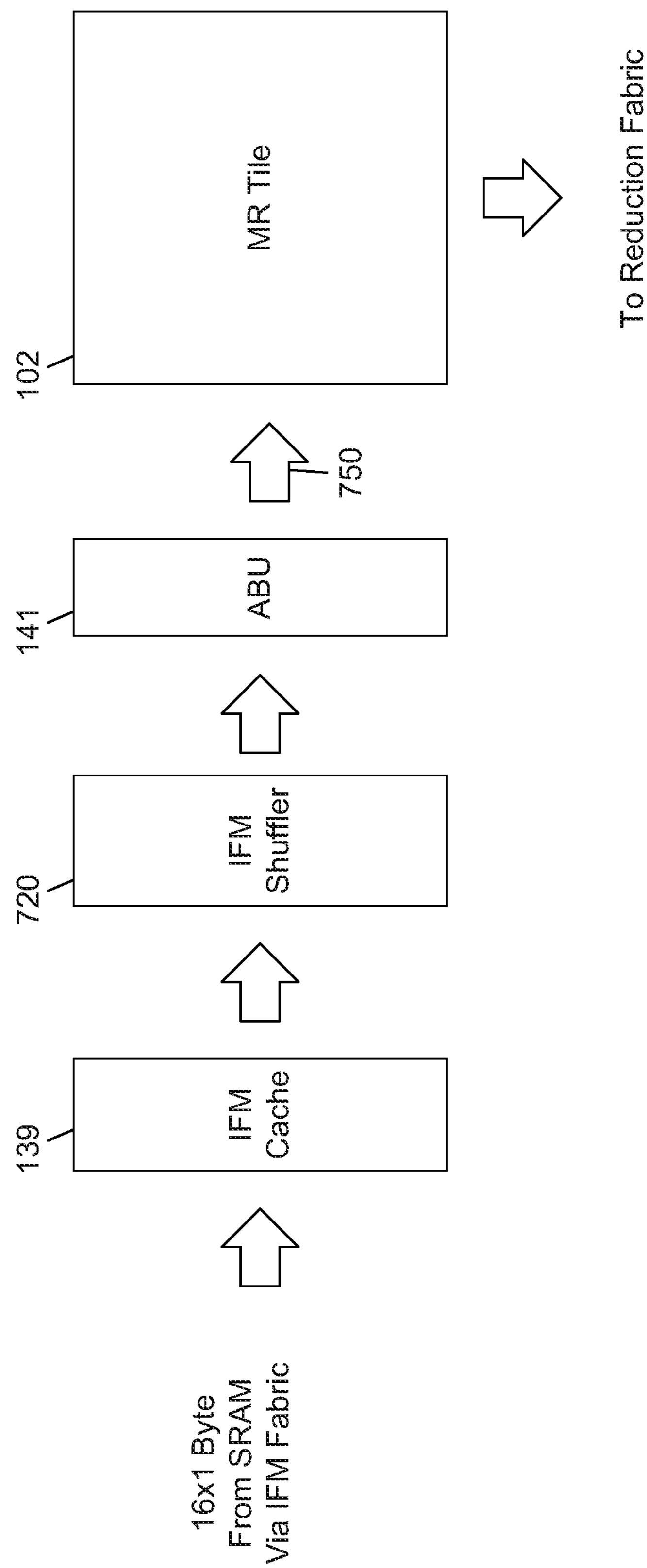
Figure 7D:
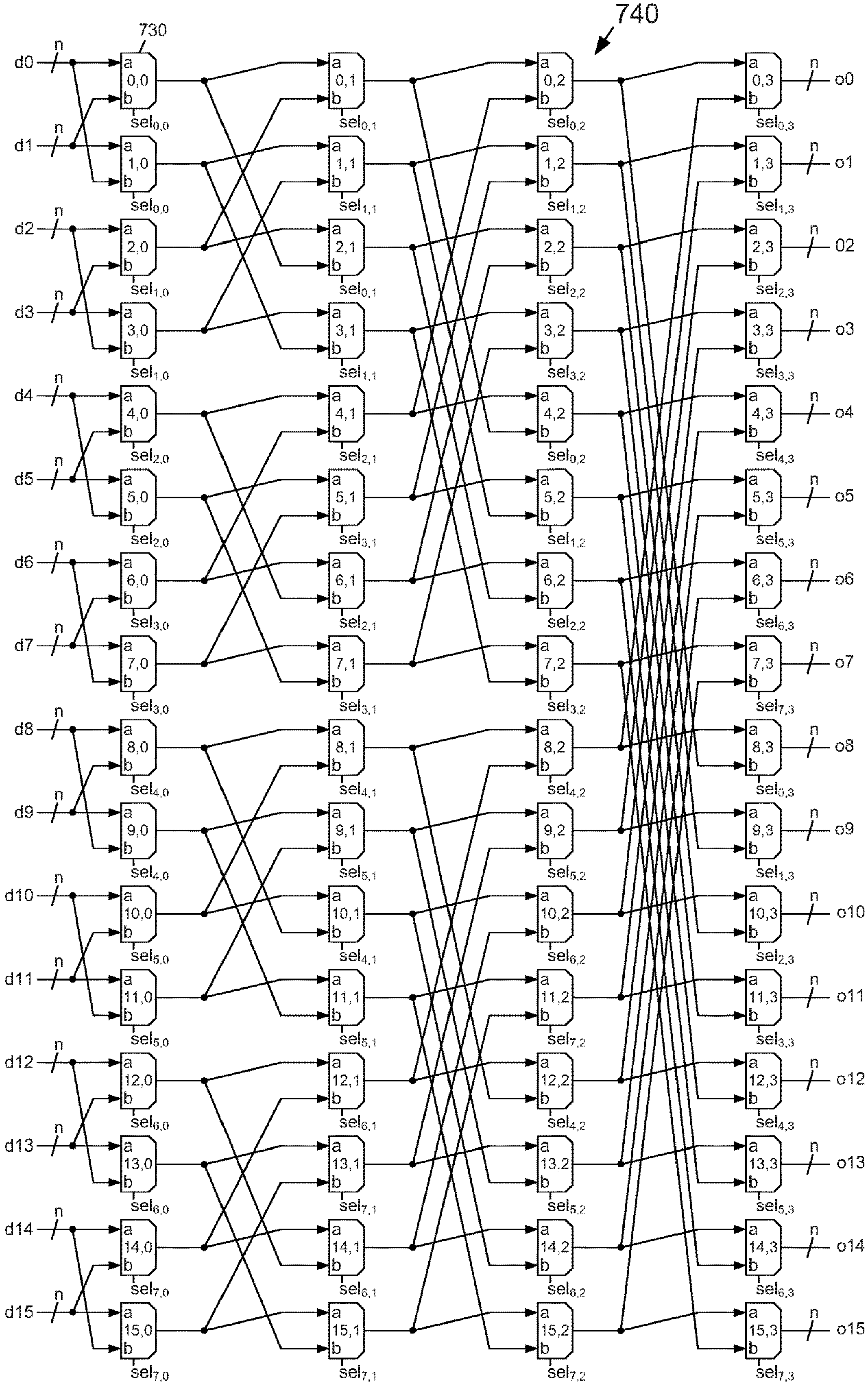
Figure 7E:
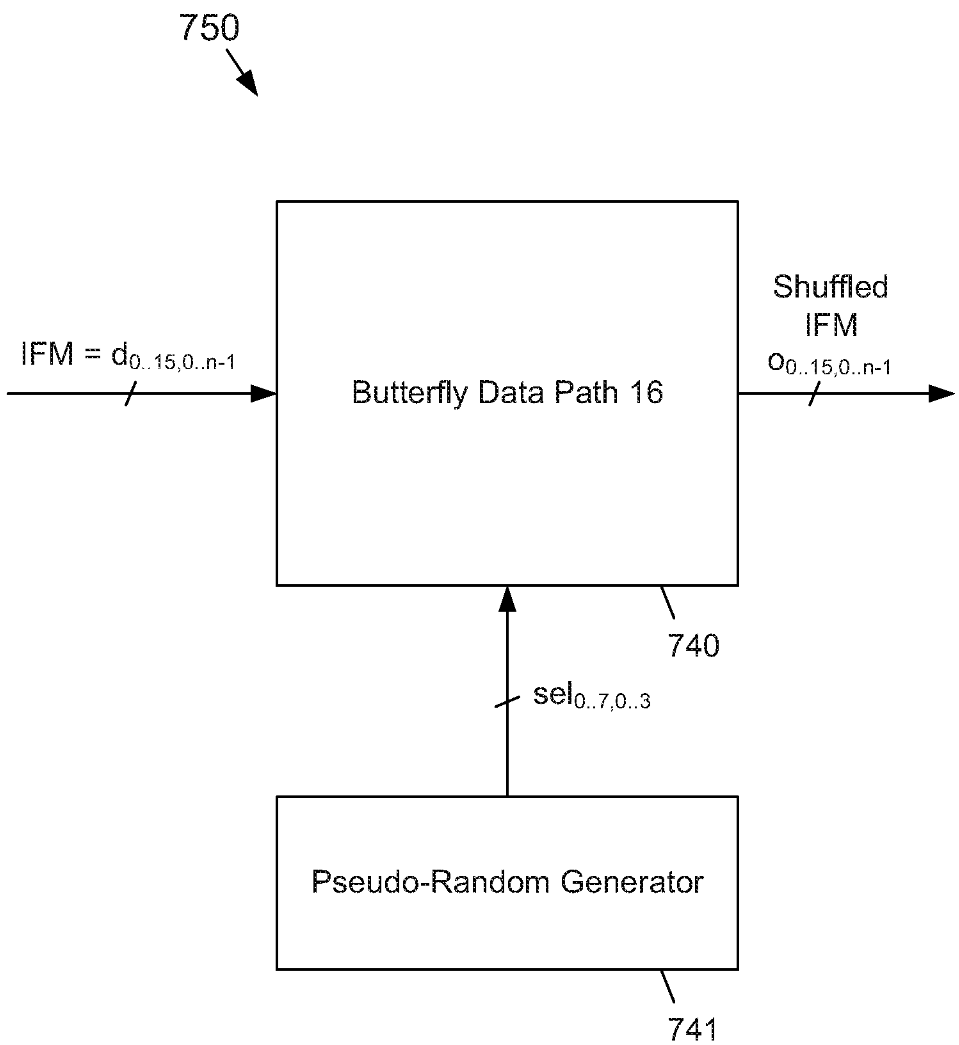
Figure 8A:
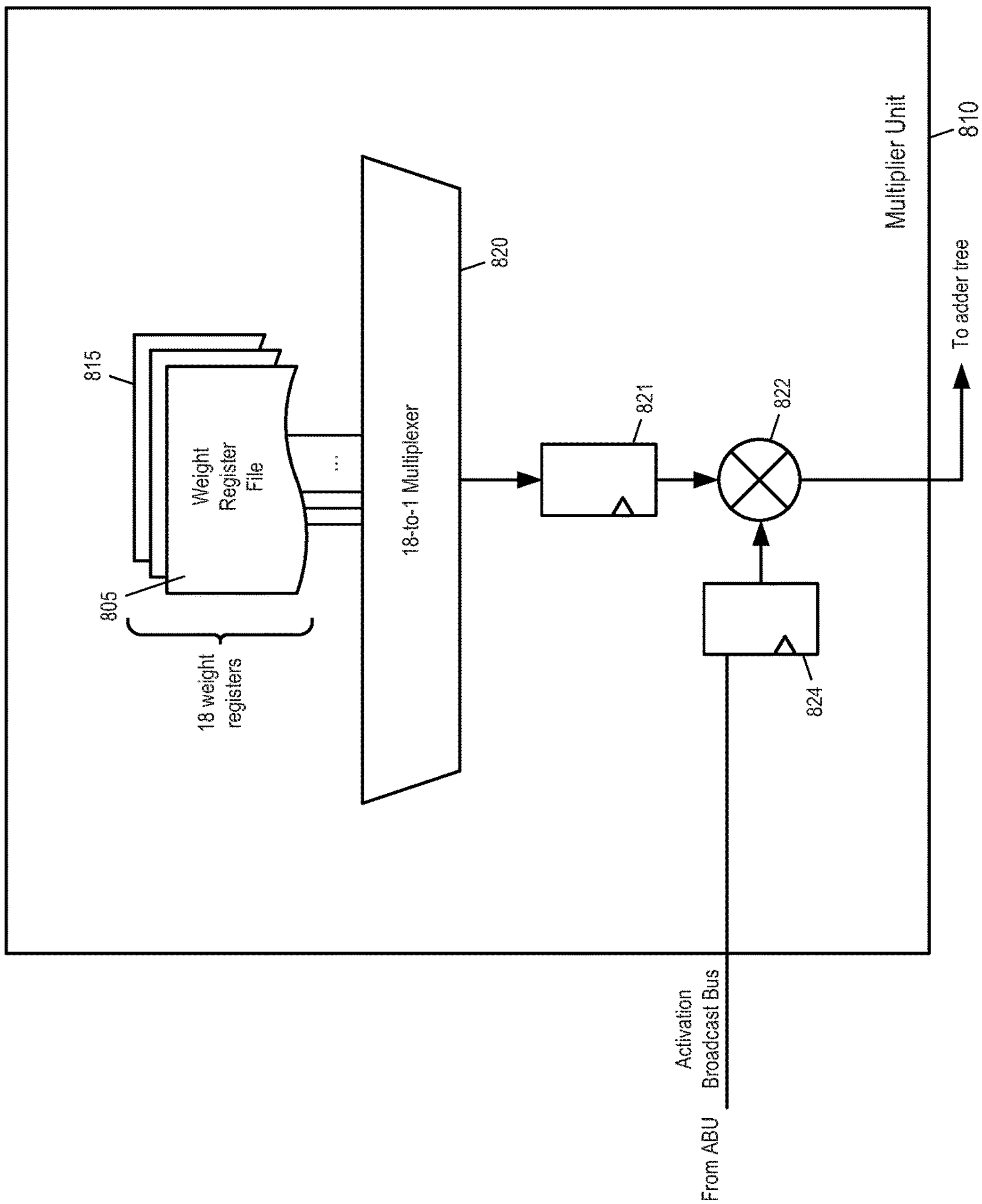
Figure 8B:
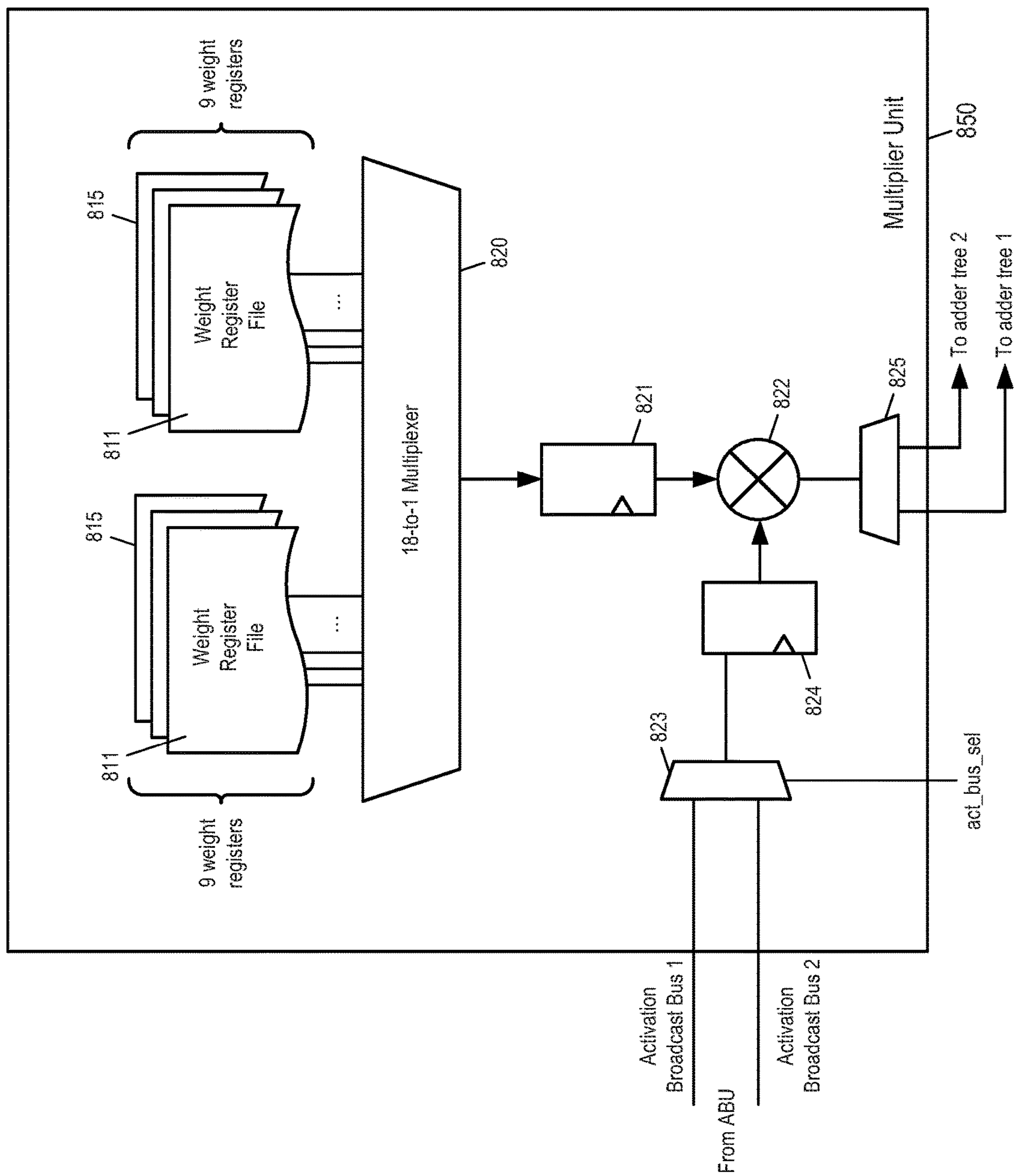
Figure 8C:
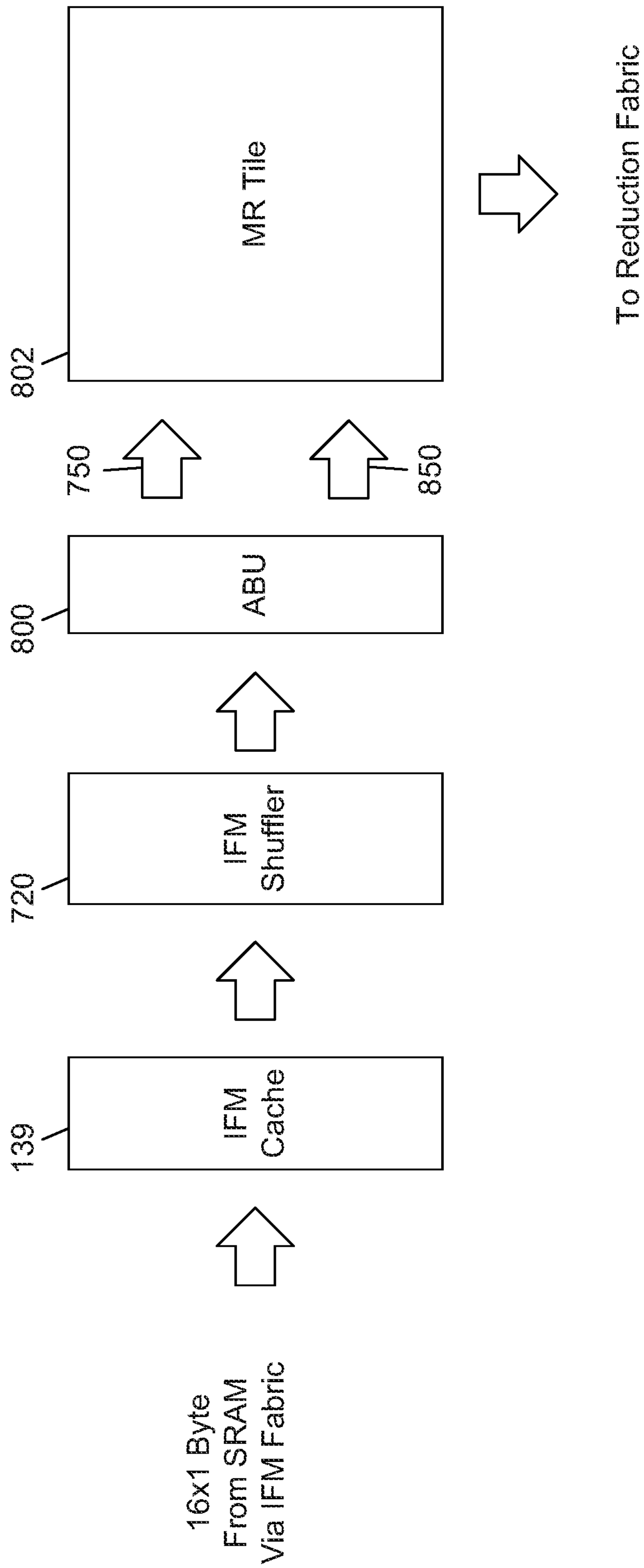

FIG. 3KA is a block diagram depicts a portion of a neural processor according to the subject matter disclosed herein;

FIG. 3KB is a data diagram according to the subject matter disclosed herein;

FIG. 3LA is a block diagram depicting a portion of a neural processor according to the subject matter disclosed herein;

FIG. 3LB is a block diagram depicting a portion of a neural processor according to the subject matter disclosed herein;

FIG. 3LC is a block diagram depicting a portion of a neural processor according to the subject matter disclosed herein;

FIG. 3LD is a block diagram depicting a portion of a neural processor according to the subject matter disclosed herein;

FIG. 3MA is a block diagram depicting a portion of a neural processor according to the subject matter disclosed herein;

FIG. 3MB is a block diagram depicting a portion of a neural processor according to the subject matter disclosed herein;

FIG. 3NA is a block diagram depicting a portion of a neural processor according to the subject matter disclosed herein;

FIG. 3OA is a block diagram depicting a portion of a neural processor according to the subject matter disclosed herein;

FIG. 3OB is a block diagram depicting a portion of a neural processor according to the subject matter disclosed herein;

FIG. 3OC is a block diagram depicting a portion of a neural processor according to the subject matter disclosed herein;

FIG. 3PA is a block diagram depicting a portion of a neural processor according to the subject matter disclosed herein;

FIG. 3PB is a block diagram depicting a portion of a neural processor according to the subject matter disclosed herein;

FIG. 3PC is a block diagram depicting a portion of a neural processor according to the subject matter disclosed herein;

FIG. 4AA is a block diagram depicting a portion of a neural processor according to the subject matter disclosed herein;

FIG. 4AB is a block diagram depicting a portion of a neural processor according to the subject matter disclosed herein;

FIG. 4AC is a block diagram depicting a portion of a neural processor according to the subject matter disclosed herein;

FIG. 4AD is a block diagram depicting a portion of a neural processor according to the subject matter disclosed herein;

FIG. 4AE is a block diagram depicting a portion of a neural processor according to the subject matter disclosed herein;

FIG. 4AF is a block diagram depicting a portion of a neural processor according to the subject matter disclosed herein;

FIG. 4AG is a block diagram depicting a portion of a neural processor according to the subject matter disclosed herein;

FIG. 4AH is a block diagram depicting a portion of a neural processor according to the subject matter disclosed herein;

FIG. 4AJ is a block diagram depicting a portion of a neural processor according to the subject matter disclosed herein;

FIG. 4AK is a block diagram depicting a portion of a neural processor according to the subject matter disclosed herein;

FIG. 4AL is a block diagram depicting a portion of a neural processor according to the subject matter disclosed herein;

FIG. 4AM is a block diagram depicting a portion of a neural processor according to the subject matter disclosed herein;

FIG. 4AN is a block diagram depicting a portion of a neural processor according to the subject matter disclosed herein;

FIG. 4BA is a block diagram depicting a portion of a neural processor according to the subject matter disclosed herein;

FIG. 4BB is a block diagram depicting a portion of a neural processor according to the subject matter disclosed herein;

FIG. 4BC is a block diagram depicting a portion of a neural processor according to the subject matter disclosed herein;

FIG. 4BD is a block diagram depicting a portion of a neural processor according to the subject matter disclosed herein;

FIG. 4CA is a block diagram depicting a portion of a neural processor according to the subject matter disclosed herein;

FIG. 4CB is a block diagram depicting a portion of a neural processor according to the subject matter disclosed herein;

FIG. 4CC is a block diagram depicting a portion of a neural processor according to the subject matter disclosed herein;

FIG. 4DA is a block diagram depicting a portion of a neural processor according to the subject matter disclosed herein;

FIG. 4DB is a block diagram depicting a portion of a neural processor according to the subject matter disclosed herein;

FIG. 4DC is a block diagram depicting a portion of a neural processor according to the subject matter disclosed herein;

FIG. 4EA is a block diagram depicting a portion of a neural processor according to the subject matter disclosed herein;

FIG. 4EB is a block diagram depicting a portion of a neural processor according to the subject matter disclosed herein;

FIG. 4EC is a block diagram depicting a portion of a neural processor according to the subject matter disclosed herein;

FIG. 4FA is a block diagram depicting a portion of a neural processor according to the subject matter disclosed herein;

FIG. 4FB is a block diagram depicting a portion of a neural processor according to the subject matter disclosed herein;

FIG. 4G is a block diagram depicting a portion of a neural processor according to the subject matter disclosed herein;

FIG. 4H is a block diagram depicting a portion of a neural processor according to the subject matter disclosed herein;

FIG. 5A is a block diagram depicting a portion of a neural processor according to the subject matter disclosed herein;

FIG. 5B is a block diagram depicting a portion of a neural processor according to the subject matter disclosed herein;

FIG. 5C is a block diagram depicting a portion of a neural processor according to the subject matter disclosed herein;

FIG. 5D is a block diagram depicting a portion of a neural processor according to the subject matter disclosed herein;

FIG. 5E is a block diagram depicting a portion of a neural processor according to the subject matter disclosed herein;

FIG. 5F is a block diagram depicting a portion of a neural processor according to the subject matter disclosed herein;

FIG. 5G is a block diagram depicting a portion of a neural processor according to the subject matter disclosed herein;

FIG. 6 is a block diagram depicting a portion of a neural processor according to the subject matter disclosed herein;

FIG. 7A depicts an example of IFM data having a relatively uniform distribution of zero values distributed among IFM slices as well as in lanes within IFM slices;

FIG. 7B depicts another example of IFM data in which zero values are clustered in the same IFM lanes of adjacent IFM slices;

FIG. 7C depicts a block diagram of an example embodiment of a system that uses an IFM shuffler to pseudo-randomly permute values within each IFM slice to disperse clusters of non-zero values within IFM slices according to the subject matter disclosed herein;

FIG. 7D depicts a block diagram of an example embodiment of a 16-channel butterfly shuffler according to the subject matter disclosed herein;

FIG. 7E depicts a block diagram of an example embodiment of a pseudo-random generator coupled to a butterfly shuffler according to the subject matter disclosed herein;

FIG. 8A depicts a block diagram of an example embodiment of a baseline multiplier unit according to the subject matter disclosed herein;

FIG. 8B depicts a block diagram of an example embodiment of a multiplier unit that supports dual sparsity for both zero-value activation and zero-value weight skipping according to the subject matter disclosed herein; and FIG. 8C depicts a block diagram of an example embodiment of a system that uses an IFM shuffler to pseudo-randomly permute values within each IFM slice to homogenize the distribution of zero-value activation and zero-value weights according to the subject matter disclosed herein.

DETAILED DESCRIPTION

The detailed description set forth below in connection with the appended drawings is intended as a description of exemplary embodiments of a neural processor provided in accordance with the present disclosure and is not intended to represent the only forms in which the present disclosure may be constructed or utilized. The description sets forth the features of the subject matter disclosed herein in connection with the depicted embodiments. It is to be understood, however, that the same or equivalent functions and structures may be accomplished by different embodiments that are also intended to be encompassed within the scope of the subject matter disclosed herein. As denoted elsewhere herein, like element numbers are intended to indicate like elements or features. Additionally, as used herein, the word “exemplary” means “serving as an example, instance, or illustration.” Any embodiment described herein as “exemplary” is not to be construed as necessarily preferred or advantageous over other embodiments.

As used herein, the term “module” refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

Figure 1A:
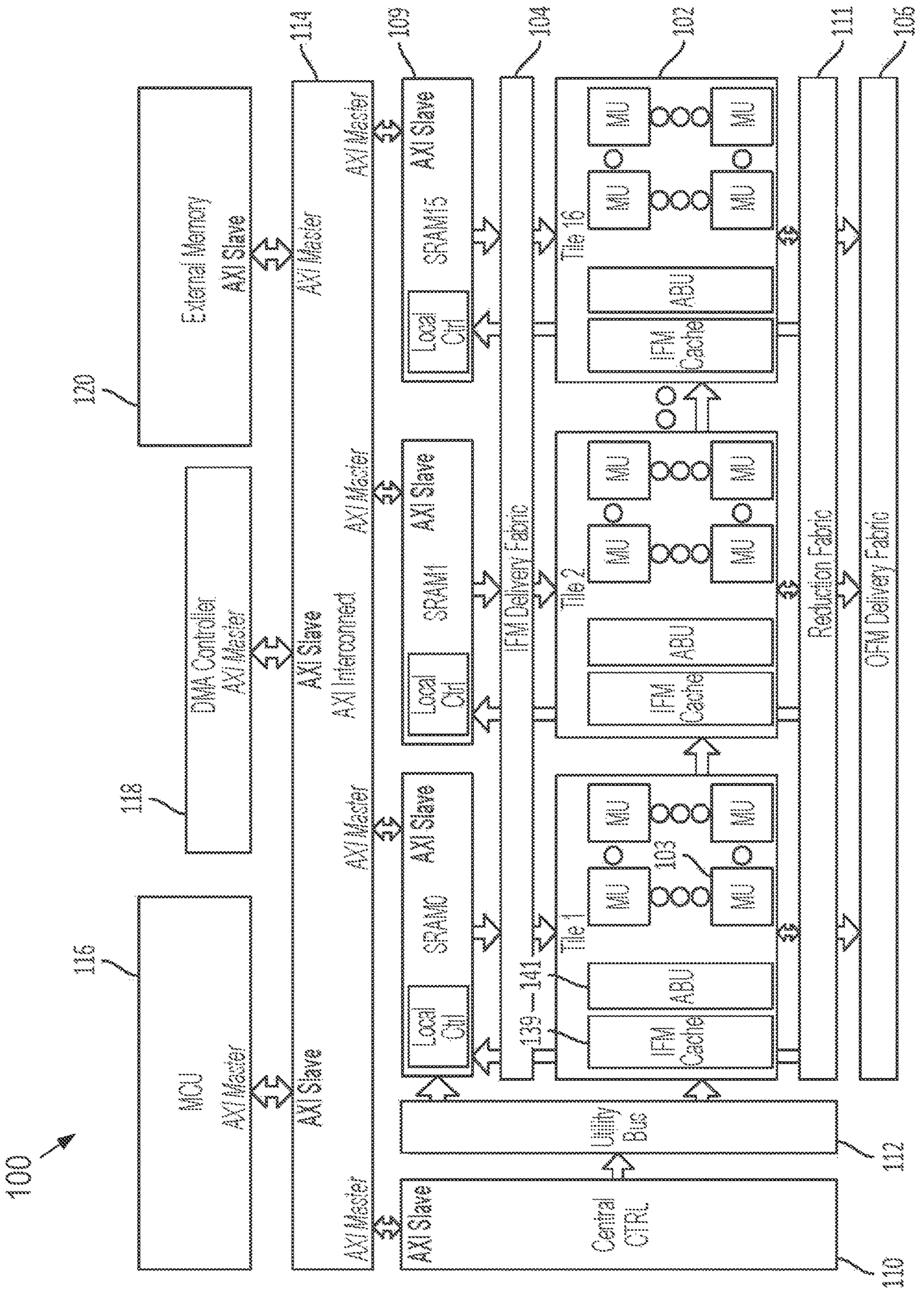
FIG. 1A is a block diagram depicting a neural processor according to the subject matter disclosed herein.

FIG. 1A depicts a high-level block diagram of a neural processor 100 according to the subject matter disclosed herein. The neural processor 100 may be configured to efficiently determine, or calculate, a convolution and/or a tensor product of an input feature map (IFM) (or a tensor of "activations") with a multi-dimensional array (or tensor) of weights to form an output feature map (OFM). The neural processor 100 may also be configured to determine, or compute, feature-map pooling and/or activation functions; however, for purposes of clarity and brevity, pooling and activation functions are largely not covered herein.

A plurality of memory bank sets 109 (each including several, e.g., four memory banks 108 in FIGS. 4AB and 4AC) may be connected to Multiply-and-Reduce (MR) tiles 102 (described in further detail below) through an IFM delivery fabric 104 that brings input activation maps stored in the memory bank sets 109 to the tiles 102 for subsequent computation. As will be discussed in further detail below, the tiles 102 contain an array of Multiplier Units (MUs) 103. The tiles 102 also connect to the memory bank sets 109 via an OFM delivery fabric 106 that transmits computed results from the tiles 102 to the memory bank sets 109 for storage. In one embodiment, the memory bank sets 109 may be static random access memory (SRAM) memory bank sets. Accordingly, the memory bank sets 109 may be referred to herein as the SRAM bank sets 109, or simply as the SRAM 109. In another embodiment, the memory bank sets 109 may include volatile and/or non-volatile memory bank sets.

The IFM delivery fabric 104 may be a segmented bus (as discussed below), and, as a result, each one of the SRAM bank sets 109 may be associated with one of the tiles 102. A central controller 110 may supply control words to control registers in the system via a utility bus 112. Data may be delivered to the neural processor via an AXI (Advanced Extensible Interconnect by ARM Ltd) interconnect 114, and the results of processing operations performed by the neural processor 100 may similarly be retrieved via the AXI interconnect 114. An MCU (micro-controller) 116 may be used to orchestrate computation by properly configuring the central controller 110 in a timely fashion, as well as coordinate and execute data transfers using a DMA controller 118 between the neural processor 100 and an external memory 120. Each of the different components and/or functional blocks of the neural processor described herein may be implemented as separate components and/or as modules.

Figure 1B:
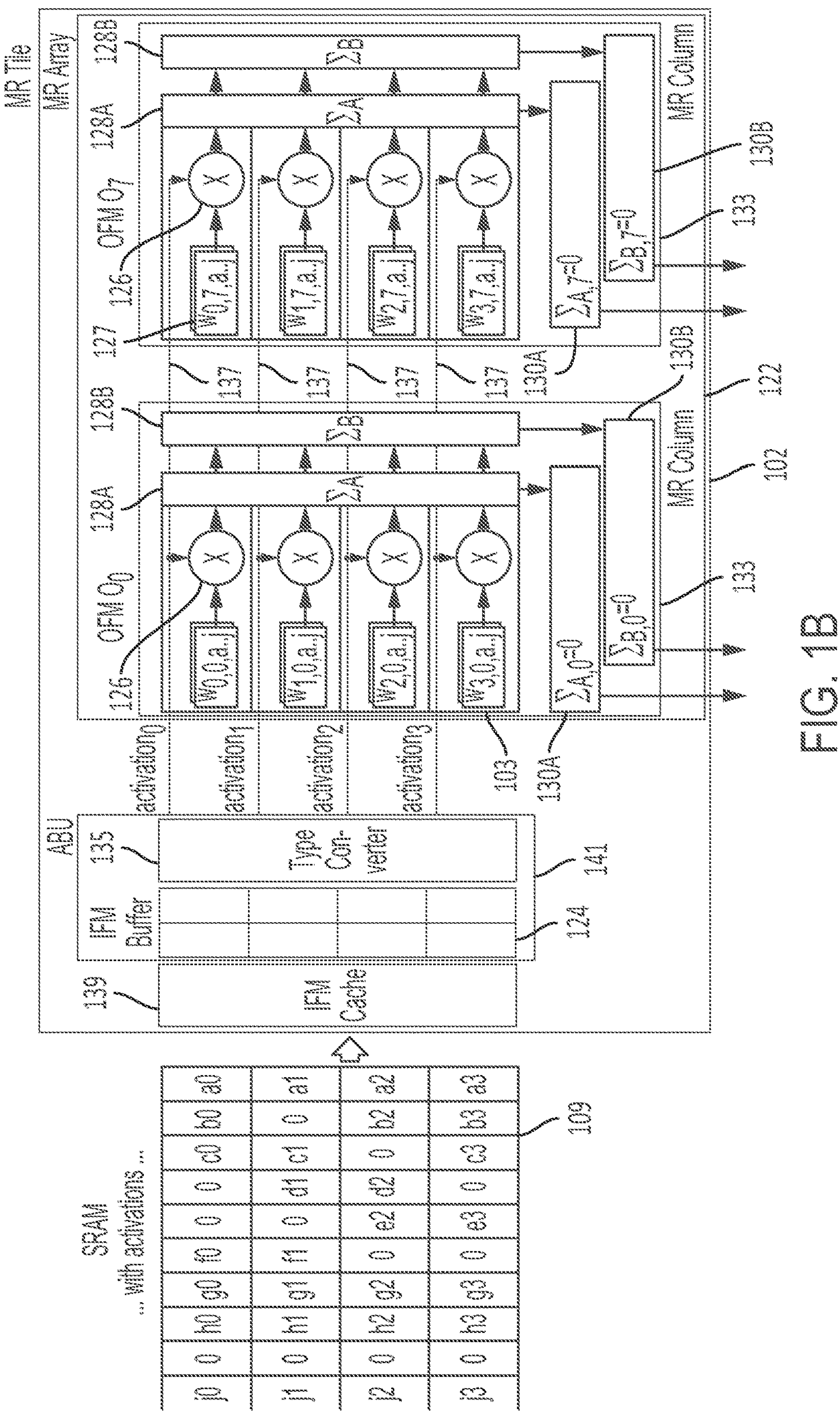
FIG. 1B is a block diagram depicting a portion of a neural processor according to the subject matter disclosed herein.

Each tile 102 may include a multiply-and-reduce (MR) array 122 of multiply-and-reduce (MR) columns 133. FIG. 1B depicts an MR array 122 as may be configured in some embodiments. Each MR array 122 may contain eight MR columns 133, of which only two MR columns are depicted for clarity. Each MR column 133 may contain sixteen MUs 103, of which only four MUs 103 are depicted for clarity, and two adder trees 128A and 128B.

Each MU 103 may include a plurality of registers, e.g., a register file 127 containing 18 9-bit registers that may be referred to as "weight registers," and a multiplier 126. The multiplier 126 multiplies input activations by the weights in the register file 127. Subsequently, the adder trees 128A and 128B in each MR column 133 sum up (i.e., reduce) resulting products from the sixteen MUs 103 in a column to form a dot product. The summation may be performed in a particular way, as explained below.

Each tile 102 also may contain an IFM Cache 139 and an Activation Broadcast Unit (ABU) 141. The IFM Cache 139 may reduce SRAM reads for input feature maps by caching IFM values received from the SRAM 109. Just as each MR Column 133 may contain sixteen MUs 103, the IFM Cache 139 may contain sixteen parallel "activation lanes" in which each activation lane 137 effectively corresponds to a "row" of MUs 103 in the MR Array 122.

The Activation Broadcast Unit 141 may be responsible for preparation of input activations. A first step in the preparation process may include fetching input activations from the IFM Cache 139 into an IFM Activations Buffer 124 in accordance with a convolution sequence while also omitting zero-valued activations when possible to realize a sparse activation computation functionality. The sparse activation computation functionality may be optionally disabled, resulting in a "dense" tensor computation mode. A second step in the preparation process may include converting a numerical type of activations into a sign-and-8 bit-magnitude format, which may include partitioning data types having a bit width exceeding 8 bits into a series of sign-and-8 bit-magnitude values using a Type Converter 135. When activations have been encoded using a "zero-point" encoding, as supported by, for example, a Google TensorFlow, a zero-point constant value Z may be added to activations before converting the values to sign-and-8 bit-magnitude format.

Just as each MR Column 133 may contain sixteen MUs 103, the ABU 141, the IFM Buffer 124 and the Type Converter 135 may each also contain sixteen lanes. The resulting converted sixteen activation values are broadcast in parallel to the MR Array 122 so that each activation lane brings an input activation value to a corresponding row of eight MUs 103.

Each MR column 133 may also contain accumulators 130A and 130B, one for each of the adder trees 128A and 128B. As used herein, an "accumulator" is a combination of an adder and a register that may be configured to add an input value to the contents of the register, and overwrite the contents of the register with a resulting sum.

As mentioned previously, MUs 103 in the MR array 122 may be arranged as a plurality of rows, e.g., 16 rows, with FIG. 1B depicting only four rows out of 16 for clarity, and columns (or "OFM channels"), e.g., eight columns, of which only two columns labeled "00" and "07" are depicted in FIG. 1B.

An IFM vector having a length of sixteen values may be referred to herein as an "IFM slice." An IFM slice may have associated planar coordinates (x, y) and an associated depth channel index d as indices into the associated IFM tensor, e.g., IFM[x,y,d:d+15]. In a general case, a tile 102 receives one IFM slice at a time from on-chip memory, or SRAM, containing a 3D IFM tensor in which each input IFM slice contains values for sixteen depth channels from index d to d+15, inclusive, at a planar location (x, y) in the input layer.

Similarly, an OFM vector having a length of eight values may be referred to herein as an "OFM slice." An OFM slice may have associated planar coordinates (x, y) and an associated depth channel index d as indices into the associated OFM tensor, e.g., OFM[x, y, d:d+7]. In a general case, a tile 102 produces OFM slices as an output. When a tile is not stalled, the output rate may vary, as will be seen below, from one OFM slice per clock up to, for example, a maximum of two OFM slices per clock in some embodiments. Note that the tile 102 OFM output vectors (OFM slices) that are output from the tiles 102 may need to be further reduced by a Reduction Fabric 111 to complete the OFM vector computation before transmitting the final OFM vector result over the OFM delivery fabric 106 for storage in the SRAM 109.

Note that both the IFM and OFM tensors may also have a fourth "batch" dimension; however a primary purpose of the neural processor 100 is to accelerate neural-network model real-time inference, as opposed to neural-network model training, and real-time inference is typically performed on a batch size of 1. For the sake of explanation simplicity, the batch dimension will be omitted in most of following discussion and batch dimension details will be described separately later.

The neural processor 100 may be implemented in synchronous logic, and each MR column 133 may be entirely within one clock domain. In some embodiments, during each cycle of operation (e.g., during each clock cycle), each of the sixteen multipliers 126 may form a corresponding product from two multiplicands (or operands) at its inputs. Each of the adders 128 may form a sum of some or all of the sixteen products at the inputs to the adders 128 (as depicted in FIG. 1B for the four lanes depicted), and the adder of each accumulator 130 may form the sum of (i) the current value of the register of the accumulator 130 plus (ii) the output of a corresponding adder 128. At the beginning of the next clock cycle, the output of each adder of each accumulator 130 may be written into the register of the accumulator 130.

In some embodiments, the calculation provided by a tile 102 may be pipelined and additional registers (i.e., arrays of flip-flops) may be present between the elements depicted in FIG. 1B, to provide, for example, adequate timing margins at the clock speed at which the circuit operates. In such an embodiment, the throughput may be the same (i.e., the same as in the absence of the additional registers, e.g., one multiplication and addition per clock cycle), but the latency between (i) the input data being input to the multipliers 126 and (ii) the final results of the multiplications and additions being written to the registers of the accumulators 130 may be greater (e.g., several clock cycles).

FIGS. 1C-1H depict an example of operation in which the neural processor 100 takes advantage of sparsity in the IFM data to accelerate the completion of a calculation by advancing certain multiplication and addition operations out of turn to make use of a multiplier 126 that would otherwise perform a multiplication by zero if an element of the IFM data equals zero. The IFM data may be stored in an SRAM bank set 109 and fetching of the IFM data from the SRAM bank set 109 may be scheduled so that the activations buffer 124 operates as a plurality of queues. Each queue formed by the activations buffer 124 corresponds to one row of data, as depicted in FIG. 1B, and each queue outputs IFM data to a respective lane of the MR array 122.

For clarity of explanation, it is assumed that the IFM cache 139 between the SRAM 109 and the activations buffer 124 has been disabled and bypassed. It is also assumed that the data type of the activations is uint8 and the data type of the weights is int8, in which case the type converter 135 acts to pass activation values through unchanged and multiplication in an MU 103 takes one clock cycle. Another assumption is that the SRAM bank set 109 contains some sample IFM values, as depicted in FIG. 1B, at the beginning of the example operation and only one tile is being used.

Still another assumption is that the weight tensor W[0 . . . 15, 0 . . . 7, a . . . j] corresponds to 16 IFM lanes, 8 OFM columns, and 10 IFM input vectors a through j has been pre-loaded into corresponding MU register files (i.e., register files 127).

Figure 1C:
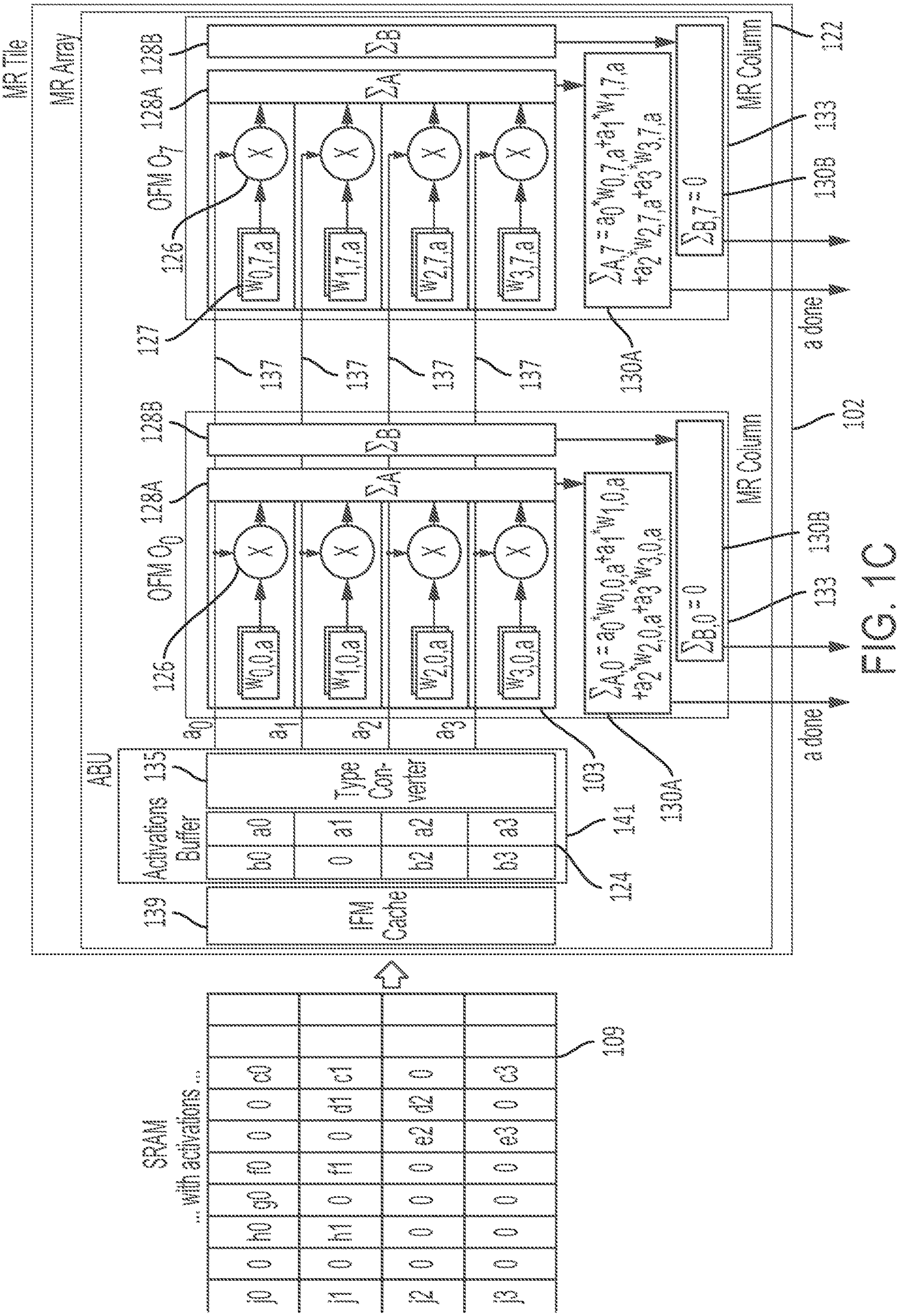
FIG. 1C depicts a data flow in a portion of a neural processor according to the subject matter disclosed herein.

Once the example operation starts, it may be seen from FIG. 1C, that, in the example depicted, two IFM vectors a[ ] and b[ ] in the two rightmost columns the SRAM 109 have been fetched into the activations buffer 124 so that the first column of the activations buffer 124 (i.e., the right column a[ ]) contains the first vector of the IFM (i.e., elements a0 through a3) and the second column of the activations buffer 124 (i.e., the left column b[ ]) contains the second vector of the IFM (i.e., elements b0 through b3, with b1=0). In FIG. 1C, the second queue contains a1 as its first element (nearest the MR array 122), and the second queue contains zero (0) as its second element (i.e., b1=0).

Being at the front of the activations buffer 124, the IFM vector a[0 . . . 3] is broadcast to MR array 122, that is, the IFM value a0 is broadcast over the top-most activation lane 137 as an input to each of the eight multipliers 126 in the top row. At the same time the top row multipliers 126 in columns 0 through 7 respectively receive weights W[0, 0 . . . 7,a] from their respective local register files 127 as a second input to each multiplier 126.

Similarly, the value a1 is broadcast over the second-from-top activation lane 137 as an input to the second-from-top row of multipliers 126. At the same time, the second-from-top row multipliers 126 in columns 0 through 7 respectively receive weights W[1, 0 . . . 7, a] from their respective local register files 127 as a second input to each multiplier 126.

In operation, the products of the first vector of the IFM (i.e., the elements a0 through a3) with corresponding weights may be formed in each of the (16×8) array of multipliers 126, and the sums of the products corresponding to the desired dot product may be formed in the first adders 128A and saved in the first accumulators 130A. That is, the contents of the first accumulators 130A contain:

$$\Sigma_{A,0}=a_0*w_{0,0,a}+a_1*w_{1,0,a}+a_2*w_{2,0,a}+a_3*w_{3,0,a}$$

$$\ldots$$

$$\Sigma_{A,7}=a_0*w_{0,7,a}+a_1*w_{1,7,a}+a_2*w_{2,7,a}+a_3*w_{3,7,a}.$$

At this point, the determination, or calculation, of the OFM output vector corresponding to IFM a[ ] is finished with the result available in the accumulator 130A (depicted as $\Sigma_{A,0\ldots7}$ in FIG. 1C) and ready to be output to the OFM delivery fabric 106. The accumulator 130A of each column may then be cleared.

Figure 1D:
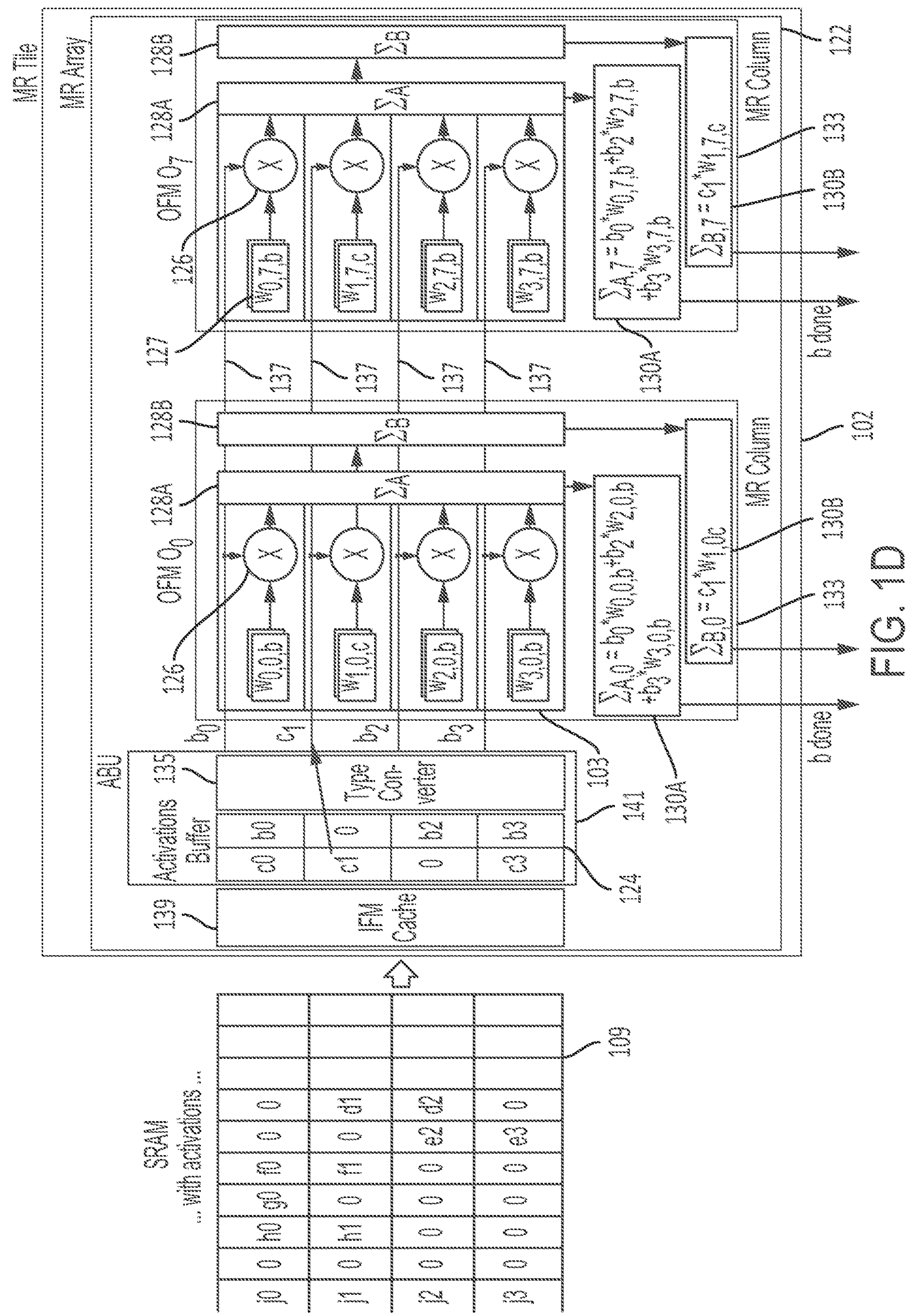
FIG. 1D depicts a data flow in a portion of a neural processor according to the subject matter disclosed herein.

In FIG. 1D, after the first vector of the IFM has been processed, the third vector of the IFM (i.e., elements c0 through c3, with c2=0) may be read into the activations buffer 124. Instead of forming the product of the weights with all of the elements of the second vector of the IFM (i.e., elements b0 through b3, with b1=0), which would entail forming in each multiplier 126 of the second lane a product of zero value and a corresponding weight, the second element of the third vector of the IFM (i.e., the element c1) is advanced out of turn and multiplied by a corresponding weight in each multiplier 126 of the second lane.

At the same time, the multipliers 126 in lanes 0, 2 and 3 are receiving weights W[0,0 . . . 7,b], W[2,0 . . . 7,b] and W[3,0 . . . 7,b] correspondingly from their respective local register files. Because lane 1 is operating out-of-turn due to activation b1=0 being skipped, the multipliers in lane 1 receive weights W[0,0 . . . 7,c] associated with IFM vector ("pixel") c, not weights associated with IFM vector (pixel) b.

Since the tile 122 is now processing two pixels simultaneously (pixel b and part of pixel c), adding multiplication products in a column may yield an incorrect result. To obtain the correct result, one of the two adder trees 128 is used to compute the dot product for pixel b, while the other of the two adder trees 128 is used to start computing the dot product for pixel c.

Figure 1E:
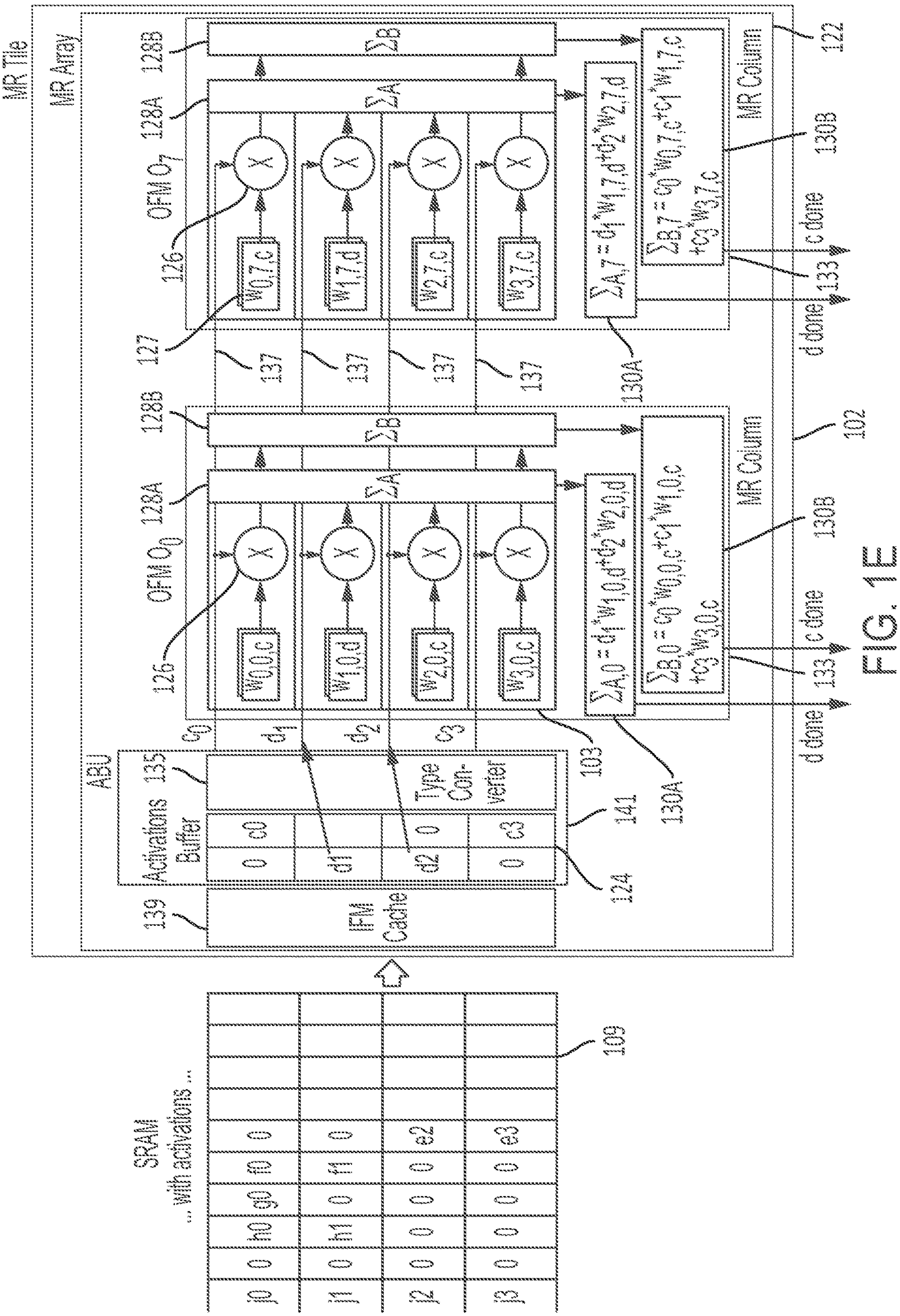
FIG. 1E depicts a data flow in a portion of a neural processor according to the subject matter disclosed herein.

The product formed by each multiplier 126 of the second lane is input to the second adder 128B (indicated as $\Sigma_{B,0 \ldots 7}$ in FIG. 1C), whereas the products formed by the multipliers 126 of other lanes are input to the first adder 128A. The advancement out of turn of the element c1 forms a "hole" in the activations buffer 124 that may be taken advantage of in a subsequent clock cycle by advancing another element out of turn (as depicted in FIG. 1E when element d1 is advanced out of turn).

Once the products of the nonzero elements of the second vector of the IFM data with corresponding weights have been determined, or calculated, and their sum is in the first accumulator 130A of each column, the first accumulator 130A of each column contains the dot product of the second vector (b[ ]) of the IFM with the weight vector of the column, and may be output to the OFM delivery fabric 106. The first accumulator 130A of each column may then be cleared. That is, the contents of the first accumulator 130 of each column contains prior to clearing:

$$\Sigma_{A,0}=b_0*w_{0,0,b}+b_2*w_{2,0,b}+b_3*w_{3,0,b}$$

. . .

$$\Sigma_{A,7}=b_0*w_{0,7,b}+b_2*w_{2,7,b}+b_3*w_{3,7,b}.$$

At this time, the second accumulator 130B of each column contains only one term of the dot product of the third vector (c1) of the IFM with a corresponding weight vector. That is, the contents of the second accumulator 1308 contains:

$$\Sigma_{B,0}=c_1*w_{1,0,c}$$

. . .

$$\Sigma_{B,7}=c_1*w_{1,7,c}.$$

Referring to FIG. 1E, in a subsequent operation (e.g., during the next clock cycle) the remainder of the products of the elements of the third vector of the IFM (c0, c3) with the corresponding weight vectors may be formed by the first and fourth multipliers 126 of each column of the MR array 122. The respective products may be added to the one product already stored in the second accumulator 130B to complete, in the second accumulator 1308, the dot products of the third vector of the IFM (c[ ]) with the corresponding weight vectors. That is, the contents of the second accumulator 130B contains:

$$\Sigma_{B,0}=c_0*w_{0,0,c}+c_1*w_{1,0,c}+c_3*w_{3,0,c}$$

. . .

$$\Sigma_{B,7}=c_0*w_{0,7,c}+c_1*w_{1,7,c}+c_3*w_{3,7,c}.$$

The dot products of the fourth vector of the IFM (i.e., the elements d0 through d3, with d0=d4=0) with the weight vectors may be determined, or calculated, at the same time by advancing out of turn both the elements d1 (because the product involving c1 was performed on the previous cycle, leaving a "hole" in the activations buffer 124) and the element d2 (because c2=0). The contents of the first accumulator 130A contains:

$$\Sigma_{A,0}=d_1*w_{1,0,d}+d_2*w_{2,0,d}$$

. . .

$$\Sigma_{A,7}=d_1*w_{1,7,d}+d_2*w_{2,7,d}.$$

At this point, the computation of OFM data for both IFM vector c[ ] and IFM vector d[ ] is complete.

Figure 1F:
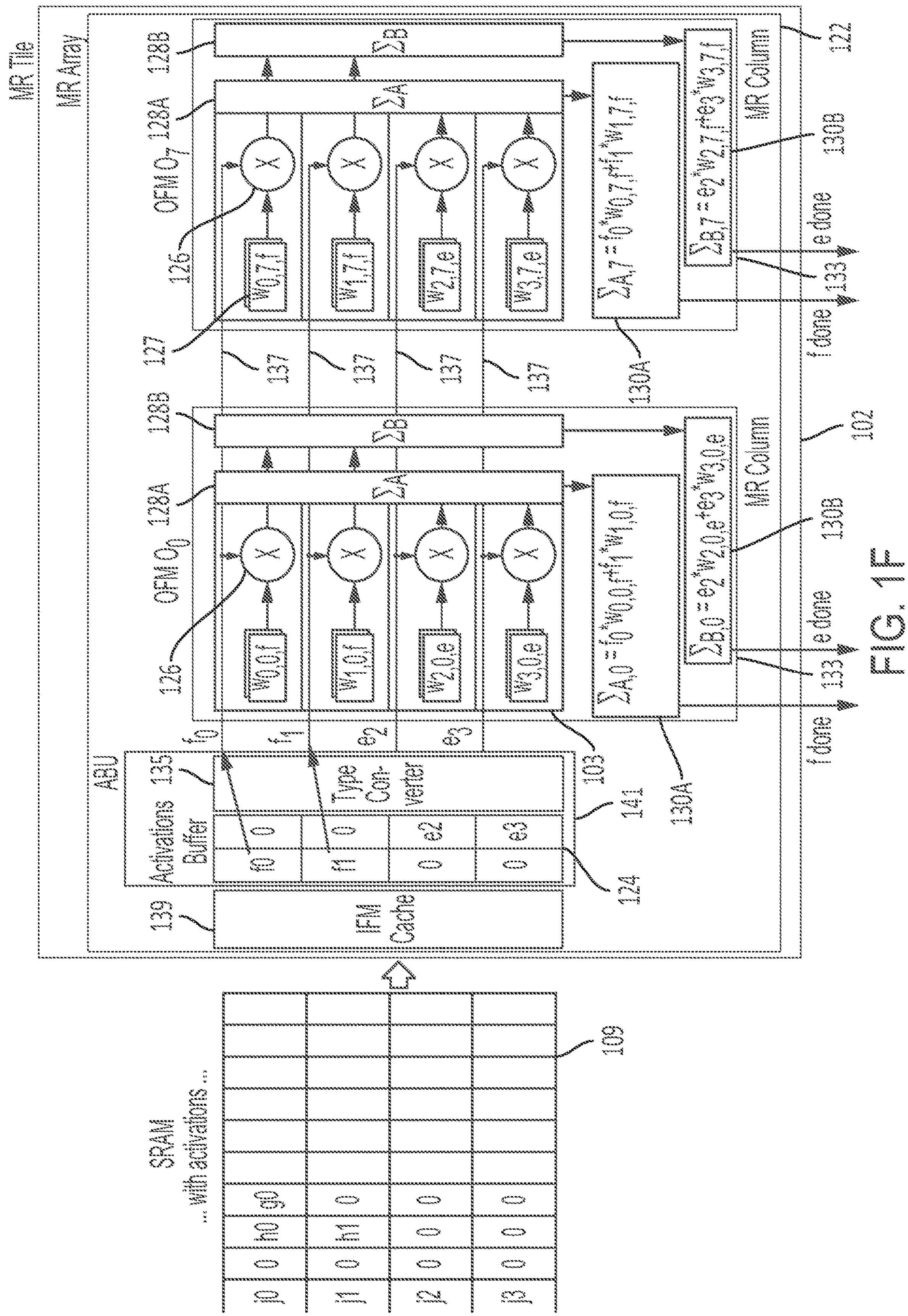
FIG. 1F depicts a data flow in a portion of a neural processor according the subject matter disclosed herein.

In a similar manner, when the activations buffer contains two vectors e[ ] and f[ ] with complementary sparsity, as depicted in FIG. 1F, each column of the MR column 122 may form two dot products simultaneously. In the example depicted in FIG. 1F, for example, the dot product of the fifth vector of the IFM data (i.e., elements e0 through e3, with e0=e1=0) with each weight vector is formed at the same time as the dot product of the sixth vector of the IFM data (i.e., elements f0 through f3, with f2=f3=0) with each weight vector, and both non-zero elements of the sixth vector are advanced out of turn.

Figure 1G:
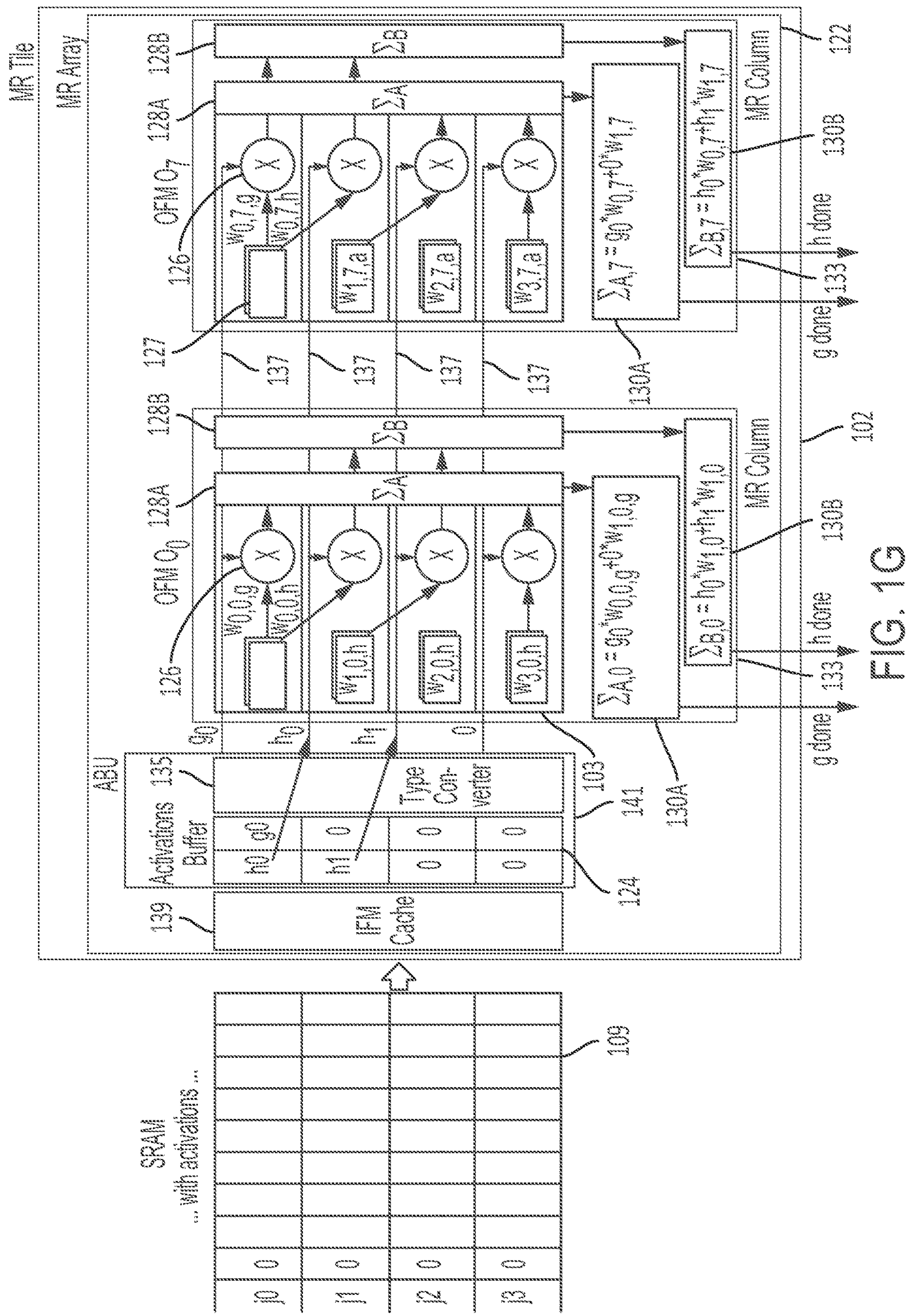
FIG. 1G depicts a data flow in a portion of a neural processor according to the subject matter disclosed herein.

FIG. 1G depicts a state in which the seventh vector g[ ] of the IFM data (i.e., elements g0 through g3, with g1=g2=g3=0) is in the first column of the activations buffer 124 and the eighth vector of the IFM data (i.e., elements h0 through h3, with h2=h3=0) is in the second column of the activations buffer 124. FIG. 1G depicts how the dot product of the eighth vector h[ ] of the IFM data with each corresponding weight is formed at the same time as the dot product of the seventh vector of the IFM data with each corresponding weight by advancing the (non-zero) elements of the eighth vector of the IFM data out of turn so that (non-zero) elements of the eight vector are processed at the same time as the (non-zero) elements of the seventh vector of the IFM data. Because one of the (non-zero) elements of the eighth vector of the IFM (h0) is in the same lane as a (non-zero) element of the seventh vector of the IFM (g0), each of the (non-zero) elements of the eighth vector of the IFM data is shifted to an adjacent lane of the MR column 122 so that these elements may be advanced out of turn.

Inputting the first element (h0) of the eighth vector h[ ] of the IFM data into the second-from-top multiplier 126 of each column (which is not used for the seventh vector g[ ] of the IFM data because it has a zero element in this position) and inputting the second element (h1) of the eighth vector h[ ] of the IFM data into the third multiplier 126 of each column (which is also not used for the seventh vector g[ ] of the IFM data) allows the (non-zero) elements of the eighth vector of the IFM data to be processed at the same time as the (non-zero) elements of the seventh vector of the IFM data. The corresponding elements of the weight vectors for the eight vector h[ ] are also shifted. More specifically, each MU 103 associated with topmost lane fetches two weights, one weight associated with g0, labeled $w_{0,0 \ldots 7,g}$ in FIG. 1G in which 0 . . . 7 indicates the corresponding column, and another weight associated with h0, labeled $w_{0,0 \ldots 7,h}$ in FIG. 1G. Each weight $w_{0,0 \ldots 7,g}$ is input into a corresponding multiplier 126 in the topmost lane, which is receiving g0. Each weight $w_{0,0 \ldots 7,h}$ is, however, shifted one lane down and input into the multiplier 126 of the second-from-the-top lane in the same column, which is receiving h0.

Lastly, the MUs 103 in the second-from-the-top lane each fetch weight w1,$_{0 \ldots 7}$.h (associated with h1), and shift these weights one lane down, over to the third-from-the-top lane in the same column that is receiving h1.

In the state depicted in FIG. 1G, each multiplier 126 of each MR column 122 in the bottom lane is unused for one cycle. The likelihood of such events to make full use of all of the multipliers 126 may be reduced in some embodiments by configuring the MR tile 102 to have a deeper (e.g., 3-deep) activations buffer 124 so that each activation lane may have more (e.g., three) values from the same channel from which to choose. Bringing (shifting) non-zero activations from a lane that is at a distance that greater than one lane away also provides more flexibility in substituting zero-valued activations with non-zero activations. Having more than two sets of adder trees and associated accumulators may also increase multiplier utilization.

Figure 1H:
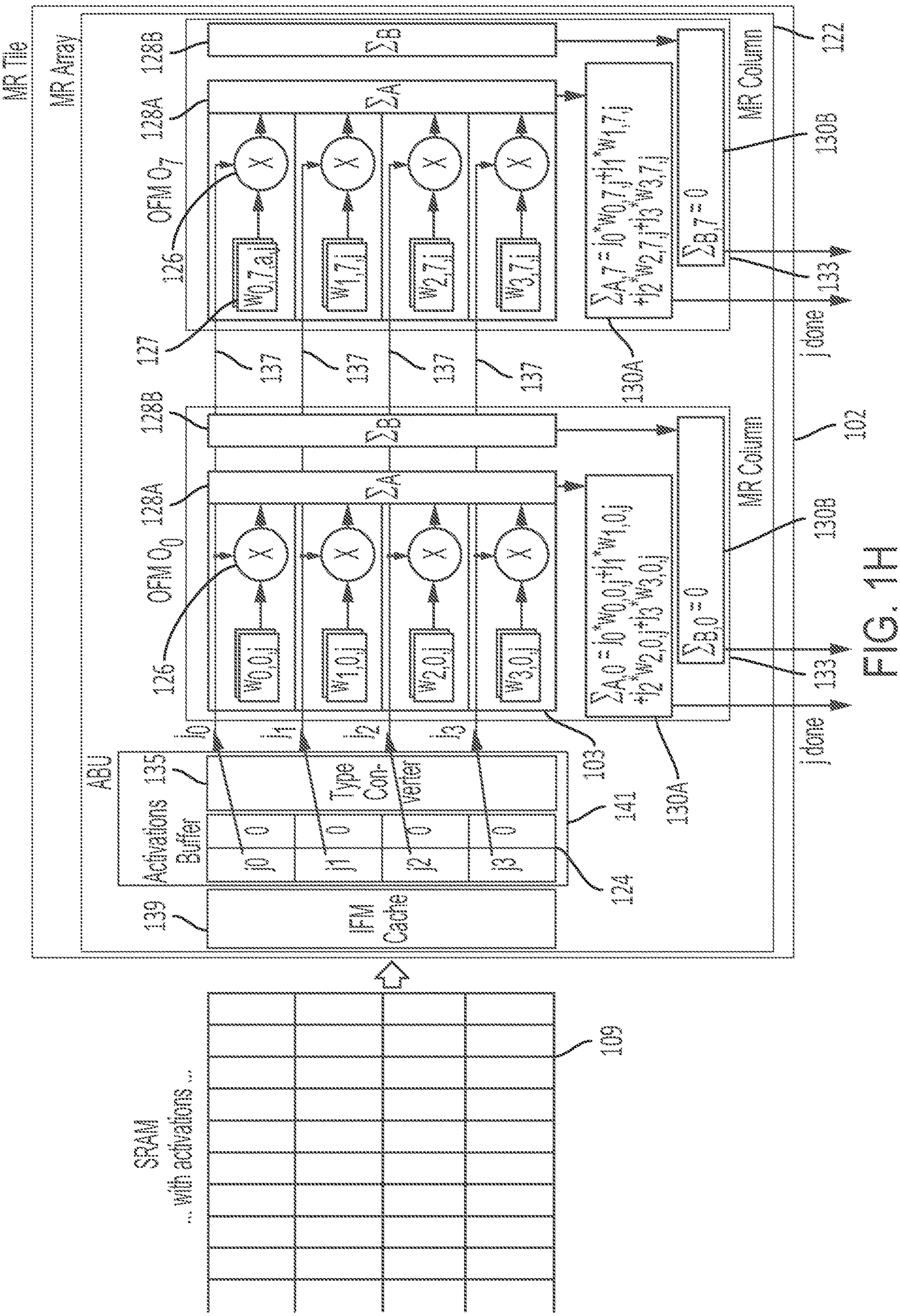
FIG. 1H depicts a data flow in a portion of a neural processor according to the subject matter disclosed herein.

FIG. 1H depicts a subsequent cycle following the cycle depicted in FIG. 1G in which the first column of the activations buffer 124 contains the ninth vector of the IFM data (containing entirely zeros) and the second column of the activations buffer 124 contains the tenth vector of the IFM data (i.e., elements j0 through j3). In the state depicted in FIG. 1H, all of the elements of the tenth vector of the IFM data may be advanced out of turn and the dot product of the tenth vector j[ ] of the IFM data with each weight vector may be calculated without incurring a delay of one cycle for the processing of the ninth vector of the IFM data.

Figure 1I:
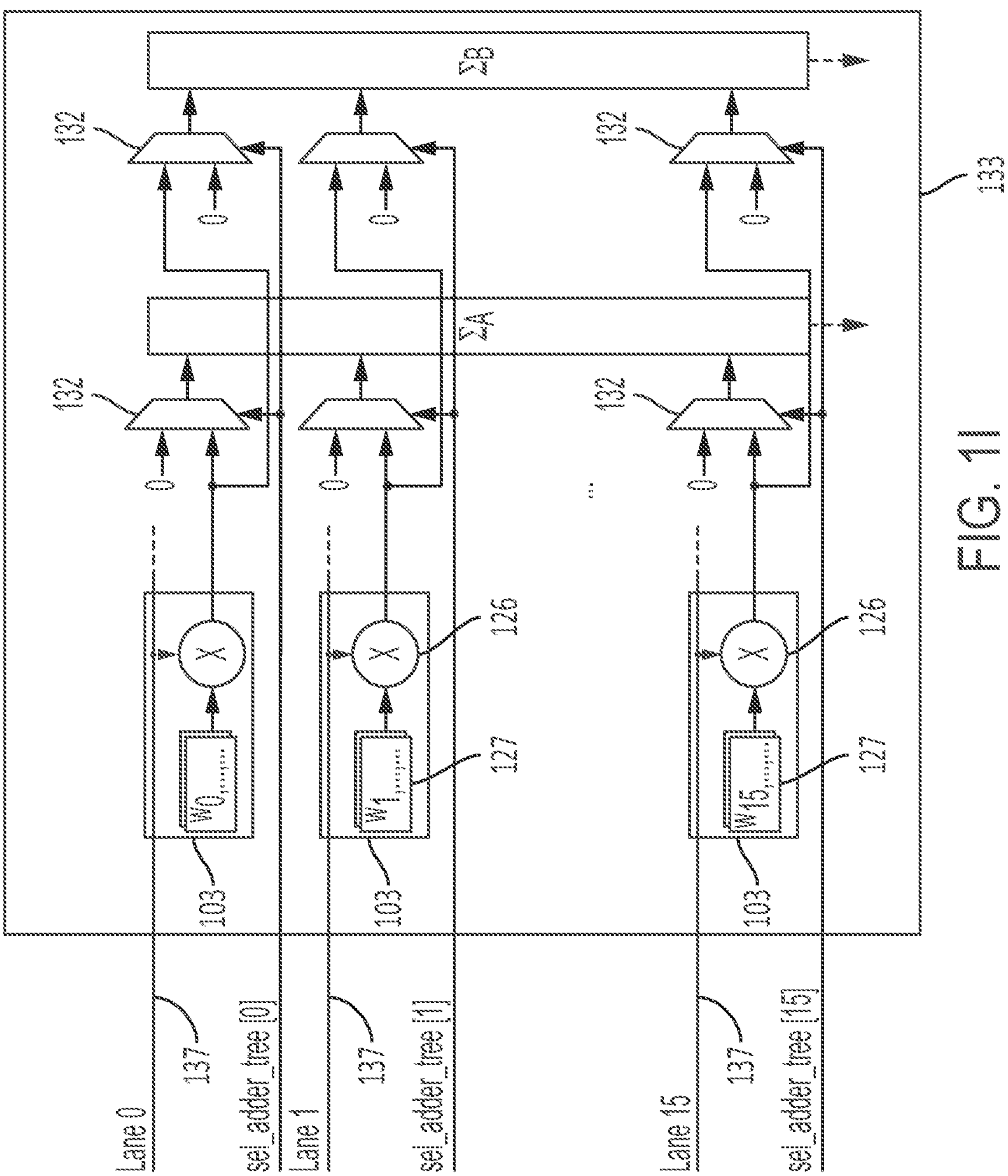
FIG. 1I is a block diagram depicting a portion of a neural processor according to the subject matter disclosed herein.

As was depicted in the example above, the output of a multiplier 126 may be input to the adder tree 128A during some clock cycles, and may be input tout to the adder tree 128B during other clock cycles. When the output of the multiplier 126 is not input to an adder tree 128A or 128B, the input to the adder tree may be set to zero. FIG. 1I depicts an example configuration using multiplexers 132 to direct the output of any multiplier 126 to either the first adder 128A or the second adder 128B to support the operations depicted in, for example, FIGS. 1D-1H. Here the multiplexer control signals sel_adder_tree[0 . . . 15] come from a Tile Control logic 144 (FIG. 1O) to coordinate computation within a tile 102 including fetching IFM vectors from cache, selection and multiplexing of non-zero activations from the activations buffer to activation lanes, selection of an adder tree to use with each IFM vector, multiplexing multiplier unit outputs to the correct adder tree, and clearing column accumulators.

Figure 1J:
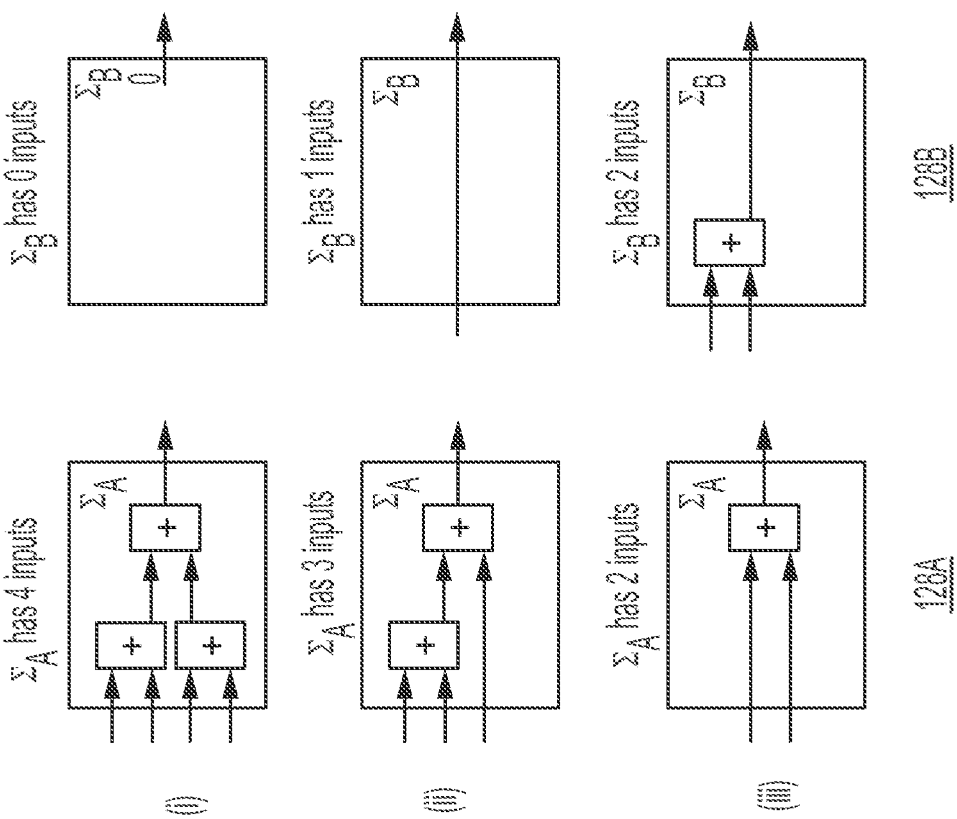
FIG. 1J is a block diagram depicting a portion of a neural processor for three cases according to the subject matter disclosed herein.

Since an output of a multiplier 126 is always input to the adder tree 128A or the adder tree 128B, but never both adder trees 128A and 128B simultaneously, it is possible to implement both adder trees 128A and 128B using less logic. FIG. 1J depicts how both the first adder 128A and the second adder 128B may be logical concepts implemented with a single physical adder tree and suitable multiplexers (not shown). For clarity, consider configuring two adder trees in which each adder tree includes four inputs. A four-input adder tree may be implemented using three adders. In a simple approach, each adder tree would use three adder elements, therefore configuring two four-input adder trees would use six adder sub-elements. The two four-input adder trees may be constructed using only three adder elements with the help of a few extra multiplexers. There are three cases of interest to consider. (i) In a first case, all four of the inputs are summed by the first logical adder 128A (and the output of the second logical adder 1288 is zero). (ii) In a second case, three of the inputs are summed by the first logical adder 128A (and the output of the second logical adder 128B is equal to the remaining input). (iii) In a third case, two of the inputs are summed by the first logical adder 128A, and two of the inputs are summed by the second logical adder 128B. In two further cases (not depicted in FIG. 1J), the second logical adder 128B sums three or all four of the inputs, and the first logical adder 128A is equal to the remaining input or to zero, respectively. As used herein, an "adder" is either a physical circuit for adding at least two numbers to form a sum, or one of a plurality of logical adders formed with a combination of physical adders and multiplexers, as in the example of FIG. 1J. As seen from FIG. 1J, only three adder elements (with some additional multiplexers not shown), not six, are sufficient to implement all possible cases.

Figure 1K:
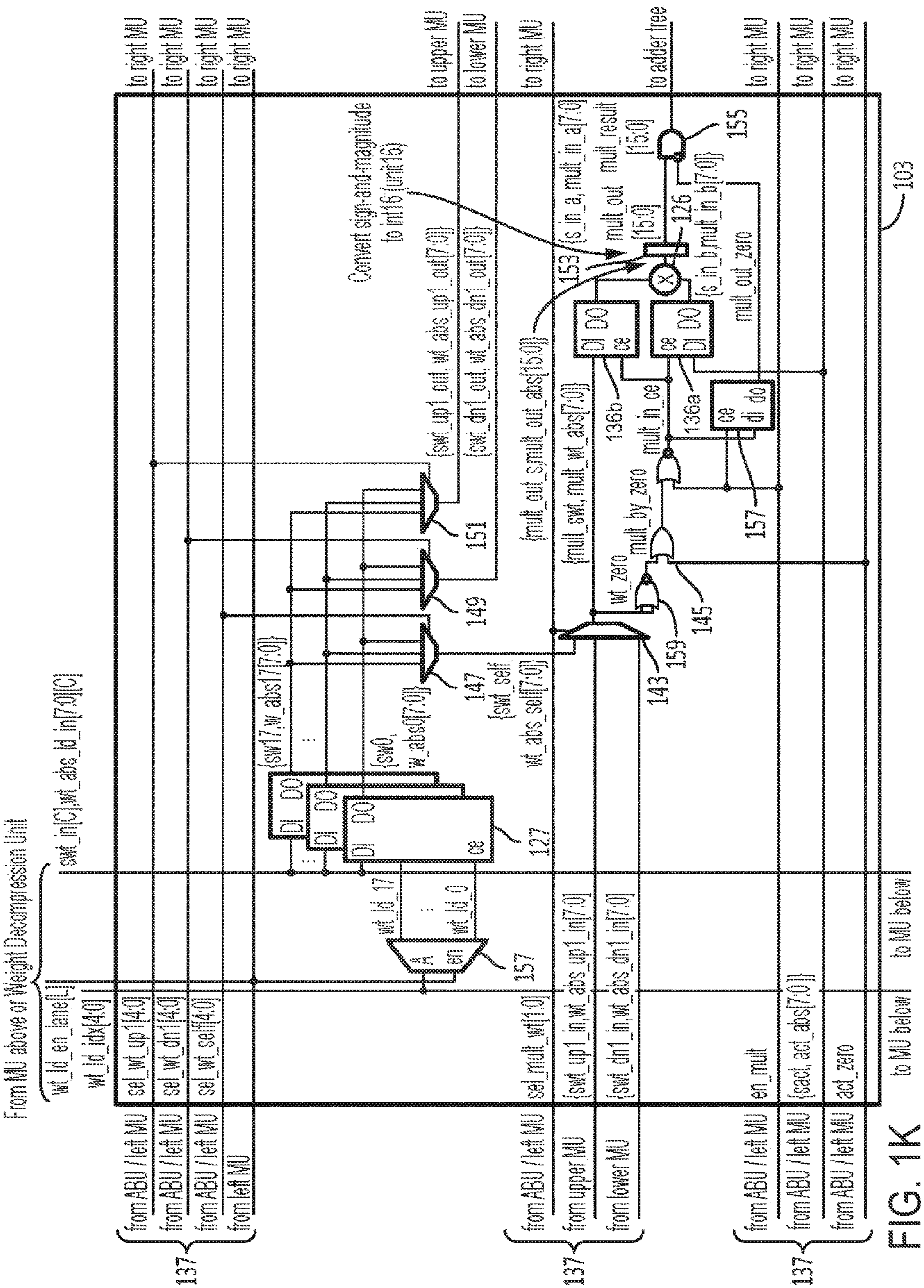
FIG. 1K is a schematic diagram of a portion of a neural processor according to the subject matter disclosed herein.

FIG. 1K depicts an internal circuit diagram of a multiplier unit 103 according to the subject matter disclosed herein. The multiplier unit 103 may include an unsigned 8-bit by unsigned 8-bit multiplier 126, a register file 127 that may holds local weights, logic 143 that may selects an input weight for the multiplier 126, logic 149 and 151 that may shifts a local weight over to an adjacent lane, logic 145, 136, 157, 155 and 159 that may detects a multiply-by-zero situation and idles down the multiplier 126 to reduce dynamic power consumption, and a weight loading logic 157.

The register file 127 holds weights. One register corresponds to a single int8 or uint8 weight. Weights having a larger bit width occupy more than one register, for example, an int16 or uint16 weight may occupy two registers. The register file 127 may hold eighteen int8 or uint8 weights or correspondingly nine int16 or uint16 weights. The number of registers may be selected to enable computing a 3-by-3 convolution using 16-bit weights without resorting to generating partial results, as described later.

Figure 1L:
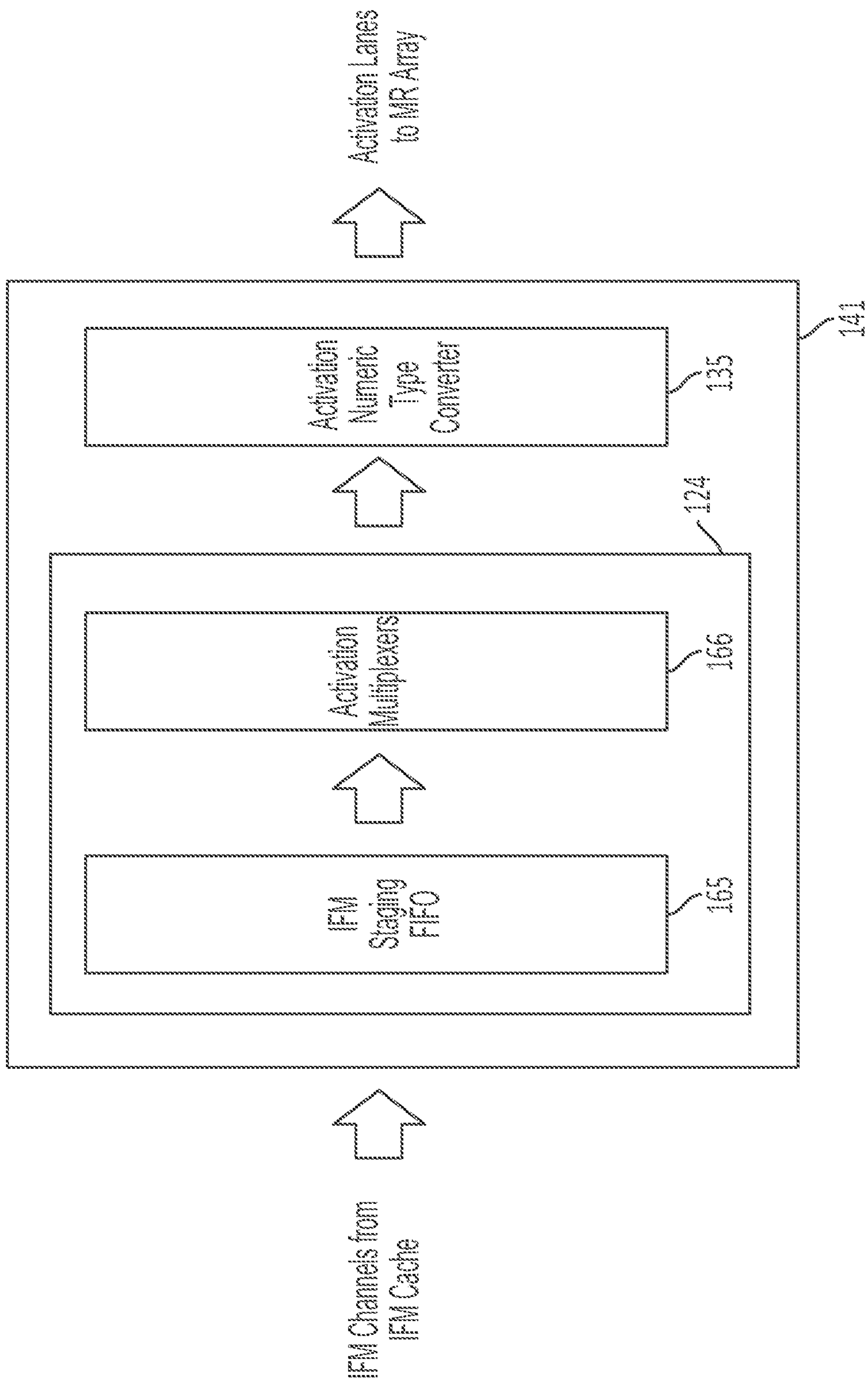
FIG. 1L is a block diagram depicting a portion of a neural processor according to the subject matter disclosed herein.
Figure 1M:
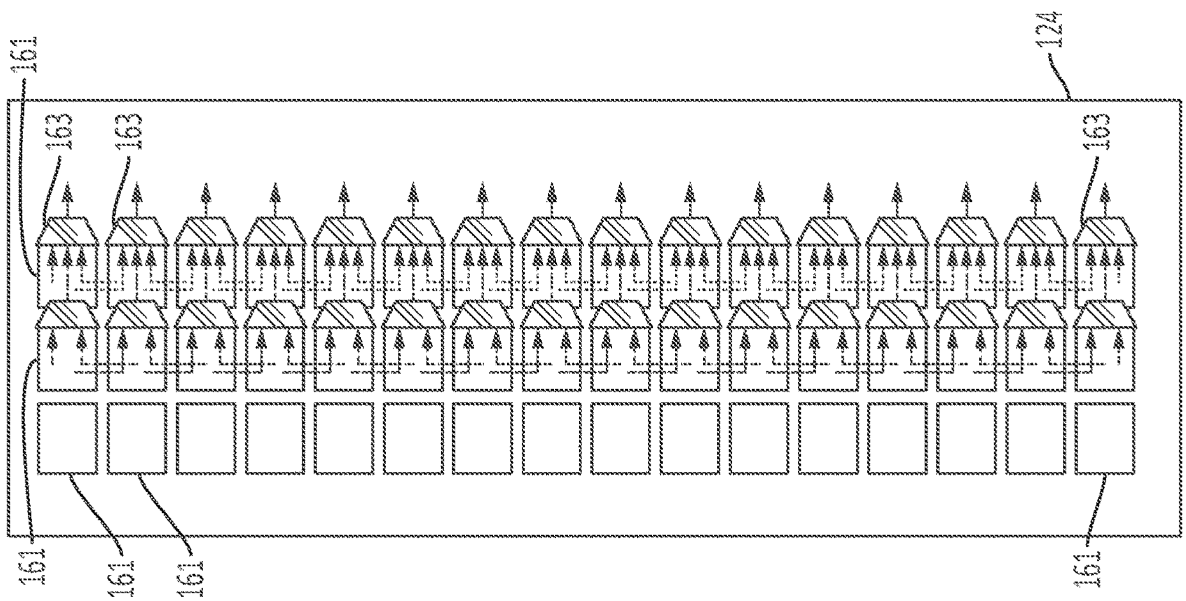
FIG. 1MA is a block diagram depicting a portion of a neural processor according to the subject matter disclosed herein.
Figure 1M:
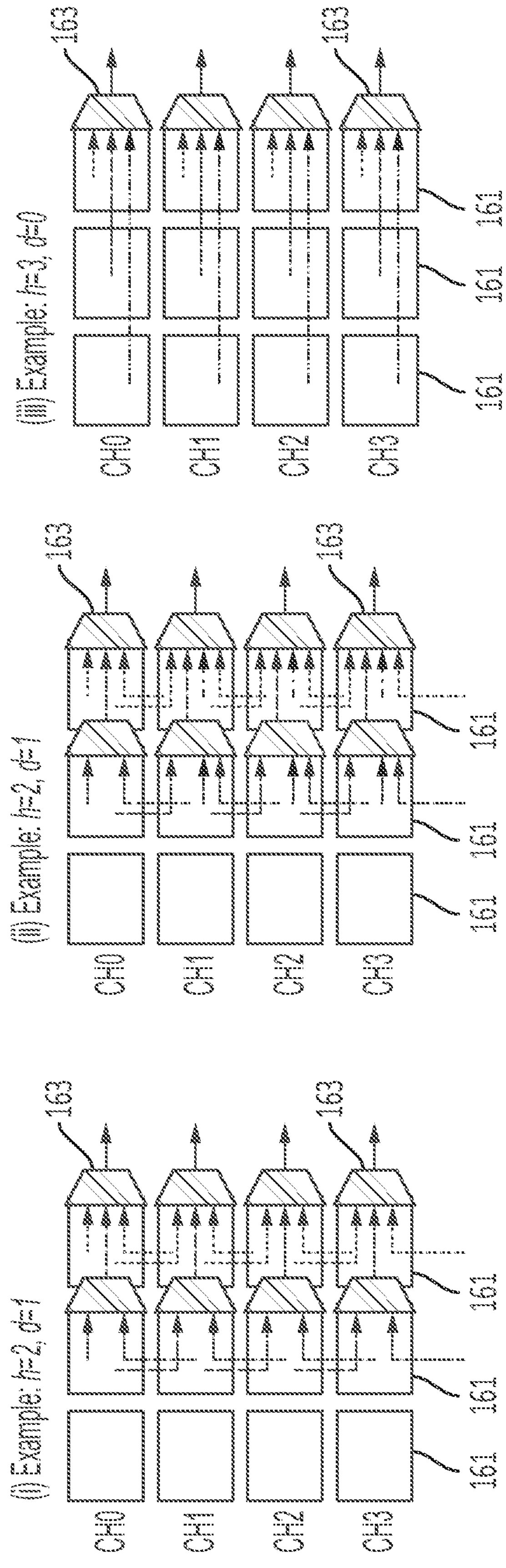
Figure 1N:
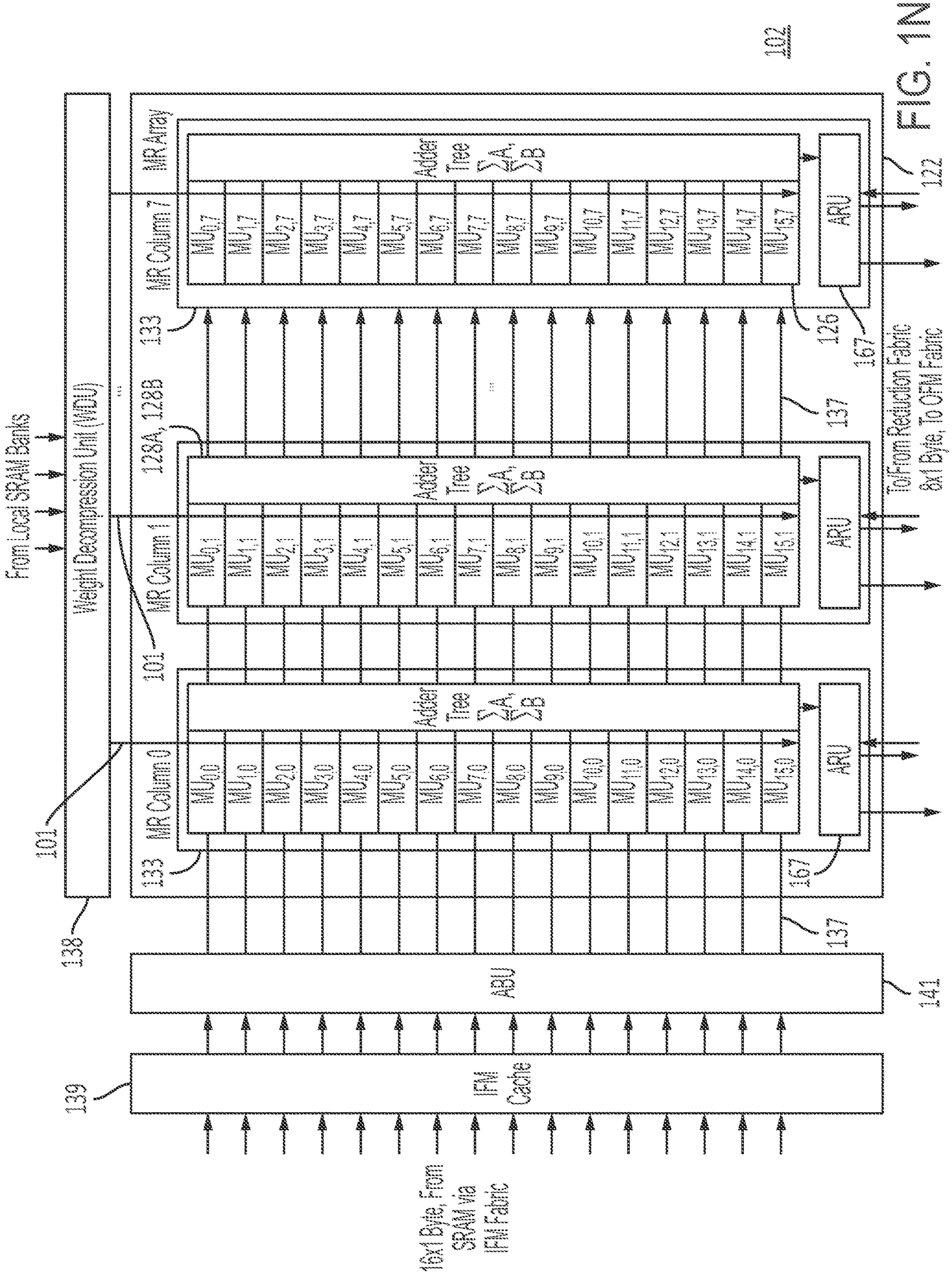
FIG. 1N is a block diagram depicting a portion of a neural processor according to the subject matter disclosed herein.

The register file 127 includes a single input port to load weights {swt_in[C], wt_abs_Id_in[7:0][C]} over a vertical weight load bus 101 (FIG. 1N). Each MR column 133 C receives its own weight load bus in which C ranges from zero to seven. Weights are loaded from a Weight Decompression Unit 138 (FIG. 1N) one entire lane at a time (i.e., in all eight columns in a single lane simultaneously) by placing weight values {swt_in[C], wt_abs_Id_in[7:0][C]} on the vertical weight load buses 101, specifying an index of the destination register (from zero to seventeen) on the weight register index bus wt_Id_idx[4:0], and asserting the lane weight load enable wt_Id_en_lane[L] to load weights into lane L.

From FIG. 1K, it takes eighteen cycles to load all weights in a single lane and 18*16=288 clock cycles total to load all weights in the entire MU array 122. In some situations, this speed of weight loading may be insufficient, in particular when computing a fully-connected (FC) layer. Unlike a convolution-layer computation, during a FC-layer computation each weight is used only once and is discarded thereafter. Therefore, to maintain maximum utilization of multipliers 126 when computing an FC layer, it is necessary to load one weight in each multiplier unit 103 every clock, which is sixteen times faster than the base circuit depicted in FIG. 1K. In this case, the embodiment may be, for example, modified to include additional weight load buses 101 {swt_in[C0], wt_abs_Id_in[7:0][C0]}, {swt_in[C1], wt_abs_Id_in[7:0][C1]}, etc., to accelerate weight loading.

In FIG. 1K, the weight register file 127 includes three output ports to enable fetching three weights simultaneously in case one of the weights is to be shifted one lane up, while the second weight is shifted one lane down, and the third weight is being consumed locally.

Fetching a weight from the local register file for local consumption is accomplished using the multiplexer 147. For example, in FIG. 1C, the multiplexer 147 selects the locally-stored weight $w_{0,0,a}$ that is to be multiplied with the IFM value $a_0$. As another example, in FIG. 1D, the multiplexer 147 selects the locally-stored weight $w_{1,0,c}$ to be multiplied by the IFM value c1.

Fetching a weight from the local register file 134 and shifting that weight to the lower lane is accomplished using the multiplexer 149. For example, in FIG. 1G, the locally-stored weight $w_{0,0,h}$ is shifted one lane down to be multiplied with the IFM value h0.

Lastly, fetching a weight from the local register file 127 and shifting that weight to the upper lane is accomplished using the multiplexer 151.

The Activation Broadcast Unit 141 controls all three register-file fetch multiplexers 147, 149 and 151 respectively using signals sel_wt_self[4:0], sel_wt_dn1[4:0] and signals sel_wt_up1[4:0] because ABU 141 has the complete information about the shift of each activation lane and the offset into the activation buffer associated with each IFM value being broadcast (to activation lanes).

To reduce the area of the MR column 133, the number of output ports in the register file 127 may be reduced from three to two, for example, by disallowing shifting weights up and down simultaneously from the same register file. The number of output ports in the register file 127 may be further reduced to one, for example, by disallowing all weight shifting or allowing either one shift or consuming the weight locally. Limiting the shifting and the maximum shifting distance, however, may somewhat reduce multiplier utilization. Multiple variations and combinations of shift target lane choices with activation buffer depth may be devised to optimize multiplier utilization while reducing MR column 133 and Activation Broadcast Unit 141 complexity, area, and power. A particularly effective method and apparatus to achieve optimized multiplier utilization involves shuffling (permuting) activation lanes in a pseudo-random fashion, while loading associated weights accordingly, as described in a related disclosure.

In FIG. 1K, the multiplexer 143 selects the input weight to be used in the multiplication by the multiplier 126. As discussed previously, the input weight may come from the local weight register file 127, or become "shifted down" from the weight register file in the adjacent upper lane (and same column in some embodiments), or become "shifted up" from the weight register file in the adjacent lower lane (and the same column in some embodiments), respectively denoted by signals {swt_self, wt_abs_self[7:0]}, {swt_dn1, wt_abs_dn1[7:0]} and {swt_up1, wt_abs_up1[7:0]}. The Activation Broadcast Unit 141 controls the multiplexer 143 using a signal sel_mult_wt[1:0] as ABU 141 has the complete information about the shift of each activation lane and the activation buffer offset associated with each IFM value being broadcast (to activation lanes).

For example, in FIG. 1C, the multiplexer 143 selects {swt_self, wt_abs_self[7:0]} carrying weight $w_{0,0,a}$ that is to be multiplied with the IFM value $a_1$. In FIG. 1D the multiplexer 143 selects {swt_self, wt_abs_self[7:0]} carrying weight $w_{1,0,c}$ that is to be multiplied with the IFM value c1. In FIG. 1G, the multiplexer 143 selects {swt_dn, wt_abs_dn[7:0]} carrying weight $w_{0,0,h}$ that is to be multiplied with the IFM value h0 by the second-from-top multiplier 126 in column zero.

Note that, as shown in FIG. 1K, each register file 127 has a bit width of nine, in which eight bits hold a weight magnitude and one bit holds a weight sign stored in the sign-and-8 bit-magnitude format (and with "zero-point" constant Z pre-added when applicable). The register file 127 bit width may be reduced to eight bits by adding logic that converts a signed int8 type to a sign-and-8 bit-magnitude representation (including zero-point addition when applicable) on-the-fly as weights are fetched from the register file 127. Such an on-the-fly conversion might be of interest when the size of the register file 127 has been chosen to be large enough to result in the described area savings.

The Activation Broadcast Unit 141 broadcasts activation {sact, act_abs[7:0]} to be used as an input to the multiplier 126. The logic gates 145 and 159 use signals wt_zero and act_zero (an auxiliary signal from ABU) to check for a multiply-by-zero situation in which the weight (to be multiplied) equals zero or the activation (to be multiplied) equals zero or both. The resulting signal mult_by_zero is asserted if a multiply-by-zero situation occurs, causing the clock for the weight and activation multiplier input registers to be gated using mult_in_ce signal. Gating the clock of the input multiplier registers causes the multiplier inputs and multiplier internal signals to keep (freeze) its previous states, thereby preventing switching activity to reduce dynamic power. In parallel with this activity, the flip-flop gate 157 delays the mult_in_ce signal by one cycle to generate a mult_out_zero signal that causes the logic gate 155 to zero out the multiplier output mult_result[15:0], corresponding to a multiplication by zero. The ABU 141 also sends a signal en_mult to idle all multipliers 126 whenever computation in an entire tile is to be stalled, as discussed later.

The signal names in FIG. 1K follow a convention in which "act" stands for activation, "wt" stands for weight, "s" in "sact", "swt", "mult_out_s", "s_in_a", etc. stands for "sign," and "abs" in "wt_abs", "act_abs", etc. stands for absolute value (magnitude).

The ABU 141 broadcasts activations {sact, act_abs[7:0]} in the sign-and-8 bit-magnitude format. Similarly, the selected (for multiplication) weight {mult_swt, mult_wt_abs [7:0]} is also supplied in the sign-and-8 bit-magnitude format. The registers 136*a* and 136*b* respectively latch the activation and the weight that are to be multiplied to create input signals {s_in_a, mult_in_a [7:0]}, {s_in_b, mult_in_b [7:0]} for the multiplier 126. In some embodiments, the multiplier 126 computes the product by multiplying the two absolute 8-bit values and exclusive ORing the two signs, resulting in a sign-and-16 bit-magnitude output {mult_out_s, mult_out_abs[15:0]}. The logic 153 converts the sign-and-16-bit-magnitude result into a 16-bit signed output that is to be input into an adder tree by negating the product absolute magnitude mult_out_abs[15:0] when the product sign is asserted (i.e., the product result is negative) to produce signal mult_out[15:0]. Lastly, as previously mentioned, the logic 155 zeros out mult_out[15:0] in multiply-by-zero cases.

To summarize the role of the ABU 141 for multiplication control, the ABU 141 provides input IFM data in sign-and-8 bit-magnitude format, weight selection control, including shifting lane up and lane down, and an auxiliary signal act_zero indicating the current activation being broadcast equals to zero. When the act_zero signal is asserted, the actual value of {sact, act_abs[7:0]} may remain unchanged to reduce activation lane switching activity. Although cases of a zero-valued activation being broadcast may happen, some embodiments may minimize such occurrences.

FIGS. 1B-1H depict computation with support for sparse activations by fetching, whenever possible, non-zero-valued activations from the IFM buffer 124 inside the ABU 141, and multiplexing associated weights to multipliers 126 to obtain correct-dot products. The IFM buffer 124 fetches IFM values from the cache 139 and stages the fetched IFM values in an activation staging FIFO 165 (see FIGS. 1L and 1MA). Subsequently, the plurality of activation multiplexers 166 acts to fetch non-zero activations (when possible) from the IFM staging FIFO 165 so that activations may be "shifted" up or down from adjacent lanes, as well as fetch activations out-of-turn.

In FIGS. 1MA and 1MB (discussed below), the "look-ahead" distance (h) is a search distance along the same channel, the "look-aside" distance (d) is a search distance sideways, and the FIFO depth (F) refers to the depth of the activation FIFO 165. For clarity of terminology, the plurality 166 of the activation multiplexers 163 accept IFM channels as input from the IFM staging FIFO 165, apply look-ahead and look-aside to fetch activations, and output resulting values to activation "lanes" (not channels). Use of the terminology "lanes" helps distinguish the notion of logical indexing of depth "channels" within a tensor vs. activations flowing along physical hardware "lanes".

The registers 161 inside the IFM staging FIFO 165 may be optional and are shown for the sake of explanation clarity. In some case, it might be possible to reduce area and power by eliminating the activation staging FIFO registers 161, connecting the IFM multiplexers 163 to a multi-port cache output directly, and revising the IFM cache read logic to fetch the IFM values from the cache 139 directly to the multiplexers 163 in the correct order.

FIG. 1MA depicts a configuration of the multiplexers 163 that may be used to select an activation from the activation staging FIFO registers 161 to be broadcast to the MR array 122 (via the type converter 135) and input to a multiplier 126 in any of a plurality of lanes of a tile (e.g., a total of 16 lanes in a tile) from among any one of several possible values stored in the activations FIFO 165, including a value in the same lane and values in other lanes. For a more general case, each cell may go to 2*d multiplexers, and each destination may have an equal number of sources (2*h*d), except that lane 1 and lane 16 have h*(d+1) sources due to being at the ends.

Let the output cache size (C) be defined as the size of the output cache that resides in an Accumulate and Return Unit (ARU) 167 of each MR column (FIG. 1N). Let the input bandwidth (I) be defined as the IFM streaming bandwidth (the number of 16-byte-long IFM vectors per clock cycle); and let the output bandwidth (O) be defined as the OFM delivery fabric bandwidth (the number of 8-byte-long OFM vector results per clock cycle). Further, the raw sparsity ($s_r$%) may be defined to be the observed sparsity based on counting zero elements in the activation tensor (in proportion to the total number of activations in the activation tensor). The actual sparsity (sa %) may be defined to be the actual number of zero elements applied during the two-dimensional convolution (conv2d) process for an activation tensor (in proportion to the total number of activations in the activation tensor), which takes convolution strides into consideration (e.g., convolution striding may not use certain zero-valued activations or may include certain zero-valued activations multiple times), and which takes convolution padding into consideration. The multiplier utilization (UM) may be defined to be the percentage of cycles during which multipliers perform valid multiplications (multiplying non-zero activations). For a 1×1 convolution, for example, if the activation tensor has a raw sparsity of $s_r$%, the multiplier utilization would be ($1-s_r$%) if using a simple, naive approach (i.e., "dense" computation mode with no zero-skipping), and for a non-1×1 convolution, the multiplier utilization is ($1-s_a$%) when using the simple, naive (dense) computation.

FIG. 1MB depicts (i) an enlarged view of four rows of the circuit of FIG. 1MA in a first configuration on the left side of FIG. 1MB (which is the configuration shown in FIG. 1MA); (ii) an enlarged view of four rows of the circuit of FIG. 1MA in a second configuration in the center of FIG. 1MB; and (iii) an enlarged view of four rows of the circuit of FIG. 1MA in a third configuration on the right side of FIG. 1MB. In the first configuration, look-aside multiplexer inputs come from rows above and below, and no look-ahead comes from the same row. The first configuration generally has fewer wires than the other two configurations, and spreads the search for non-zero activation values to other channels (i.e., to fewer rows), which may be advantageous if one channel tends to have consecutive zeros. Further, if targeting a speed-up of a factor of two, then two locations may be sufficient, and channels 1 and 16 have the same number of candidates in the h=2, d=1 configuration. The second configuration may be referred to as a "full multiplex scheme". In this configuration, look-aside multiplexer inputs come from channels above and below and look-ahead inputs come from the same channel of the next depth. In the third configuration, no look-aside multiplexer inputs are used, and look-ahead multiplexer inputs come from the same channel only (i.e., look-aside d=0). The third configuration has a relatively low complexity, i.e., fewer than half of the multiplexers and wires are needed, and may allow a simpler weight skipping support at a cost of somewhat reduced multiplier utilization.

FIG. 1N depicts a top-level diagram of a tile 102 including the MR Array 122 containing a grid of the MUs 126 organized in eight MR columns 133 and 16 rows. Each MU 126 element includes subscripts ($MU_{row,col}$) corresponding to the row and column coordinates of the MU within the MR array 122. The weight decompression unit 138 may receive compressed weights from SRAM bank set 109 situated local to the tile, and decompress weights during the process of writing the weights to the weight registers 127. The weights may be compressed to take advantage of sparsity in the weights, thereby reducing the memory used for storing the weights and reducing the bus bandwidth used for transmitting the weights to the multiplier units 126. Alternatively, weights may be stored in the SRAM bank set 109 uncompressed. The IFM cache 139 may be used to cache IFM data to reduce a bottleneck effect of the IFM delivery fabric 104, and the ABU 141 may be used to implement skipping of zero-valued activations (or "activation skipping") as described in the context of FIGS. 1D-1H.

Figure 1O:
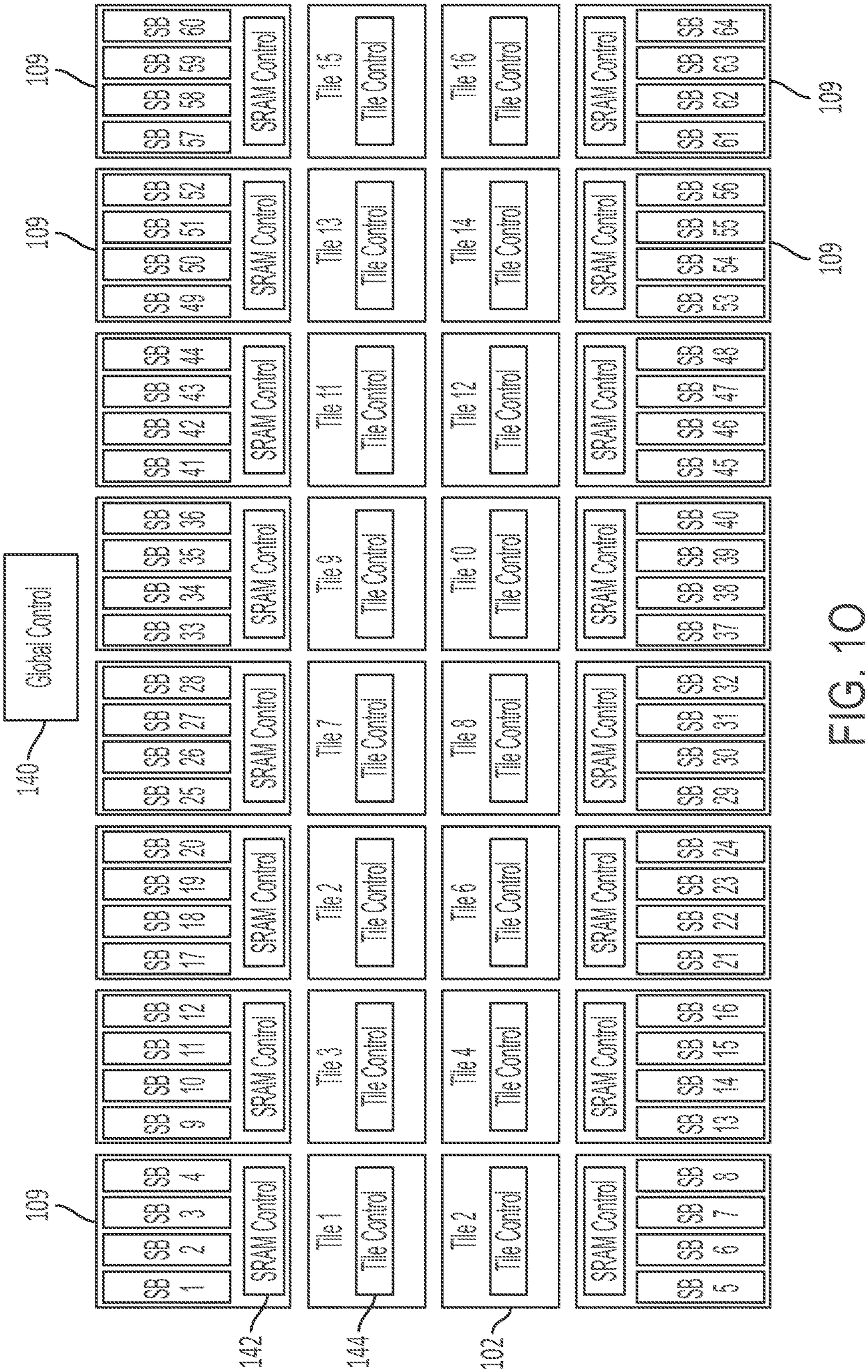
FIG. 1O is a block diagram depicting a neural processor according to the subject matter disclosed herein.

FIG. 1O depicts the hierarchy of neural processor control. The neural processor 100 may have state machines, or "control finite state machines" (control FSMs) or "control logic" that may control the various elements depicted in FIG. 1A. The control hierarchy may have two levels that include a "global" level and a "local" level. In operation, a global control (GC) FSM 140 orchestrates operation of local control state machines 142 and 144, including starting a weight load phase, and starting, and controlling, a computation phase. Since tiles 102 support skipping zero-valued activations, output rates of the tiles 102 may vary somewhat depending on the actual sparsity of IFM slices being received by each tile 102. Therefore, computation in the tiles 102 may run a few clocks ahead or behind. Thus, the global control logic 140 coordinates operation of the local tile control logic 144 to bring the outputs from the plurality of tiles 102 back into sync to complete reduction using the reduction fabric 111 and transmit final OFM results via the OFM delivery fabric 106 to the SRAM bank sets 109. The synchronization of outputs of the plurality of tiles 102 may be accomplished, for example, using a small output FIFO 198 (also 179) (FIG. 1X) inside the ARU 167 and, in extreme cases of a tile output FIFO 198 becoming full, by throttling (stalling) the tile 102 having the output FIFO full to allow other tiles to catch up.

Each of a plurality of SRAM control (SC) FSMs 142 may generate SRAM addresses and read/write signals for each SRAM bank within the SRAM bank set 109. Each of a plurality of tile control (TC) FSMs 144 may skip activations when an activation has a value of zero. To prepare for operation, a host CPU (not shown) loads the start address and size (height, width, depth, batch size) of each IFM and OFM tensor into the SRAM control FSMs 142; loads the operation type (i.e., fully connected (FC) or convolution) and IFM, OFM. and weight data types to the global control FSM 140, and the IFM and OFM weight cycling configuration, the order of IFM traversal, the number of IFM passes (explained later) and other computation mapping settings, the choice of activation function and pooling (if any); enables or disables partial result generation; loads the weight tensor size (height, width, number of input and output depth channels); loads the zig-zag Z height (discussed below); and loads options for convolution padding and convolution stride into the configuration registers of the FSMs. The host CPU further writes into registers associated with the IFM delivery fabric 104, the OFM delivery fabric 106 and the reduction fabric (RF) 111 to configure connectivity in accordance with operational parameters, including addresses of the IFM and OFM tensors within each SRAM bank set 109. To start operation, the host CPU writes to registers in the global control FSM 140. The global control FSM 140 then signals the SRAM control FSMs 142 and the tile control FSMs 144 to start.

In some embodiments, the global control FSM 140 controls scanning within the convolution window, translates the convolution window, and traverses over the IFM tensor to produce a stream of IFM slices. The global control FSM 140 sends planar pixel (x, y) coordinates; depth channel index d, and IFM slice; and read signals to the SRAM control FSMs 142. Each of the SRAM control FSMs 142 adds start addresses, fetches appropriate IFM data, and outputs data to the IFM delivery fabric 104. Typically IFM (and OFM) tensor size is too large to fit in a single SRAM bank set 109, thereby causing IFM (and OFM) tensors to be sub-divided into portions to be stored across multiple SRAM bank sets 109. During computation, the global control FSM 140 orchestrates IFM and (correspondingly) OFM tensors to be traversed (fetched or stored in a certain sequence) while also effecting on-the-fly reconfiguration of the IFM and OFM delivery fabrics 104 and 106 to fetch IFM data from and write OFM data to the correct SRAM bank set 109.

All tile caches 139 may receive the data substantially simultaneously. The global control FSM 140 computes and provides all tile control FSMs 144 with (i) the address for the IFM cache 139 register file in which to save each incoming data and (ii) a write enable signal to write data from the IFM delivery fabric 104 into the cache 139. The write enable signal is active when an IFM slice comes from an SRAM bank set 109 over the IFM delivery fabric 104 and inactive when the IFM slice has already been cached. As the global control FSM 140 traverses an IFM layer (tensor) in a particular sequence, the global control FSM 140 also keeps track of which IFM slices that are needed for computation have been cached, and signals the SRAM control FSMs 142 when to read data not already-present in the IFM caches 139. If the data has already been cached in the tile cache 139, the global control FSM 140 keeps the read signal inactive so that the SRAM control FSM 142 skips the SRAM read. In order to simplify management of the IFM caches, each IFM slice from the IFM delivery fabric is written to all associated destination tiles (prescribed by mapping, as discussed later) and their respective IFM caches at same addresses in the IFM caches 139 regardless of the destination number of the tile. Since tile computations run at somewhat different rates due to uneven activation sparsity, control logic for each tile manages the IFM cache 139 reading locally, independently of other tiles.

In some embodiments, the process of writing the OFM results is similar to the reading of the IFM values. Due to activation skipping, however, the computation delay may vary. Each tile control FSM 144 has information indicating when all columns in that tile have finished a computation. The tile control FSM 144 of each tile sends an ofm_ready signal to the global control FSM 140, which instructs the SRAM control FSM 142 to write the resulting OFM slice from the OFM delivery fabric 106 to SRAM banks at the proper (x, y, d) index into the OFM tensor. During OFM tensor traversal, the global control FSM 140 generates OFM (x, y, d) OFM slice coordinates in a manner analogous to its generating of IFM (x, y, d) slice coordinates during IFM tensor traversal. Once a computation is complete, the global control FSM 140 sends an interrupt to the host CPU.

As mentioned previously, due to activation skipping, a tile 102 may produce, for example, up to two output results per clock. Therefore, the IFM delivery fabric 104 should be able to supply up to two IFM slices per clock to avoid a decrease in multiplier utilization. Accordingly, the local tile control FSMs 144 may inform the global control FSM 140 about the amount of data in cache remaining to be processed so that the global control FSM 140 may direct the SRAM control logic 142 to resume fetching the IFM data to avoid IFM caches underflow. When any of the tile IFM caches 139 becomes full, the global control FSM 140 instructs the SRAM control FSM 142 to pause IFM tensor traversal, including reading IFM slices from the SRAM 109 and writing IFM slices into the tile caches 139.

Figure 1P:
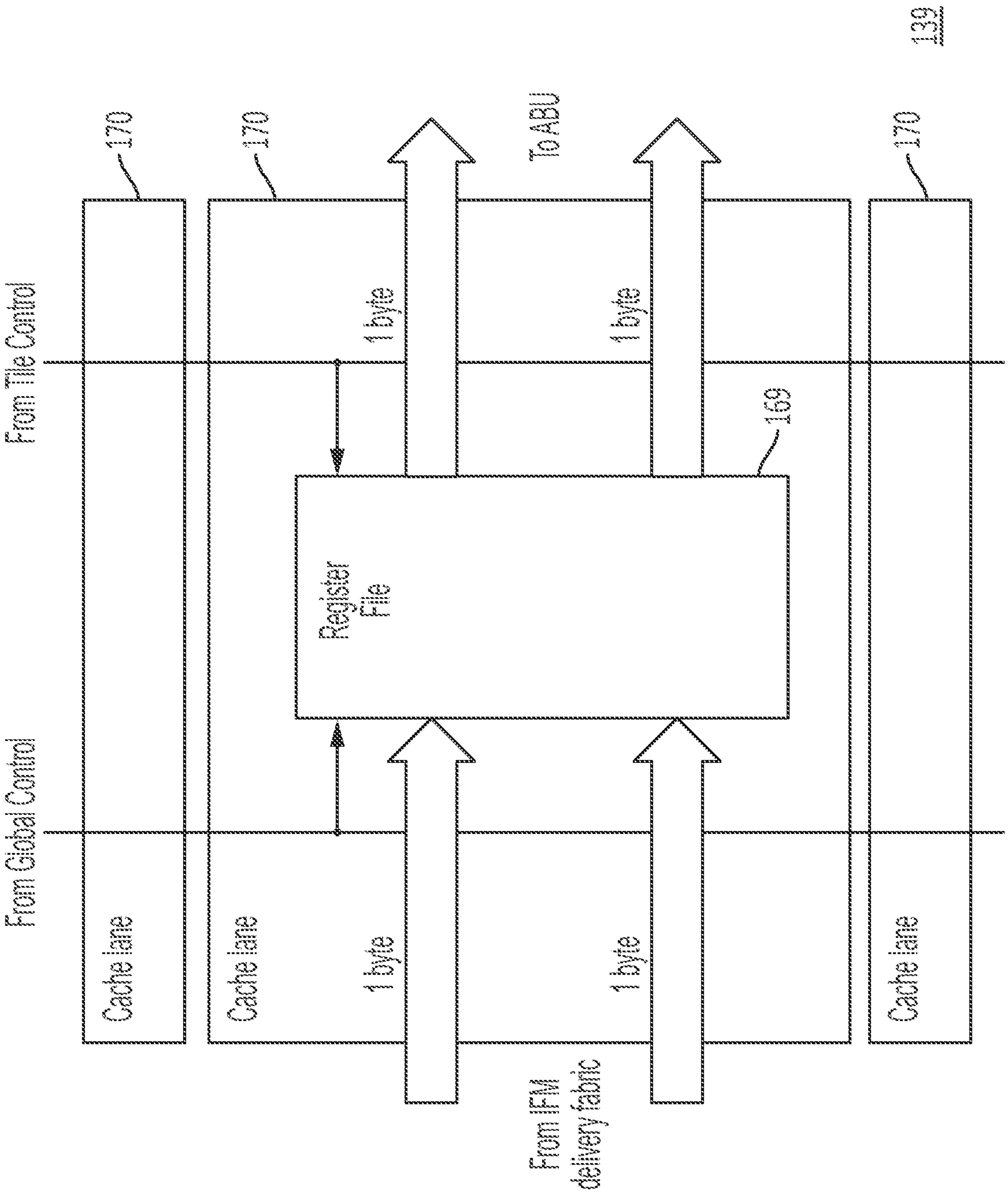
FIG. 1P is a block diagram depicting a portion of a neural processor according to the subject matter disclosed herein.

Referring to FIG. 1P, in some embodiments, the IFM cache 139 includes sixteen lanes 170. Each lane contains a register file 169 with dual input ports and dual output ports. Dual ports may be used because due to activation skipping (and having two adder trees per MU column), the system tile 102 is capable of processing up to two activations per clock (when there are sufficient zero activations). To process activations faster, for example. three IFM slices per clock, a triple input port, a triple output port, triple IFM delivery fabric bandwidth, triple OFM delivery fabric bandwidth and three adder trees per MU column may be used.

Activations are input from the SRAM 109 over the IFM delivery fabric 104 at up to double rate. The tile control FSM 144 keeps track of the amount of IFM data remaining to be processed in each cache lane 146. When any of cache lanes is about to become full, the tile control FSMs 144 may inform the global control FSM 140 that at least one lane cache is about to become full and the global control FSM 140 may throttle (stall) IFM reads controlled by the SRAM control FSM 142 to avoid tile cache lane(s) overflow until cache space frees.

The global control FSM 140 may also inform the tile control FSMs 144 when a convolution window scan is complete (and the window is translated to the next position) and when IFM cycling is complete so that tiles may properly reset column accumulators and do not mix a convolution at one location with a convolution at the next location. The concept of IFM cycling is defined and discussed later.

The tile control FSM 144 generates signals required for reading IFM data from each cache lane register file 169 including read address and read enable for the output port for each register file. Each clock cycle, the tile control FSM 144 reads one or two data values (from one port or both cache ports accordingly) unless the tile 102 has finished processing and is waiting for other tiles to finish processing so that results are available to be reduced by the reduction fabric 111. Whether one or two bytes are read per single clock depends on activation sparsity. The IFM buffer 124 within the ABU 141 checks whether the activations are sparse and may inform the tile control FSM 144 so that the tile control FSM 144 loads one byte if the ABU IFM staging FIFO 165 frees one slot and two bytes if the ABU IFM staging FIFO 165 frees two slots.

The Table in FIG. 1Q depicts the cache size sufficient to hold all IFM slices while performing convolution operation with convolution window sizes of 1×1, 2×2, 3×3 and 4×4 to avoid duplicate reads from the SRAM 109 as the convolution window slides planar-wise from one (x, y) location to the next location. Data in the table assumes that the register file 134 of a multiplier unit 103 contains 18 weight registers and that the convolution window scans the input tensor in a "zig-zag" sequence (as discussed below) because a "zig-zag" scan sequence may act to maximize the use of the IFM cache 139 and thereby minimize reads from the SRAM 109 and power consumption because a single read from the SRAM 109 typically consumes considerably more power in comparison to a single read from a local register file 169.

For example, with a zig-zag scan value, or parameter, Z (discussed further below) set to 2 and an MU 103 holding 18 weights (sufficient to hold two 3×3 8-bit convolution kernels or one 3×3 16-bit convolution kernel), the register file 169 should have a 20 byte size.

Neural networks may have between 50% and 90% of multiplicands in which at least one multiplicand (activation and/or weight) is zero. This may be the case, for example, for an Inception v3 neural network, after applying weight pruning. If an MR tile 102 may skip multiply-by-zero occurrences efficiently, the MR tile 102 may be able to process data in, e.g., 100%−80%=20% of the time taken to process without zero skipping, which is five times faster. As mentioned previously, in some embodiments, the MR implementation may be configured for the cache to use more than two multiplicand inputs to deliver data fast enough (to be multiplied or skipped). In some block diagrams herein, only double input bandwidth (and, an activations buffer 124 that is only two deep) is depicted for simplicity and clarity of the explanation. It will be understood, however, that the depth of the IFM activations buffer 124 may be greater than two, and that the corresponding speed increase (over a configuration in which no multiplications by zero are skipped) may be greater than a factor of two for sufficiently sparse data.

Figure 1R:
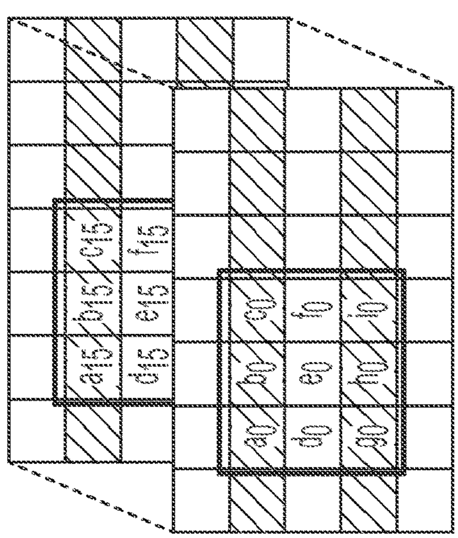
FIG. 1R is a tensor diagram according to the subject matter disclosed herein.
Figure 1S:
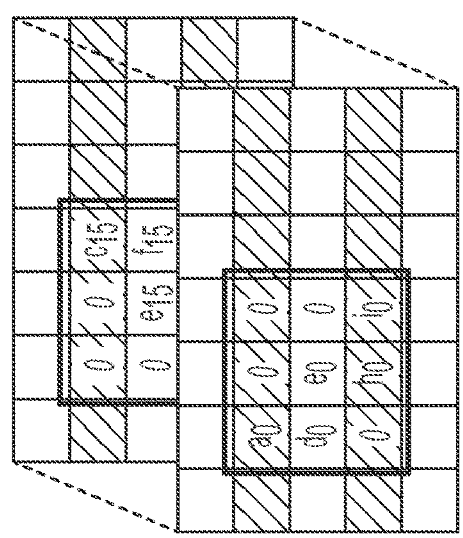
FIG. 1S is a tensor diagram according to the subject matter disclosed herein.

Data sparsity may be used to achieve significant improvements in processing throughput, as described above in the context of FIGS. 1B-1H, and as described in the following paragraphs, by suitable operation of the IFM cache 139 and the ABU 141. FIG. 1R depicts a 3×3 convolution window positioned at a starting location within an IFM tensor (stored in SRAM 109) to initiate input layer convolution. For the layer convolution operation to start, the nine IFM slices $a_0[0 \ldots 15]$ through $i_0[0 \ldots 15]$ are read from SRAM 109, delivered over the IFM fabric 104 to target tiles 102, and written into the IFM cache 139 of each target tile 102. FIG. 1S depicts another example of such data, in which several of the elements are zero.

Figure 1T:
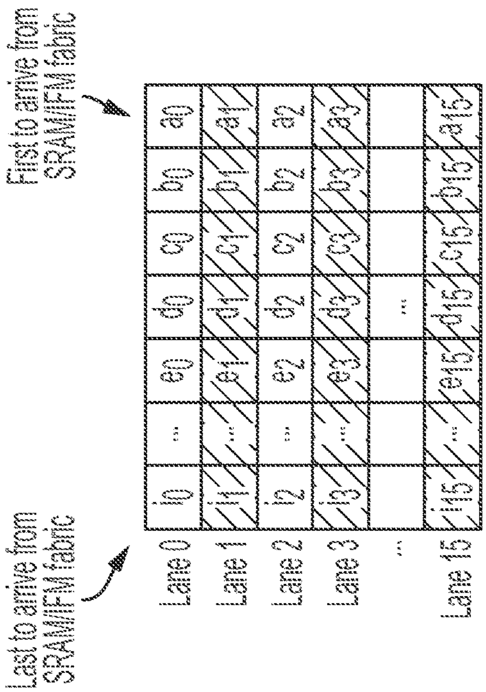
FIG. 1T depicts a data flow in a portion of a neural processor according to the subject matter disclosed herein.
Figure 1U:
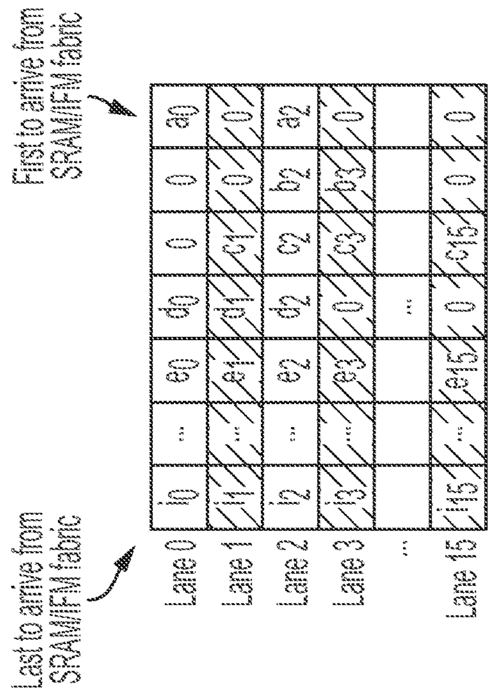
FIG. 1U depicts a data flow in a portion of a neural processor according to the subject matter disclosed herein.

FIG. 1T depicts how the data may be logically stored in the IFM cache 139 just before a layer convolution operation starts, with values ordered in arrival sequence (from SRAM), and does not necessarily show their arrangement according to the actual storage addresses of the values. In the present example, a 3×3 convolution is performed and for clarity, the drawings depict nine (3×3=9) 8-bit activation values, although the cache may store more to accommodate the motion of the convolution window. Similarly, FIG. 1U depicts the present example from FIG. 1T explicitly having some activations having zero values.

Figure 1V:
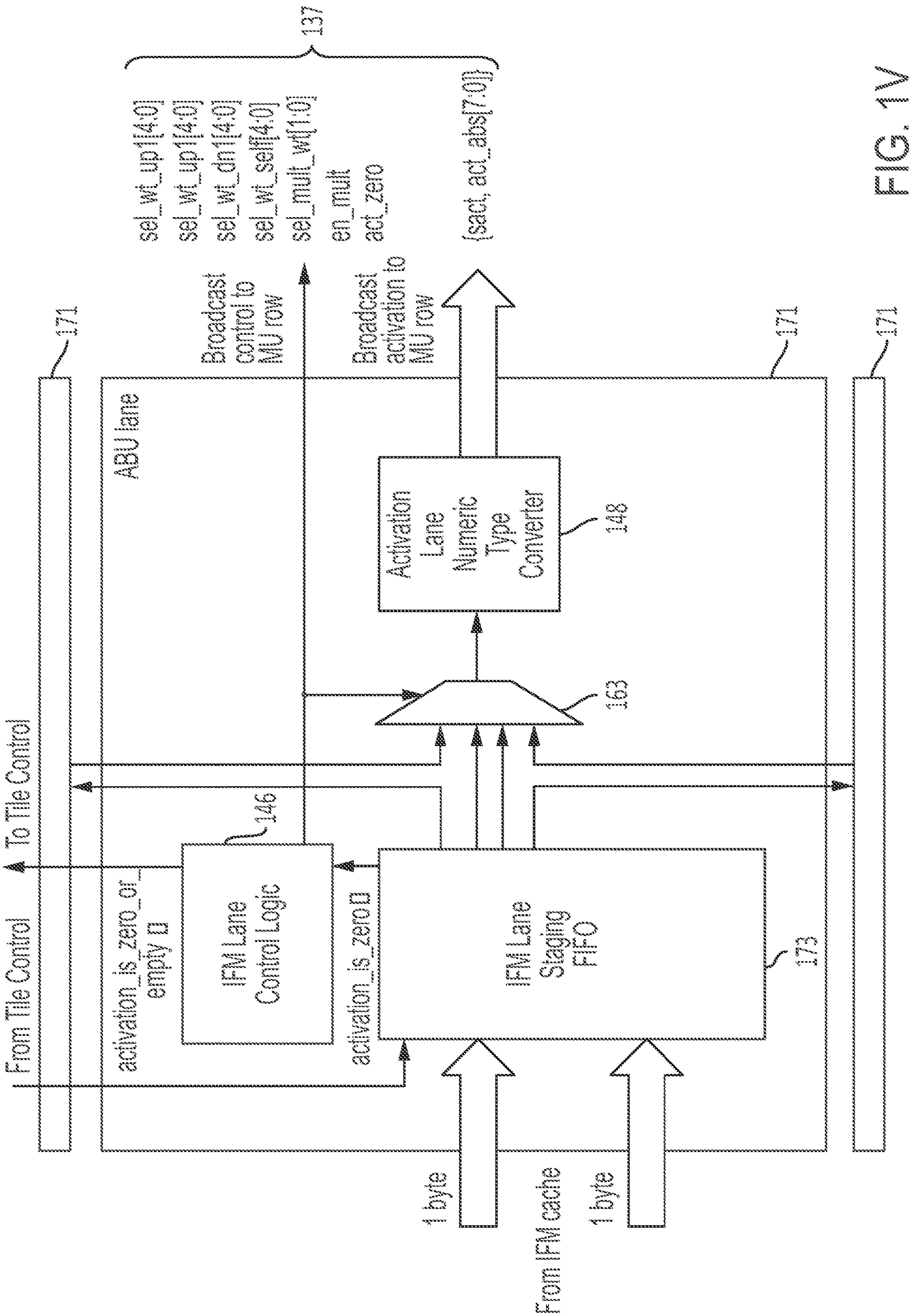
FIG. 1V is a block diagram depicting a portion of a neural processor according to the subject matter disclosed herein.

FIG. 1V depicts a single lane 171 of an activation broadcast unit 141 according to some embodiments. Each ABU lane 171 includes an IFM lane staging FIFO 173, which may be implemented using a register file, a lane multiplexer 163, a lane control logic module 146, and an activation lane numeric type conversion circuit 148. Each ABU lane 141 together with the tile control FSM 144 and other ABU lanes may control activation skipping in that lane, i.e., the skipping of activation elements having a value of zero.

The activation lane numeric type conversion circuit 148 may further convert activations from signed two's complement numerical encoding to sign-and-8 bit-magnitude format in order to simplify multiplier circuits processing signed and unsigned data of various bit width including uint8, int8, uint16, int16, uint24, int24, uint32, int32, etc. Each ABU lane 171 may also broadcast activations to the associated row of multiplier units 126 within MR columns 133 as part of an activation lane 137 set of signals.

The lane IFM staging FIFO 173 has two input ports, two output ports, and may be two-values deep. The two input ports may be used to bring in activations from the IFM cache 139 at a rate of up to two activations (bytes) per clock cycle. As such, when there are enough zero-value activations, it may be possible to process up to two activations per clock cycle as a result of having two adder trees in the MU columns, a lane cache with two input ports and two output ports, and a staging buffer 173 with a depth of two. In some embodiments, if it is anticipated that the IFM data will be sufficiently sparse to justify a larger number of activations per clock, e.g., three activations per clock, activations may be processed by using a circuit having three adder trees per MU column, three lane cache input/output ports, three staging FIFO input ports and a staging FIFO depth of three (in which the "staging FIFO" in this context refers to the IFM lane staging FIFO 173).

The lane control logic 146 may broadcast a set of control signals as part of the activation lane 137 set of signals to the associated row of multipliers 126 to inform the multipliers 126 whether the activation is zero or not. If the activation is zero, the control signals indicate which non-zero activation is being multiplexed to replace the zero, including from which lane and how deep in (offset into) the staging FIFO, so that each multiplier 126 will be able to select the correct weight and adder tree to use for the multiplication. Similarly, the lane control logic 146 also controls the lane multiplexer 163 to multiplex an activation from the correct staging FIFO 173 depth offset located in the correct adjacent IFM channel and onto the activation lane 137.

FIG. 1V depicts the IFM lane staging FIFO 173 having four output logical connections that are sufficient to provide any one of the two buffered activations to the adjacent lane above, any one of the two buffered activations to the adjacent lane below and both buffered activations to the lane activation multiplexer 163. Although FIG. 1V depicts the staging FIFO 173 having four output logical connections, the FIFO 173 has only two physical output ports because the FIFO 173, in the depicted embodiment, is only two-value-deep and thus holds only two values that are available for simultaneous output.

Figure 1W:
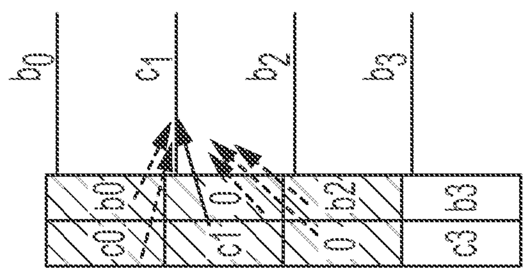
FIG. 1WA is a block diagram depicting a portion of a neural processor according to the subject matter disclosed herein.
Figure 1W:
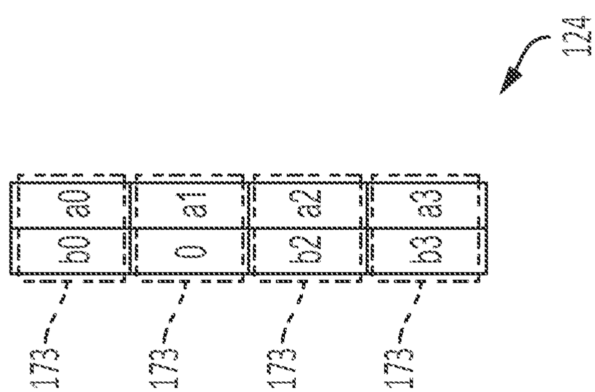
Figure 1W:
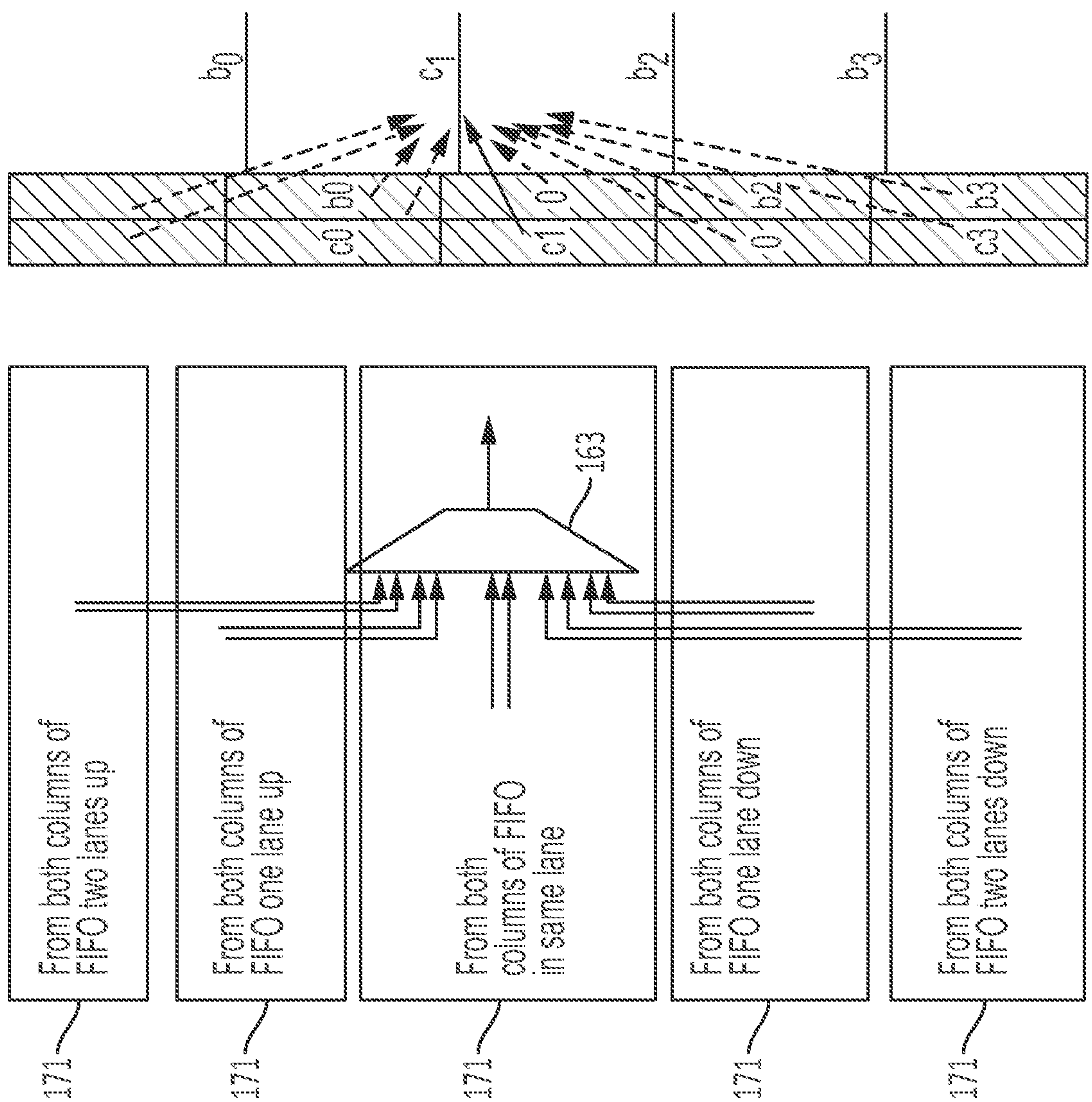
Figure 1W:
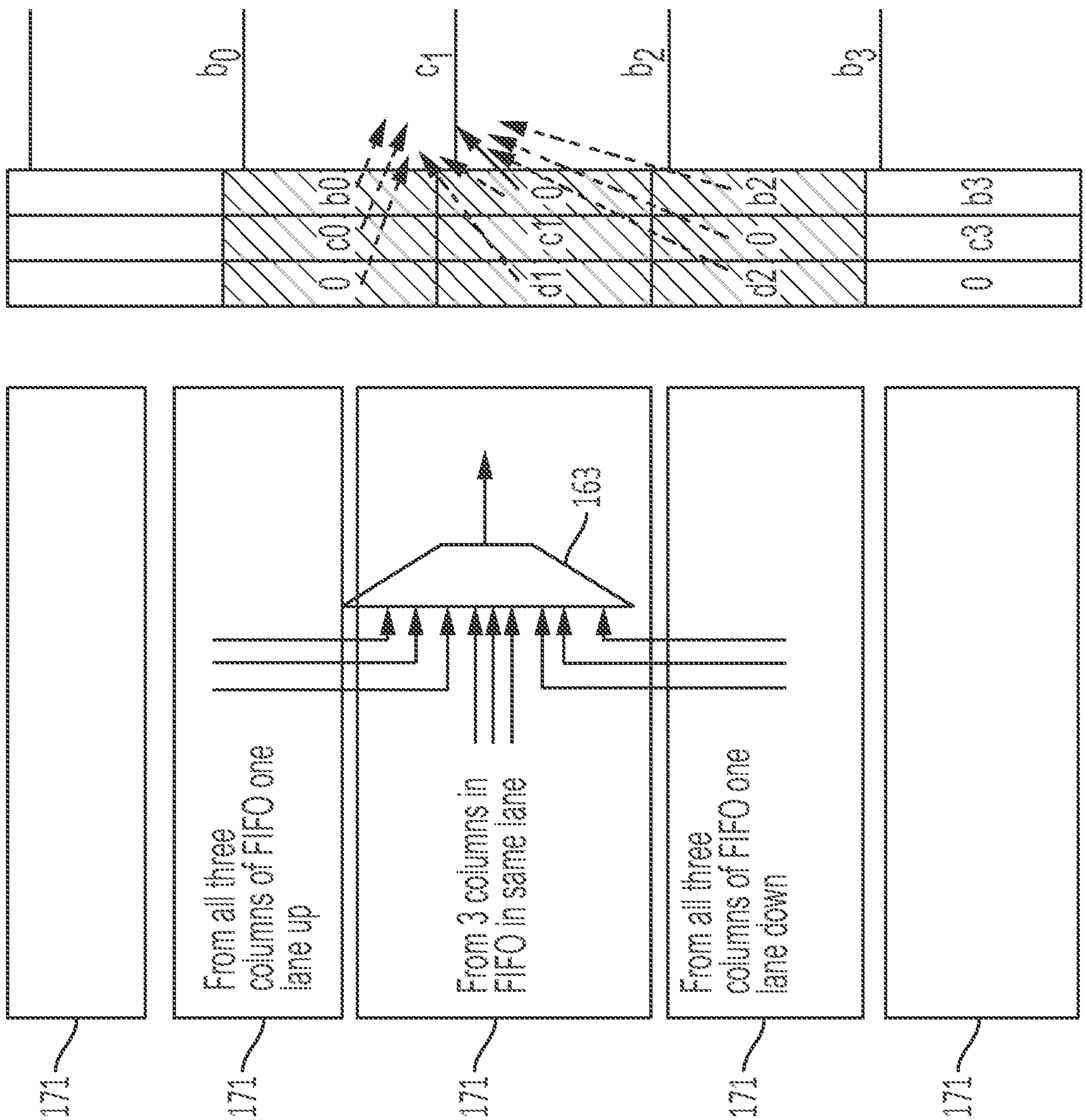
Figure 1W:
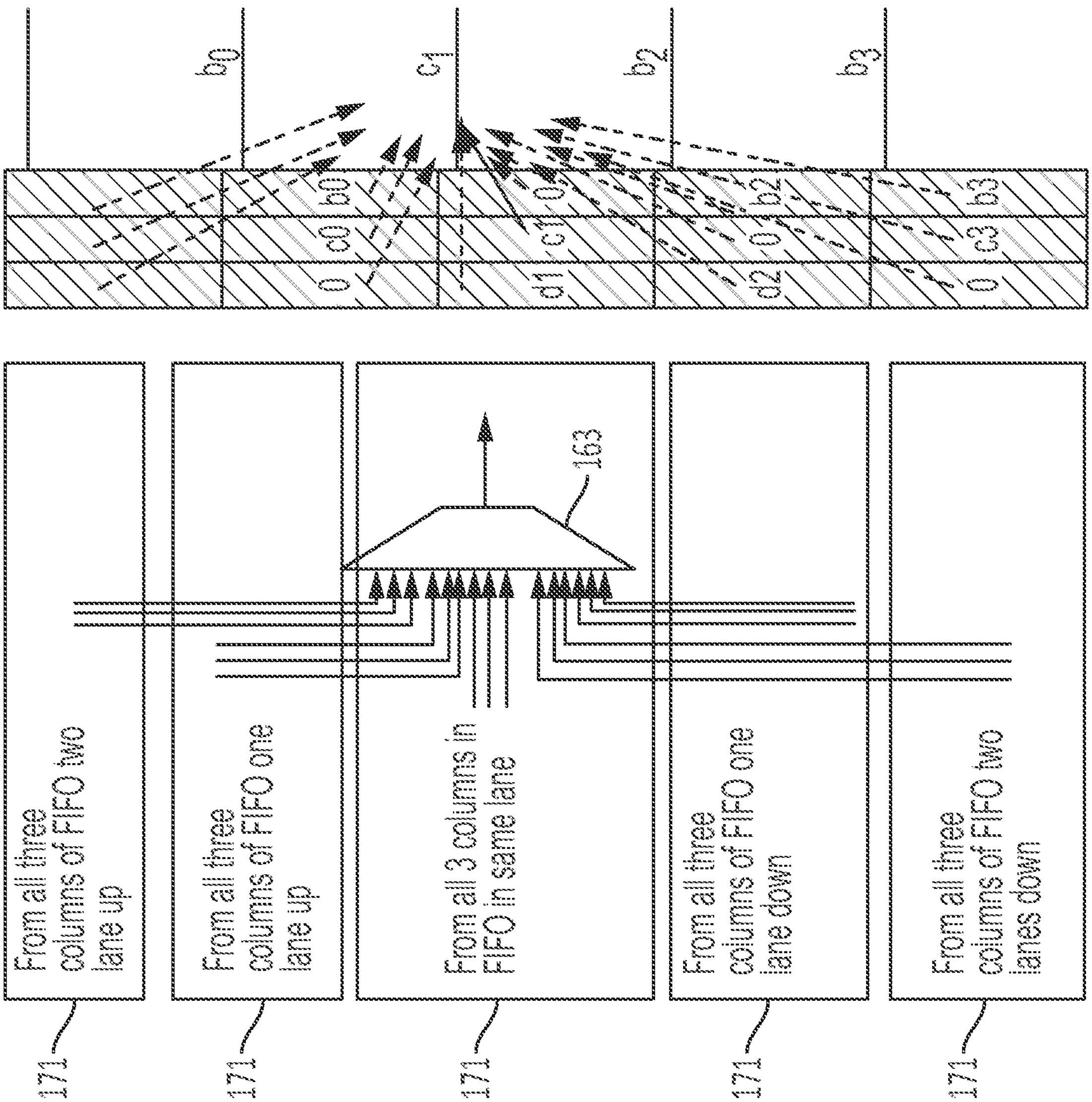

FIG. 1WA depicts the contents of the IFM staging FIFO 165 having four individual IFM lane staging FIFOs 173 (not 16 for clarity of illustration) after the first two vectors of the IFM have been read in (as also depicted in FIG. 1C). In this state, the FIFO may check which activation values are zero and which are not zero. In some embodiments, each FIFO register has a zero detector (e.g., 8-input NOR logic). Each lane staging FIFO 173 reports which activations are zero to the respective lane control logic 146, which keeps track of which activations in that lane have been used (e.g., borrowed, which results in creating a "hole" as depicted in FIG. 1D). The control logic 146 for each lane forwards this information about lane staging FIFO occupancy, including which activations are zero, to the tile control FSM 144. The activations $a_0$, $a_1$, $a_2$, and $a_3$ undergo numeric format conversion (if the activations are signed activations like int8 or int16), become subdivided into 8-bit values (if activation bit width exceeds 8, e.g., uint16, int16, uint24, int24, uint32, int32, etc.), and are broadcast to the respective rows of the multiplier units 126.

On the next clock cycle, the IFM staging FIFO 165 may contain the values indicated in FIG. 1WB (and in FIG. 1D). At this point, the activations $a_0 \ldots a_3$ have been processed, and b0, b2 and b3 are being broadcast to the respective rows of the multiplier units 126. Since b1 is 0, the lane of b1 is unused. The control logic 146 of each lane forwards this information (which activations are zero or "holes") to the tile control FSM 144. The tile control FSM 144 then makes decisions regarding (i) which data to multiplex out (in FIGS. 1WB and 1D, b0 onto lane 0, c1 onto lane 1, b2 onto lane 2, b3 onto lane 3, etc.) and (ii) using inputs from the control logic 146 from every lane, detect whether an entire FIFO column contains holes and/or zeros, and thus may be skipped. When the latter happens, the tile control FSM 144 causes (i) the cache to fetch two values (instead of one) and (ii) the FIFO to accept these two values (instead of one), thus skipping the entire hole-and/or-zero FIFO column. Also, lane control logic also causes the cache to fetch two values if the plurality values in the IFM lane staging FIFO 173 associated with that lane (as opposed to entire column) includes zeros and/or holes.

For example, lane 1 (outputting c1) has 6 choices to output: c0, c1, c2 (which is zero) and b0, b1 (which is also zero) and b2. The multiplexer 163 outputs one of these 6 choices. Which choice to output is determined by the tile control FSM 144. To be able to accomplish this, the multiplexer 163 may be configured to be capable of retrieving data from both FIFO columns one lane above, from both columns of the FIFO one lane below, and from both FIFO columns in same lane as the multiplexer 163. This capability may be implemented using, e.g., circuits similar to those depicted in FIGS. 1MA and 1MB. As mentioned earlier in the description of those figures, the ability to retrieve (and multiplex in) data from one lane above and below may be referred to as a "look-aside of 1," and the ability to retrieve (and multiplex in) data from up to the second-from-right FIFO column may be referred to as a "look-ahead of 2". Each IFM staging FIFO 165 column and lane combination may have a separate look-ahead and/or look-aside value associated with it; however, for clarity and simplification, it may be assumed that all columns and lanes to in IFM staging FIFO 165 have same associated look-aside value and same look-ahead value. Also, other variations may be adopted based on how many inputs each multiplexer 163 has and where those inputs are connected, not covered by the look-ahead and look-aside concepts, including, for example, prohibiting forwarding input from staging FIFO onto same activation lane and connecting lanes 0 and 15 in a more flexible way to compensate for lanes 0 and 15 not having one of two adjacent lanes.

The look-aside and/or look-ahead may be greater than two. Larger numbers may result in better performance by more optimally skipping zero activations so that tile computation time is further reduced. This benefit may be achieved because when the look-aside and/or look-ahead numbers are larger, each lane has more choices regarding from where to retrieve a non-zero activation. More choices of non-zero activations helps spread non-zero activations more evenly across all lanes so that each lane ends up having about the same number of non-zero activations as opposed to some lanes more and others fewer, potentially causing tile processing to wait to complete until the lane with the most activations finishes the computation. As mentioned earlier, spreading non-zero activations may be achieved by shuffling activation lanes and associated weights pseudo-randomly as described in a separate, related disclosure.

FIG. 1WC depicts a configuration in which the look-ahead is 2 and the look-aside is 2 for each FIFO column, and in which the multiplexer 163 has 10 inputs. In such an embodiment, the FIFO may be two-deep and, correspondingly, may have two output ports.

FIG. 1WD depicts a configuration in which the look-ahead is 3 and the look-aside is 1, and in which the multiplexer 163 has 9 inputs. In such an embodiment, the FIFO may be three deep and may have three output ports.

FIG. 1WE depicts a configuration in which both the look-ahead and the look-aside are 3, and in which the multiplexer 163 has 15 inputs. In such an embodiment, the FIFO may be three deep and may have three output ports.

The activation broadcast unit 141 and the tile control FSM 144 may be similarly involved in the operations depicted in FIGS. 1E-1G. For example, FIG. 1E depicts that when c1 has been borrowed (multiplexed from the second-from-rightmost column) in the previous clock cycle, a "hole" is created that the lane control logic 146 (in the lane where c1 originally was) tracks. Each lane control logic 146 informs the tile control FSM 144 of which data cells in the IFM staging FIFO 165 are zero or empty so that the tile control FSM 144 may control the activation multiplexers 163 appropriately. The tile control FSM 144 decides multiplexer control to spread out activations to increase or optimize throughput. Optimal throughput may be achieved when all lanes have the same number of non-zero activations, as opposed to being unbalanced such that some lanes have many non-zero activations, while other lanes (in same tile) have mostly zeros. In such an unbalanced case, lanes that mostly have zeros may finish their computations sooner (i.e., may output all non-zero activations sooner) than lanes having many non-zero activations, which may delay the end of computation of that tile and cause reduced multiplier utilization in the zero-rich lane.

As another example, in the state depicted in FIG. 1G, the lane control logic 146 also receives a multiplexer selection signal from the tile control FSM 144 to keep track of (i) holes that were created and (ii) from where activations were multiplexed. The lane control logic 146 then broadcasts this information to the associated row of multiplier units 126 so that when an activation has been multiplexed out of order (where "in order" in FIG. 1G, for example, means g0 from the activations buffer being output onto activation lane marked as g0), each multiplier unit 126 in that row may multiply that out-of-order activation by its corresponding weight.

For example, if the activation was multiplexed from one lane up from the second-from-rightmost staging FIFO column, the corresponding weight to multiply this activation is located in multiplier units one lane above (for each column), as depicted.

When the look-ahead is greater than two, e.g., three, and an activation is retrieved from the third-from-rightmost column, the corresponding weight to be retrieved is 3−1=2 ahead, meaning that if the in-order activation would have been multiplied with weight w[row, col, i], the appropriate weight to multiply by is instead w[row, col, i+2].

FIG. 1H depicts the (advantageous from a throughput perspective) situation when activations are multiplexed (advanced out of order) so that an entire FIFO column (all 16 lanes) becomes free (contains only zeros or holes). The tile control FSM 144 detects this condition and instructs the IFM cache 139 to load two values into the FIFO because both FIFO columns get consumed simultaneously—the rightmost all-zero column getting skipped (discarded) and the second from rightmost column broadcast and used up for calculation. This reduces computation delay in the tile by one clock cycle.

Figure 1X:
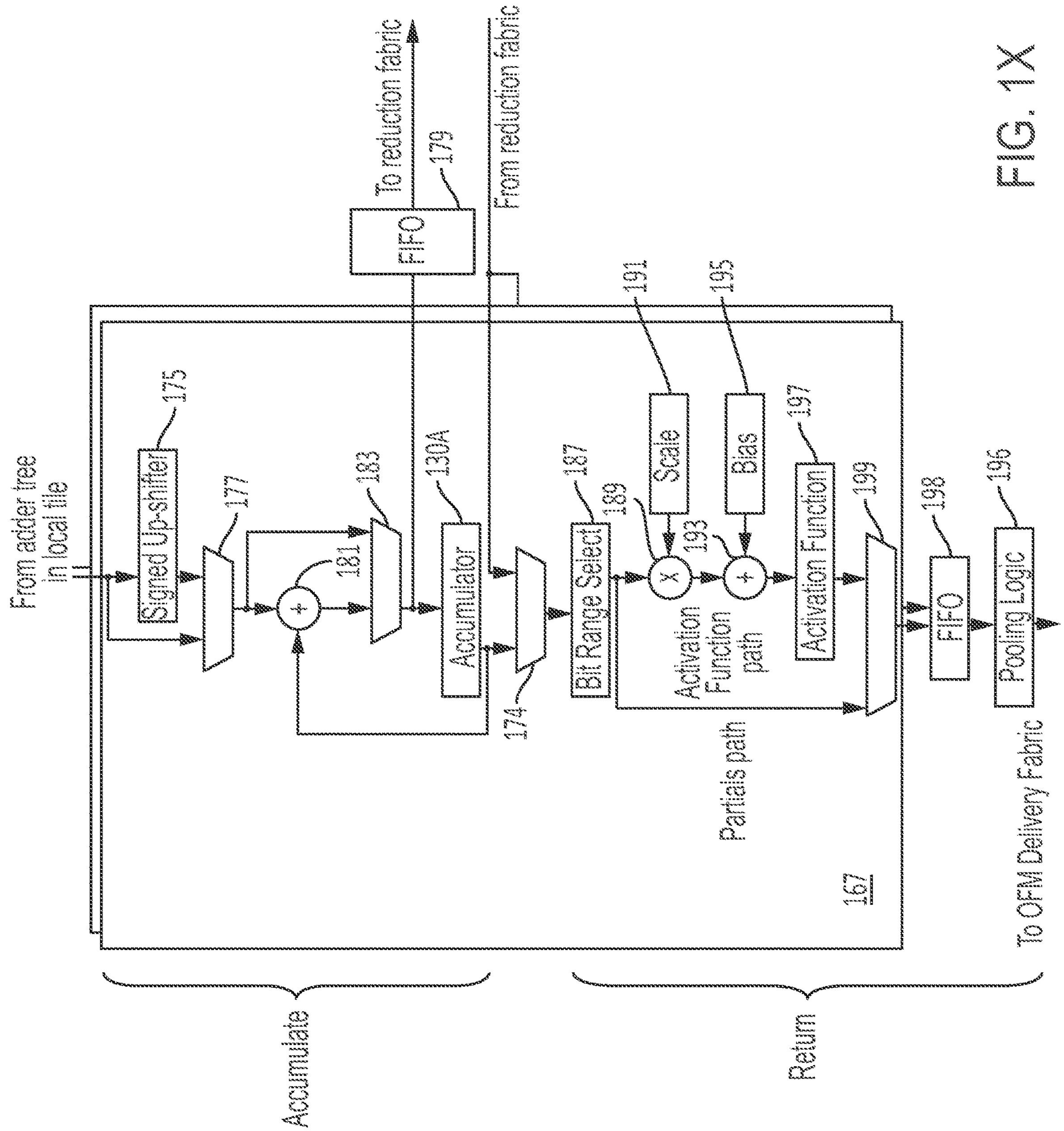
FIG. 1X is a block diagram depicting a portion of a neural processor according to the subject matter disclosed herein.

FIG. 1X depicts the accumulate-and-return unit (ARU) 167. The role of the ARU 167 is to complete dot-product calculation and apply an activation function (when applicable) to produce a finished output feature map (OFM) that is ready for transmission over the OFM delivery fabric back to the SRAM for storage. As depicted in FIG. 1N, each MR column 133 contains two ARUs 167, one per adder tree 128A and 1288.

ARUs 167 have two inputs, one from local adder tree 128A (or 128B) and one from the reduction fabric 111. Central to each ARU 167 is an adder 181 and the accumulator register 130A, which may complete dot-product computation by accumulation (over time), as explained later. To finish OFM computation, a fully reduced dot product may be (optionally) truncated (via rounding) using a unit 187, scaled by a factor 191 using a multiplier 189, may be summed with an OFM bias term 195 using an adder 193, and may pass via an activation function 197. The activation function 197 may be a module that may support one or more activation functions, such as rectified linear unit (ReLU), sigmoid, hyperbolic tangent, and so on. If dot-product reduction cannot be completed (for reasons explained later), the partial dot product, or just "partial product", from an accumulator 130A (130B) may bypass the scaling, bias and activation functions on its way to the OFM delivery fabric 106 via the multiplexer 199 and output the FIFO 198. The multiplexer 183 bypassing adder 181 may allow loading an adder tree value directly into accumulator 130A, e.g., to initiate accumulation.

The multiplexer 174 may select the input source for the ARU 167 for "return" (scale, bias and activation application, when applicable, along with the partials path) between (i) adder trees within same (local) tile where the ARU 167 is located, and (ii) the reduction fabric 111 that comprises a configurable adder tree combining local ("intra-tile") adder trees 128A and 128B into even larger ("inter-tile") adder trees capable of reducing multiplier unit products from multiple tiles, e.g., from 32 or 64 or 128 or 256 multiplier units.

The tile ARUs 167 are controlled by the tile control FSM 144 because the tile control FSM keeps track of which lane and adder tree in each MR column 133 was used to obtain each partial IFM reduction. The ARU 167 has two outputs, including one connecting to OFM delivery fabric 106 via the FIFO 198 and the on-the-fly pooling logic 196, and one connecting to the reduction fabric 111 via the FIFO 179. The tile control FSM 144 also keeps track of the state of the output FIFOs 198 and 179. Because each tile 102 performs calculations at a slightly different speed due to the unpredictability of zero activation skipping, each output FIFOs 198 and 179 acts to restore synchronization of tile outputs by delaying outputs from tiles that end up running ahead (faster) than other tiles. Having tile outputs synchronized by the FIFO 179 may be needed because tile outputs may undergo further reduction by the reduction fabric 111, which may be thought of a set of additional adder tree stages and thus may require its inputs (from tiles) to arrive in parallel and synchronized. Similarly, having tile outputs synchronized by the FIFO 198 may be needed in order to output all channels of OFM slice to the OFM delivery fabric simultaneously. The sizes of the output FIFOs 198 and 179 of four or less entries each may be sufficient in many cases. In cases when an output FIFO 198 or 179 is about overflow in one or more tiles, the tile control FSM 144 may stall computation until the output FIFO 198 or 179 empties. The output FIFOs 198 or 179 may have two input ports in order to merge results from two adder tree (A and B) paths.

Lastly, the tile control FSMs 144 and the SRAM controls 142 work together to read data from the output FIFO 198 perform reduction fabric processing, transmit results over the OFM delivery fabric 106, and for storage in the SRAM 109.

The Activation Numeric Type Converter 135 works together with the accumulate-and-return unit 167 to support signed and unsigned input and output data types of various bit width including being able to use one data type for activations and another data type for weights, arbitrarily, referred below to "mixing data types."

In some embodiments, the following data types may be used: int8, uint8, int16, uint16, int24, uint24, int32, and uint32 for IFM data, OFM data and weight data. As explained below, IFM data and weight data types may be mixed freely. For example, a convolution or a fully-connected layer calculation may be performed using uint8 activations and int8 weights, or int8 activations and int8 weights, or int16 activations and int8 weights, or int16 activations and int16 weights, etc. OFM data type may also be chosen at will, including uint8, int8, uint16, int16, uint24, int24, uint32, int32, and so on, by applying combinations of scaling, rounding and choice of activation function.

Activations may be prepared for operations as follows. Activations may be stored in the SRAM 109, for example, as int8 or uint8 or int16 or uint16, as specified by a user. The IFM data may be fetched to cache (i.e., to the IFM cache 139), then passes through the activation broadcast unit 141, including the activation numeric type converter 135, as depicted in FIG. 1L. As a first step, if activations were quantized using a "zero point" offset quantization, as used in the Google TensorFlow, the type converter 135 adds "zero point" offset to activations. Subsequently, the numeric type converter 135 prepares activations by applying a suitable transform (or "transformation"), which makes possible multiplications that use data types wider than 8 bits, e.g., 16-bit weight and/or 16-bit activations, signed or unsigned, to be performed using 8-bit unsigned multipliers 126. For each lane, the activation broadcast unit 141 broadcasts an 8-bit absolute value act_abs[7:0] of the activation accompanied by a 1-bit sign sact, as depicted in FIG. 1K. The transform applied by the activation numeric type converter 135 converts int8/uint8 to "sign and 8-bit absolute value". If the input activation is uint8, the type converter 135 sets the output broadcast 8-bit absolute value equal to the input uint8 value (i.e., no transform), and sets the broadcast sign to zero (which means that a non-negative value is represented).

If the input activation data type is int8, the activation numeric type converter 135 sets the output absolute value to the absolute value of the activation, and sets the output sign to 1 if the activation is negative and to 0 otherwise.

The weights may be prepared for operations as follows. The weights may be stored in the SRAM 109 as int8 or uint8 or int16 or uint16, as specified by a user. As the weights are loaded into the MU registers, the weights are transformed (using the same transform as that used by the activation numeric type converter 141 to transform activations) in the weight decompression unit 138. The weights are stored as an 8-bit absolute value and a 1-bit sign. Referring to FIGS. 1K and 1N, values represented as int8 and uint8 are converted to 8-bit absolute value wt_abs_ld_in[7:0][C] and 1-bit sign representation swt_in[C] as weights are loaded from the SRAM 109 into the MU registers and input into the multiplier units 103 over vertical weight load buses 101.

Eight-bit multiplication may be performed as follows. A multiplier 126 may be an unsigned 8-bit by unsigned 8-bit multiplier. The multiplication operation may take as an input an activation and a weight, both in 8-bit-absolute-value-and-1-bit-sign representation. The multiplier 126 then multiplies the two 8-bit absolute values, and exclusive ORs the two signs. If the product of the two 8-bit absolute values is zero, the output sign is set to zero. The output of the multiplier 126 (the 16-bit absolute value accompanied by its sign) is then converted to int17 and delivered to an adder tree 128A (or 128B). Subsequently, the adder tree 128 reduces signed int17 values received from column multiplier units and delivers the signed sum to the ARU 167 associated with the adder tree.

In some embodiments, 16-bit and 8-bit input data types may be mixed as follows. An 8-bit weight and an 8-bit activation may be multiplied in one cycle. In some embodiments, all possible combinations of 8-bit numeric data type are supported, e.g., uint8 activation×int8 weight, int8 activation×int8 weight, uint8 activation×uint8 weight, and int8 activation×int8 weight. The product of (i) a 16-bit weight and an 8-bit activation, or (ii) of a 16-bit activation and an 8-bit weight, may be determined, or calculated, using two cycles. The product of a 16-bit activation and 16-bit weight may be determined, or calculated, using four cycles. All possible combinations of 8-bit and 16-bit numeric data types may be supported, e.g., uint16 activation×int8 weight, int16 activation×int8 weight, uint16 activation×int16 weight, uint8 activation×int16 weight, int16 activation×int16 weight, and so on.

In some embodiments, 16-bit activations may be handled as follows. When activations are uint16 or int16, the type converter 135 may prepare the data by applying a transform (similar to the 8-bit transformation described above). Values in uint16 or int16 format may be transformed to 16-bit-absolute value and sign format. If an 8-bit (uint8 or int8) weight is used, the first cycle output of the activation broadcast unit 141 may be the least significant byte (LSB) of the 16-bit absolute value and sign resulting from the transformation (for multiplication with the 8-bit weight), and the second cycle output of the activation broadcast unit 141 may be the most significant byte (MSB) of the 16-bit-absolute value and sign resulting from the transformation (also for multiplication with the 8-bit weight). Both partial product results (each converted to signed int17) may then be sent to the accumulator 130A or 1308 of a column (via a column adder tree 128A or 1288 to the column accumulate-and-return unit 167, as usual) and may be added together by the accumulator 130A (or 130B), except that the most significant byte product may also be shifted up 8 bits using sign extended shift 175 (and multiplexer 177) before being added.

If the weight is 16-bit (uint16 or int16), then four clock cycles may be used to perform the multiplication of a (16-bit) activation and a weight. The first cycle output of the activation broadcast unit 141 may be the least significant byte of the 16-bit-absolute value and sign resulting from the transformation of the activation, the multiplier 126 may simultaneously be input the least significant byte of the 16-bit-absolute-value of the weight, and a first multiplication may be performed. During the second cycle, the product of the same portion of the activation (i.e., the least significant byte of the 16-bit-absolute value and sign resulting from the transformation of the activation) may again be input to the multiplier, along with the most significant byte of the 16-bit-absolute-value of the weight, and a second multiplication may be performed.

The third cycle output of the activation broadcast unit 141 may be the most significant byte of the 16-bit-absolute value and sign resulting from the transformation of the activation, the multiplier may simultaneously be input the least significant byte of the 16-bit-absolute-value of the weight, and a third multiplication may be performed. During the fourth cycle, the product of the same portion of the activation (i.e., the most significant byte of the 16-bit-absolute value and sign resulting from the transformation of the activation) may again be input to the multiplier 126, along with the most significant byte of the 16-bit-absolute-value of the weight, and a fourth multiplication may be performed. All four partial product results may each be output to a column accumulator 130A (or 130B) (via the associated adder tree 128A or 128B for the column to the accumulate and return unit for the column, as usual) and added together, except that the second and third partial product may each be pre-shifted before the addition by 8 bits and by 16 bits for the fourth partial product using a sign extended up-shifter 175 and multiplexer 177.

Performing a convolution operation involves traversing the IFM tensor, stored in the SRAM 109, and streaming contents of the IFM tensor to one or more tiles 102 as a series of IFM slices delivered over IFM delivery fabric 104. An IFM tensor has three dimensions with coordinates expressed as (x,y,d) (and batch index, which is omitted for now for clarity of explanation) in which x and y indices correspond to the planar coordinate of the activation and index d corresponds to the depth channel. The neural processor 100 traverses the IFM tensor by cycling via (x,y,d) index values in a certain sequence. As used herein, cycling over (x, y) coordinates refers to a "planar" traversal and cycling over the d coordinate refers to a "depth-wise" traversal.

The following several paragraphs describe the planar traversal, including the use of the IFM cache 139. Referring to FIG. 1N, the IFM delivery fabric 104 may connect to the IFM tile 102 via the IFM cache 139. There may be one IFM cache 139 per each tile 102, each placed locally to the associated tile. Utilizing the IFM cache 139 (per each tile) helps reduce the number of reads from SRAM 109. Reducing the number of reads from the SRAM 109 may be beneficial in three aspects, including (i) reducing the contribution of the SRAM 109 to the overall power consumption of the neural processor, (ii) reducing chances of SRAM read or write stalls and (iii) reducing the amount of traffic flowing via IFM delivery fabric 104.

The SRAM power-consumption reduction aspect may be of interest when the SRAM 109 consumes a considerably higher power as compared to flip-flop register power consumption, which may happen in practice. The SRAM stall aspect may be of particular importance when the number of SRAM banks, located in each SRAM unit 109, is low compared to the number of input-output (I/O, read or write) operations to be performed. For example, as will be described later, each SRAM bank set unit 109 may contain four SRAM banks, thus able to execute up to 4 I/O operations simultaneously (each clock period). These I/O operations may be an IFM slice read, a write of one or two OFM slices, a partial result read or write and a slice read or write requested by the AXI interconnect 114.

A bank access collision may occur when more than four such I/O operations must access data residing in the same SRAM bank 109 simultaneously or one or more I/O operation must access data in same bank, causing SRAM bank arbitration logic to stall either an AXI access or an IFM data fetch or an OFM data write or partial result I/O, potentially causing a computation stall as well. Hence, the IFM cache 139 may reduce IFM reads from SRAM units 109, thereby acting to reduce the chances of having stalls of these types.

As will be discussed later in more detail, in cases when weight kernel size is particularly large, computation may be split into parts and partially-finished computation results ("partial results" or "partials") may be stored in the SRAM 109. In order to maintain acceptable computation precision, partial results usually have a considerably longer bit width (e.g., 4 or 6 bytes) as compared to IFM data and OFM data. Writing and reading partial results having a long bit width to (from) SRAM consumes correspondingly higher SRAM bandwidth, which may increase chances of SRAM bank access collision and, consequently, AXI and/or computation stalls. Thus, the IFM cache 139 may help alleviate a SRAM I/O bottleneck, in particular, for computations that use partial results.

Reducing the IFM delivery fabric traffic may be of interest when communication bus area comes at a premium. Recall that the IFM delivery fabric 104, as depicted in FIG. 1P, may deliver up to two IFM slices per clock to the IFM cache 139. The IFM delivery fabric 104 may be referred to as having "width of N slices" when the IFM delivery fabric delivers N slices to the IFM cache 139 simultaneously, e.g., every single clock. By caching IFM slices locally to each tile, the IFM delivery fabric 104 may stay idle when an IFM slice that is required for computation has been already cached locally by the tile and is readily available for processing. The IFM delivery fabric 104 having idle cycles (having utilization less than 100%) makes it possible to use the idle cycles to transmit extra IFM slices, thus making the overall "effective" IFM delivery bandwidth exceed 2×. Therefore, when the area of the IFM delivery fabric 104 is at a premium, the width of the IFM delivery fabric 104 may be reduced from, for example, two slices to one slice, while still keeping the overall IFM delivery bandwidth at 1× or more, sometimes reaching 2× or more.

As will be seen below, the IFM cache 139 delivers the biggest benefits for convolution operations having kernel planar width and/or height greater than one. "Depth-wise" convolutions (those having kernel width and height both equal to 1) and fully-connected computations may also benefit from IFM caching, but typically only in rare circumstances.

Figure 2A:
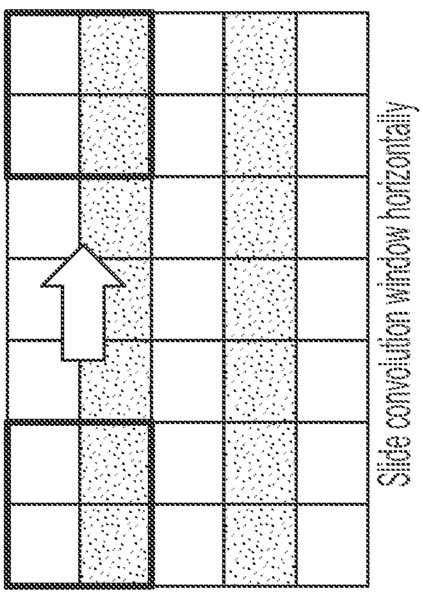
FIG. 2AA is a convolution diagram according to the subject matter disclosed herein.
Figure 2A:
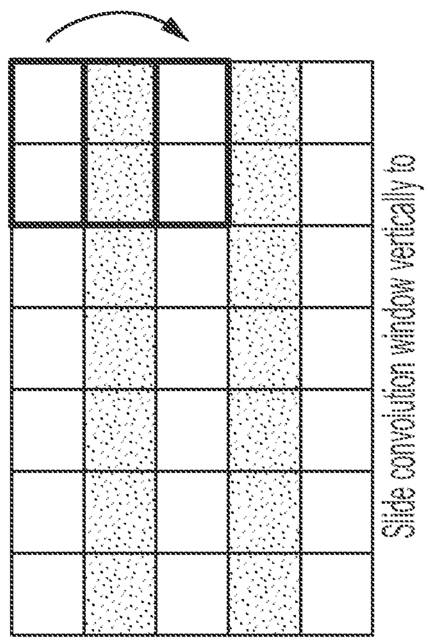
Figure 2A:
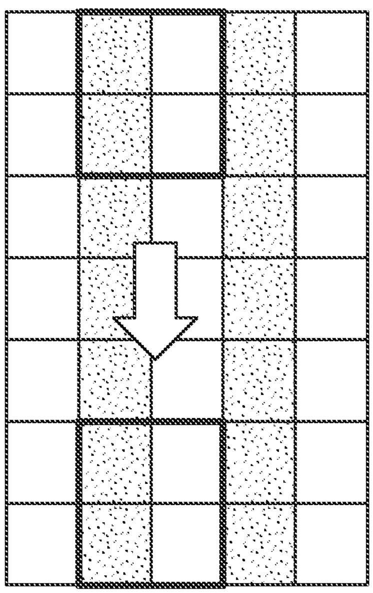
Figure 2A:
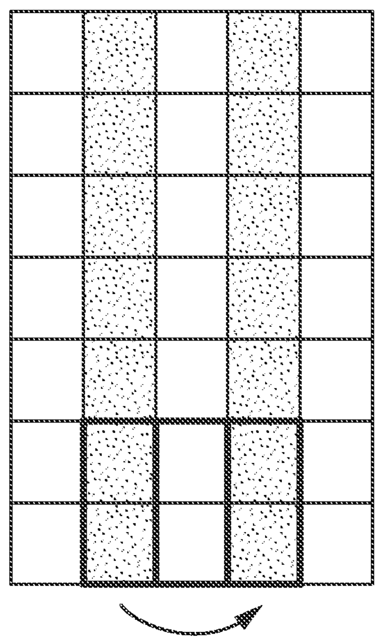

In order to appreciate a solution provided by one embodiment, referred to herein as a "zig-zag" planar traversal, which is designed to increase IFM cache hit rate, first consider traversing the IFM tensor planar-wise in a simple, naïve fashion, using a 2×2×16×16 weight kernel, as depicted in FIGS. 2AA-2AD. Here, 2×2 refers to the planar height and width of the weight kernel, 16 refers to IFM depth (i.e., one slice) and 1 refers to OFM depth. For clarity of explanation, however, the convolution may be treated as purely planar, i.e., 2×2×1×1. FIG. 2AA depicts the convolution operation starting with the convolution (kernel weight) window placed at the upper left corner of the IFM tensor. After computing the 2×2 convolution at that location, the window slides one pixel to the right. The computation followed by the sliding process repeats until the window reaches the upper-right corner of the IFM tensor. Once at the upper right corner, the convolution is calculated and the convolution window now slides one row down, as depicted in FIG. 2AB, instead of to the right. Subsequently, same compute-and-slide steps repeat further, as depicted in FIG. 2AC, except the convolution window now keeps sliding to the left until it reaches the left edge of the IFM tensor where it slides one row down once again, as depicted in FIG. 2AD. Repeating these steps eventually results in a complete planar scan (traversal) of the IFM tensor. Such a scan may be referred to as horizontal (as opposed to vertical) because the window slides predominantly horizontally, i.e., the inner loop cycles over the x coordinate.

Figure 2B:
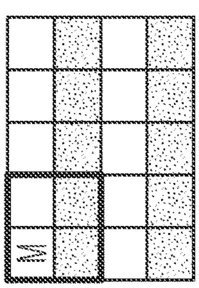
FIG. 2BA is a convolution diagram according to the subject matter disclosed herein.
Figure 2B:
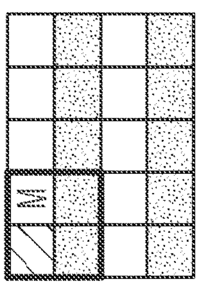
Figure 2B:
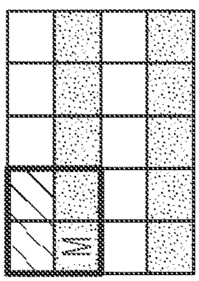
Figure 2B:
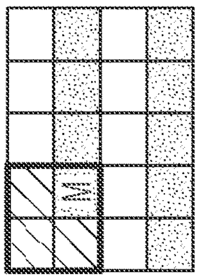
Figure 2B:
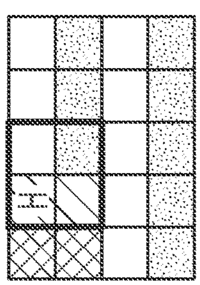
Figure 2B:
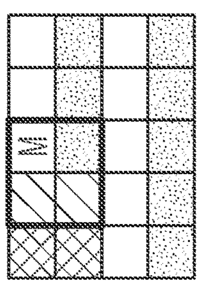
Figure 2B:
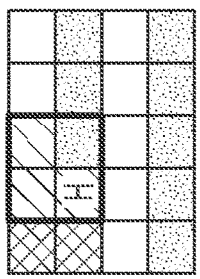
Figure 2B:
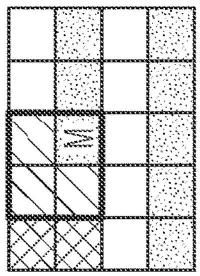
Figure 2B:
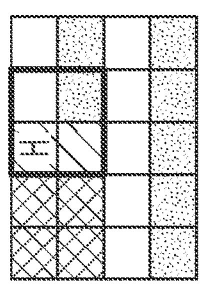
Figure 2B:
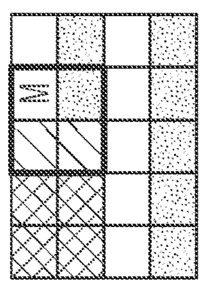
Figure 2B:
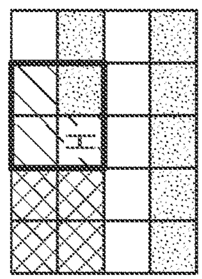
Figure 2B:
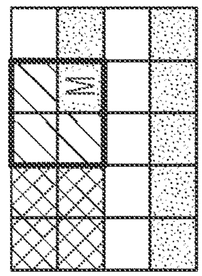
Figure 2B:
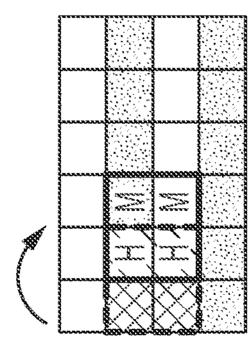

Consider using the IFM cache 139 in conjunction with the simple, naïve "horizontal" scan as depicted in FIGS. 2BA-2BL. In the beginning of the convolution operation, the IFM cache 139 is cleared, the 2×2 convolution window is placed at the top left corner of the IFM tensor, followed by retrieving four IFM values required to compute convolution at that starting location. As depicted in FIG. 2BA, the first of the four IFM values is retrieved from the top leftmost position in the IFM sensor. That position may be referred to as being in row 0, column 0. Because the cache has been cleared, the IFM value at row 0, column 0 must be retrieved from the SRAM 109, not the IFM cache 139, resulting in a cache miss, marked as "M" in FIG. 2BA. Once retrieved, the IFM value becomes cached. FIG. 2BB depicts the second IFM value (of the four) retrieved at row 0, column 1. The cache does not contain the value associated with that location (row 0, column 1), resulting in another cache miss marked by "M". The light shading of the location at row 0, column 0 indicates that the IFM value retrieved in the previous step has been cached. FIGS. 2BC and 2BD depict retrieval of the remaining two IFM values, each resulting in a cache miss. At this point all four IFM values have been retrieved, the convolution calculation at the current location may complete, all four IFM values have also been cached and the convolution window may slide one column to the right.

FIGS. 2BE-2BH depict retrieval of four more IFM values to calculate convolution at the new location. In FIG. 2BE, retrieving the IFM value at row 0, column 1 results in a cache hit, thus obviating the SRAM read. Similarly, FIG. 2BG depicts another cache hit at row 1, column 2, while retrieving the other two IFM values each cause a cache miss.

As the convolution window continues sliding, the leftmost previously-cached IFM values, as indicated by dark shading in FIGS. 2B1-2BL (and FIGS. 2BE-2BH), will not participate in computation for an extended period of time, or at all, until the convolution window slides all the way to IFM tensor rightmost edge, slides one row down and slides all the way back to the cached value. Therefore, once the convolution window slides, these values may be purged from the cache to keep cache size small.

FIGS. 2BI-2BL depict retrieving the next four IFM values to calculate convolution at the next location (one step to the right), resulting in two cache hits and two cache misses. As depicted in FIG. 2BM, caching IFM values horizontally during 2×2 convolution results in, approximately, a 50% cache hit probability (rate) as two out of four IFM values (marked with light shading) are re-used once every time the convolution window slides one step to the right. More generally, a convolution using a H×W planar kernel size in conjunction with horizontal caching, and assuming a cache of sufficient size, results in a H*(W−1)/(H*W) cache hit rate. The cache size sufficient for such convolution may be (W−1) bytes per lane per tile. As will be explained later, however, the neural processor 100 may also use "IFM weight cycling" to accumulate several IFM channels into a dot product by cycling weights of multiplier units sequentially during dot-product computation. Therefore, as will become clear later, in a most general case, the maximum cache size equals to the number of weights stored in the MU weight register file 127 (which equals to 18 for 8-bit weight data types) per lane per tile.

In FIGS. 2BA-2BM, keeping the cache size relatively small requires aggressively purging cache values. Referring to FIG. 2BM, as the convolution window slides over row R (row 2), the IFM values from the previous row R−1 (row 1) have been long purged from the cache (indicated as cache miss "M" at row 1, column 2). In order to increase a cache hit rate above H*(W−1)/(H*W), caching values of one or more rows, for example, might be considered, of the IFM tensor. Caching a whole IFM tensor row, however, would require cache size to increase so that, in general, cache size becomes a function of IFM tensor width. Since IFM tensor width is usually unknown at ASIC design time, and since IFM tensor width may be relatively large, caching IFM rows appears to be expensive in terms of silicon area and thus undesirable. The same reasoning applies in the symmetrical case when the convolution window scans predominantly vertically (i.e., the planar coordinate inner loop iterates over row number) instead of horizontally.

Figure 2C:
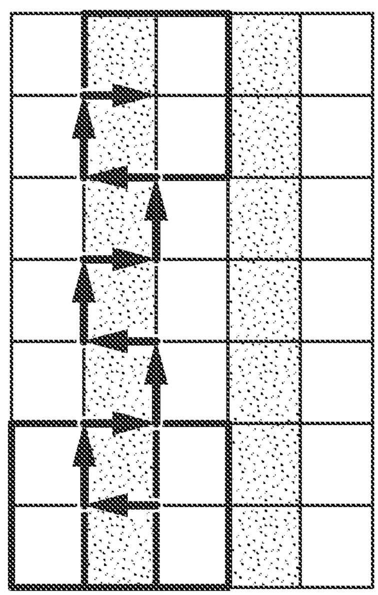
FIG. 2C is a convolution diagram according to the subject matter disclosed herein.

As opposed to the simple, naïve planar scan, some embodiments perform planar traversal of IFM tensor in a "zig-zag" shape during convolution operation. A zig-zag planar traversal may help increase the cache hit probability, while still keeping cache size small. FIG. 2C depicts the down-right-up-right zig-zag path along which the convolution window may be displaced (slide), in such an embodiment. Unlike the simple, naïve horizontal traversal, the convolution window in FIG. 2C slides to the right after having calculated two convolutions (in vertically adjacent locations), not one. Therefore, a single complete left-to-right edge-to-edge sweep of an IFM tensor by the convolution window produces two rows of convolution results, as opposed to one row of results by the simple, naïve horizontal traversal.

In a more general case, a zig-zag traversal may be parametrized using "Z number" corresponding to the number of output rows processed in a single horizontal IFM tensor sweep. For example, in FIG. 2C the Z number equals to two. As will be seen later, higher Z numbers result in higher cache hit rates.

In FIG. 2C a zig-zag traversal producing two rows of results per single horizontal sweep may be imagined as performing a naïve horizontal traversal on an IFM tensor that is twice as wide, but half the height. More generally, a zig-zag traversal path may be viewed as being "unrolled" into a single (horizontal) sweep of length of H*Z columns using a total of H/Z sweeps to complete IFM tensor convolution in which H and W are IFM tensor height and width, respectively. For example, in FIG. 2C, Z=2, and, therefore, instead of traversing H×W IFM layer by simple, naïve scanning, the length of the arrow path is approximately H*Z=W*2 so the logical IFM layer width becomes W*Z=2 W, while the logical IFM layer height becomes H/Z=H/2. The simple, naïve horizontal may be equivalent to a zig-zag traversal with Z=1.

Figure 2D:
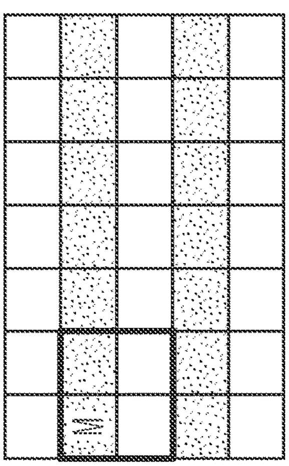
FIG. 2DA is a convolution diagram according to the subject matter disclosed herein.
Figure 2D:
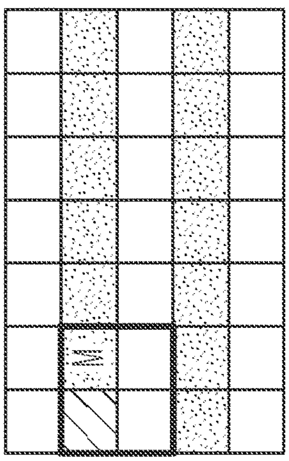
Figure 2D:
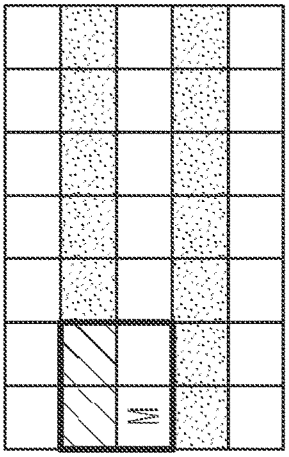
Figure 2D:
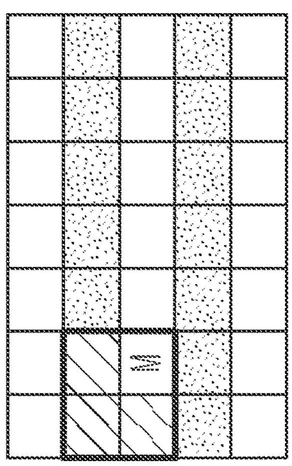
Figure 2D:
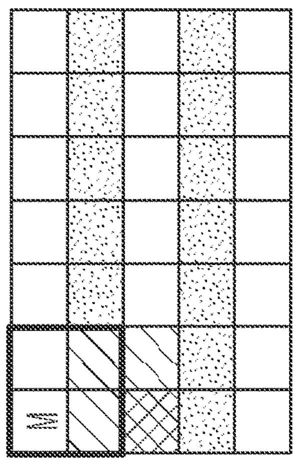
Figure 2D:
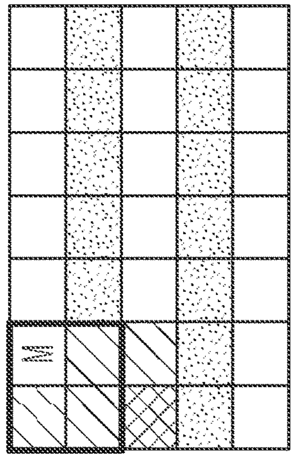
Figure 2D:
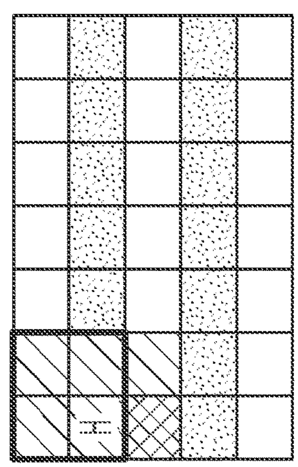
Figure 2D:
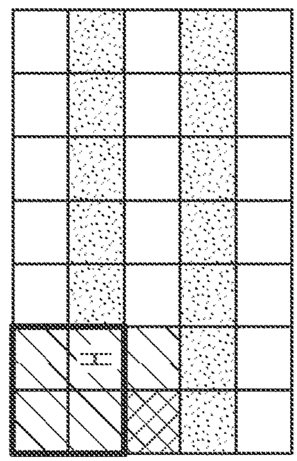
Figure 2D:
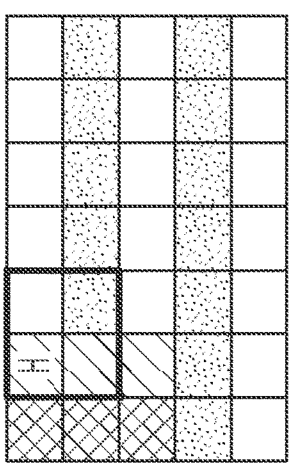
Figure 2D:
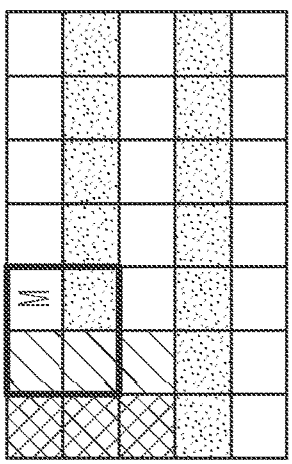
Figure 2D:
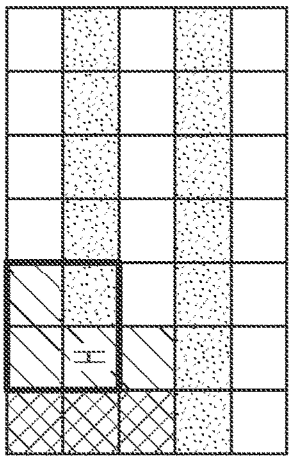
Figure 2D:
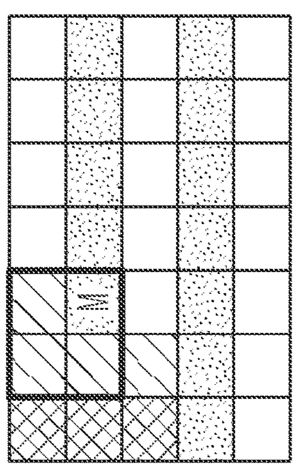
Figure 2D:
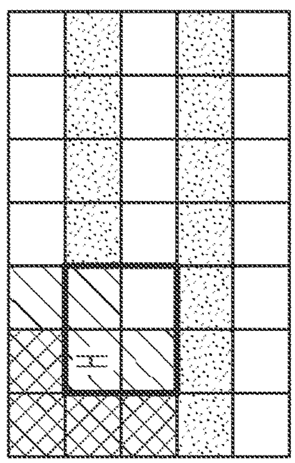
Figure 2D:
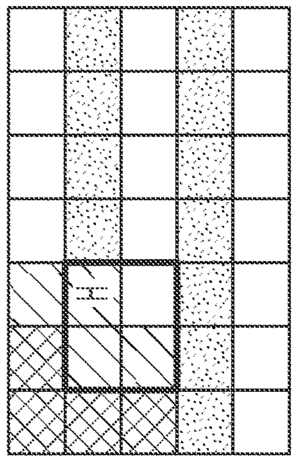
Figure 2D:
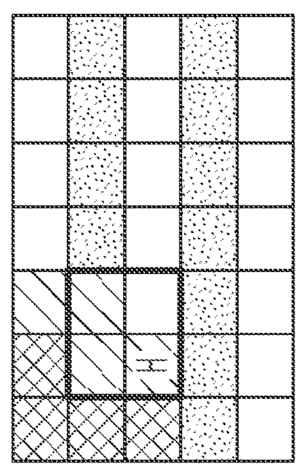
Figure 2D:
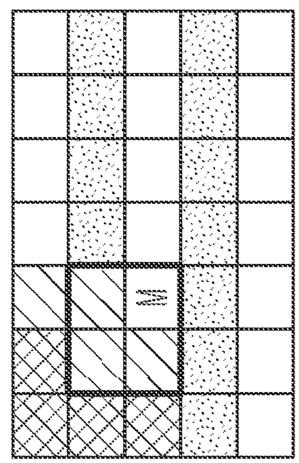
Figure 2D:
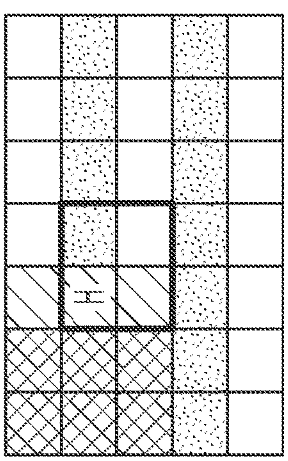
Figure 2D:
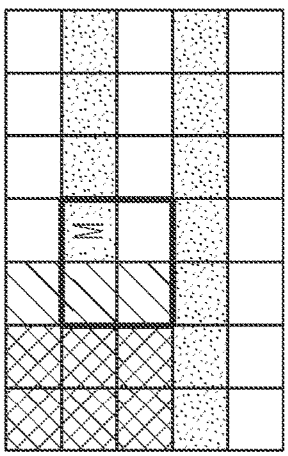
Figure 2D:
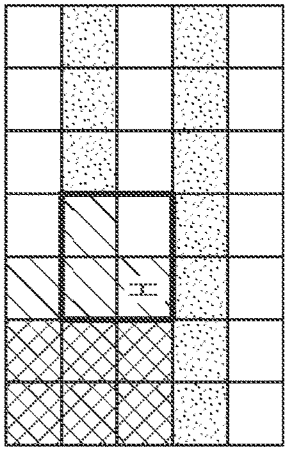
Figure 2D:
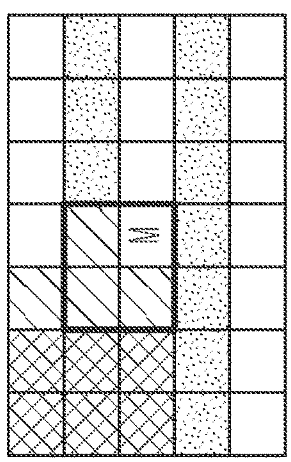
Figure 2D:
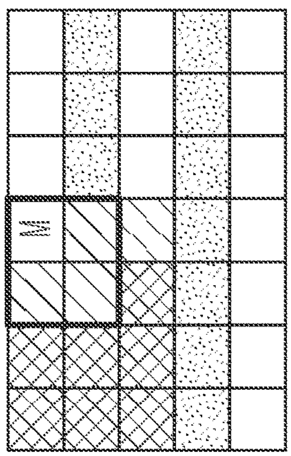
Figure 2D:
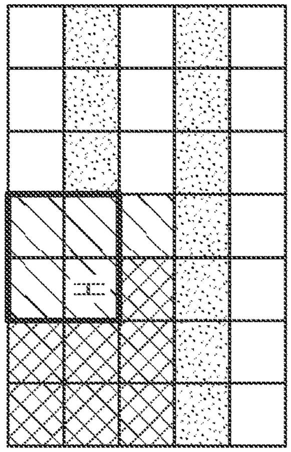
Figure 2D:
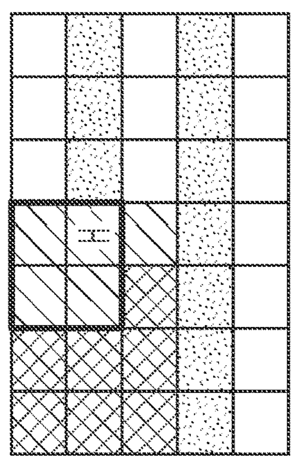

FIGS. 2DA-2DD depict a zig-zag transversal with Z=1 for the first position of the convolution window. Retrieving all four IFM values results in cache misses, causing four SRAM reads to occur. For the next position of the convolution window, fetching two more IFM values results in cache misses, while the other two IFM fetch locations overlap with the previous position of the convolution window, thus resulting in two cache hits, as depicted in FIGS. 2DE-2DH.

As depicted in FIGS. 2DI-2DL, for the next position of the convolution window, two IFM values are cache misses, and two overlap with the previous position of the convolution window, each resulting in a cache hit. For the next position of the convolution window, one IFM value is a cache miss, and three overlap with the previous position of the convolution window, and are cache hits, as depicted in FIGS. 2DM-2DP. As such and further referring to FIGS. 2DQ-2DX, the use of a zig-zag path significantly improves the ratio of cache hits to cache misses.

FIG. 2E is a table showing the actual number of SRAM reads associated with a zig-zag traversal with respect to the number of SRAM reads in ideal cache, i.e., a cache that has infinite capacity and never purges any values. Thus, the table in FIG. 2E is a measure of a zig-zag traversal efficiency. The table assumes that cache sizes are sufficient for a given Z while performing a single sweep, i.e., values from a previous sweep become purged. Lower numbers in the table correspond to higher efficiency, and 1.0 is the ideal case. Convolution size (Conv size) refers to planar dimensions of square weight kernels. For example, a 3×3 convolution with zig-zag traversal having Z=2 results in 2× more SRAM reads as compared to a 3×3 convolution using an ideal cache. A 3×3 convolution using zig-zag traversal having Z=1, i.e., a simple, naïve (e.g., horizontal) traversal, however, results in 3× more SRAM reads as compared to using an ideal cache. Thus, in this case, a zig-zag traversal with Z=2 reduces a SRAM read count by 3/2=1.5× as compared to the simple, naïve traversal, while cache size for both zig-zag Z=2 and Z=1 simple, naïve traversals remains little changed, as computed by formulas described below. Note that larger numbers of Z produce larger SRAM read count savings. For example, increasing cache Z to 4 results in 3/1.5=2× SRAM read savings for a 3×3 convolution.

FIG. 2F depicts a table of average expected IFM SRAM reads per clock that are used for supplying IFM cache, and assuming one IFM slice is processed per each clock. For example, a 5×5 convolution with cache Z=4 performs a SRAM read only 8% of the time on average as compared to 100% (i.e., every clock) without cache and compared to 20% of the time with cache Z=1 (i.e., simple, naïve traversal scheme).

Figure 2G:
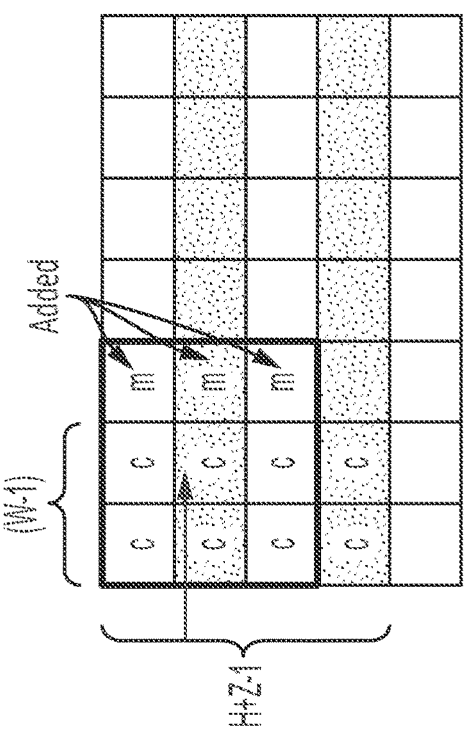
FIG. 2GA is a convolution diagram according to the subject matter disclosed herein.
Figure 2G:
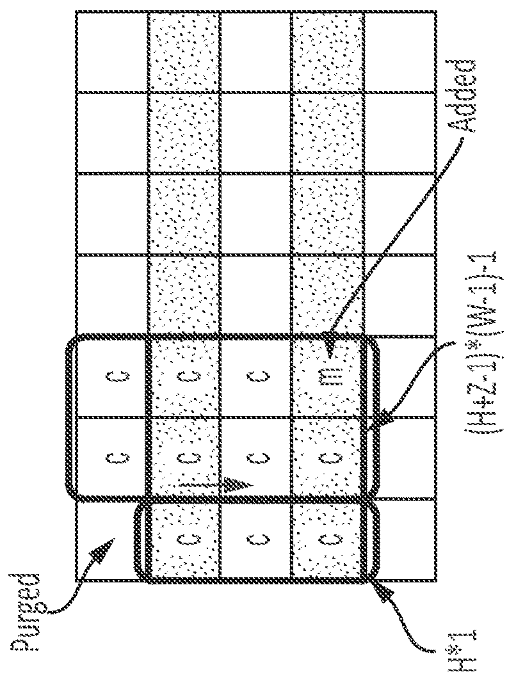

FIGS. 2GA-2GB depict the derivation of the cache hit/miss counts and cache size. A zig-zag traversal involves repetition of a two-step sequence in which the convolution window slides vertically by Z−1 rows, then slides sideways by one column. Ignoring special cases at IFM tensor edges for simplicity, a convolution window of planar size W×H sliding one column sideways (to the right in FIG. 2GA) results in H cache misses (marked "m") and H*(W−1) hits. The following step of sliding Z-1 rows vertically (downwards in FIG. 2GB) results in (Z−1) cache misses and (Z−1)*(H*W−1) cache hits.

Correspondingly, once the convolution window has slid one column horizontally, the convolution window may use previously-cached values (marked as "c" in FIG. 2GA, cached during the previous vertical translation) inside the kernel window for the current calculation. Previously-cached values marked "c" outside the kernel window (below, in FIG. 2GA) also should stay in the cache to be used as the window will start sliding vertically (down, in FIG. 2GA). Also, values fetched from SRAM (marked "m") should be added to the cache to be used in the calculation at the current location as well, after the convolution window slides Z−1 rows down, one column right and comes back up. Next, every time the convolution window slides down one row, one cache value (top left) may be purged and one value from SRAM is added (marked "m"). Therefore, counting the number of "c" marks in FIG. 2GB, the needed cache size is (H+(H+Z−1)*(W−1)).

If weight cycling is used, as explained later, the cache size may be increased by the same factor as the number of kernels stored simultaneously in any tile. As mentioned above, when the convolution kernel is small, the system may store several planar kernels into each MU 103. For example, if the MU 103 has 18 weight registers, and the convolution is 2×2, then four 2×2 kernels may be stored in the MU weight registers 127. For example, a dot product of IFM data having 64 channels 0 . . . 63 may be computed into OFM 0 . . . 7 by cycling over four stored kernels over time. The system may fetch an IFM slice holding channels 0 . . . 15, multiply by the first (of four) kernels, and keep the result in the accumulator of the tile; fetch an IFM slice with channels 16 . . . 31, multiply by the second 2×2 kernel (of four), and add the result to the already-stored accumulator value; and repeat a third and fourth time. These IFMs may also be cached, resulting in a correspondingly increased cache size. The IFM cache size has an upper limit regardless of choice of the planar translation method (naïve or zig-zag or some other), however, that is a function of the size of the multiplier unit weights register file 127. This is because each cached IFM slice must have a corresponding weight in the weight register file to be multiplied, and the weight register file itself is limited, e.g., to 18 weights. Note that same reasoning also translates into an IFM cache size having a lower bound equal to the weight register file size.

Therefore, the IFM cache size should be set to maximum of (H+(H+Z−1)*(W−1)−1) and MU_WEIGHTS taken over all possible supported H and W combinations in which MU_WEIGHTS equals the size of the multiplier unit weight register file 127, e.g., 18. For example, if neural processor 100 has 18 weights per multiplier unit 103, supports a zig-zag traversal of Z=2 and all natural H and W for kernel weight planar size so that H*W≤18, e.g., 1×1, 1×2, 2×1, . . . 4×4, 9×2, 2×9, the IFM cache size is the maximum of (1+(1+2−1)*(1−1)−1)=0, (1+(1+2−1)*(2−1)−1)=2, (2+(2+2−1)*(1−1)−1)=2, . . . (4+(4+2−1)*(4−1)−1)=18, (2+(2+2−1)*(9−1)−1)=25, (9+(2+2−1)*(2−1)−1)=11 and 18, which is 25.

In some embodiments the MU weight register file capacity is equal to 18 8-bit weights (uint8 or int8) or, equivalently, 9 16-bit weights (uint16 or int16). When IFM data is 16-bit (uint16 or int16), the IFM cache may store 16-bit IFM data by allocating two bytes per one 16-bit IFM. Therefore, similar to MU weight register 127 being able to store 9 16-bit weights, the IFM cache 139 may store 9 16-bit IFM values. The zig-zag (as well as a simple, naïve) planar traversal may be applied to 16-bit IFM values in a manner similar to how it is applied to 8-bit values. In such cases, the cache size calculation described above should also include additional W and H terms in the maximum function, such as (H+(H+Z−1)*(W−1)−1)*size_of (IFM_DATA_TYPE) in which size_of (IFM_DATA_TYPE) refers to the size in bytes of the data type of the IFM values (e.g., 3 bytes for 24-bit IFM values and 4 bytes for 32-bit IFM values). A zig-zag (and simple, naïve) caching may be used in cases if IFM data type is 24-bit, 32-bit or larger, however, it is recommended to increase the size of the MU weight register file 127 (and the size of the IFM cache 139) to 3×3×size_of (IFM_DATA_TYPE). This ensures that weight kernels of a popular 3×3 planar size may be convolved without resorting to use of partial results, which may be undesirable, as explained later.

As described earlier, global, SRAM, tile and lane control logic units 140, 142, 144 and 146 work together to execute proper control of SRAM IFM fetching, transmission of IFM slices over the IFM delivery fabric 104, caching IFM values in the local tiles 102, retrieving cached IFM values (usually at somewhat different rates for each activation lane) and re-synchronizing OFM results among the tiles 102. To configure IFM and OFM planar traversal, the host CPU loads the computation parameters to the global control FSM 140 and SRAM control logic 142, including zig-zag height Z. The global control FSM 140 then orchestrates the SRAM control FSMs 142 and the tile control FSMs 144 to start and carry out the computation.

Figure 2H:
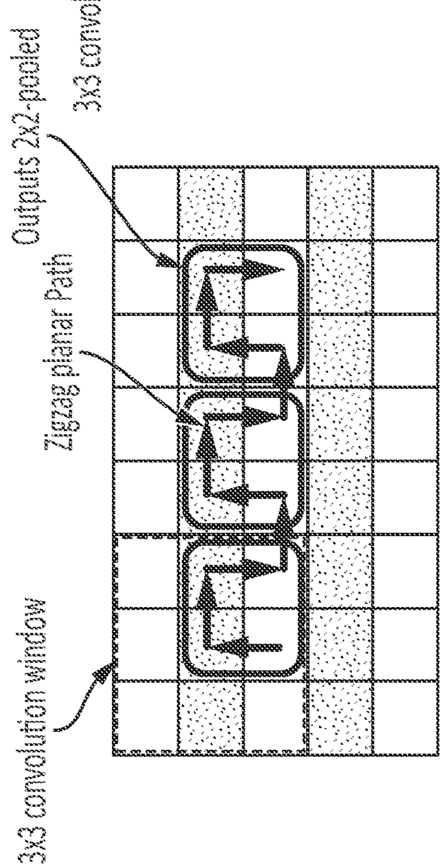
FIG. 2HA is a convolution diagram according to the subject matter disclosed herein.
Figure 2H:
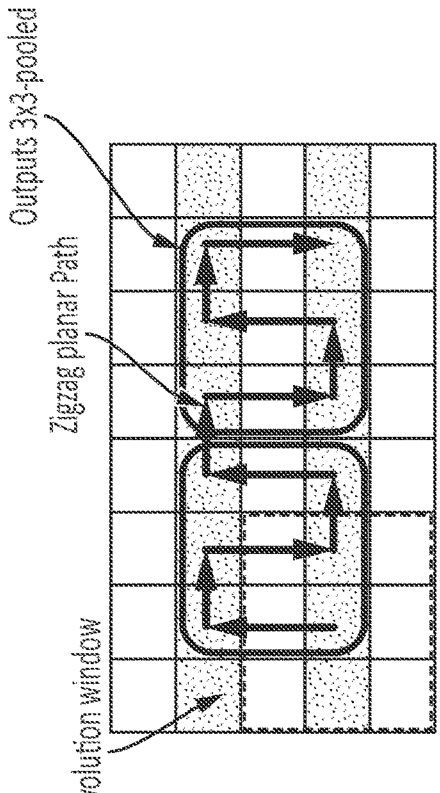
Figure 2H:
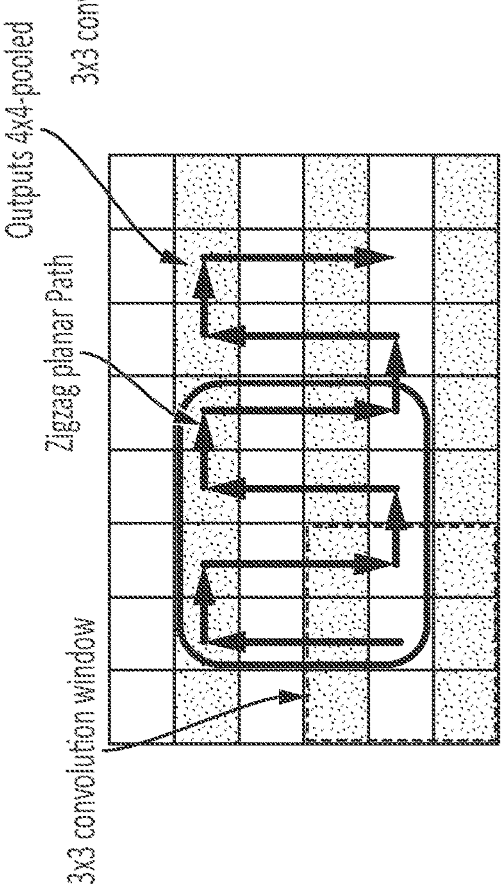
Figure 2H:
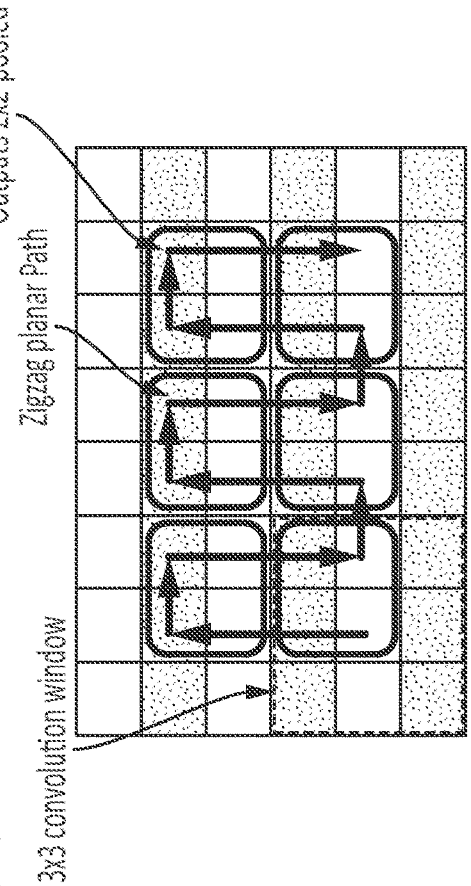

When the convolution window traverses input and output layers in a zig-zag planar-wise fashion, each accumulate-and-return unit 167 may receive OFM values to compute pooling on-the-fly advantageously without saving pre-pooling results to SRAM and reading the values back later to apply pooling. The ARU 167 may perform pooling in cases when pooling windows do not overlap, as depicted in FIGS. 2HA-2HD by not sending out each convolution OFM result, but instead keeping the convolution result in the register of the pooling logic 196 until each pooling output is complete. Only after each pooling output is completed does the ARU 167 write the pooling output to the SRAM 109. For max pooling, the output register of the ARU 167 register may hold the maximum value, which becomes compared with convolution outputs and updated when the latest OFM output exceeds the current maximum. Once the pooling window slides, the output register of the ARU 167 is reset to start the max operation anew. For average pooling, the accumulator of the ARU 167 keeps adding OFM output until the pooling window is about to slide. The accumulator is then multiplied by 1/(POOLING_WIDTH*POOLING_HEIGHT) to compute the average, is rounded and written to SRAM 109. Once the pooling window slides, the accumulator is reset to start the averaging anew.

For example, FIG. 2HA depicts a zig-zag planar traversal with Z=2 performed in conjunction with a 2×2 planar pooling in which the IFM layer is traversed in such a way that causes OFM values (in each pooling window) to be computed sequentially. Because the output of the ARU 167 generates each four OFM values to compute each pooling one after another, the ARU pooling logic 196 may take the maximum among the four consecutive results in order to calculate max pooling. FIG. 2HB depicts a zig-zag planar traversal with Z=3 and a 3×3 planar pooling. Since the Z value equals to the pooling kernel height, traversing the IFM layer in a zig-zag manner naturally results in OFM data within each pooling window being generated in a sequence suitable for max and average polling. FIG. 2HC provides an additional illustration of Z=H=4 in which H refers to the height of the pooling kernel.

FIG. 2HD depicts a case when Z value does not match the height of the pooling kernel such that Z=4 and the pooling kernel's height is 2. In this case, the pooling logic 196 may subdivide pooling into two areas (upper 2×2 and lower 2×2 as depicted) and use an additional register to temporarily store unfinished results from one of the two pooling areas (lower 2×2 in FIG. 2HD). More generally, a zig-zag pooling window height may be a natural multiple of the height of the zig-zag traversal. Reasonable numbers may include 2, 3 and 4. As mentioned previously, a zig-zag pooling vertical stride should equal the zig-zag traversal height, which restricts on-the-fly pooling to such cases only. Pooling windows may overlap horizontally as long as the output pooling logic 196 has sufficient copies of pooling logic, however, in which each processes the respective horizontally-overlapping pooling window in parallel for all such horizontally-overlapping pooling windows. The zig-zag pooling window width and stride may be generally arbitrary with reasonable pooling window width numbers including, for example, 2, 3 and 4.

In cases when pooling windows overlap vertically, thereby making on-the-fly pooling problematic, and/or in cases that need custom pooling (other than max and average), pooling may be accomplished by (i) placing read-modify-write logic near SRAM banks 109 (not depicted) and/or (ii) reading out SRAM over the AXI interface to an external an CPU, GPU, DSP or other type of computing core, performing the pooling and writing results back to NPU SRAM over the AXI interface. A custom read-modify-write logic near SRAM banks 109 may be also re-used to add partial results efficiently without sending partial results back to the tiles.

In order to configure the neural processor 100 to perform a certain operation (e.g., convolution or fully-connected layer computation), the IFM and OFM tensor sizes should be considered and, in conjunction with parameters of the operation (e.g., operation type, stride, etc.) the computation "mapped" onto the available hardware. Each individual tile 102 may have only a fixed number of 16 IFM depth channel inputs and 8 OFM depth channel outputs, while the number of depth channels in deep-learning neural-network model layers varies and usually far exceeds 16 and 8. A mapping algorithm may run offline (during compile time as opposed to run time) to sub-divide the large IFM and OFM tensors into portions (sub-tensors), assign the portions to the available tiles for computation, and produce a description (configuration) of how outputs from the available tiles may be re-assembled to complete computation. The mapping algorithm may also determine the order of IFM (and correspondingly OFM) tensor traversal both planar-wise and in particular depth-wise, as will be explained in more detail below. Because there may be multiple solutions to a particular mapping problem, i.e., for given IFM, OFM and weight tensor sizes and operation parameters, the mapping algorithm may also accept a parameter indicating whether to optimize the solution for lowest power, lowest SRAM size, lowest computation latency (achieved by maximizing multiplier utilization) and/or a combination of these (e.g., lowest power given the available fixed SRAM size).

Aspects of the mapping operation of some embodiments may be understood from a set of examples, as a progression from trivial to increasingly more advanced examples. For the sake of explanation clarity, features associated with zero activation skipping should be ignored and each OFM column is assumed to have only one adder tree and accumulator, i.e., that the computation is "dense", as activation skipping largely does not affect mapping. Caching, including a zig-zag planar translation method, should also be ignored and the convolution window is assumed to move (slides planar-wise) in a raster fashion because caching largely does not affect mapping. In a first example, depicted in FIGS. 3AA-3AK, a 3×3×16×8 convolution is calculated using a single tile 102. FIG. 3AA depicts the tile 102 accepting an IFM slice having 16 depth channels as inputs and producing an OFM slice having 8 depth channels. For this example, the size of the IFM tensor 304 is 64×64×16, the size of the OFM tensor 303 is 64×64×8, and the size of the weight tensor 302 is 3×3×16×8, as indicated in FIG. 3AB.

Initially, the weights are pre-loaded from the SRAM 109 into the MU weight register files 127, as depicted in FIG. 3AC. The size of the weight kernel 302 is 3×3×16×8. Having a planar size of 3×3, the weight kernel 302 has 3*3=9 planar "locations" that are indicated A through I in FIG. 3AC. Each planar location is associated with a 16-long weight vector used to compute a dot product with a 16-long IFM value vector for one OFM channel. Because there are 8 OFM channels, the weight kernel 302 may be thought of as having one 3D tensor for each OFM channel, as depicted in FIG. 3AC.

Specifically, the weights may be loaded into the MU weight register files 127 as follows. The plurality of MU weight register files in the entire MR array 122 may be thought of a tensor having dimensions 18×16×8 (18 weights per MU, 16 MU rows and 8 MU columns), which more than enough to hold the entire weight kernel of size 3×3×16×8. The weight register file tensor size of 18×16×8 may also be re-written as (3×3)×16×8 in which each MU weight register file at row R, column C stores all 9 weights of 3×3=9 planar locations (x, y) in weight tensor W×H×R×C and in which W and H are weight kernel planar width and height, i.e., W=3 and H=3. For example, referring to FIG. 3AC, the weight register file in row 0, column 0 stores weights {A0[0], B0[0], C0[0], D0[0], E0[0], F0[0], G0[0], H0[0], 10[0]} in which the notation is "A . . . 1" followed by OFM column "0 . . . 7" and IFM row "[0 . . . 15]". Correspondingly, the weight register file in row 15, column 0 stores weights {A0[15], B0[15], C0[15], D0[15], E0[15], F0[15], G0[15], H0[15], 10[15]}. The weight register file in row 15, column 7 stores weights {A7[15], B7[15], C7[15], D7[15], E7[15], F7[15], G7[15], H7[15], 17[15]}, and so on. Since tiles 102 compute dot products "vertically" using column-wise adder trees, it may be seen that the described ordering of loaded weights allows computing dot product of the IFM input at each planar location A . . . I.

Referring to FIG. 3AD, a convolution window may then be positioned at a start position, and the eight accumulators 130 (of which, as mentioned earlier, there is one for each of the 8 OFM channels for the sake of mapping explanation clarity) may be cleared.

Referring to FIG. 3AE, the tile 102 may then read IFM a[0 . . . 15] (in which a . . . z refer to planar locations of the IFM, and 0 . . . 15 refers to IFM depth channels) from the SRAM 109, and broadcast the values to the 8 columns of the tile 102. The first column may multiply a[0 . . . 15] element-wise with the pre-loaded weights A0[0] . . . A0[15], the second column may multiply a[0 . . . 15] element-wise with the pre-loaded weights A1[0] . . . A1[15], etc. The resulting products may be summed (reduced) vertically using the adder tree of each column, and added to the corresponding accumulator 130. The resulting dot product is not yet a finished result because 8 more (out of 3*3=9) planar locations remain to be processed to complete the 3×3 convolution at a single location.

Referring to FIG. 3AF, the tile 102 may then read IFM b[0 . . . 15] from the SRAM 109, and broadcast the values to the 8 columns of the tile 102. The first column may multiply b[0 . . . 15] element-wise with the pre-loaded weights B0[0] . . . B0[15], the second column may multiply b[0 . . . 15] element-wise with the pre-loaded weights B1[0] . . . B1[15], etc. The resulting products may be summed vertically, and added to the corresponding accumulator 130. Referring to FIG. 3AG, the tile 102 may then read IFM c[0 . . . 15] from the SRAM 109, and broadcast the values to the 8 columns of the tile 102. The first column may multiply c[0 . . . 15] element-wise with the pre-loaded weights C0[0] . . . C0[15], the second column may multiply c[0 . . . 15] element-wise with the pre-loaded weights C1[0] . . . . C1[15], etc. The resulting products may be summed vertically, and added to the corresponding accumulator 130.

Referring to FIG. 3AH, the tile 102 may then read IFM g[0 . . . 15] from SRAM, and broadcast the values to the 8 columns of the tile 102. The first column may multiply g[0 . . . 15] element-wise with the pre-loaded weights D0[0] . . . D0[15], the second column may multiply g[0 . . . 15] element-wise with the pre-loaded weights D1[0] . . . D1[15], etc. The resulting products may be summed vertically, and added to the corresponding accumulator 130. Referring to FIG. 3AI, the tile 102 may then read IFM h[0 . . . 15] from SRAM, and broadcast the values to the 8 columns of the tile 102. The first column may multiply h[0 . . . 15] element-wise with the pre-loaded weights E0[0] . . . . E0[15], the second column may multiply h[0 . . . 15] element-wise with the pre-loaded weights E1[0] . . . . C1[15], etc. The resulting products may be summed vertically, and added to the corresponding accumulator 130.

Referring to FIG. 3AJ, analogous operations may be performed for the remaining position of the nine positions of the kernel, labelled a through o. The values stored in the accumulators 130 may then be rounded to form an 8-bit output OFM result, and all 8 OFM results may be written to the SRAM 109. This completes the calculation of one convolution. The convolution window may then be translated planar-wise by one column, as depicted in FIG. 3AK, and the operations may be repeated.

In a second example, depicted in FIGS. 3BA-3BC, a 3×3×16×128 convolution is determined, or calculated, using a single tile. As mentioned earlier, for convenience, the term "IFM slice" may be defined to mean the 16 IFM depth channels (i.e., a unit of IFM read and tile input), and the term "OFM slice" may be defined to mean 8 OFM depth channels (i.e., a unit of OFM tile output), as depicted in FIG. 3BA. It may be convenient to depict operation mapping in a rectangle in which the height of the rectangle corresponds to the number of IFM channels, and the width of the rectangle represents the number of OFM channels, as depicted in FIG. 3BB. The 3×3×16×128 convolution may be accomplished by splitting the convolution into 16 3×3×16×8 convolutions so that the previous example of performing 3×3×16×8 convolution may be repeated 16 times. In a first step, the 3×3×16×8 convolution for OFM[0 . . . 7] may be computed. In a second step, the 3×3×16×8 convolution for OFM[8 . . . 15] may be computed, and so forth, until in a sixteenth step, the 3×3×16×8 convolution for OFM[120 . . . 127] may be computed. The processing of a next subset of OFM channels may be referred to herein as "stepping the OFM". The sixteen steps may correspond to sixteen rectangles, the first, second, and sixteenth of which are depicted in FIG. 3BC, and it may be seen from FIGS. 3BB and 3BC that when the sixteen steps are complete, the 3×3×16×128 convolution has been calculated.

Hypothetically, an unlimited number of OFM channels may be processed in this manner by simply splitting the OFM into sufficiently small pieces. Each time the system "steps the OFM," the IFM is re-read entirely (in this example, sixteen times). Each reading of the (entire) IFM may be referred to herein as an "IFM pass", and each such IFM pass may consume a considerable amount energy (or power) if the operation is performed repeatedly). Reducing power consumption is usually highly desirable, especially for a battery-powered device such, as a mobile smartphone. The next example depicts an approach for avoiding some of this energy cost.

In a third example, depicted in FIGS. 3CA and 3CB, a 3×3×16×128 convolution is determined, or calculated, this time using sixteen tiles as opposed to one tile. Each tile 102 has 16*8=128 multipliers 126, so the 16 tiles have 128*16=2,048 multipliers total. The IFM[0 . . . 15] may be broadcast to all 16 tiles 102, so that Tile 1 will compute OFM[0 . . . 7], Tile 2 will compute OFM[8 . . . 15], and so forth, and Tile 16 will compute OFM[120 . . . 127]. As used herein, the term IFM "broadcast" refers to the inputting of an IFM simultaneously to several MR tiles 102 as opposed to the description of a tile 102 in which broadcast refers to inputting the ABU output to all MU columns with a single tile.

The neural processor 100 has multiple SRAM bank sets 109 (FIGS. 1A and 3AC). As such, referring to FIG. 3CB, the input IFM[0 . . . 15] may be input from SRAM bank set 0. The output of tile 1 (OFM[0 . . . 7]) may be concatenated with the output of tile 2 (OFM[8 . . . 15]) into a 16-channel OFM[0 . . . 15] and saved into SRAM bank set 1. Similarly, the output of tile 2 may be concatenated with the output of tile 3 and saved to SRAM bank set 2, and so forth, with the output of tile 15 being concatenated with the output of tile 16 and saved to SRAM bank set 8. It may be seen that in this third example, all OFMs are computed in a single "pass" (i.e., reading the entire IFM data once) and that most of the energy consumption incurred in the second example above by performing multiple IFM passes is avoided because the IFM data is read only once as a result of using an IFM broadcast.

In a fourth example, depicted in FIG. 3DA, a 3×3×16×256 convolution is determined, or calculated, using sixteen tiles. Sixteen tiles may be capable only of generating up to 16*8=128 OFM channels in a single pass. In this example, 256 OFM channels are to be generated. Two OFM steps may therefore be run, with a first step being used to calculate OFM[0 . . . 127] and a second step being used to calculate OFM[128 . . . 255]. Two IFM passes may be used, thereby reading the IFM entirely twice. The forming of the OFM in two steps is depicted in FIG. 3DA.

In a fifth example, depicted in FIGS. 3ΣA and 3ΣB, a 3×3×32×64 convolution is determined, or calculated, using sixteen tiles. This example involves 32 IFM channels, unlike the preceding examples that have 16 IFM channels. All 32 IFM channels (2 slices) may be read from SRAM 109 simultaneously. The neural processor 100 may have several SRAM banks sets. Each bank set (in mapping examples) may stream 1 slice per clock cycle. As such, to read (stream)

2 slices (32 IFM channels) concurrently, two bank sets may be used, of which a first bank set may stream IFM[0 . . . 15], and a second bank set may stream IFM[16 . . . 31].

Referring to FIG. 3EB, calculation of OFM[0 . . . 7] may be split across tile 1 and tile 9. Tile 1 may reduce (add) IFM[0 . . . 15] into unfinished OFM[0 . . . 7]. Tile 2 may reduce IFM[16 . . . 31] into unfinished OFM[0 . . . 7]. Calculation of OFM[0 . . . 7] may then be completed by adding the outputs of tile 1 and tile 2 (and applying bias, activation function, etc.). To perform this addition, the adder trees of tile 1 and tile 2 may be "joined" using one more additional hardware adder stages. The reduction fabric 111 provides such additional hardware adder stages. Analogous operations may be used for OFM[8 . . . 15] (adding tile 2 and 10), . . . OFM[56 . . . 63] (adding tiles 8 and 16). Referring to FIG. 3EB, in this example there is no output from tiles 1 . . . 8 to the SRAM 109. Only tiles 9 . . . 16 save OFMs to the SRAM 109, as will be explained later.

In a sixth example, depicted in FIGS. 3FA-3FC, a 3×3×32×512 convolution is determined, or calculated, using sixteen tiles. Referring to FIG. 3FA, as in the fifth example, two IFM slices (IFM[0 . . . 31]) may be read from two SRAM banks and each of the two IFM slices may be broadcast to 8 tiles. Two such sets of 8 tiles together may compute OFM [0 . . . 63] and the results may be saved to 4 SRAM bank sets. Referring to FIG. 3FB, 64 OFMs may be computed per IFM pass (i.e., the entire IFM may be read to calculate 64 OFMs). As such and in a manner similar to that of the fourth example, 512 OFMs may be computed in 8 IFM passes (and, equivalently, 8 OFM "steps"). OFM[0 . . . 63] may be calculated during a first IFM pass. OFM[64 . . . 127] may be calculated during a second IFM pass, and so forth, with OFM[448 . . . 511] being calculated during an eighth IFM pass. In this example, a "2 IFM slices by 64 OFM slices" operation has been split into 8 OFM steps. Each OFM step convolves "2 IFM slices by 8 OFM slices". Referring to FIG. 3FC, in some embodiments virtual SRAM banks may be used to handle cases in which a SRAM bank (which may have a capacity of about 32 kB) runs out of IFM data or fills up with OFM data.

In such a case, the data fabric of the neural processor 100 may transparently (to tiles receiving IFM streams) switch to connect another SRAM bank set. As mentioned earlier, the IFM and OFM tensors may be too large to be stored in a single SRAM bank set 109 and may thus need to be split up into sub-tensors, each being small enough to fit into an SRAM bank set 109 for storage. The global control logic 140 contains configuration registers specifying how IFM and OFM tensors have been split up and stored in SRAM bank sets, including IFM and OFM sub-tensor indices, sizes, index of SRAM bank set storing each sub-tensor, as well as addresses where each sub-tensor is stored within the associated SRAM bank set.

As computation proceeds and IFM (OFM) traversal moves from a sub-tensor stored in one SRAM bank set 109 to another sub-tensor stored in another SRAM bank set 109, the global control FSM 140 orchestrates the on-the-fly reconfiguration of IFM and OFM delivery fabrics, switching over IFM source (and OFM destination) SRAM bank set from current one to the next one. In some embodiments, the reconfiguration is accomplished in a way that is transparent to tiles consuming IFM (and tiles generating outputs) and does not stall or slow down computation during the bus switch-over.

As mentioned earlier, a piece of software, referred to herein as a "mapper," may decide statically (at compile time) how to split entire the IFM and OFM storage across SRAM bank sets and physical SRAM banks, as well as weight kernel storage and partial results. For clarity of mapping explanation, details of physical IFM and OFM storage across multiple SRAM bank sets may be ignored and SRAM bank sets may be regarded as being "virtual" or "logical" views 306 into IFM and OFM, as depicted in FIG. 3FC.

In a seventh example, depicted in FIGS. 3GA-3GD, a 3×3×32×512 convolution is determined, or calculated, using sixteen tiles. In this example, the same convolution as in the sixth example is calculated using fewer IFM passes to save energy. Referring to FIG. 3GA, each multiplier unit weight register file 127 may have 18 weights, of which only 9 were used in the sixth example for a 3×3 convolution. As such, two sets of 3×3 weights may be stored (as opposed to one), and "cycled" through over time. In particular, the 3×3×32×512 convolution may be split into two 3×3×16×512 convolutions interleaved in time. Referring to FIG. 3GB, in a manner analogous to that of the third example, the 3×3×16×512 convolution may be mapped to 16 physical tiles. For each IFM pass, one IFM slice may be read from the SRAM bank set and broadcast to 16 physical tiles, which output 128 OFM channels to 8 SRAM bank sets. In this example, it takes four IFM passes (and four OFM steps) to finish the OFM computation.

Referring to FIG. 3GC, in some embodiments, in a first step, IFM[0 . . . 15] may be input to compute the convolution for OFM[0 . . . 127] at OFM location (x,y), but the OFM result may be kept in the accumulators instead of writing the result to SRAM. Referring to FIG. 3GD, in a second step, each multiplier unit weight register file 127 may then switch to the second set of 3×3 weights and input IFM[16 . . . 31] to finish computing OFM[0 . . . 127]. This process may be referred to herein as "IFM weight cycling". Then, in a third step, OFM[0 . . . 127] may be saved to SRAM, and the accumulators may be cleared. These three steps may be repeated until the calculation is complete.

Referring to FIG. 3GA, in some embodiments, logical tiles may be defined as physical tiles storing multiple sets of weights. It may be seen that in the present example (the seventh example) two sets of 16 such logical tiles (interleaved in time) (i.e., 32 logical tiles) are formed by storing two 3×3 sets of weights. In the seventh example the 32 logical tiles may physically calculate more (e.g., a wider) OFM in each IFM pass, so that the number of IFM passes (and SRAM IFM read energy) is reduced by a factor of two compared to the sixth example.

In an eighth example, illustrated in FIGS. 3HA-3HC, a 3×3×512×256 convolution is first determined, or calculated, using sixteen physical tiles. Note that the number of IFM and OFM channels (512 and 256 respectively) in this example are both fairly large. As discussed in further detail below, partial results, or "partials" may be used when a convolution kernel is too large to be calculated otherwise. This example shows, however, how convolution with a large weight kernel may still be performed without the use of partials. A 3×3×512×256 convolution may be calculated as depicted in FIG. 3HB. For a 3×3 8-bit convolution 2 sets of 3×3 8-bit weights may be stored into each multiplier unit so that there are (2 sets of weights)*(16 physical tiles)=32 logical tiles. The 32 logical tiles may reduce 32 IFM slices so that the maximum number of IFM channels that may be processed without using partials is (32 slices)*(16 IFM channels per slice)=512 IFM channels. As such, it is possible to compute a 3×3×512×N convolution in which N is any positive integer without using partials.

Referring to FIGS. 3HB and 3HC, 256 IFM channels per clock may be reduced using tile adder trees combined with the reduction fabric 111. In order to reduce all 512 IFM channels (and generate 8 OFM channels), two weight cycles are performed. In weight cycle 1, as depicted in FIG. 3HB, IFM [0 . . . 15] may be input to tile 1, IFM [16 . . . 31] may be input to tile 2, and so forth, and IFM [240 . . . 255] may be input to tile 16. The hardware trees may be joined over all 16 tiles (per each column) using hardware adder stages provided by the reduction fabric 111. The adder tree root may end at tile 16 (as discussed later, in the context of the reduction fabric 11, OFM delivery fabric and adder tree), so that only tile 16 generates a result, while accumulators of tiles 1 . . . 15 are not used in this configuration. In weight cycle 2, depicted in FIG. 3HC, IFM [256 . . . 271] may be input to tile 1, IFM [272 . . . 287] may be input to tile 2, and so forth, and IFM [496 . . . 511] may be input to tile 16. Tile 16 may then write the finished OFM[0 . . . 7](x,y) result to SRAM bank 16. Finally, 32 IFM passes (32 OFM steps) may be performed to compute OFM[0 . . . 7], then OFM[8 . . . 15], and so forth, through OFM[248 . . . 255]. Note while the IFM pass and OFM step numbers are identical in this particular example, the difference between IFM pass and OFM step will become clearer in later examples.

FIG. 3HD additionally depicts how the 3×3×512×256 convolution depicted in FIGS. 3HA-3HC may be altered into a 3×3×512×512 convolution simply by performing 64 IFM passes (64 OFM steps) instead of 32 IFM passes (32 OFM steps).

In a ninth example, depicted in FIGS. 31A-31F, a 3×3×512×256 convolution is determined, or calculated, using sixteen tiles and using partial results. In some cases, using partials may make energy savings possible by reducing the number of SRAM reads (compared to, e.g., the eighth example). When using partials, the mapping algorithm may partition the weight tensor in several parts, in particular, depth channel-wise, converting a single convolution operation (including loading weight tensor, traversing IFM, writing OFM) into two or more convolution operations. Outputs of these two or more resulting convolutions later become combined to produce final result.

Figure 31A:
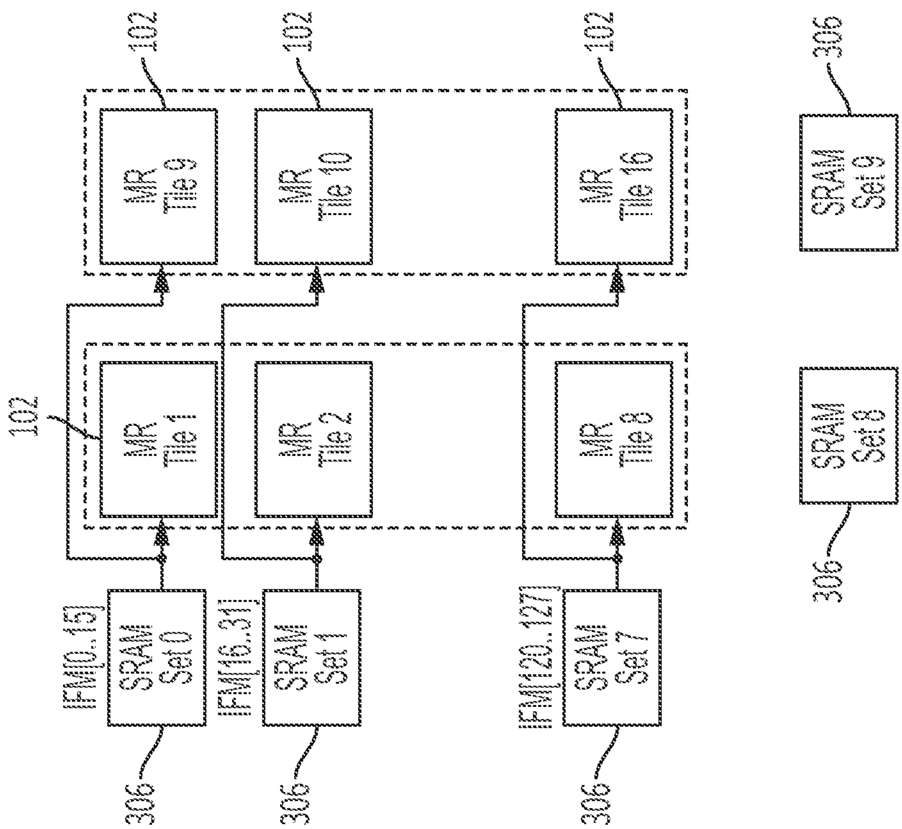

At first, recall that FIGS. 3HB-3HC depict a 3×3×512×256 convolution calculated without partials. FIGS. 31A-3IB and 31C-31D depict hardware resource mappings associated after the weight tensor (and the corresponding IFM and OFM) 512 IFM channels partitioned into 256 and 256, corresponding to two separate convolutions, each of size 3×3×256×256.

Figure 31B:
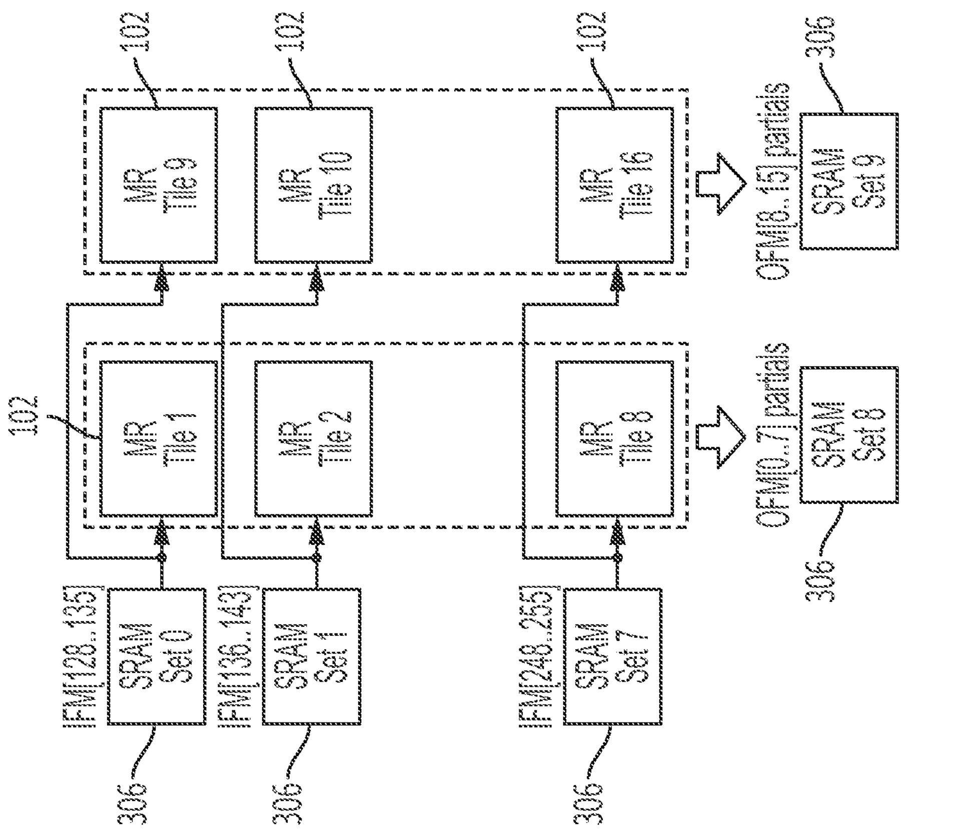
Figure 31C:
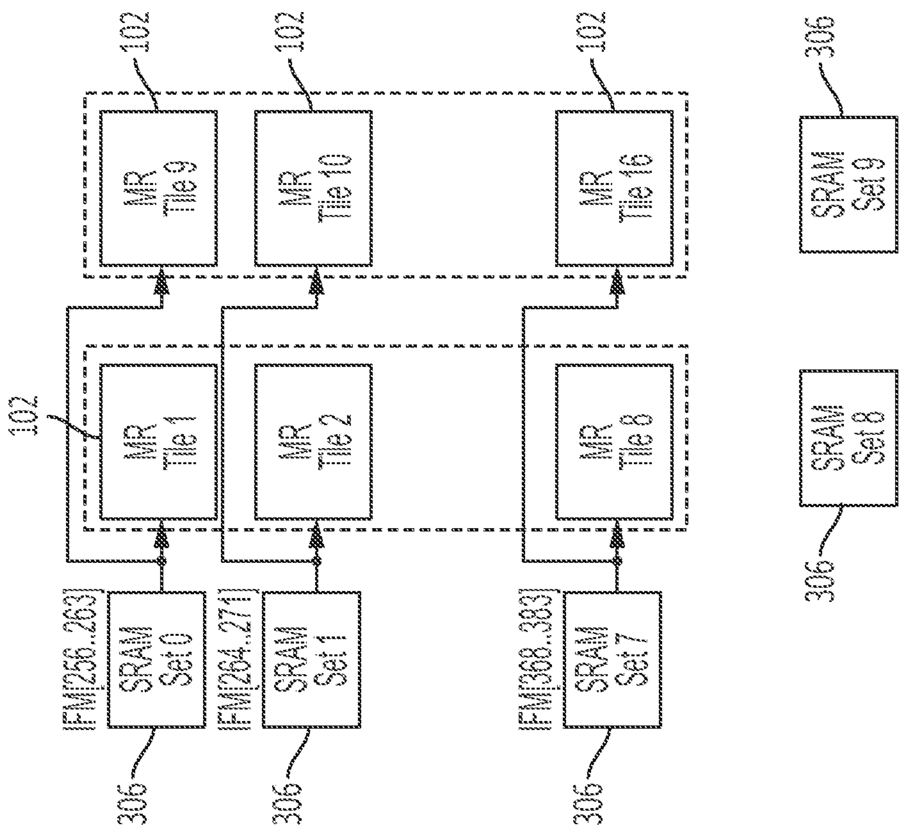
Figure 31D:
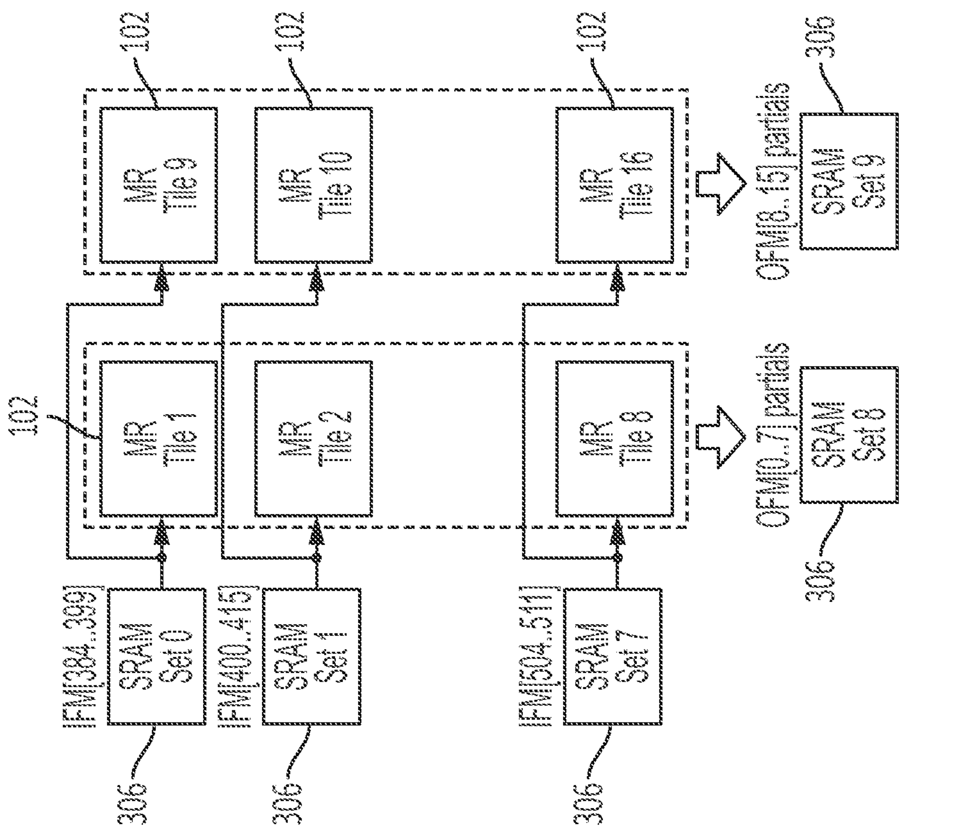

FIGS. 31A-31B depict the first of the two 3×3×256×256 convolutions. Because the weight kernel planar size is 3×3=9, each MU weight register file capable of holding 18 8-bit weights has enough capacity to store two sets of 3×3 weights, thus making 32 logical tiles available for computation.

Eight IFM slices may then be loaded. Each IFM slice may then be broadcast to 2 physical tiles. Sixteen OFM steps (16 IFM passes) may be performed. During the first weight cycle, as depicted in FIG. 31A, a 3×3 IFM [0 . . . 127] may be input, convolved with the first set of 3×3 weights, reduced using adder trees and accumulated in accumulator registers of tiles 8 and 16. Referring to FIG. 31B, during the second weight cycle, a 3×3 IFM [128 . . . 255] may be input, convolved with the second set of 3×3 weights, reduced using adder trees and further accumulated in accumulator registers in tiles 8 and 16. At this point, the convolution of the 3×3 IFM [0 . . . 255] with a corresponding 3×3×256×16 weight kernel is completed for OFM channels 0 . . . 15, and may be written to virtual SRAM bank sets 8 and 9 as a partial result. Since this is a partial result, as opposed to finished result, the accumulator 130 values bypass the activation function module 197 on the way to SRAM. Optionally, in order to reduce SRAM size requirement and power consumption, the bit range select module 187 may reduce the bit width of the partial results rounding, e.g., down to 4 bytes when using 8-bit activations and weight or down to 6 bytes when using 16-bit activations and weights.

The steps above are repeated until the entire IFM[0 . . . 255] has been processed, i.e., for all desired planar (x, y) locations, in one pass over IFM[0 . . . 255] and resulting in the corresponding set of partial results computed for OFM[0 . . . 15]. Partial results for the remaining OFM channels [16 . . . 255] are computed by performing 15 more passes over IFM[0 . . . 255] (corresponding to 15 more OFM steps).

Note that in this mapping example, using two partials passes widens (extends) the OFM that is physically and concurrently generated in one pass by a factor of two (from one OFM slice to two). Also, the size of the IFM tensor processed during each partials pass is shortened by a factor of two from H×W×512 to H×W×256.

The second partials IFM pass may be same as the first, except IFM [256 . . . 383] may be input during the first weight cycle, and IFM [384 . . . 511] may be input during the second weight cycle, as respectively depicted in FIGS. 3IC and 3ID.

Completing the original 3×3×512×256 convolution includes adding partial results (from the two 3×3×256×256 convolutions, element-wise) and applying scaling, bias and activation function, similar to the ARU 167. There may be several ways to accomplish this final step, including (i) reading partial results generated by the first partial convolution, transmitting the partials over the IFM delivery fabric 104 to tile ARUs 167 to be summed with the second set of partial results, element-wise, such that the ARUs 167 will generate final results during the second partial convolution; (ii) having the partials output of the ARUs 167 during both partial convolutions, while having additional logic in SRAM bank sets 109 performing read-modify-write to add partials and apply the activation function. More specifically, the additional logic to finalize partials would be receiving partial results during the second partial convolution, read from SRAM results of the first partial convolution, sum the results and apply an activation function on-the-fly and write the final result back to SRAM; (iii) have the additional logic in SRAM bank sets 109 capable of read-add-write operation for partials in order to continue adding partial results from two or more partial operations, element-wise, without applying the activation function, followed by reading and sending partial results to tile ARUs 167 to be finalized during the last partial operation round.

Unlike cases in which partials are not used, when partials are used, the OFM height and width should be taken into account when arranging a convolution operation. Referring to FIG. 31E, four bytes may be used to store each partial result (assuming both IFM and OFM are 8-bit). In this case, the SRAM storage size for partial results equals to (OFM height)*(OFM width)*(OFM depth)*(4 bytes). If SRAM (on-chip) storage capacity is insufficient for partial results, the OFM data may be split into sub-windows and processed one at a time, as depicted. Every time a sub-window is processed, however, it may be necessary to load (or re-load) an entire set of kernel weights, which may increase energy consumption. For example, assume that the OFM planar size is set to 10×10, and the IFM planar size is set to be equal to the OFM planar size. The kernel weight size in this case is relatively large, at 3*3*512*256=1.2 Mbytes. The SRAM size to store the entire partial result for the whole IFM planar size without sub-dividing it into planar sub-windows is 10*10*256*4=102,400 bytes. For the sake of simplicity, further assume SRAM having plenty of capacity, such that the use of sub-windows is not necessary.

FIG. 3IF summarizes the process of calculating the convolution in this example, whereby a first set of partials for IFM[0 . . . 255] and all OFM partials [0 . . . 255] is determined, or calculated, and saved, a second set of partials for IFM[0 . . . 255] and all OFM[0 . . . 255] is determined, or calculated, (but not written to SRAM because this is the last partials round), and the partials are added element-wise and an activation function is applied on-the-fly and written to SRAM as the second partial convolution is being determined, or calculated.

As mentioned earlier, use of MR tiles 102 for adding of the partials element-wise and application of the activation function is optional. Instead, Auxiliary Planar and Activation Processing (APAP) units dedicated for element-wise and planar (no reduction across channels) operations may be used. These units may be located inside the SRAM bank sets 109 and have access to the partials stored locally in SRAM, as well as partials arriving to SRAM bank sets. The APAP units then write the finished results into the SRAM 109.

A determination, or calculation, performed according to the ninth example may save a significant amount of energy by performing two passes. Because the number of IFM passes was reduced from 32 to 16, the amount of IFM data read is (IFM height)*(IFM width)*(IFM channels)*(IFM passes)=10*10*512*(32−16)=819,200 bytes (ignoring caching). The amount of partials data written to SRAM is (OFM height)*(OFM width)*(OFM channels)*(number of partial convolutions−1)*(4 bytes)=10*10*256*(2−1)*4=102,400 bytes. In other words, twice this amount would be incurred if the second partials pass were to save the result to the SRAM 109 instead of directly inputting the result to the planar/activation units. Further, the amount of partials data read from the SRAM 109 is (OFM height)*(OFM width)*(number of partial convolutions−1)*(4 bytes)=10*10*256*(2−1)*4=102,400 bytes. In other words, twice this amount would be incurred if the second partials pass were to save the result to the SRAM 109 instead of directly inputting the result to the planar/activation units. As such, performing 3×3×512×256 (8-bit) convolution using partials vs. without partials in the example results in 819,000 fewer IFM bytes read from SRAM, while incurring additional 102,400 bytes to write partials to SRAM and another 102,400 bytes to read partials from SRAM.

Assuming that the energy of one SRAM write is about double that of one SRAM read, the total saved SRAM energy equals to 819,000−2*102,400−102,400=511,800*(energy per SRAM read).

In a tenth example, depicted in FIGS. 3JA-3JD, a 8×8×16×64 convolution is determined, or calculated, using four tiles. An 8×8 convolution has 8*8=64 weights, which may not fit into a single multiplier unit. A single multiplier unit 103 may store, for example, only 18 weights. The 64 weights may therefore be split among four tiles 102, as depicted in FIG. 3JA, so that Tile 1 stores W[0 . . . 1,0 . . . 7*,*], Tile 2 stores W[2 . . . 3,0 . . . 7*,*], Tile 3 stores W[4 . . . 5, 0 . . . 7*,*], and Tile 4 stores W[6 . . . 7,0 . . . 7*,*] in which the weight kernel notation is W[row, column, IFM channel, OFM channel] and "*" refers to the entire applicable range. The system may then add (reduce) across tiles to calculate OFM[0 . . . 7] so that, effectively, each tile performs a 2×8×16×64 convolution and four 2×8×16×64 convolutions that are performed concurrently using four tiles, that become aggregated into one 8×8×16×64 convolution. Each 2×8×16×64 convolution further includes two 1×8×16×64 convolutions that are combined together using IFM weight cycling.

FIG. 3JB depicts a first step of the IFM weight cycling wherein even (not yet odd) rows within convolution window are convolved. Here, tile 1 convolves row 0 W[0,*,*,*] of the convolution window with IFM values "a0, b0, c0, d0, e0, f0, g0, h0", while tile 2 convolves row 2 W[2,*,*,*] of the convolution window with IFM values "a2, b2, c2, d2, e2, f2, g2, h2". Tile 3 convolves row 4 W[4,*,*,*] of the convolution window with IFM values "a4, b4, c4, d4, e4, f4, g4, h4," and tile 4 convolves row 6 W[2,*,*,*] of the convolution window with IFM values "a6, b6, c6, d6, e6, f6, g6, h6". Products of the multiplier units 103 are reduced using tile adder trees within tiles as well using addition adder tree stages provided by the reduction fabric 111, and are accumulated (as IFM values "a*, b*, . . . h*" stream over the IFM delivery fabric 104 to the four tiles) in the accumulator register 130 of tile 4.

FIG. 3JC depicts a second step of the IFM weight cycling in which odd rows within convolution window are convolved. Here, tile 1 convolves row 1 W[1,*,*,*] of the convolution window with IFM values "a1, b1, c1, d1, e1, f1, g1, h1", while tile 2 convolves row 3 W[3,*,*,*] of the convolution window with IFM values "a3, b3, c3, d3, e3, f3, g3, h3". Tile 3 convolves row 5 W[5,*,*,*] of the convolution window with IFM values "a5, b5, c5, d5, e5, f5, g5, h5" and tile 4 convolves row 7 W[2,*,*,*] of the convolution window with IFM values "a7, b7, c7, d7, e7, f7, g7, h7". Similar to the first IFM weight cycling step, products of the multiplier units 103 are reduced using tile adder trees within tiles as well using addition adder tree stages provided by the reduction fabric 111, and are accumulated (as IFM values "a*, b*, . . . h*" stream over the IFM delivery fabric 104 to the four tiles) in the accumulator register 130 of tile 4. Unlike during the first IFM weight cycling step, however, the accumulator registers 130 are not cleared at the beginning of the second IFM weight cycle step so that once both IFM weight cycling steps complete, the accumulator registers 130 contains dot product for both even and odd rows.

The resulting OFM [0 . . . 7] may then be written to the SRAM 109, thereby completing the convolving of the 8×8×16×8 window for one OFM location. As depicted in FIG. 3JD, to continue the calculation the convolution window may then be translated to compute the next 8×8 convolution. The process may be repeated until the entire OFM is complete.

In an eleventh example, depicted in FIGS. 3KA and 3KB, an 8×8×64×64 convolution is determined, or calculated, using sixteen tiles. An 8×8 convolution may be applied to 16 tiles, and more IFM and OFM channels may be used. Splitting up an 8×8 convolution over four physical tiles causes the number of "logical" tiles to decrease by a factor of four, e.g., (16 physical tiles)/(4 physical tiles per operation)=4 logical tiles, as depicted in FIG. 3KA. As used herein, the term "physical grouping" of physical tiles is defined by connecting tile adder trees into a single adder tree (per column) to perform an operation that is too large for a single physical tile 102.

Referring to FIG. 3KA, because an 8×8 convolution may be too large to fit into a single tile 102, the 8×8 convolution may be split over four tiles. The four tiles may become physically grouped into one logical tile by connecting adder trees from the four tiles into a single adder tree. Referring to FIG. 3KB, mapping 8×8×64×64 to 16 physical tiles logically transforms to mapping 8×8×64×64 to 4 logical tiles in which each logical tile has 18*4=72 weights, enough to fit 8×8=64 convolution weights.

FIG. 3KB depicts a mapping of the 8×8×64×64 convolution operation onto the 4 logical (and thus 16 physical) tiles. The transformed operation may be performed as follows. First, the four IFM slices may be read. All IFM channels may be read at once to avoid partials. Second, each IFM slice may be "broadcast" to one logical tile. Third, 8 OFMs (one OFM slice) may be computed in one IFM pass. This may be repeated so that (64 OFMs)/(8 OFM per pass)=8 IFM passes (8 OFM steps) may be performed to compute all OFM channels.

In some circumstances, more OFM channels may be needed, for example, to determine, or calculate, an 8×8×64×1024 convolution. This is possible without using partials by adding more OFM steps performing more IFM passes to re-read an IFM. In some circumstances more IFM channels may be needed, for example, to determine, or calculate, an 8×8×128×64 convolution. In such a case, it may be necessary to use partials unless (i) the number of physical tiles is increased or (ii) the number of weights per multiplier is increased. In some applications, however, large size convolutions like 8×8 may apply only to RGB images or images with few IFM channels. The MU weights register file 127 holding N weights may accommodate convolution kernel up to H*W≤N in which H and W refer to the planar height and width of the weight kernel. For example, an MU 103 having an 18 8-bit weight capacity may hold convolution kernels including 4×4, 5×3, 3×5, 6×2, 2×6, 7×2, 2×7, 8×2, 2×8, 9×2, 2×9, 18×1 and 1×18. In practice, the need to calculate an 8×8×128×64 convolution may be rare and therefore may be performed by a CPU instead of the neural processor 100, thus making optional the associated neural processor additional hardware logic. For purposes of clarity IFM, OFM and reduction fabric descriptions omit connections required cases of H*W>N, such as the one described in this example.

In a twelfth example, depicted in FIGS. 3LA-3LD, a 1×1×1024×64 convolution is determined, or calculated, using sixteen tiles. Each MU may have 18 weights. Since a 1×1 convolution requires only 1×1=1 weight, it may be possible to fit (18 weights per multiplier)/(1 weight per convolution window)=18 sets of 1×1 convolution weights into each tile. The number of logical tiles may be calculated to be (16 physical tiles)*(18 convolution weight sets per multiplier)=288 logical tiles. The calculation, of a 1×1×1024×16 convolution using 16 physical tiles may be transformed to a calculation of a 1×1×1024×16 convolution using 288 logical tiles. All (1024) IFM channels may be read in one IFM pass to avoid partials. With 288 logical tiles, it may be possible to accept IFMs up to a size of (16 IFM channels per IFM slice)*(288 logical tiles)=4,608 channels. A 1×1×1024×64 convolution requires only 1024 IFM channels, out of the 4,608 IFM channels available without using partials. Therefore, the number of OFM slices that may be computed per IFM pass is floor((4,608 max IFM channels)/(1024 IFM channels))=4 OFM slices.

The determination, or calculation, may be performed as follows. First, 16 sets of 1×1 weights may be stored in each MU. During each OFM step (IFM pass), 64 slices (all 1024 IFM channels) may be read. Physically, this corresponds to reading (64 IFM slices)/(16 sets of 1×1 weights per MU)=4 IFM slices at a time. Each of the four IFM slices may be broadcast to (16 physical tiles)/(4 IFM slices)=4 tiles to compute 4 OFM slices in one OFM step (and one IFM pass). The OFMs may be computed using (8 OFM slices)/(broadcast over 4 tiles)=2 OFM steps (and 2 IFM passes). The IFM weights may be cycled 16 times.

Specifically, referring to FIG. 3LA, the calculation of the convolution may proceed along the following steps. In a first step, the accumulators are cleared. In a second step, IFM[0 . . . 15], IFM[16 . . . 31], IFM[32 . . . 47] and IFM[48 . . . 63] are fetched and respectively broadcast to tiles 1, 5, 9, and 13, tiles 2, 6, 10, and 14, tiles 3, 7, 11, and 15, and tiles 4, 8, 12, and 16. In a third step, the system accumulates the dot product respectively calculated by tiles 1 . . . 4 to OFM[0 . . . 7], tiles 5 . . . 8 to OFM[8 . . . 15], tiles 9 . . . 12 to OFM[16 . . . 23], and tiles 13 . . . 16 to OFM[24 . . . 31] as intermediate (unfinished) results in accumulator registers of tiles 4, 8, 12 and 16, respectively.

Referring to FIG. 3LB, in a fourth step, the accumulators are not cleared, and the MUs 103 are switched to use the next set of 1×1 weights corresponding to a step in IFM weight cycling. In an fifth step, IFM[64 . . . 79], IFM[80 . . . 95], IFM[96 . . . 111] and IFM[112 . . . 127] are fetched and respectively broadcast to tiles 1, 5, 9, and 13, tiles 2, 6, 10, and 14, tiles 3, 7, 11, and 15, and tiles 4, 8, 12, and 16. In a twelfth step, the system accumulates the dot product respectively calculated by tiles 1 . . . 4 to OFM[0 . . . 7], tiles 5 . . . 8 to OFM[8 . . . 15], tiles 9 . . . 12 to OFM[16 . . . 23], and tiles 13 . . . 16 to OFM[24 . . . 31] as intermediate (unfinished) results in accumulator registers of tiles 4, 8, 12 and 16, respectively.

Referring to FIG. 3LC, the calculation may proceed, continuing to cycle IFM weights (for a total of 16 IFM weight cycling steps), fetch and broadcast IFMs, calculate and accumulate dot product until reaching last IFM slices (channels 960 through 1023). At this step, the accumulators are not cleared, and the MUs 103 are switched to the next (last 16th) set of 1×1 weights corresponding to the last step in IFM weight cycling. In a next step, IFM[960 . . . 975], IFM[976 . . . 991], IFM[992 . . . 1007] and IFM[1008 . . . 1023] are fetched and respectively broadcast to tiles 1, 5, 9, and 13, tiles 2, 6, 10, and 14, tiles 3, 7, 11, and 15, and tiles 4, 8, 12, and 16. Next, the system accumulates the dot product respectively computed by tiles 1 . . . 4 to OFM[0 . . . 7], tiles 5 . . . 8 to OFM[8 . . . 15], tiles 9 . . . 12 to OFM[16 . . . 23], and tiles 13 . . . 16 to OFM[24 . . . 31] to obtain finished dot-product results in accumulator registers of the tiles 4, 8, 12 and 16, respectively. In the next step, activation is applied to the dot-product results accumulated in accumulator registers of the tiles 4, 8, 12 and 16, and the four resulting OFM slices are written to SRAM. This completes the calculation of OFM[0 . . . 31].

Referring to FIG. 3LD, the system then proceeds to the next OFM step (by performing another IFM pass) and repeats the computation, this time for OFM[32 . . . 63]. The system loads slice of weights for next OFM step: W[0,0, 0 . . . 1023,32 . . . 63]. Weight loading may take place concurrently with computation using vertical weight loading buses 101, as depicted in FIGS. 1K and 1N, in which case there is no additional delay incurred by the weight loading process. The system may clear the accumulators, and switch the MUs 103 to the first set of 1×1 weights. The system may then repeat the operations as described in the context of FIGS. 3LA-3LC to calculate OFM[32 . . . 63].

As depicted in FIG. 3LD (similar to the case of FIG. 3LC), once the system have gone through 15 of 16 IFM weight cycles, has fetched corresponding IFM slices, calculated and accumulated intermediate dot-product results, the system reaches the last (16th) round of IFM weight cycling. In this round, the accumulators are not cleared, and the Mus 103 are switched to the next (last 16th) set of 1×1 weights (last, 16th IFM weight cycling step). The system fetches IFM[960 . . . 975], IFM[976 . . . 991], IFM[992 . . . 1007] and IFM[1008 . . . 1023] and respectively broadcasts to tiles 1, 5, 9, and 13, tiles 2, 6, 10, and 14, tiles 3, 7, 11, and 15, and tiles 4, 8, 12, and 16. Next, the system accumulates the dot product respectively calculated by tiles 1 . . . 4 to OFM[32 . . . 39], the dot product computed by tiles 5 . . . 8 to OFM[40 . . . 47], tiles 9 . . . 12 to OFM[48 . . . 55], and tiles 13 . . . 16 to OFM[56 . . . 63]. At the end of this process, the system applies activation functions 197 (in tiles 4, 8, 12 and 16) to the finished dot product, stored in accumulators 130 (in tiles 4, 8, 12 and 16), and writes the final OFM[32 . . . 63] result to SRAM to complete the convolution operation.

Consider now a fully-connected (FC) layer computation as opposed to a convolution operation. First consider a trivial case of 16×8 FC computation using a single tile and single IFM sample. Note that FC layer calculation is similar to a 1×1 convolution (described in the previous example), except the weights are discarded after being multiplied with an IFM. A single 16×8 FC computation may be accomplished by loading 1 weight into each MU, fetching a single IFM[0 . . . 15] slice, calculating the dot product using the adder trees of the tile, applying an activation function to the resulting dot product, and writing the finished OFM[0 . . . 7] result to the SRAM 109.

Consider a case of determining, or calculating, a 16×16 FC by a single tile 102 and single IFM sample. A single 16×16 FC computation may be accomplished by loading 2 weights into each MU 103, fetching a single IFM[0 . . . 15], and having an MU 103 select the first of the two pre-loaded weights for multiplication. The OFM[0 . . . 7] may be computed, as described above. The MU 103 may select the second of the two pre-loaded weights for multiplication and compute OFM[8 . . . 15]. This process of cycling through MU weights in order to compute multiple OFM from same IFM is called herein "OFM weight cycling".

Note that the 16×16 FC computation was accomplished using one IFM pass, but two OFM steps (corresponding to two OFM weight cycles). Therefore, as observed in most other examples, the number of OFM steps typically equals the number of IFM passes unless OFM weight cycling is used.

Consider another simple case of determining, or calculating, a 16×128 FC using a single tile and a single IFM sample. This may be accomplished by loading 16 weights into each MU 103, and fetching the single IFM slice. The 16 OFM steps may be performed by OFM weight cycling, i.e., by cycling via MU weights to compute OFM[0 . . . 7], OFM[8 . . . 15], . . . OFM[120 . . . 127] one after another.

Consider a simple case of determining, or calculating, a 16×8 FC using a single tile for a batch of 18 IFM samples (i.e., IFM tensor shape may be expressed as 1×16×18). As a side note, because the neural processor 100 performs inference (not training), mapping examples have implicitly assumed the IFM batch size of one, as is typical for inferencing applications. Computations with IFM batch size greater than one may also be mapped onto hardware. For example, computations may be repeated as already-described for each sample in the IFM batch. A 16×8 FC single-tile computation on a batch of 18 IFM samples, however, may utilize MU weight register file capacity to pre-load 18 weights into each MU 103, one weight for each IFM sample. Subsequently, the calculation may be accomplished by fetching the first (from the batch of 18) IFM[0 . . . 15][0] sample, computing a dot product of the fetched IFM sample with the first of the 18 weights in each MU, applying the activation function and writing the resulting OFM[0 . . . 7][0] to SRAM. Next, IFM[0 . . . 15][1] sample is fetched and multiplied with the second of the 18 weights in each MU 103 to obtain OFM[0 . . . 7][1] after activation function application. This sequence continues until the entire batch of IFM[0 . . . 15][0 . . . 17] samples (18 total) has been processed, resulting in a batch of OFM[0 . . . 7][0 . . . 17] samples. Cycling over MU weights in order to process a batch of IFM samples may be referred to herein as "IFM batch cycling". Note that IFM weight cycling, OFM cycling and IFM batch cycling may be combined to perform computations as long as MU weight register file capacity is sufficient.

In a thirteenth example, depicted in FIGS. 3MA and 3MB, a 288×8 fully connected determination, or calculation, is performed using a single tile. Referring to FIG. 3MA, as mentioned previously a fully connected computation may be similar to a 1×1 convolution in which the convolution window is not translated and weights are not reused, and must be discarded after a single use. One tile 102 may compute 8 OFM channels in parallel (i.e., 1 OFM slice). 288 IFM channels may correspond to 288/(16 rows per MR tile)=18 slices. The system may use 18 weights in each MU 103 to store all 18 slices of FC weights.

To perform the fully connected calculation, the system may execute the following steps (which may be performed, to some extent, concurrently, that is, they may overlap in time). In a first step, the weights may be loaded from the SRAM 109. The weights may be loaded concurrently with computation using, for example, vertical weight loading buses 101, as depicted in FIGS. 1K and 1N. As such, the system may ensure that the FC weights are placed into the SRAM 109. In a second step, the accumulators for OFM[0 . . . 7] may be cleared. In a third step, one sample of IFM[0 . . . 15] may be input into the tile, and the result may be added into the OFM[0 . . . 7] accumulators 130 to form an intermediate (unfinished) result.

In a fourth step, the OFM[0 . . . 7] accumulators may be left un-cleared, and the system may switch to the next set of FC weights (cycle IFM weights). In a fifth step, IFM[16 . . . 31] may be input into the tile, and the result may be added into the OFM[0 . . . 7] accumulators. Referring to FIG. 3MB, the steps may be repeated until all IFM channels (and associated weights) have been cycled through, with IFM[280 . . . 287] being the last slice. Finally, the activation function may be applied to the accumulated dot product and the final OFM[0 . . . 7] result may be written to SRAM. This completes the fully connected computation.

In a fourteenth example, depicted in FIG. 3NA, a 288×64 fully connected determination, or calculation, is performed. In this example, the OFM channel count is increased from 8 (in the thirteenth example) to 64. This is equivalent to the thirteenth example if the system splits the FC 288×64 calculation into 8 smaller FC calculations of size 288×8 and performs the calculations one by one (e.g., in 8 OFM steps). This results in 8 IFM passes.

Figure 30A:
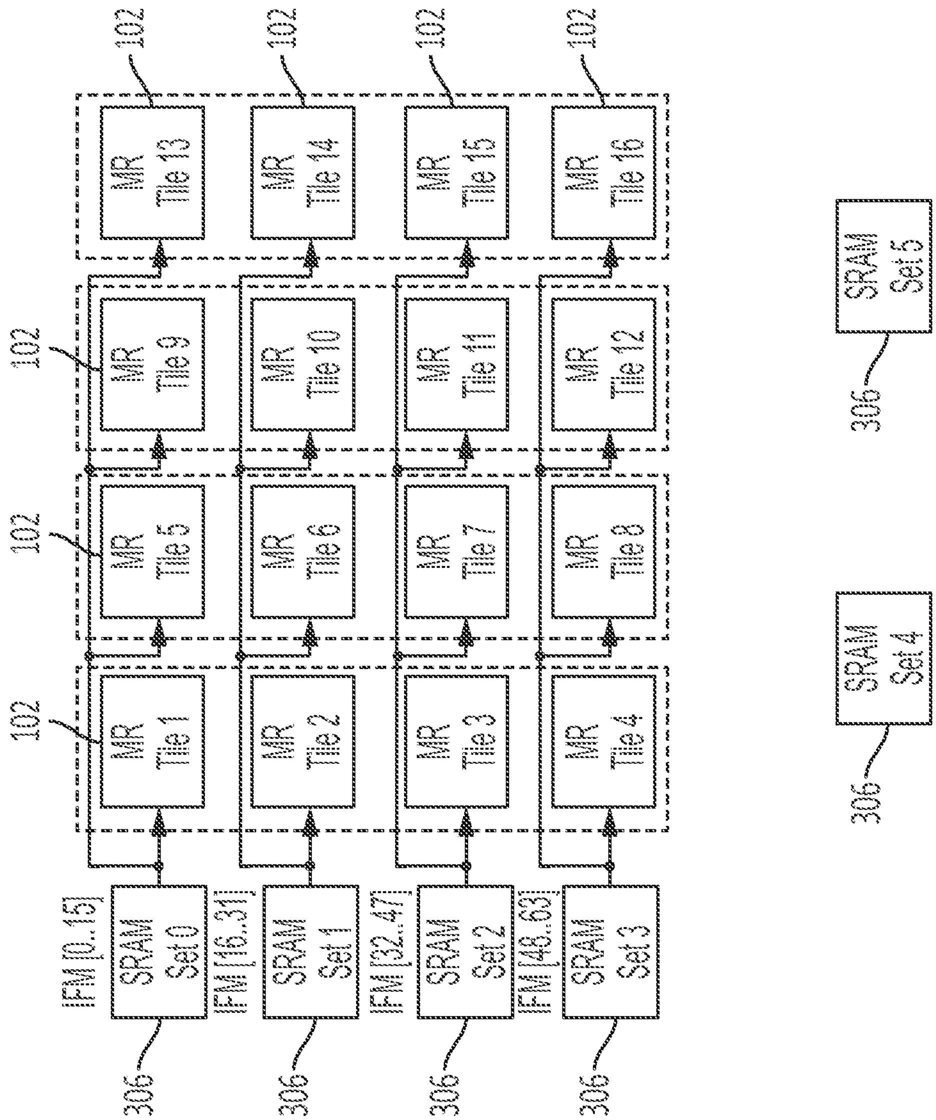
Figure 30B:
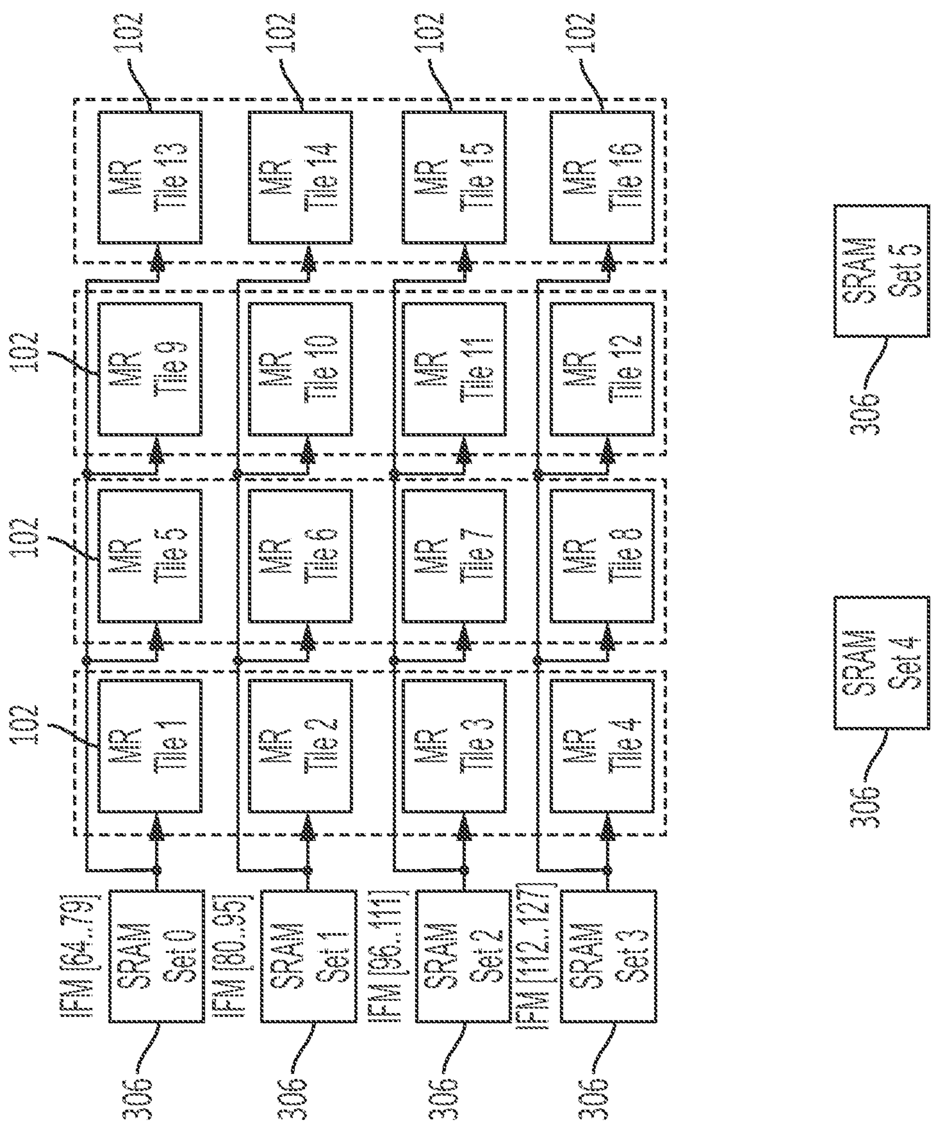
Figure 30C:
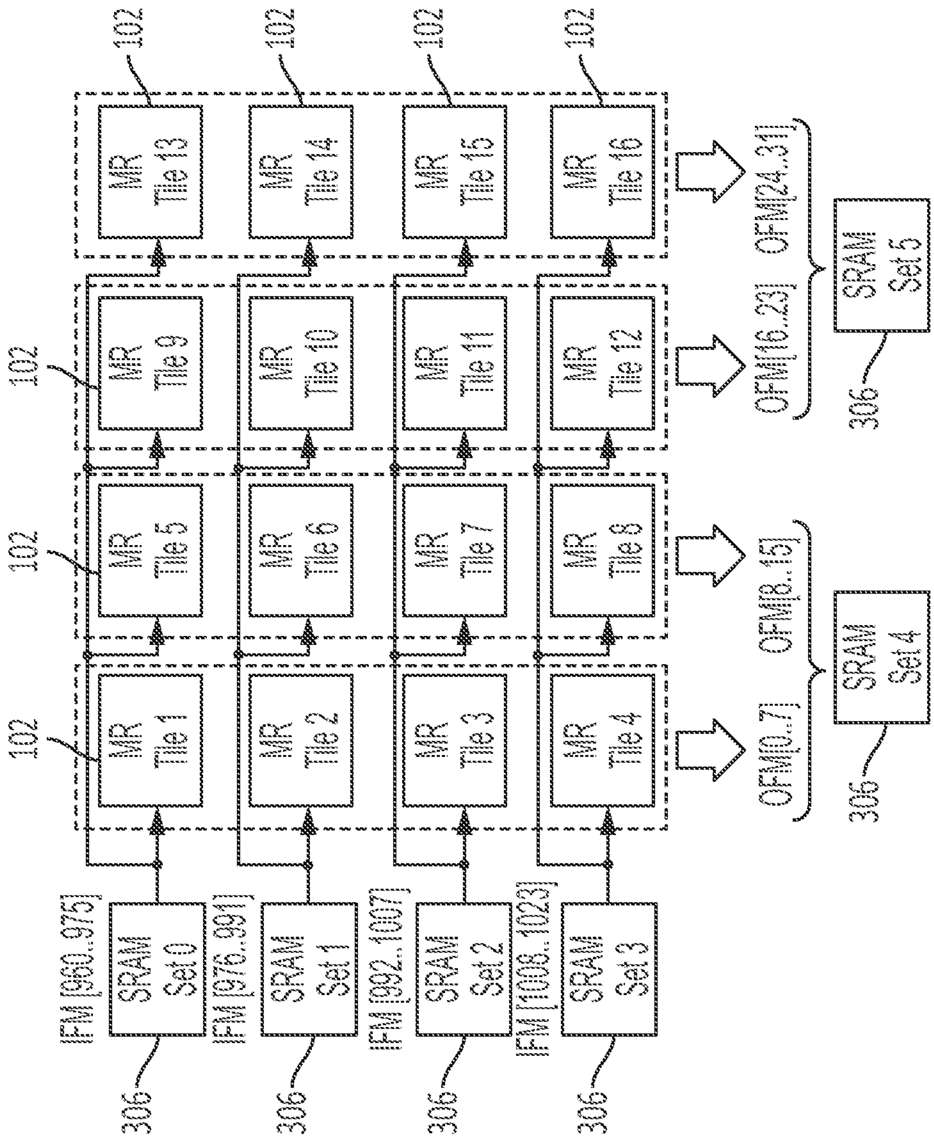

In a fifteenth example, depicted in FIGS. 30A-30C, a 1024×32 fully connected determination, or calculation, is performed on a single IFM sample (i.e., batch size of 1). Referring to FIG. 3OA, because a FC determination is similar to a 1×1 convolution, there may be (18 weights per MU)*(16 physical tiles)=up to 288 logical tiles each performing a 1×1 convolution. As such, the system may read all 1024 IFM channels (1024/16=32 IFM slices) in a single round to avoid partials.

To read all 32 IFM slices, 32 logical tiles may be used. The calculation may involve computing 32 OFMs (4 OFM slices). To do this in one pass (compute all OFMs at once), (32 IFM slices)*(4 OFM slices)=128 logical tiles may be used. As such, the available number of logical tiles (288) is sufficient. The number of logical tiles may be decreased to the needed 128 by storing 8 weights in each MU 103 (instead of storing up to 18 weights per MU 103).

The calculation may proceed as follows. The system may store 8 sets of IFM FC weights per MU 103, and use 128 logical tiles (as mentioned above). The entire calculation may be completed in a single IFM pass by computing four OFM slices. Each of the four IFM slices may be fetched and broadcast to the four tiles. The weights may be cycled eight times because there are 8 IFM weight sets stored in each MU. The sequence may include the following steps. In a first step, the OFM accumulators may be cleared. In a second step, IFM[0 . . . 63] (4 IFM slices) may be fetched and each slice may be broadcast to the four tiles. In a third step, not-yet-finished OFM[0 . . . 31] (4 OFM slices) may be computed and added to the OFM accumulators.

Referring to FIG. 3OB, in a fourth step, the OFM accumulators may be left uncleared, and the next set of weights may be used. In a fifth step, IFM[64 . . . 127] (4 IFM slices) may be fetched. In a sixth step, the system may continue computing (not-yet-finished) OFM[0 . . . 31] (4 OFM slices) by adding sum-of-products to the OFM accumulators. Referring to FIG. 3OC, the system may continue cycling weights and accumulating OFM results until all of the IFM has been processed. As a last step, the system may fetch IFM[960 . . . 1023] and accumulate into OFM[0 . . . 31], then apply the activation function to the accumulated OFM[0 . . . 31] and write the result to the SRAM 109.

In a sixteenth example, depicted in FIGS. 3PA-3PC, a 4096×1024 fully connected determination, or calculation, is performed using sixteen tiles and batch size of 1. This calculation may use (4096/16 IFM channels per tile)=256 IFM slices, and (1024/8 OFM channels per tile)=128 OFM slices. As in some of the other examples described above, it may be advantageous to read the entire IFM to avoid partials. Up to (18 weights per MU)*(16 physical tiles)=288 logical tiles may be available for use in performing the calculation. To read an entire IFM, 256 logical tiles may be used. As such, the available number of logical tiles (288) is sufficient. The system may be configured to use 256 logical tiles by loading 16 sets of weights into each MU 103. To read 256 IFM slices in one round (without partials), all 256 logical tiles may be used. Accordingly, (256 logical tiles/256 IFM slices)=1 OFM slice will be generated per IFM pass, and, to complete the calculation, (128 OFM slices)/(1 OFM slice per IFM pass)=128 OFM steps (and thus 128 IFM passes) will be performed.

The physical configuration is depicted in FIG. 3PA. The reduction fabric 111 may be configured to reduce outputs of all 16 tiles into a single OFM slice. Sixteen IFM slices (from 16 virtual SRAM banks) will be fetched, and each "broadcast" to only one tile 102.

The calculation may be performed in several steps, as follows. In a first step, the OFM[0 . . . 7] accumulators are cleared. In a second step, 16 IFM slices (IFM[0 . . . 255]) are fetched, and reduced into OFM[0 . . . 7] accumulators as intermediate (unfinished) results.

In a third step, the OFM[0 . . . 7] accumulators are left un-cleared, and the system switches to the next IFM weight set in the MUs 103. In a fourth step, the next 16 IFM slices (IFM[256 . . . 511]) are fetched, reduced and added to the OFM[0 . . . 7] accumulators. The steps may be continued until all of the IFM (up to and including IFM[4080 . . . 4095]) has been processed, as depicted in FIG. 3PB. The activation function may be applied to the accumulated dot products (in tile 16)] and the final result may be written to the SRAM 109. This completes the calculation of OFM[0 . . . 7]. Referring to FIG. 3PC, to perform the next OFM step, the system may repeat the previous computation for OFM[8 . . . 15], loading weights W[0 . . . 4095,8 . . . 15], and continue stepping the OFMs until all OFMs are computed, up to OFM[1016 . . . 1023], to complete the entire FC computation.

There may be FC computation cases when the IFM has more than (18 weights)*(16 IFM channels per IFM slice)*(16 physical tiles)=4,608 channels. In this case, partials may be used by splitting IFM channels into portions (of size sufficient to map onto existing physical hardware), computing FC for each portion separately, adding partial results (stored in SRAM) element-wise, as described previously, and finishing the calculation by applying the activation function.

In a case when weights are 16 bit, the MU weight register file capacity becomes 9 (16-bit weights) instead of 18 (8-bit weights) and calculations may be performed using multi-cycling, as described earlier. Similar reasoning applies for larger weight bit length, e.g., 24-bit or 32-bit in which, for example, the MU weight register file 127 has enough capacity to hold 6 24-bit weights or hold 4 32-bit weights.

Optionally, besides mapping an operation to all available physical tiles, a neural processor may be logically subdivide into several neural processors, each having a smaller number of tiles. For example, a neural processor having 16 physical tiles may be logically viewed as two neural processors, each having half the original number of tiles, e.g., 8 tiles each, or four neural processors, each having one quarter of the original number of tiles, e.g., 4 tiles each, and so on. Each neural processor resulting from such subdivision follows substantially same mapping principles as described above, given the number of physical tiles remaining after the division. Subdividing a neural processor into a plurality of smaller neural processors may be desirable for operations that require relatively few IFM reductions and relatively few OFM channels generated (more specifically a product thereof). For example, a 1×1×32×32 convolution mapping requires only 4 tiles. If mapped to 16 tiles, 1×1×32×32 convolution would result in 12 of 16 tiles being unused, thus considerably reducing multiplier utilization. In cases like this, a neural processor having 16 physical tiles may be subdivided into four neural processors, each having 4 tiles, mapping a 1×1×32×32 convolution onto each of the four resulting neural processors, subdividing the IFM tensor, e.g., of size H×W×32, into four non-overlapping IFM tensors of size (H/2×W/2×32), assigning one such quarter-size IFM tensor to one of the four smaller neural processors, and thus computing the convolution on all four IFM sub-tensors in parallel. Note that such small weight tensor sizes may be relatively uncommon and an operation mode like this requires appropriate support by the IFM, OFM and reduction fabrics.

The various mappings of neural network layer operations onto available hardware require support from the IFM delivery fabric 104, the OFM delivery fabric 106 and the reduction fabric 111. FIG. 4AA depicts a physical layout sketch of a neural processor having 16 hardware tiles 102 and 16 SRAM bank sets 109. In one embodiment, SRAM bank sets 109 memory may be placed in a distributed fashion in which each SRAM bank set 109 is adjacent (local) to exactly one tile 102 forming a tile-and-SRAM-bank-set unit 401. This allows streaming IFM and OFM data between every tile 102 and its local SRAM 109 in a highly parallel fashion, i.e., having up to 16 IFM and/or streams run in parallel in order to avoid a bandwidth bottleneck between SRAM and computing tiles that might exist if SRAM is aggregated into larger storage arrays and placed further away from tiles (i.e., when the memory is not distributed).

FIGS. 4AB and 4AC depict connections between a tile 102 and its local SRAM bank set 109, as well as the contents of SRAM bank set 109. Each SRAM bank set 109 may have four SRAM banks B0, B1, B2, B3 in order to provide sufficient bandwidth for concurrent read-write operations to serve the IFM, the OFM delivery fabrics, the CPU access over an AXI port (not shown), reading and writing partial results, and weight loading. FIG. 4AB depicts a path between banks B0, B1, B2, B3 to IFM delivery fabric 104 via multiplexer 403. This path may deliver up to two IFM slices per computation clock in order to supply enough IFM data to tiles capable of activation zero skip. The IFM delivery fabric 104 connects to the tile 102 to bring in IFM data from the local SRAM bank set as well as the other 15 SRAM bank sets. Each SRAM bank set 109 also supplies weights directly to its local tile 102, specifically to the weight decompression unit 138 inside the local tile 139. In order to make weight loading fast, all four SRAM banks B0 through B3 may fetch and input weights to WDU 139 in parallel. Loading weights to tiles as fast as possible is particularly important during fully-connected layer computation because, unlike in a convolution, FC weights must be discarded after each multiplication.

The plurality of MU weight register files 127 in each MR tile 102 may accept a weight kernel of size 18*16*8=2,304 bytes=144 words in which each word has 128 bits. For example, if the total SRAM capacity available to the neural processor 100 is 2M bytes, each SRAM bank set has (2M bytes)/(16 SRAM bank sets)=128K bytes. Also, if each SRAM bank set contains 4 SRAM banks, each SRAM bank size is (SRAM bank set size)/(SRAM banks per SRAM bank set)=128K/4=32K bytes. Therefore, each of the four local SRAM banks may store 144/4=36 words (of 2048 words available).

FIG. 4AC depicts local OFM connections between a tile and its local SRAM bank set. Tile 102 outputs finished or partial results to the OFM delivery fabric, which transports that data to the local SRAM bank set as well as other SRAM bank sets elsewhere and makes that data available to SRAM banks B0 through B3 via a de-multiplexer 405.

The following several paragraphs discuss the IFM data delivery fabric 104 and OFM data delivery fabric 106. The IFM delivery fabric 104 forms connections and transports data from SRAM bank sets 109 to tiles 102, while the OFM delivery fabric 106 forms connections and transports data from tiles 102 back to SRAM bank sets 109.

Considering the task of bringing IFM data from SRAM bank sets to tiles and OFM from tiles back to SRAM, it may appear that connections between SRAM bank sets to tiles must be all-to-all and connections between tiles and SRAM bank sets must be all-to-all as well. Having all-to-all connections may require using cross-bar switches (e.g., 16-to-16), which may consume a prohibitively large silicon area in case like this and are thus highly undesirable. More specifically, the area of a full cross-bar switch is proportional to O(NM) in which N is the number of switch inputs and M is the number of switch outputs. In the case N=M=T=16 in which T is the number of physical tiles, thus makes O(NM)= $O(T^2)$, which is quadratic in the number of tiles, and makes increasing (scaling up) the number of tiles (e.g., from 32 to 32 or 64) particularly costly with respect to silicon area.

As discussed below in detail, all-to-all connections between tiles and SRAM bank sets, however, are not required. In order to reduce the size and complexity of communication fabric, some embodiments aim to store OFMs locally to where OFMs will be produced (by each of the physical tiles) by partitioning SRAM into non-overlapping storage. IFM data is still delivered to each tile 102 from various SRAM bank sets 109, however, the IFM delivery fabric configuration may be reduced to 5 essential patterns corresponding to the 5 main patterns of reduction between tiles. Note that, instead of storing OFMs locally and fetching IFM in a distributed (global) fashion, it is also possible to construct the IFM and OFM delivery fabrics 104 and 106 to fetch IFM locally while writing OFM results in a distributed (global) fashion.

In general, a convolution or fully-connected layer computation may be decomposed into one of these five configurations with respect to inter-tile reduction: (1) input one IFM slice by broadcasting the IFM slice to all 16 tiles 102 that altogether produce 16 OFM slices, as depicted in FIG. 4AD; (2) input two IFM slices in parallel by broadcasting each of the two IFM slices to 8 tiles, as depicted in FIG. 4AE; (3) input 4 IFM slices in parallel by broadcasting each of the four IFM slices to 4 tiles, as depicted in FIG. 4AG; (4) input 8 IFM slices in parallel by broadcasting each of the four IFM slices to 2 tiles, as depicted in FIG. 4AJ; (4) input 16 IFM slices in parallel by broadcasting each of the 16 IFM slices to 1 tile, as depicted in FIG. 4AL.

Case (2) may be referred to as a "broadcast 8 reduce 2" case because each IFM slice is broadcast to 8 tiles and the output of 2 tiles is reduced by the reduction fabric 111 in order to obtain finished (or partial) result. Similarly, case (3) may be referred to as a "broadcast 4 reduce 4" case because each IFM slice is broadcast to 4 tiles 102 and the output of the 4 tiles 102 is reduced. Case (4) may be referred as a "broadcast 2 reduce 8" case because each IFM slice is broadcast to 2 tiles 102 and the output of 8 tiles 102 is reduced. Case (5) may be referred to as a "broadcast 1 reduce 16" case because each IFM slice is broadcast to only one tile 102 (i.e., no broadcast) and the output of all 16 tiles 102 is reduced. Case (1) may be referred to as a "broadcast 16 reduce 1" case because the IFM slice is broadcast to 16 tiles 102 and the output of 1 tile 102 is reduced (i.e., no reduction).

The five inter-tile reduction configuration may be considered in more detail regarding what connectivity patterns the IFM and OFM delivery fabrics 104 and 106 have to support in each of the five reduction configuration cases. For additional clarity, the term "inter-tile reduction' is referred to herein as designating reduction of tile outputs using a reconfigurable adder tree provided by the reduction fabric 111, as opposed to "intra-tile reduction," which is referred to herein as designating reduction of multiplier unit products using adder trees 128A, 128B inside the tiles 102.

The following notation may be used to identify the cases for which the interconnect fabric may be put to use. The notation Bm-Rn- refers to a case in which each IFM slice is broadcast to m tiles and output of n tiles is reduced by the inter-tile reduction fabric 111 in order to obtain a result. With 16 physical tiles available, the five inter-tile reduction cases include B16-R1, depicted in FIG. 4AD; B8-R2, depicted in FIG. 4AF; B4-R4, depicted in FIG. 4AH; B2-R8 depicted in FIG. 4AK; and B1-R16, depicted in FIG. 4AM.

The maximum number of inter-tile reduction cases is equal to LOG 2(N) in which N is the number of physical tiles in a neural processor 100. The inter-tile reduction configurations available in a neural processor with N tiles are constructed starting from configuration BN-R1 (m=N and n=1), followed by dividing m by two and multiplying n by two for each next configuration until m reaches 1. For example, if a neural processor 100 has only 8 tiles, there may be four inter-tile configurations available, including B8-R1, B4-R2, B2-R4 and B1-R8. A neural processor 100 having 32 tiles may provide up to six inter-tile configurations including B32-R1, B16-R2, B8-R4, B4-R8, B2-R16 and B1-R32.

Since computation may produce final results (e.g., with activation functions applied) as well as partial results, each inter-tile configuration may have two cases to consider with respect to OFM delivery path. The two cases include the case of producing final results as Bm-Rn-F, and the case of producing partial results as Bm-Rn-P.

FIGS. 4AE, 4AG, 4AJ, 4AL and 4AN additionally depict tile outputs being added together by the reduction fabric 111 in each of the five reduction configurations. For example, FIG. 4AL depicts the B2-R8 configuration with outputs of 8 tiles T0, T8, T4, T10, T2, T14 and T6 being summed up by one adder tree (the left adder tree in FIG. 4AK), while output of 8 tiles T7, T15, T3, T11, T13, T5, T9 and T1 are summed up by another adder tree (the right adder tree in FIG. 4AK).

Note that the configurable adder tree of the reduction fabric 111 is designed to add outputs of tiles 102 that are adjacent to each other, as opposed to adding outputs of tiles 102 spread around away from each other, thus making the configurable adder tree of the reduction fabric wiring compact and the tree itself "distributed". Note also that, unlike in previous examples, the 16 tiles here are identified as T0 through 15 and ordering of tile identifiers has changed (compared to notation used in mapping examples) in order to simplify notation in the examples below.

Each inter-tile reduction configurations may be examined one by one in detail. A first example case includes B16-R1 operations. Following the store-OFM-as-locally-as-possible while fetching IFM globally (from any SRAM bank set) principle, in this configuration the input IFM may stream from any SRAM bank set S0 . . . S15. As depicted in FIG. 4BA, SRAM bank set S10 furnishes a stream of IFM slices to all 16 tiles T0 through T15 over the IFM delivery fabric 104 (broadcasts one IFM slice to all 16 tiles, as depicted in FIG. 4AD. When one SRAM bank set (e.g., S10), for example, runs out of IFM data another SRAM bank set (e.g., S11) may become the data source and continue streaming IFM data to tiles. These steps may continue until the entire IFM tensor has been streamed in. In a case when multiple IFM passes are required, the IFM tensor streaming sequence may repeat as necessary.

In the B16-R1 configuration, there is no inter-tile reduction so that the adder unit of each tile 102 accumulates only the result of that tile, and the OFM finished or partial result will be written to a nearby SRAM bank set 109, as described below. Hence, each of 16 tiles 102 in the B16-R1 configuration generates a stream of OFM slices when results are final or a stream of partial results. Specifically, in the partials case, each value may be up to 32-bits-wide when working with 8-bit IFM and OFM or 48-bit-wide assuming 16-bit IFM and OFM data, and each partial result may be stored locally, as indicated by arrows 106 in FIG. 4BB. In this case, each SRAM bank set 109 acts as a destination to store partial results. Moreover, each SRAM bank set 109 receives data from its local tile, e.g., SRAM bank set S8 receives data from tile T8, S0 receives data from T0, and so on. Since each SRAM bank set 109 has 4 SRAM banks 108, each SRAM bank set 109 may generally store 16 4-byte partial results per clock. The current source SRAM bank set 109 must, however, concurrently fetch IFM data, while also writing partial results, which may exceed the available total bandwidth of the SRAM bank set in some cases. The IFM cache 139 may be helpful in cases like this to reduce IFM reads from the source SRAM bank set 109 when convolution planar kernel size is larger than 1×1. Also, operations using IFM weight cycling and/or convolution planar kernel size that are larger than 1×1 generate an output once in several clocks (as opposed one result per every clock), thus reducing the requirement for OFM bandwidth and avoiding SRAM access bottlenecks.

When generating final results, each final value may be quantized to 8-bit (or 16-bit, etc.) and the values may be written to SRAM bank sets [S0 . . . S7] or [S8 . . . S15]. FIGS. 4BC and 4BD depict the OFM delivery fabric connection and configuration choices. Since OFM slice width is half the IFM slice width (8 depth channels vs. 16), outputs of two vertically-adjacent tiles (a "tile column") may be sent over short, local connections to the upper SRAM bank set or to the lower SRAM bank set. Each SRAM bank set is capable of handling slices having 16 channels (due to IFM slice having 16 channels), therefore each SRAM bank set 109 may also accept two OFM slices. For example, outputs of tiles T0 and T8, which together comprise a tile column, may be grouped together and sent over local short connections 106 to either SRAM bank set S8, located immediately below T8, as depicted in FIG. 4BC, or S0, located immediately below T0, as depicted in FIG. 4BD. Similarly, tile column T4 T12 outputs may be grouped and sent locally to S4 or S12, tile column T10 T2 outputs to S10 or S2, tile column T14 T6 outputs to S14 or S6, tile column T7 T15 outputs to S7 or S15, tile column T3 T11 outputs to S3 or S11, tile column T13 T5 outputs to S13 or S5 and tile column T19 T1 outputs to S9 or S1.

A second example case depicts B8-R2 operations. As depicted in FIG. 4CA, one IFM slice may be supplied from upper SRAM bank sets 109 in which the term "upper" is defined to include S0, S4, S10, S14, S7, S3, S13 and S9, and one IFM slice may be supplied from lower SRAM bank sets 109 in which the term "lower" is defined to include S8, S12, S2, S6, S15, S11, S5 and S1. More specifically, any of the upper SRAM bank sets 109 may act as a source sending (broadcasting) an IFM slice to all upper tiles T0, T4, T10, T7, T3, T13 and T9. For example, the IFM delivery fabric 104 may be configured to read IFM slice from S10 and broadcast that IFM slice to T0, T4, T10, T14, T7, T3, T13 and T9. Alternatively, for example, the IFM delivery fabric 104 may be configured to read IFM slice from S3 and broadcast that IFM slice to T0, T4, T10, T14, T7, T3, T13 and T9.

Similarly, any of the lower SRAM bank sets 109 may act as a source sending (broadcasting) an IFM slice to all lower tiles T8, T12, T2, T6, T15, T11, T5 and T1. For example, the IFM delivery fabric 104 may be configured to read IFM slice from S11 and broadcast that IFM slice to T8, T12, T2, T6, T15, T11, T5 and T1. Alternatively, for example, the IFM delivery fabric 104 may be configured to read IFM slice from S8 and broadcast that IFM slice to T8, T12, T2, T6, T15, T11, T5 and T1.

Additionally, referring to FIG. 4CA, the SRAM bank sets 109 may be paired to send IFM slices so that in one (clock) cycle data is received from one of the following pairs [S0,S1] [S2,S3] [S4,S5] [S6,S7] [S8,S9] [S10,S11] [S12, S13] and [S14,S15]. For example, in FIG. 4CA, IFM slices are sourced from the [S10, S11] pair of the SRAM bank sets 109.

FIG. 4CB depicts inputting two IFM slices in which each IFM slice is broadcast to 8 tiles and the outputs of two tiles is reduced in a column-wise fashion. For example, following FIG. 4AF, the output of T0 is reduced with the output of T8 to generate one result; the T4 and T12 outputs are reduced to generate another result; the T10 and T2 outputs are reduced to generate yet another result; the T14 and T6 outputs are reduced to generate yet another result; the T7 and T15 outputs are reduced to generate yet another result; the T3 and T11 outputs are reduced to generate yet another result; the T13 and T5 outputs are reduced to generate yet another result; and T9 and T1 outputs are reduced to generate yet another result.

In the case of partial results, the eight reduction results may be stored in one of the two groups of SRAM bank sets [S0 . . . S7] and [S8 . . . 15]. For example, FIG. 4CB depicts the eight partial results stored in SRAM bank sets [S0 . . . S7]. In the case of final results, the OFM delivery fabric 106 may merge two neighboring tile columns' results, stored in one of the four SRAM bank set groups, including [S0 . . . S3], [S4 . . . S7], [S8 . . . S11] and [S12 . . . S15]. For example, FIG. 4CC depicts the eight final results stored in SRAM bank sets [S4 . . . S7].

A third example case depicts the B4-R4 operation. As depicted in FIG. 4DA, one IFM slice may be supplied from each quarter of the floorplan. Referring to FIG. 4DB, the operation may involve broadcasting four IFM slices and generating four results after reduction. The IFM delivery fabric 104 and the OFM delivery fabric 106 may manage to send inputs and receive outputs in one (clock) cycle, as long as IFM slices come from one four groups, including [S0 . . . S3], [S4 . . . S7], [S8 . . . S11], and [S12 . . . S15], and as long as outputs are written to one of four groups [S0 . . . S3], [S4 . . . S7], [S8 . . . S11], and [S12 . . . S15] if the results partial, as depicted in FIG. 4DB, and one of eight groups [S0 S1], [S2 S3], [S4 S5], [S6 S7], [S8 S9], [S10 S11], [S12 S13], and [S14 S15] if the results are final, as depicted in FIG. 4DC.

Referring to FIG. 4AJ, note that each reduction group 407 generates one output result. Two results may be stored in the top part, and two results may be stored in the bottom part. Because an OFM slice containing final results has size of 8 bytes, the OFM delivery fabric 104 may merge the results of two neighboring columns. FIG. 4AH also depicts the four IFM slices being broadcast to form four output results after reduction.

A fourth example case depicts B2-R8 operation. As depicted in FIG. 4EA, one IFM slice may be supplied from each eighth of the floorplan. Referring to FIG. 4EB, the operation may involve broadcasting eight IFM slices to produce two results after reduction.

The IFM delivery fabric 104 and the OFM delivery fabric 106 may manage to send inputs and receive outputs in one (clock) cycle, as long as input comes from one of two groups, including [S0 . . . S7] and [S8 . . . S15], and as long as the outputs are written to one of eight groups [S0 S1], [S2 S3], [S4 S5], [S6 S7], [S8 S9], [S10 S11], [S12 S13], and [S14 S15] if the results are partial, and any SRAM bank set 109 if the results are final.

FIG. 4EA depicts the source data being broadcast for the fourth example case. FIG. 4EB depicts the partial results being formed for the fourth example case, and FIG. 4EC depicts the final results being formed for the fourth example case. Referring to FIG. 4AJ, each section 407 generates one result after reduction. One of the two results may be stored in the top part, while the other result may be stored in the bottom part. Because OFM slice containing the final results has size of 8 bytes, the OFM delivery fabric 106 may merge the results of two neighboring column. FIG. 4AK also depicts the four IFM slices being broadcast to form two output results after reduction.

A fifth example case depicts the B1-R16 operation. As depicted in FIG. 4FA, one IFM slice may be supplied from each SRAM bank set 109 corresponding to a broadcast of one. Referring to FIG. 4FB, the operation may involve reducing outputs of all 16 tiles 102 to generate one result that may be stored in any SRAM bank set 109 for when the result is partial and when the result is final.

Because OFM slice containing final results has size of 8 bytes, the OFM delivery fabric 106 may merge the results of two neighboring columns. FIG. 4AM also depicts the 16 IFM slices input to form a single output result after reduction.

The IFM and OFM delivery fabrics 104 and 106 may be designed in a way, including the example described above, that makes it always possible for one operation to calculate and store to the SRAM 109 in such a way that a following operation that consumes results a previous operation is able to fetch those results for all permutations of reduction configurations of the current and the following operations. For example, the current operation may use a B4-R4 reduction configuration and store its results to SRAM bank sets 109 following the OFM delivery fabric 106 connectivity choices associated with the B4-R4 reduction configuration. The next (or a next) operation may use a B2-R8 reduction configuration with associated choices for IFM delivery fabric 106 connectivity, while being able to successfully fetch data calculated and stored by the previous B4-R4 operation.

FIG. 4G depicts one possible implementation of the IFM delivery fabric 104 that supports all IFM delivery fabric connectivity options for all reduction configurations described earlier. The fabric includes four two-way multi-drop buses with two of the two-way buses being placed between the upper SRAM bank sets and upper tiles, and the other two two-way buses being placed between the lower SRAM bank sets and lower tiles. The buses may be connected in a circular fashion by registers 411 so that data from upper buses may flow to lower buses and back. Note that additional pipelining registers that may be present in the IFM delivery fabric 104 have been omitted in FIG. 4G for the sake of explanation clarity.

FIG. 4H depicts one possible implementation of the OFM delivery fabric 106 that supports all OFM delivery fabric connectivity options for all reduction configurations described earlier. The fabric consists of four two-way 16-byte-wide multi-drop buses to support reduction configurations B2-R8 and B1-R16. Note that pipelining registers that may be present in OFM delivery fabric 106 have been omitted in FIG. 4H for the sake of explanation clarity.

The reduction fabric 111 may perform "inter-tile" reduction (as opposed to intra-tile reduction accomplished by the adder trees 128A and 128B) for all reduction configurations except for configuration R1 (when there is no inter-tile reduction), for example, the B8-R2, B4-R4, B2-R8 and B1-R16 configurations. The reduction fabric 111 includes a reconfigurable adder tree made up of reduce-and-accumulate (RAA) nodes 520 depicted in FIG. 5A. Each RAA node 520 operates on partially reduced results, i.e., linear results before activation function application. An RAA node 520 receives inputs either from same tile column ARUs 167 where that RAA node is located or inputs from other RAA nodes. An RAA node 520 sends outputs either to RAA nodes further up in the adder tree or back to the ARU 167. Subsequently, if results are final, the ARU 167 applies an activation function and forwards the final results to the OFM delivery fabric 106. Alternatively, if results are partial, the ARU 167 forwards partial results to OFM delivery fabric 106 while bypassing the activation function.

FIG. 5B depicts the reduction fabric 111 configured for the R16 configuration. Here, ARU modules 167 generate partially reduced results (from the intra-tile adder trees 128A and 128B), stream out the partially reduced results via the "To reduction fabric" output as indicated in FIG. 1X to the first level of RAA nodes 502. The first level of RAA nodes 502 reduce 16 ARU streams of partially reduced data pairwise down to 8 streams of partially reduced data. A second level of RAA 504 further reduce the 8 streams produced by the first level of RAA nodes 502 pairwise down to 4 streams of partially reduced data. Third and fourth-level RAA nodes 506 and 508 complete the reduction process to produce one stream of fully-reduced data that gets forwarded to the ARU 167 of the tile T14 for activation function application (when generating final results) and output to the OFM delivery fabric 106. Note that the tile T14 is physically located near the tree root RAA node 508 and corresponds to the ARU 167 of tile T14 in FIG. 4FB.

FIG. 5C depicts the reduction fabric 111 configured for the R8 configuration. Unlike the R16 configuration, the R8 configuration includes two adder trees (as opposed to one) in which each adder tree has three levels as opposed to four levels. The first adder tree reduces partially-reduced data from the ARUs of tiles T0, T8, T4, T12, T10, T2, T14 and T6, and forwards the fully-reduced result to the ARU 167 of tile T12 to complete the data return. The second adder tree reduces partially-reduced data from the ARUs 167 of tiles T7, T15, T2, T11, T13, T5, T9 and T1, and forwards the fully-reduced result to the ARU 167 of tile T13 to complete the data return. Note that tiles T12 and T13 are each physically located near the respective tree root RAA nodes 506 and corresponds to the ARUs 167 of tile T12 and T3, respectively, in FIG. 4FB.

FIG. 5D depicts a configuration R4 having four adder trees in which each adder tree reduces partially-reduced outputs from four tiles. FIG. 4DB depicts the physical locations of the ARUs 167 associated with the four tree root nodes.

FIG. 5E depicts a configuration R2 having eight adder trees in which each adder tree reduces partially-reduced outputs from two tiles 102. FIG. 4CB depicts the physical locations of the ARUs associated with the eight tree root nodes.

Lastly, FIG. 5F depicts a configuration R1 having no adder trees and tile ARUs 167 outputting results directly to the OFM delivery fabric 106 without the need for the reduction fabric 111. FIG. 4BB depicts the physical locations of ARUs 167 in this case. Note that the number inside the ARUs 167 in FIGS. 4BB, 4BC, 4BD, 4CB, 4CC, 4DB, 4DC, 4EB, 4EC and 4DB indicates the RAA tree node level as indicated in FIGS. 5B-5F in which level 0 corresponds to configuration R1 (not using the reduction fabric). The configuration R1 is implemented by ARU multiplexer 174 in the ARU forwarding data from accumulator 130A (or 130B) to the activation function and partial paths (which start with the bit range select unit 187) directly, thus bypassing the reduction fabric 111, as depicted in FIG. 1X. Note that some auxiliary logic that may be required to properly bypass the reduction fabric 111 in case of sparse activation support is not shown for clarity of general explanation.

FIG. 5G depicts the reduction fabric 111 formed from the RAA nodes 502, 504, 506, 508. Note again that each RAA node is physically located near exactly one tile 102. Each RAA node 502 receives inputs from both tiles in the tile column where node 502 is located. There is exactly one RAA node 502 per tile column. The RAA node 508 receives its inputs from nodes 506, which in turn receive their inputs from the nodes 504, which in turn receive inputs from the nodes 502. Note that the tile T12 does not have an RAA node 502 associated with it because there are 15 tree nodes while the number of physical tiles is 16.

As depicted in FIG. 5A, each RAA node 520 has two functions including reducing two inputs A and B using the adder 512 as well as accumulating reduced results using the accumulator 518 and the adder 514. The multiplexer 516 allows loading a reduced result from the adder 512 directly into the accumulator 518 at the start of an accumulation, for example, to start IFM weight cycling. The multiplexer 516 also allows accumulating reduced results as, for example, IFM weight cycling proceeds over time.

Storing weights in a compressed format may be beneficial to reduce amount of SRAM (and off-chip DDR) storage required to store the weights, to reduce SRAM (and off-chip DDR) power associated with fetching weights and to speed up weight loading, in particular during fully-connected layer computation. In some embodiments, idle cycles may be used to load multiplier unit weights. Also, in some embodiments, multiple vertical weight loading buses 101 may be used to accelerate weight loading, as opposed to FIG. 1K depicting only one weight loading bus per MR column.

More specifically, as previously depicted in FIG. 4AB, weights are stored in the four SRAM banks 108 local to each tile 102, and each tile 102 is capable of reading all 4 banks in parallel. Each SRAM bank 108 fetches 16 8-bit weights. Because each tile 102 has 8 MR columns, it takes (8 MR columns per tile)/(4 local SRAM banks per tile)=2 clocks to load one 8-bit weight per activation lane in case when weights are not compressed. Each tile 102 also contains a weight decompression unit 138 per tile, which may be used to decompress FC and convolution weights. For example, each multiplier unit 103 may have 18 weights, and it may take (18 weights per MU)*(2 clocks per weight load)=36 clock cycles to load all MU weights. Smaller kernels that do not use all 18 weights may load faster.

Weight streaming that is concurrent with an FC calculation may be used to improve throughput in fully connected calculations to keep multiplier utilization high during large FC computations. As mentioned earlier, an FC calculation does not reuse weights. Therefore, it may be necessary to stream weights rapidly during FC calculation. Specifically, an FC calculation with an IFM weight cycling of 1 would require providing one weight per clock to each MU in order to keep all multipliers 126 fully utilized. An IFM weight cycling of 2 requires providing one weight per two clocks to each MU 103 in order to keep all multipliers fully utilized. More generally, an IFM weight cycling of N requires providing one weight per N clocks per MU 103 to keep all multipliers 126 fully utilized.

According to various deep-learning research publications, fully-connected layer weights may be compressed, sometimes by a factor of 2 or more. In such cases, one decompressed weight may be loaded into each MU 103 per one clock, as opposed to loading one uncompressed weight into each MU 103 per two clocks.

Additionally, IFM data must, however, also be fetched from SRAM 109 along with weights, thus reducing SRAM bandwidth available to fetch weights. The amount of IFM data being fetched from SRAM 109, in turn, depends on the mapping reduction configuration. Large reduction numbers, e.g., R16, require fetching IFM data with more channels as compared to smaller reduction configurations, e.g., R1.

Because all 64 SRAM banks may be busy fetching FC weights, it may not be possible to read the IFM data from the SRAM 109 at the same time. To increase multiplier utilization, the IFM data may be stored spliced across all 64 banks. In some embodiments, to fetch the IFM data, weight reading stops for one clock cycle, and all 64 banks make one IFM data read into a 1-deep cache register located next to the output of the SRAM 109. The IFM data then streams from the cached 64 16-byte line. More specifically, one IFM data fetch from all 64 banks in parallel may fetch enough data at once to equal R=(64 SRAM banks)*(broadcast configuration number B)/(number of physical tiles) number of IFM data reads. Thus, the maximum multiplier utilization for fully-connected layer computation may be calculated according to R/(1+R) as a function of broadcast configuration number B, as shown, for some embodiments, in FIG. 6.

As mentioned earlier, the global control 140 as well as the local control units 142, 144 may have various configuration registers. In some embodiments, contents of some of these configuration registers may be able to switch on-the-fly to change the configuration of the neural processor 100 instantly, for example, as the neural processor 100 transitions from one operation to another or when one SRAM bank set 109 runs out of data and the IFM delivery fabric 104 must switch on-the-fly (without delay) streaming IFM data from another SRAM bank set 109. Following generally-known design practices, such on-the-fly reconfiguration may be accomplished by making configuration registers double-buffered, and put a new configuration into effect by switching between the two buffers. As depicted in FIG. 1A, the central control 110 may receive configuration data from a CPU over the AXI bus, pass that configuration data over to the utility bus 112, which in turn may transmit and load configuration values from the CPU into configuration registers of the control logic, such as 140, 142 and 144, as well as various other registers including the ARU bias register 195, the scale register 191, the activation function 197 configuration register, and so on. To coordinate on-the-fly configuration changes involving a large number of double-buffered registers switching at various time as needed, the utility bus 112 may load not only configuration register values, but also time (clock count) at which the double-buffered register must switch its configuration into effect.

FIG. 1A also depicts SRAM bank sets 109 each having an AXI slave interface, enabling the CPU to write IFM and weight tensors, and read back OFM results. Since the SRAM bank sets serve I/O requests coming from the IFM and OFM delivery fabrics 104 and 106 as well as local weight load connections, CPU I/O requests over the AXI interface 114 may be arbitrated and assigned a lower priority in order to allow neural network computation to continue without delay while the CPU waits for results.

Additionally, the subject matter disclosed herein provides a scalable multiplexer circuit or module, referred to herein as a "butterfly shuffler," that efficiently permutes data for purposes including homogenizing sparse data. There may be situations in which sparse data, such as data associated with input feature maps in particular, may include non-zero values that are clumped together. That is, the data may be non-homogeneous sparse data. In such a situation, a system that may parallel-process the sparse data by, for example, multiplying input feature map (IFM) values in parallel, may have many of the multipliers idling (i.e., multipliers with at least one operand equal to 0) while small groups of multipliers may be providing the bulk of the multiplying, thereby resulting in a bottleneck condition.

For example, referring to FIG. 7A, IFM data in memory, or SRAM, 109 has zero values relatively uniformly distributed among IFM slices as well as in lanes within IFM slices. IFM buffer 141 may receive a stream of IFM slices from FIG. 7A and use a look-ahead of 1 combined with look-aside of 1 to successfully multiplex non-zero activations in an out-of-order fashion, as to achieve activation skipping. For example, a non-zero value 701 may be multiplexed one lane down and one position forward to replace the zero value at location 702. Similarly, the IFM buffer 141 may forward other non-zero values out-of-order as indicated by arrow markers.

IFM data depicted in FIG. 7B has the same number of zero values as FIG. 7A; however, the zero values in FIG. 7B are clustered in the same IFM lanes of adjacent IFM slices. The IFM buffer 141 would have to support a look-aside of 4 to successfully multiplex non-zero activations 703 in place of zero values occupying location 704 to achieve activation skipping. Support for a large look-aside range, e.g., more than 1, may be prohibitively expensive in terms of silicon area as multiplexers 163 would have more inputs to bring activation values from lanes located further away.

Referring to FIG. 7C, an IFM shuffler 720 may be used to pseudo-randomly permute values within each IFM slice to disperse clusters of non-zero values within the IFM slice, thus, for example, converting the arrangement of data shown in FIG. 7B into the arrangement of data shown in FIG. 7A.

Note that pseudo-random permutation of activations must be accompanied by permutation of weights in an identical fashion, such that shuffled activations will be multiplied by the correct weights. Note also that since the pseudo-random permutation sequence may be known in advance of computation, weights may be permuted off-line, lane-wise for each incoming IFM slice, and loaded into an MR tile 102 before computation starts.

Besides shuffling IFM slice values lane-wise, the IFM shuffler 720 may also reorder the temporal sequence of IFM slices. Note that MR tile weight must be correspondingly reordered off-line, with respect to the steps in dot product computation, to match the altered order in which IFM slices will be arriving.

An IFM shuffler 720 may be efficiently implemented using a butterfly shuffler. Referring to FIG. 7D, a 16-channel (lane) butterfly shuffler 740 may be comprised of 64 2-to-1 multiplexers $M_{row,col}$ 730 arranged in an array of 16 rows 0 . . . 15 and 4 columns 0 . . . 3. As shown, the butterfly shuffler 740 may flexibly permute, or rearrange, IFM slice values arriving over 16 input lanes into another IFM slice.

Referring to FIG. 7D, multiplexers 730 in each column are paired to create 2×2 cross-bars. More specifically, in a 16-lane butterfly shuffler 740, 16 multiplexers 730 in each column become grouped pair-wise to form 8 2×2 cross-bar switches. Control signals of multiplexers that belong together in a pair are connected together. Sixteen multiplexers 730 in column 0 are paired to form 8 2×2 cross-bars as follows: $\{M_{0,0}, M_{1,0}\}$, $(M_{2,0}, M_{3,0})$, $(M_{4,0}, M_{5,0})$, $(M_{6,0}, M_{7,0})$, $(M_{8,0}, M_{9,0})$, $(M_{10,0}, M_{11,0})$, $(M_{12,0}, M_{13,0})$, $(M_{14,0}, M_{15,0})$. The eight resulting pairs are controlled by signals $sel_{0\ldots7,0}$ respectively. De-asserting $sel_{x,col}$ causes the corresponding cross-bar to pass inputs to outputs as is, without crossing. Asserting $sel_{x,col}$ causes the corresponding cross-bar to pass inputs across to outputs, i.e., input signals become swapped at the outputs of the cross-bar. For example, de-asserting $sel_{0,0}$ causes the 2×2 cross-bar formed by multiplexers $\{M_{0,0}, M_{1,0}\}$ to pass lanes 0 and 1 without changes, as lanes 0 and 1. Asserting $sel_{0,0}$ causes multiplexers $\{M_{0,0}, M_{1,0}\}$ output lanes 0 and 1 as lanes 1 and 0, i.e., swapped (crossed).

Note that multiplexer pairs in column 0 may be formed by pairing multiplexers $\{M_{x*2},0, M_{x*2+1},0\}$, where x is an integer ranging from 0 to 7, controlled by $sel_{x,0}$. More generally, in a butterfly shuffler having N lanes and M=log 2(N) columns, multiplexers in column c are paired as $\{M_{mod(x,k)+floor(x,k)*2,c}, M_{mod(x,k)+floor(x,k)*2+k,c}\}$, controlled by $sel_{x,c}$, in which $k=2^c$, $x \in [0 \ldots 2^{M-1}]$, each column has $2^{M-1}$ control signals, and there is a total of $S=2^{M-1}*M=N*\log 2(N)/2$ signals controlling permutations resulting in a total of $2^{N*\log 2(N)/2}$ permutations.

The butterfly shuffler 740 disclosed herein is not a full cross-bar multiplexer configuration. A full cross-bar configuration has a large area $O(N^2)$ in which N is number of lanes of data. In contrast, the area of the butterfly shuffler 740 is O(N log(N)), in which N is the number of lanes of data. In general, a full cross-bar provides N! unique permutations, while a butterfly shuffler with N lanes yields $2^{N*\log 2(N)/2}$ permutations. For example, a 16-lane butterfly shuffler has $2^{16*4/2=}2^{32}$ permutations for 16 channels.

FIG. 7E illustrates a pseudo-random generator 741, e.g., a linear feedback shift register, controlling permutations of the butterfly shuffler's data path 740. Before computation starts, e.g., to compute a convolution at a certain location, control logic of an MR tile may initialize the pseudo-random generator 741 to generate a known pseudo-random sequence of permutations as to shuffle data within incoming IFM slices. As mentioned before, weights pre-loaded into MR tile 102 that are to be used in this computation must be pre-shuffled offline, such that the post-shuffle order of lanes in each IFM slice coincides with the lane indices of weights.

As described above, zero activation sparsity may be supported by a look-aside and look-ahead mechanism, and further augmented by a type IFM shuffler, such as a butterfly shuffler 740. Zero activation skipping using two adder trees per MU column may yield a maximum speed-up of around 2× and an average speed-up of around 1.5×. However, input feature map fabric—as well as memory (SRAM)—bandwidth may be limited. As described earlier, the input feature map fabric bandwidth in an example embodiment may be limited to 2× to match the maximum speed-up of 2× obtained by zero activation skipping. Accordingly, a 2× maximum speed-up due to zero activation skipping may bring the OFM fabric throughput to be 2×, as compared to computation with zero activation skipping disabled. The OFM fabric throughput should also match computation throughput, thus providing a 2× bandwidth.

If the memory (SRAM) and/or IFM delivery fabric is limited to 2×, for example due to SRAM clock frequency or area or power constraints associated with IFM delivery fabric bandwidth, further increase in zero activation skipping may be capped as the SRAM and/or IFM delivery fabric become a bottleneck in data delivery and MR tile multipliers become idle while waiting for data to process. More generally, computation acceleration by any mechanism—including zero activation and zero weight skipping—may become capped. As described earlier, a method and apparatus has been presented for zero activation skipping. However, convolution and fully-connected layer weights also commonly exhibit sparseness, i.e., weight kernels may have a large number of zero weights. Therefore, it may be advantageous to explore zero weight multiplication skipping in addition to zero activation skipping, while keeping in mind the finite bandwidth constraints imposed by bandwidth of the IFM delivery fabric and/or the memory (SRAM).

For example, consider a method and apparatus to support weight sparsity, including combining it with activation sparsity. Assuming IFM delivery fabric bandwidth is capped at 2× the baseline bandwidth, i.e., with all multiplication skipping methods disabled, the overall throughput of a weight sparsity scheme may be also capped at 2× the baseline throughput. For this reason, for weight sparsity support, especially when combined with activation sparsity support to further increase computation speed-up beyond 2×, it may be advantageous to exploit another approach that is orthogonal to IFM delivery, i.e., an approach that does not require a further increase in IFM delivery fabric bandwidth.

One such approach may be the output feature map computation. More specifically, while keeping the IFM delivery fabric bandwidth unchanged, MU column may generate more than one output per OFM cycle. FIG. 8A depicts a baseline MU 810 with zero activation skipping logic omitted for clarity and without zero weight skipping logic as well. Here the weight register file 805 has 18 weights 815. A multiplier 822 receives an activation through a register 824 and a register file 805 weight, using an 18-to-1 multiplexer 820 and a register 821, to compute a term product, which feeds into an adder tree to continue dot product computation. FIG. 8B depicts an MU 850 that supports dual sparsity, i.e., both zero-value activation and zero-value weight skipping. Note that the weight register file 805 has been logically split in two groups 811 and 812, each containing nine weights. Here, the first group of nine weights belongs to one output channel, while the second group of nine weights belongs to a second output channel. The output from the multiplier 822 is sent to the two adder trees through a multiplexer 825. In other words, output cycling is always kept to at least 2. Mapping experiments conducted by the inventors have shown that keeping output cycling to at least 2 may be practical for most layers of popular neural network models, while for the remaining layers the logical weight register grouping may be disabled.

Zero-value weight skipping may proceed to check if a weight value—scheduled for upcoming multiplication—in group 0 equals zero and, in that case, instead use a next weight in group 1. If the weights in groups 0 and 1 both have zero values, the MU may process the next pixel.

In another aspect of the subject matter disclosed herein, referring to FIG. 8C, an ABU may broadcast an additional set of activations 850 that corresponds to next-up activations, referring to the order of activations as scheduled by the IFM buffer 124 as a result of zero skipping look-ahead and look-aside application, i.e., activations that would normally follow the currently-broadcast activations 750. Referring to FIG. 8B, correspondingly, the MU 850 may receive two sets of activation broadcast buses. In particular, the additional activation bus allows faster columns, i.e., columns with all MUs having been able to skip a multiplication due to zero activation and/or zero weight, to proceed to the next pixel. Note also that while some columns may proceed to compute the next pixel in such an out-of-order fashion, the number of activation busses per MU row limits how far out-of-order a column may proceed, i.e., by one pixel only in the example depicted in FIG. 8B.

Note that IFM shuffling, as described earlier, may be particularly helpful to enable sending two sets of activations in each cycle as clusters of non-zero values become spread out, i.e., homogenized.

In summary, the proposed dual sparsity approach may have the advantage of exploiting weight sparsity, in addition to activation sparsity, without requiring a higher IFM and/or SRAM bandwidth, while boosting computation speed-up to exceed the 2× cap, i.e., computing faster than 2× vs. baseline (with sparsity support disabled) while receiving IFM data no faster than 2×. Another advantage of the proposed dual sparsity approach may be the reuse of weight selection multiplexers 820 as the weights become grouped logically, rather than physically. One particular embodiment may opt to not use look-aside for zero activation skipping, thus obviating the need for look-aside logic and multiplexers to bring (borrow) weights from neighboring MUs. Note that having IFM shuffling would be particularly advantageous for such embodiment, in the absence of the look-aside logic. Lastly, logically, for computation mapping purposes, such computation may be essentially treated as each tile processing 16 output columns, as opposed to 8, with 16×8 multipliers.

As used herein, the terms "multiplexer" and "demultiplexer" are used interchangeably; each term means a switchable device with a plurality of data terminals (e.g., data inputs or data outputs) on one side (the "multi-port" side) and a single data terminal (e.g., a data output or a data input) on the other side (the "single-port" side), the device being configured to connect on of plurality of data terminals on the one side, selected according to a control signal received at a control input of the device, to the single data terminal on the other side.

The term "processing unit" is used herein to include any combination of hardware, firmware, and software, employed to process data or digital signals. Processing unit hardware may include, for example, application specific integrated circuits (ASICs), general-purpose or special-purpose central processing units (CPUs), digital signal processors (DSPs), graphics processing units (GPUs), and programmable logic devices, such as field programmable gate arrays (FPGAs). In a processing unit, as used herein, each function is performed either by hardware configured, i.e., hard-wired, to perform that function, or by more general-purpose hardware, such as a CPU, configured to execute instructions stored in a non-transitory storage medium. A processing unit may be fabricated on a single printed circuit board (PCB) or distributed over several interconnected PCBs. A processing unit may contain other processing units; for example, a processing unit may include two processing units, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath," "below," "lower," "under," "above," "upper" and the like, may be used herein for ease of description to describe a relationship of one element or feature to another element(s) or feature(s) as depicted in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" may encompass both an orientation of above and below. The device may be otherwise oriented (e.g., rotated 90 degrees or at other orientations) and the spatially relative descriptors used herein should be interpreted accordingly. Additionally, it will also be understood that when a layer is referred to as being "between" two layers, it may be the only layer between the two layers, or one or more intervening layers may also be present.

The terminology used herein is for the purpose of describing particular embodiments only and is not intended to be limiting of the subject matter disclosed herein. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the subject matter disclosed herein refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on," "connected to," "coupled to," or "adjacent to" another element or layer, it may be directly on, connected to, coupled to, or adjacent to the other element or layer, or one or more intervening elements or layers may be present. In contrast, when an element or layer is referred to as being "directly on," "directly connected to," "directly coupled to," or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a neural processor have been specifically described and illustrated herein, many modifications and variations will be apparent to those skilled in the art. Accordingly, it is to be understood that a neural processor constructed according to principles of this disclosure may be embodied other than as specifically described herein. The invention is also defined in the following claims, and equivalents thereof.

What is claimed is:

1. A processor, comprising:

a shuffler that shuffles sparse activation data to homogenize the sparse activation data with respect to the sparse activation data prior to shuffling;

a register that holds a first group of weight values and a second group of weight values, the first group of weight values and the second group of weight values being arranged in the register in a manner corresponding to shuffling of the sparse activation data, each group of weight values comprising at least one weight value, and each weight value in the first group of weight values corresponding to a weight value in the second group of weight values;

a non-zero weight value selector that selects a non-zero weight value from the first group of weight values or a non-zero weight value from the second group of weight values that corresponds to the weight value in the first group of weight values; and a multiplier that multiplies the selected non-zero weight value and an activation value from the homogenized sparse activation data that corresponds to the selected non-zero weight value to form an output product value.

2. The processor according to claim 1, wherein the weight value in the first group of weight values and the weight value in the second group of weight values that corresponds to the weight value in the first group of weight values both comprise zero-value weight values, and wherein the non-zero weight value selector controls the multiplier to prevent the multiplier from forming the output product value.

3. The processor according to claim 1, wherein a first weight value in the first group of weight values and the weight value in the second group of weight values that corresponds to the first weight value in the first group of weight values both comprise zero-value weight values, and wherein the non-zero weight value selector selects a non-zero weight value from a second weight value in the first group of weight values and a second weight value in the second group of weight values that corresponds to the second weight value in the first group of weight values, the second weight value in the first group of weight values being different from the first weight value in the first group of weight values.

4. The processor according to claim 1, wherein the first group of weight values includes nine weight values, and the second group of weight values comprises nine weight values.

5. The processor according to claim 1, further comprising a multiplexer coupled between the register and the multiplier, and wherein the non-zero weight value selector controls the multiplexer to couple the selected non-zero weight value to the multiplier.

6. The processor according to claim 1, wherein the processor is part of a neural processor, and wherein the shuffler comprises N lanes of activation data and M=log 2(N) columns of multiplexers, and the shuffler provides $2^{N*log\ 2(N)/2}$ permutations.

7. The processor according to claim 1, wherein the selected non-zero weight value comprises a uint8 value.

8. A processor, comprising:

a shuffler that shuffles sparse activation data to homogenize the sparse activation data with respect to the sparse activation data prior to shuffling;

a register that receives a plurality of N weight values in which N is a positive even number greater than 1, the plurality of N weight values being logically arranged into a first group and a second group, the first group and the second group being of equal size, each weight value in the first group corresponding to a weight value in the second group, weight values in the first group and weight values in the second group being arranged in the register in a manner corresponding to shuffling of the sparse activation data;

a multiplexer coupled to the register, the multiplexer selecting and outputting a non-zero weight value from a weight value in the first group or a weight value in the second group that corresponds to the weight value in the first group; and a multiplier that multiplies the non-zero weight value output from the multiplexer and an activation value from the homogenized sparse activation data that corresponds to the non-zero weight value output from the multiplexer to form an output product value.

9. The processor according to claim 8, further comprising a weight value selector that controls the multiplexer to output the non-zero weight value based on whether a weight value in the first group equals a zero value and whether a weight value in the second group that corresponds to the weight value in the first group equals a zero value.

10. The processor according to claim 9, wherein the weight value in the first group and the weight value in the second group that corresponds to the weight value in the first group both comprise zero-value weight values, and wherein the weight value selector further controls the multiplier to prevent the multiplier from forming the output product value.

11. The processor according to claim 9, wherein a first weight value in the first group and the weight value in the second group that corresponds to the first weight value in the first group both comprise zero-value weight values, and wherein the weight value selector selects a non-zero weight value from a second weight value in the first group and a second weight value in the second group that corresponds to the second weight value in the first group, the second weight value in the first group being different from the first weight value in the first group.

12. The processor according to claim 8, wherein the first group includes nine weight values, and the second group comprises nine weight values.

13. The processor according to claim 8, wherein the processor is part of a neural processor, and wherein the shuffler comprises N lanes of activation data and M=log 2(N) columns of multiplexers, and the shuffler provides $2^{N*log\ 2(N)/2}$ permutations.

14. The processor according to claim 8, wherein the non-zero weight value output from the multiplexer comprises a uint8 value.

15. A processor, comprising:

a shuffler that shuffles sparse activation data to homogenize the sparse activation data with respect to the sparse activation data prior to shuffling;

a first register that receives a plurality of N weight values in which N is a positive even number greater than 1, the plurality of N weight values being logically arranged into a first group and a second group, the first group and the second group being of equal size, each weight value in the first group corresponding to a weight value in the second group, and weight values in the first group and weight values in the second group being arranged in the first register in a manner corresponding to shuffling of the sparse activation data;

a multiplexer coupled to the first register, the multiplexer selecting and outputting a non-zero weight value from a weight value in the first group or a weight value in the second group that corresponds to the weight value in the first group;

a second register that receives a plurality of activation values shuffled by the shuffler; and a multiplier coupled to the multiplexer and the second register, the multiplier multiplying the non-zero weight value output from the multiplexer and an activation value received from the second register that corresponds to the non-zero weight value output from the multiplexer to form an output product value.

16. The processor according to claim 15, further comprising weight value selector that controls the multiplexer to output the non-zero weight value based on whether a weight value in the first group equals a zero value and whether a weight value in the second group that corresponds to the weight value in the first group equals a zero value.

17. The processor according to claim 16, wherein the weight value in the first group and the weight value in the second group that corresponds to the weight value in the first group both comprise zero-value weight values, and wherein the weight value selector further controls the multiplier to prevent the multiplier from forming the output product value.

18. The processor according to claim 16, wherein a first weight value in the first group and the weight value in the second group that corresponds to the first weight value in the first group both comprise zero-value weight values, and wherein the weight value selector selects a non-zero weight value from a second weight value in the first group and a second weight value in the second group that corresponds to the second weight value in the first group, the second weight value in the first group being different from the first weight value in the first group.

19. The processor according to claim 15, wherein the first group includes nine weight values, and the second group comprises nine weight values.

20. The processor according to claim 15, wherein the processor is part of a neural processor; and wherein the shuffler comprises N lanes of activation data and M=log 2(N) columns of multiplexers, and the shuffler provides $2^{N*log\ 2(N)/2}$ permutations.

* * * * *